US012225941B2

(12) United States Patent
Atkins et al.

(10) Patent No.: US 12,225,941 B2
(45) Date of Patent: Feb. 18, 2025

(54) CARTRIDGE FOR A VAPORIZER DEVICE

(71) Applicant: JUUL Labs, Inc., San Francisco, CA (US)

(72) Inventors: Ariel Atkins, San Francisco, CA (US); Christopher L. Belisle, Somerset, WI (US); Steven Christensen, Burlingame, CA (US); Alexander M. Hoopai, San Francisco, CA (US); Eric Joseph Johnson, San Francisco, CA (US); Jason King, San Francisco, CA (US); Esteban Leon Duque, Berkeley, CA (US); Matthew Rios, San Francisco, CA (US); Christopher James Rosser, Cambridge (GB); Andrew J. Stratton, Royston (GB); Alim Thawer, Cambridge (GB); James P. Westley, Cambridge (GB)

(73) Assignee: JUUL Labs, Inc., San Francisco, CA (US)

( * ) Notice: Subject to any disclaimer, the term of this patent is extended or adjusted under 35 U.S.C. 154(b) by 0 days.

(21) Appl. No.: 16/656,360

(22) Filed: Oct. 17, 2019

(65) Prior Publication Data
US 2020/0128874 A1 Apr. 30, 2020

Related U.S. Application Data

(63) Continuation-in-part of application No. 16/653,455, filed on Oct. 15, 2019, now Pat. No. 10,905,835.
(Continued)

(51) Int. Cl.
*A24F 40/10* (2020.01)
*A24F 40/42* (2020.01)
(Continued)

(52) U.S. Cl.
CPC .............. *A24F 40/48* (2020.01); *A24F 40/10* (2020.01); *A24F 40/42* (2020.01); *A24F 40/485* (2020.01); *A24F 40/44* (2020.01)

(58) Field of Classification Search
CPC .......... A24F 40/10; A24F 40/40; A24F 40/42; A24F 40/48; A24F 40/485; A24F 47/00;
(Continued)

(56) References Cited

U.S. PATENT DOCUMENTS

| 3,951,555 A | 4/1976 | Wittnebert et al. |
| 4,947,874 A | 8/1990 | Brooks et al. |
(Continued)

FOREIGN PATENT DOCUMENTS

| AT | 507187 B1 | 3/2010 |
| CA | 2768122 C | 11/2014 |
(Continued)

OTHER PUBLICATIONS

U.S. Appl. No. 16/805,672, filed Feb. 28, 2020.
(Continued)

*Primary Examiner* — Eric Yaary
*Assistant Examiner* — Sonny V Nguyen
(74) *Attorney, Agent, or Firm* — Mintz, Levin, Cohn, Ferris, Glovsky and Popeo, P.C

(57) ABSTRACT

A vaporization device includes a cartridge for a vaporizer device. For example, the vaporizer cartridge and/or features thereof may improve management of leaks of vaporizable material from the vaporizer cartridge, control of airflow within and/or near the vaporizer cartridge, heating of vaporizable material in the vaporizer cartridge, management of condensate in the vaporizer cartridge, and/or other assembly features of the vaporizer cartridge. Related systems, methods, and articles of manufacture are also described.

17 Claims, 112 Drawing Sheets

Related U.S. Application Data

(60) Provisional application No. 62/915,005, filed on Oct. 14, 2019, provisional application No. 62/913,135, filed on Oct. 9, 2019, provisional application No. 62/812,148, filed on Feb. 28, 2019, provisional application No. 62/812,161, filed on Feb. 28, 2019, provisional application No. 62/747,099, filed on Oct. 17, 2018, provisional application No. 62/747,130, filed on Oct. 17, 2018, provisional application No. 62/747,055, filed on Oct. 17, 2018.

(51) Int. Cl.
  *A24F 40/48* (2020.01)
  *A24F 40/485* (2020.01)
  *A24F 40/44* (2020.01)

(58) Field of Classification Search
  CPC .... A24F 47/002; A24F 47/004; A24F 47/008; A61M 15/06
  See application file for complete search history.

(56) References Cited

U.S. PATENT DOCUMENTS

| | | |
|---|---|---|
| 4,947,875 A | 8/1990 | Brooks et al. |
| 5,042,510 A | 8/1991 | Curtiss et al. |
| 5,381,509 A | 1/1995 | Mills |
| 5,646,666 A | 7/1997 | Cowger et al. |
| 6,084,616 A | 7/2000 | Nakata et al. |
| 6,155,268 A * | 12/2000 | Takeuchi ............ A24F 47/008 131/273 |
| 6,322,268 B1 | 11/2001 | Kaufmann et al. |
| 6,516,796 B1 | 2/2003 | Cox et al. |
| 6,606,998 B1 | 8/2003 | Gold |
| 7,793,861 B2 | 9/2010 | Bankers et al. |
| 7,802,569 B2 | 9/2010 | Yeates et al. |
| 8,365,742 B2 | 2/2013 | Hon |
| 8,485,180 B2 | 7/2013 | Smutney et al. |
| 8,528,569 B1 | 9/2013 | Newton |
| 8,733,345 B2 | 5/2014 | Siller |
| 8,833,364 B2 | 9/2014 | Buchberger |
| 8,881,737 B2 | 11/2014 | Collett et al. |
| 9,119,457 B2 | 9/2015 | Ooba |
| 9,146,246 B2 | 9/2015 | Battrell et al. |
| 9,215,895 B2 | 12/2015 | Adam et al. |
| 9,220,302 B2 | 12/2015 | DePiano et al. |
| 9,277,770 B2 | 3/2016 | DePiano et al. |
| 9,308,336 B2 | 4/2016 | Newton |
| 9,510,623 B2 | 12/2016 | Tucker et al. |
| 9,533,528 B2 | 1/2017 | Osano et al. |
| 9,549,573 B2 | 1/2017 | Monsees et al. |
| 9,609,893 B2 | 4/2017 | Novak, III et al. |
| 9,623,205 B2 | 4/2017 | Buchberger |
| 9,648,908 B1 | 5/2017 | Rinehart et al. |
| 9,681,688 B1 | 6/2017 | Rinehart et al. |
| 9,806,549 B2 | 10/2017 | Liberti et al. |
| 9,814,265 B2 | 11/2017 | Rinker et al. |
| 9,839,238 B2 | 12/2017 | Worm et al. |
| 9,913,493 B2 | 3/2018 | Worm et al. |
| 9,918,496 B2 | 3/2018 | Kane et al. |
| 9,936,733 B2 | 4/2018 | Ampolini et al. |
| 9,955,726 B2 | 5/2018 | Brinkley et al. |
| 9,986,761 B2 | 6/2018 | Thorens et al. |
| 9,986,762 B2 | 6/2018 | Alarcon et al. |
| 9,999,250 B2 | 6/2018 | Minskoff et al. |
| 10,004,259 B2 | 6/2018 | Sebastian et al. |
| 10,034,988 B2 | 7/2018 | Wensley et al. |
| 10,039,323 B2 | 8/2018 | Schuler et al. |
| 10,045,562 B2 | 8/2018 | Buchberger |
| 10,045,568 B2 | 8/2018 | Monsees et al. |
| 10,058,129 B2 | 8/2018 | Monsees et al. |
| 10,085,481 B2 | 10/2018 | Verleur et al. |
| 10,085,485 B2 | 10/2018 | Hunt et al. |
| 10,104,915 B2 | 10/2018 | Bowen et al. |
| 10,130,123 B2 | 11/2018 | Hatton et al. |
| 10,131,532 B2 | 11/2018 | Murison et al. |
| 10,159,282 B2 | 12/2018 | Monsees et al. |
| 10,188,148 B2 | 1/2019 | Althorpe et al. |
| 10,194,693 B2 | 2/2019 | Wensley et al. |
| 10,206,429 B2 | 2/2019 | Davis et al. |
| 10,258,085 B2 | 4/2019 | Xu |
| 10,278,427 B2 | 5/2019 | Buchberger |
| 10,285,444 B2 | 5/2019 | Clemens et al. |
| 10,292,435 B2 | 5/2019 | Qiu |
| 10,314,340 B2 | 6/2019 | Davis et al. |
| 10,383,367 B2 | 8/2019 | Rasmussen et al. |
| 10,383,368 B2 | 8/2019 | Larson |
| 10,405,579 B2 | 9/2019 | Collett et al. |
| 10,412,996 B2 | 9/2019 | Bright et al. |
| 10,631,576 B1 | 4/2020 | Chen et al. |
| 10,905,835 B2 | 2/2021 | Atkins et al. |
| 2001/0032643 A1 | 10/2001 | Hochrainer et al. |
| 2002/0142291 A1 | 10/2002 | Bauer et al. |
| 2002/0186283 A1 | 12/2002 | Smith et al. |
| 2003/0215335 A1* | 11/2003 | Crivelli ............ F04F 5/24 417/53 |
| 2004/0089314 A1 | 5/2004 | Felter et al. |
| 2005/0067503 A1 | 3/2005 | Katase |
| 2006/0047368 A1 | 3/2006 | Maharajh et al. |
| 2006/0093977 A1 | 5/2006 | Pellizzari et al. |
| 2007/0079889 A1 | 4/2007 | Lindsay et al. |
| 2008/0029095 A1 | 2/2008 | Esser |
| 2009/0230117 A1 | 9/2009 | Fernando et al. |
| 2009/0255534 A1 | 10/2009 | Paterno |
| 2009/0324206 A1 | 12/2009 | Young et al. |
| 2010/0253281 A1 | 10/2010 | Li |
| 2011/0094523 A1 | 4/2011 | Thorens et al. |
| 2011/0155153 A1 | 6/2011 | Thorens et al. |
| 2011/0226236 A1* | 9/2011 | Buchberger ...... A61M 15/0086 128/200.23 |
| 2012/0111346 A1 | 5/2012 | Rinker et al. |
| 2013/0042865 A1* | 2/2013 | Monsees ............ A61M 15/06 128/203.27 |
| 2013/0104916 A1 | 5/2013 | Bellinger et al. |
| 2013/0192615 A1 | 8/2013 | Tucker et al. |
| 2013/0213418 A1 | 8/2013 | Tucker et al. |
| 2013/0284192 A1 | 10/2013 | Peleg et al. |
| 2013/0306064 A1 | 11/2013 | Thorens et al. |
| 2013/0327327 A1 | 12/2013 | Edwards et al. |
| 2014/0096781 A1 | 4/2014 | Sears et al. |
| 2014/0096782 A1 | 4/2014 | Ampolini et al. |
| 2014/0109921 A1 | 4/2014 | Chen |
| 2014/0144429 A1 | 5/2014 | Wensley et al. |
| 2014/0190496 A1 | 7/2014 | Wensley et al. |
| 2014/0224244 A1 | 8/2014 | Liu |
| 2014/0253144 A1 | 9/2014 | Novak, III et al. |
| 2014/0261486 A1 | 9/2014 | Potter et al. |
| 2014/0261487 A1 | 9/2014 | Chapman et al. |
| 2014/0261488 A1 | 9/2014 | Tucker |
| 2014/0261491 A1 | 9/2014 | Hawes |
| 2014/0261492 A1 | 9/2014 | Kane et al. |
| 2014/0270729 A1 | 9/2014 | DePiano et al. |
| 2014/0283855 A1 | 9/2014 | Hawes et al. |
| 2014/0353856 A1 | 12/2014 | Dubief |
| 2014/0366898 A1 | 12/2014 | Monsees et al. |
| 2015/0020823 A1 | 1/2015 | Lipowicz et al. |
| 2015/0020825 A1 | 1/2015 | Galloway et al. |
| 2015/0027456 A1 | 1/2015 | Janardhan et al. |
| 2015/0027473 A1 | 1/2015 | Graf |
| 2015/0047662 A1 | 2/2015 | Hopps |
| 2015/0128969 A1 | 5/2015 | Chapman et al. |
| 2015/0136158 A1 | 5/2015 | Stevens et al. |
| 2015/0144145 A1 | 5/2015 | Chang et al. |
| 2015/0181944 A1 | 7/2015 | Li et al. |
| 2015/0201674 A1 | 7/2015 | Dooly et al. |
| 2015/0208729 A1 | 7/2015 | Monsees et al. |
| 2015/0208731 A1 | 7/2015 | Malamud et al. |
| 2015/0216233 A1 | 8/2015 | Sears et al. |
| 2015/0216237 A1 | 8/2015 | Wensley et al. |
| 2015/0223522 A1 | 8/2015 | Ampolini et al. |
| 2015/0224268 A1 | 8/2015 | Henry et al. |
| 2015/0237916 A1 | 8/2015 | Farine et al. |
| 2015/0245659 A1 | 9/2015 | DePiano et al. |

(56) References Cited

U.S. PATENT DOCUMENTS

| | | |
|---|---|---|
| 2015/0245669 A1 | 9/2015 | Cadieux et al. |
| 2015/0257445 A1 | 9/2015 | Henry, Jr. et al. |
| 2015/0257447 A1 | 9/2015 | Sullivan |
| 2015/0258289 A1 | 9/2015 | Henry, Jr. et al. |
| 2015/0264979 A1 | 9/2015 | Thorens et al. |
| 2015/0282527 A1 | 10/2015 | Henry, Jr. |
| 2015/0305407 A1 | 10/2015 | Li et al. |
| 2015/0305408 A1 | 10/2015 | Liu |
| 2015/0313275 A1 | 11/2015 | Anderson et al. |
| 2015/0313282 A1 | 11/2015 | Ademe et al. |
| 2015/0320116 A1 | 11/2015 | Bleloch et al. |
| 2015/0327596 A1 | 11/2015 | Alarcon et al. |
| 2015/0335070 A1 | 11/2015 | Sears et al. |
| 2015/0357839 A1 | 12/2015 | Cai et al. |
| 2016/0007653 A1 | 1/2016 | Tu |
| 2016/0018347 A1 | 1/2016 | Drbal et al. |
| 2016/0021931 A1 | 1/2016 | Hawes et al. |
| 2016/0029697 A1 | 2/2016 | Shafer |
| 2016/0057811 A1 | 2/2016 | Alarcon et al. |
| 2016/0058071 A1 | 3/2016 | Hearn |
| 2016/0073692 A1 | 3/2016 | Alarcon et al. |
| 2016/0109115 A1 | 4/2016 | Lipowicz |
| 2016/0143361 A1 | 5/2016 | Juster et al. |
| 2016/0150824 A1 | 6/2016 | Memari et al. |
| 2016/0150828 A1 | 6/2016 | Goldstein et al. |
| 2016/0206000 A1 | 7/2016 | Lord et al. |
| 2016/0213065 A1 | 7/2016 | Wensley et al. |
| 2016/0219933 A1 | 8/2016 | Henry, Jr. et al. |
| 2016/0219938 A1 | 8/2016 | Mamoun et al. |
| 2016/0255876 A1 | 9/2016 | Rostami |
| 2016/0261021 A1 | 9/2016 | Marion et al. |
| 2016/0262453 A1 | 9/2016 | Ampolini et al. |
| 2016/0262454 A1 | 9/2016 | Sears et al. |
| 2016/0270444 A1 | 9/2016 | Lin |
| 2016/0286865 A1 | 10/2016 | King et al. |
| 2016/0302471 A1 | 10/2016 | Adam et al. |
| 2016/0309783 A1 | 10/2016 | Hopps et al. |
| 2016/0309786 A1 | 10/2016 | Holtz et al. |
| 2016/0325858 A1 | 11/2016 | Ampolini et al. |
| 2016/0331030 A1 | 11/2016 | Ampolini et al. |
| 2016/0331033 A1 | 11/2016 | Hopps et al. |
| 2016/0331034 A1 | 11/2016 | Cameron |
| 2016/0331035 A1 | 11/2016 | Cameron |
| 2016/0338408 A1 | 11/2016 | Guenther, Jr. et al. |
| 2016/0341419 A1 | 11/2016 | Fluhrer |
| 2016/0345632 A1 | 12/2016 | Lipowicz |
| 2016/0366943 A1 | 12/2016 | Li et al. |
| 2016/0366947 A1 | 12/2016 | Monsees et al. |
| 2016/0374399 A1 | 12/2016 | Monsees et al. |
| 2017/0013880 A1 | 1/2017 | O'Brien et al. |
| 2017/0020191 A1 | 1/2017 | Lamb et al. |
| 2017/0023952 A1 | 1/2017 | Henry, Jr. et al. |
| 2017/0027227 A1 | 2/2017 | Lipowicz |
| 2017/0035115 A1 | 2/2017 | Monsees et al. |
| 2017/0042245 A1 | 2/2017 | Buchberger et al. |
| 2017/0043106 A1* | 2/2017 | Hyland .............. A61M 16/0833 |
| 2017/0043910 A1 | 2/2017 | Hopps et al. |
| 2017/0045150 A1 | 2/2017 | Marsh |
| 2017/0045994 A1 | 2/2017 | Murison et al. |
| 2017/0056883 A1* | 3/2017 | Aarts .................. B01L 3/50273 |
| 2017/0079322 A1 | 3/2017 | Li et al. |
| 2017/0095005 A1 | 4/2017 | Monsees et al. |
| 2017/0099877 A1 | 4/2017 | Worm et al. |
| 2017/0105455 A1 | 4/2017 | Qiu |
| 2017/0112194 A1 | 4/2017 | Sur et al. |
| 2017/0112196 A1 | 4/2017 | Sur et al. |
| 2017/0119052 A1 | 5/2017 | Williams et al. |
| 2017/0119053 A1 | 5/2017 | Henry, Jr. et al. |
| 2017/0127722 A1 | 5/2017 | Davis et al. |
| 2017/0135399 A1 | 5/2017 | Gavrielov et al. |
| 2017/0143038 A1 | 5/2017 | Dickens |
| 2017/0156398 A1 | 6/2017 | Sur et al. |
| 2017/0163046 A1 | 6/2017 | Patil et al. |
| 2017/0173278 A1 | 6/2017 | Buchberger |
| 2017/0181223 A1 | 6/2017 | Sur et al. |
| 2017/0181471 A1 | 6/2017 | Phillips et al. |
| 2017/0188626 A1 | 7/2017 | Davis et al. |
| 2017/0188627 A1 | 7/2017 | Sur |
| 2017/0188629 A1 | 7/2017 | Dickens et al. |
| 2017/0196263 A1 | 7/2017 | Sur |
| 2017/0202266 A1 | 7/2017 | Sur |
| 2017/0208863 A1 | 7/2017 | Davis et al. |
| 2017/0224021 A1 | 8/2017 | Xiang et al. |
| 2017/0231276 A1 | 8/2017 | Mironov et al. |
| 2017/0238617 A1 | 8/2017 | Scatterday |
| 2017/0246405 A1 | 8/2017 | Wensley et al. |
| 2017/0251718 A1 | 9/2017 | Armoush et al. |
| 2017/0251721 A1 | 9/2017 | Rostami et al. |
| 2017/0251723 A1 | 9/2017 | Kobal et al. |
| 2017/0251724 A1 | 9/2017 | Lamb et al. |
| 2017/0258134 A1 | 9/2017 | Kane |
| 2017/0258143 A1 | 9/2017 | Lederer |
| 2017/0259170 A1 | 9/2017 | Bowen et al. |
| 2017/0273355 A1 | 9/2017 | Rogers et al. |
| 2017/0273360 A1 | 9/2017 | Brinkley et al. |
| 2017/0280767 A1 | 10/2017 | Li et al. |
| 2017/0280779 A1 | 10/2017 | Qiu |
| 2017/0290371 A1 | 10/2017 | Davis et al. |
| 2017/0294804 A1 | 10/2017 | Sur |
| 2017/0333650 A1 | 11/2017 | Buchberger et al. |
| 2017/0360092 A1 | 12/2017 | Althorpe et al. |
| 2017/0360093 A1 | 12/2017 | Fernando |
| 2017/0367402 A1 | 12/2017 | Lau et al. |
| 2017/0367407 A1 | 12/2017 | Althorpe et al. |
| 2018/0020728 A1 | 1/2018 | Alarcon et al. |
| 2018/0020736 A1 | 1/2018 | Silvestrini et al. |
| 2018/0027877 A1 | 2/2018 | Tucker et al. |
| 2018/0027879 A1 | 2/2018 | Gavrielov et al. |
| 2018/0042305 A1 | 2/2018 | Hogwood et al. |
| 2018/0070647 A1 | 3/2018 | Monsees et al. |
| 2018/0077967 A1 | 3/2018 | Hatton et al. |
| 2018/0085539 A1 | 3/2018 | Trzecieski |
| 2018/0116292 A1 | 5/2018 | Atkins et al. |
| 2018/0125120 A1 | 5/2018 | Gavrielov et al. |
| 2018/0132536 A1 | 5/2018 | Henry, Jr. |
| 2018/0146711 A1* | 5/2018 | Mazur .................. A61M 11/02 |
| 2018/0160733 A1 | 6/2018 | Leadley et al. |
| 2018/0177240 A1 | 6/2018 | Duque et al. |
| 2018/0184722 A1 | 7/2018 | Murison et al. |
| 2018/0199627 A1 | 7/2018 | Bowen et al. |
| 2018/0220707 A1 | 8/2018 | Biel et al. |
| 2018/0279682 A1 | 10/2018 | Guo et al. |
| 2018/0279685 A1 | 10/2018 | Thorens et al. |
| 2018/0280637 A1 | 10/2018 | Mayle et al. |
| 2018/0296777 A1 | 10/2018 | Terry et al. |
| 2018/0297047 A1* | 10/2018 | Tong ....................... A24F 40/42 |
| 2019/0001077 A1 | 1/2019 | Xu et al. |
| 2019/0099561 A1 | 4/2019 | Nettenstrom |
| 2019/0104764 A1 | 4/2019 | Tucker et al. |
| 2019/0124982 A1 | 5/2019 | Atkins et al. |
| 2019/0166913 A1 | 6/2019 | Trzecieski |
| 2019/0200674 A1 | 7/2019 | Tucker et al. |
| 2019/0246693 A1 | 8/2019 | Nettenstrom et al. |
| 2019/0261688 A1 | 8/2019 | Qiu et al. |
| 2019/0328039 A1 | 10/2019 | Romming et al. |
| 2019/0373953 A1 | 12/2019 | Atkins et al. |
| 2019/0387797 A1 | 12/2019 | Christensen et al. |
| 2020/0000143 A1 | 1/2020 | Anderson et al. |
| 2020/0022417 A1 | 1/2020 | Atkins et al. |
| 2020/0046033 A1 | 2/2020 | Robert et al. |
| 2020/0077707 A1 | 3/2020 | Alston et al. |
| 2020/0107585 A1 | 4/2020 | Atkins et al. |
| 2020/0114094 A1 | 4/2020 | Atkins et al. |
| 2020/0128874 A1 | 4/2020 | Atkins et al. |
| 2020/0205474 A1* | 7/2020 | Tong ....................... A24F 40/44 |
| 2021/0145053 A1 | 5/2021 | Tasselli et al. |

FOREIGN PATENT DOCUMENTS

| | | |
|---|---|---|
| CA | 2883143 C | 7/2017 |
| CA | 2935072 C | 5/2018 |
| CA | 2949516 C | 6/2019 |
| CN | 1491525 A | 4/2004 |
| CN | 100589726 C | 2/2010 |

(56) References Cited

FOREIGN PATENT DOCUMENTS

| | | |
|---|---|---|
| CN | 102326869 B | 1/2012 |
| CN | 202873795 U | 4/2013 |
| CN | 103237469 A | 8/2013 |
| CN | 102264420 B | 3/2014 |
| CN | 203523810 U | 4/2014 |
| CN | 103859604 A | 6/2014 |
| CN | 104000306 A | 8/2014 |
| CN | 203828071 U | 9/2014 |
| CN | 102753047 B | 8/2015 |
| CN | 105011375 A | 11/2015 |
| CN | 102387719 B | 3/2016 |
| CN | 105476069 B | 4/2016 |
| CN | 105963833 A | 9/2016 |
| CN | 205624481 U | 10/2016 |
| CN | 106998812 A | 8/2017 |
| CN | 107580460 A | 1/2018 |
| CN | 207011686 U | 2/2018 |
| CN | 107921226 A | 4/2018 |
| CN | 108158039 A | 6/2018 |
| CN | 108158044 A | 6/2018 |
| CN | 109259313 A | 1/2019 |
| CN | 105919164 B | 3/2019 |
| CN | 109588779 A | 4/2019 |
| CN | 110089780 A | 8/2019 |
| CN | 110226778 A | 9/2019 |
| CN | 110367607 A | 10/2019 |
| CN | 215455405 U | 1/2022 |
| DE | 102017123869 B4 | 5/2019 |
| EP | 0358114 A2 | 3/1990 |
| EP | 2404515 A1 | 1/2012 |
| EP | 2967154 B1 | 1/2016 |
| EP | 3061356 A1 | 8/2016 |
| EP | 3097803 A1 | 11/2016 |
| EP | 3143882 B1 | 3/2017 |
| EP | 3143884 B1 | 4/2017 |
| EP | 3158880 A1 | 4/2017 |
| EP | 3170414 A1 | 5/2017 |
| EP | 3165102 A2 | 8/2017 |
| EP | 3220987 A1 | 9/2017 |
| EP | 3337341 A1 | 6/2018 |
| EP | 3358972 A1 | 8/2018 |
| EP | 3177351 B1 | 10/2018 |
| EP | 3232834 B1 | 4/2019 |
| EP | 3488715 A2 | 5/2019 |
| EP | 3518696 A1 | 8/2019 |
| EP | 3664631 A2 | 6/2020 |
| EP | 3692830 A1 | 8/2020 |
| EP | 3694357 A1 | 8/2020 |
| EP | 3747286 A1 | 12/2020 |
| EP | 3863436 A1 | 8/2021 |
| EP | 3664630 B1 | 2/2022 |
| EP | 3984390 A1 | 4/2022 |
| EP | 4044842 A2 | 8/2022 |
| GB | 2548647 A | 9/2017 |
| JP | H1133097 A | 2/1999 |
| JP | 4171054 B2 | 8/2008 |
| JP | 2012506263 A | 3/2012 |
| JP | 2012-517229 | 8/2012 |
| JP | 2013516159 A | 5/2013 |
| JP | 2013/113551 A | 6/2013 |
| JP | 2015-504653 A | 2/2015 |
| JP | 2015-198985 A | 11/2015 |
| JP | 2016511008 A | 4/2016 |
| JP | 2018-509158 A | 4/2018 |
| JP | 2018-523976 A | 8/2018 |
| KR | 2009/0010954 A | 1/2009 |
| KR | 2012-0101118 A | 9/2012 |
| KR | 101430282 B1 | 8/2014 |
| KR | 20150046318 A | 4/2015 |
| KR | 20160096745 A | 8/2016 |
| KR | 1020180088806 A | 8/2017 |
| KR | 2018-0044409 A | 5/2018 |
| KR | 20180083424 A | 7/2018 |
| KR | 101957819 B1 | 3/2019 |
| KR | 20190057399 A | 5/2019 |
| RU | 2527351 C2 | 8/2014 |
| RU | 2611487 C2 | 2/2017 |
| RU | 2656089 C2 | 5/2018 |
| TW | 201806502 A | 3/2018 |
| UZ | 2238 C | 12/2002 |
| WO | WO-9501137 A1 | 1/1995 |
| WO | WO-2008077271 A1 | 7/2008 |
| WO | WO-2012026963 A2 | 3/2012 |
| WO | WO-2012059726 A2 | 5/2012 |
| WO | WO-2013060781 A1 | 5/2013 |
| WO | WO-2013113173 A1 | 8/2013 |
| WO | WO-2014/071329 A1 | 5/2014 |
| WO | WO-2014150979 A2 | 9/2014 |
| WO | WO-2015077645 A1 | 5/2015 |
| WO | WO-2015165105 A1 | 11/2015 |
| WO | WO-2016019353 A1 | 2/2016 |
| WO | WO-2016023809 A1 | 2/2016 |
| WO | WO-2016028544 A1 | 2/2016 |
| WO | WO-2016033242 A1 | 3/2016 |
| WO | WO-2016033721 A1 | 3/2016 |
| WO | WO-2016041209 A1 | 3/2016 |
| WO | WO-2016058139 A1 | 4/2016 |
| WO | WO-2016/079155 A1 | 5/2016 |
| WO | WO-2016079151 A1 | 5/2016 |
| WO | 2016/092261 A1 | 6/2016 |
| WO | WO-2016123763 A1 | 8/2016 |
| WO | WO-2016127468 A1 | 8/2016 |
| WO | WO-2016128562 A1 | 8/2016 |
| WO | WO-2016141592 A1 | 9/2016 |
| WO | WO-2016145072 A1 | 9/2016 |
| WO | WO-2016193336 A1 | 12/2016 |
| WO | WO-2017011419 A1 | 1/2017 |
| WO | 2017/028295 A1 | 2/2017 |
| WO | WO-2017016323 A1 | 2/2017 |
| WO | WO-2017036819 A1 | 3/2017 |
| WO | WO-2017036828 A1 | 3/2017 |
| WO | WO-2017036879 A1 | 3/2017 |
| WO | WO-2017046363 A1 | 3/2017 |
| WO | 2017/059571 A1 | 4/2017 |
| WO | WO-2017064051 A1 | 4/2017 |
| WO | WO-2017064324 A1 | 4/2017 |
| WO | WO-2017072277 A1 | 5/2017 |
| WO | WO-2017082728 A1 | 5/2017 |
| WO | WO-2017085240 A1 | 5/2017 |
| WO | WO-2017093535 A1 | 6/2017 |
| WO | WO-2017108268 A1 | 6/2017 |
| WO | WO-2017122196 A1 | 7/2017 |
| WO | WO-2017137554 A1 | 8/2017 |
| WO | WO-2017139595 A1 | 8/2017 |
| WO | WO-2017153270 A1 | 9/2017 |
| WO | WO-2017163045 A1 | 9/2017 |
| WO | WO-2017163046 A1 | 9/2017 |
| WO | WO-2017163050 A1 | 9/2017 |
| WO | WO-2017163052 A1 | 9/2017 |
| WO | WO-2017207416 A1 | 12/2017 |
| WO | WO-2017207419 A1 | 12/2017 |
| WO | WO-2017216516 A1 | 12/2017 |
| WO | WO-2018020037 A1 | 2/2018 |
| WO | WO-2018024742 A1 | 2/2018 |
| WO | WO-2018031600 A1 | 2/2018 |
| WO | WO-2018057957 A1 | 3/2018 |
| WO | WO-2018087738 A1 | 5/2018 |
| WO | WO-2018/122380 A1 | 7/2018 |
| WO | WO-2018138688 A1 | 8/2018 |
| WO | WO-2018158566 A1 * | 9/2018 ........... A24B 15/167 |
| WO | WO-2018172765 A1 | 9/2018 |
| WO | WO-2018202403 A1 | 11/2018 |
| WO | WO-2019073010 A1 | 4/2019 |
| WO | WO-2019173923 A1 | 9/2019 |
| WO | WO-2019232086 A1 | 12/2019 |
| WO | WO-2020025644 A1 | 2/2020 |
| WO | WO-2020081849 A2 | 4/2020 |
| WO | WO-2021076657 A3 | 8/2021 |
| WO | WO-2022161259 A1 * | 8/2022 ............. A24F 40/10 |

OTHER PUBLICATIONS

U.S. Appl. No. 16/653,455, filed Oct. 15, 2019, US 2020-0114094.
U.S. Appl. No. 16/657,857, filed Oct. 18, 2019, US 2020-0120991.

(56) References Cited

OTHER PUBLICATIONS

U.S. Appl. No. 16/805,672, filed Feb. 28, 2020, US 2020-0275696.
U.S. Appl. No. 16/520,149, filed Jul. 23, 2019, US 2020-0022417.
U.S. Appl. No. 16/653,455, filed Oct. 15, 2019, U.S. Pat. No. 10,905,835.
U.S. Appl. No. 17/161,590, filed Jan. 28, 2021.

* cited by examiner

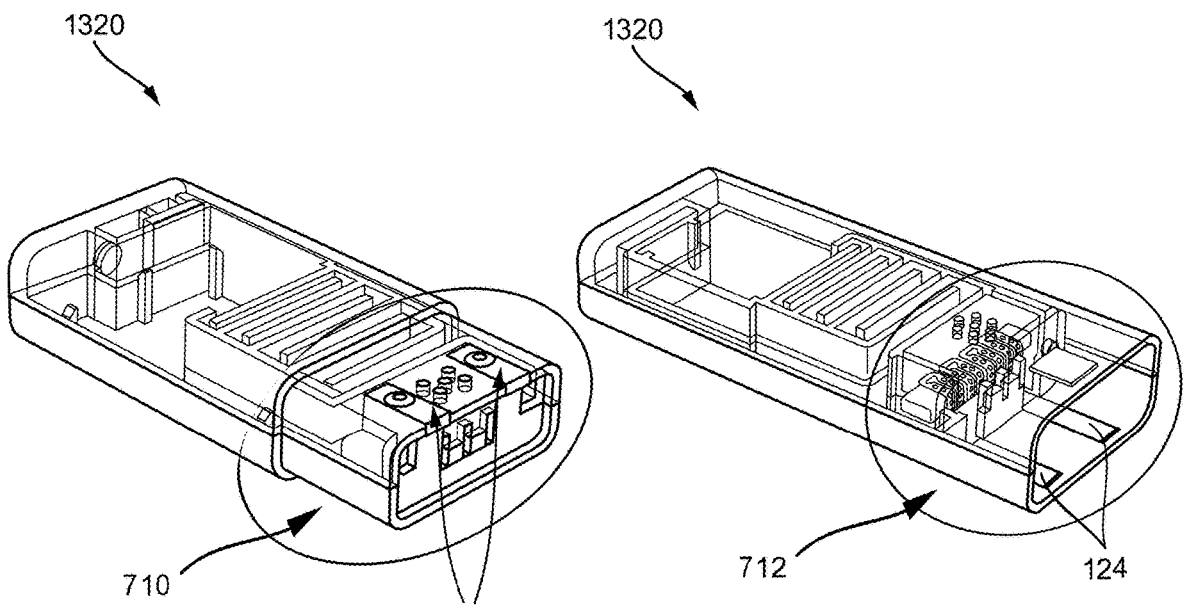
FIG. 7A  FIG. 7B
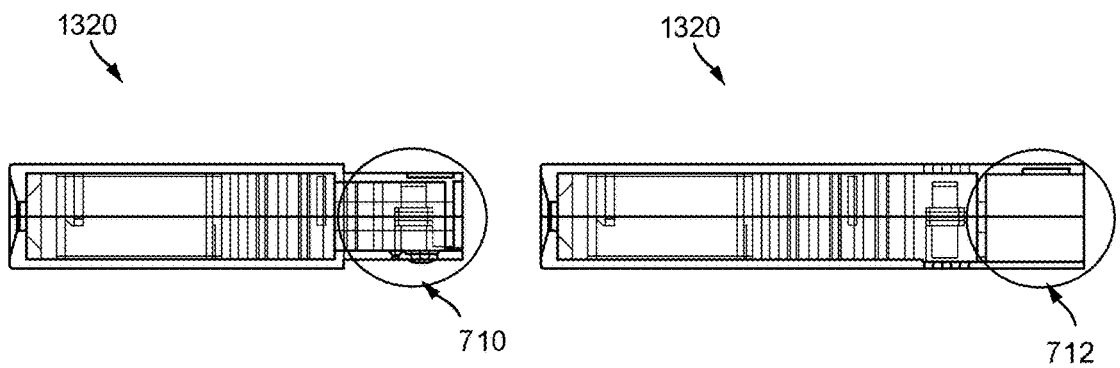
FIG. 7C  FIG. 7D

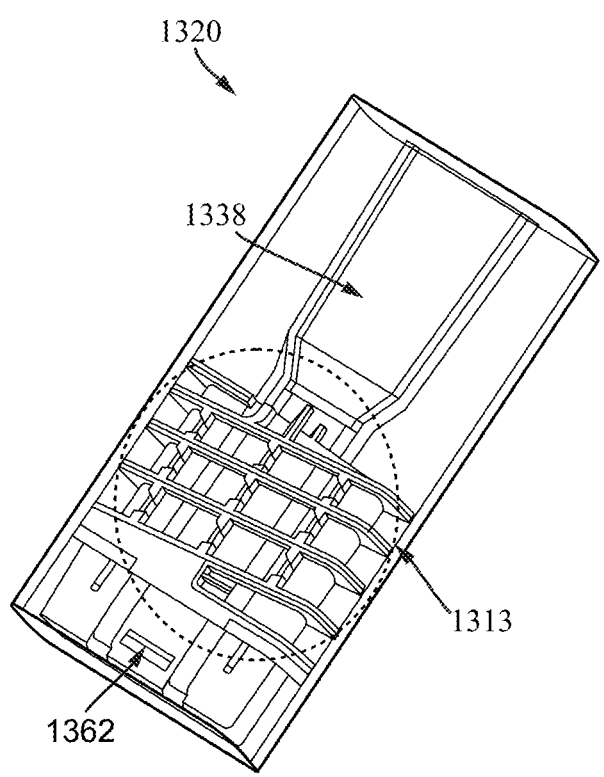
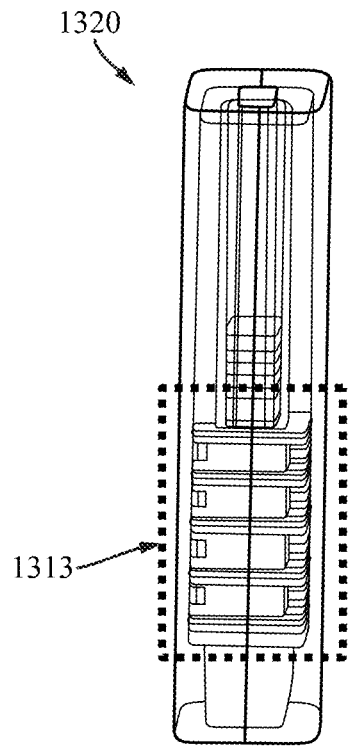
FIG. 10C  FIG. 10D
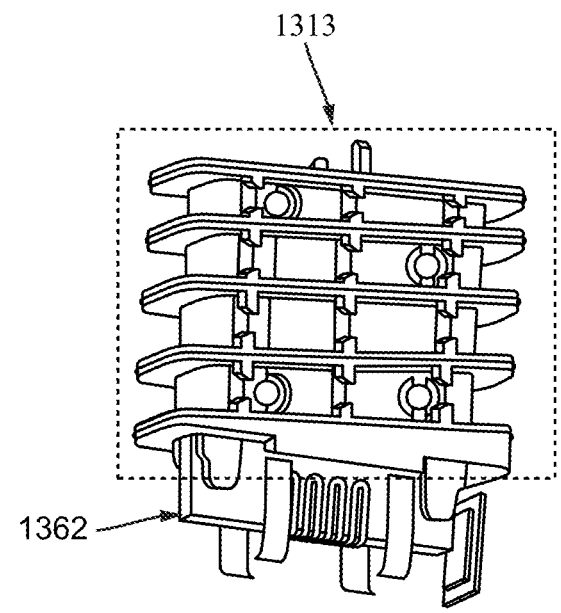
FIG. 10E

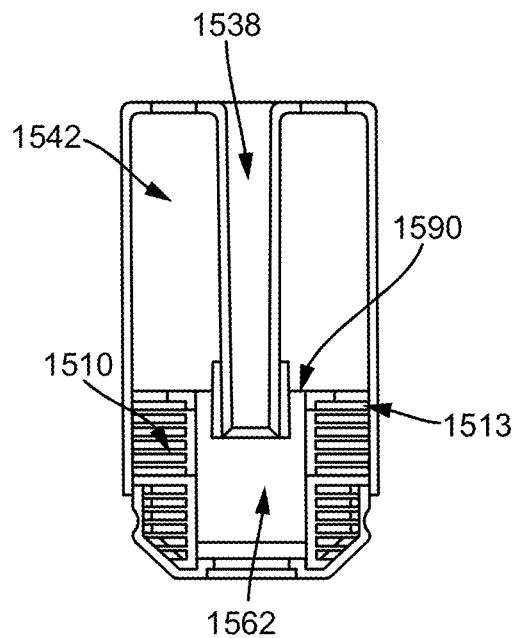 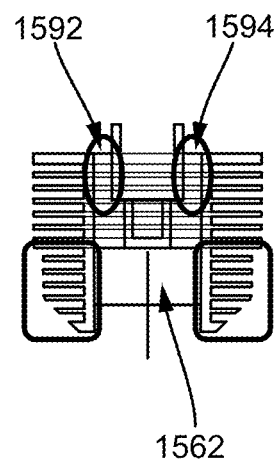
FIG. 16A  FIG. 16B
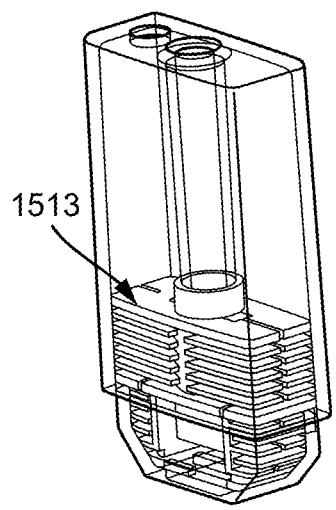
FIG. 16C

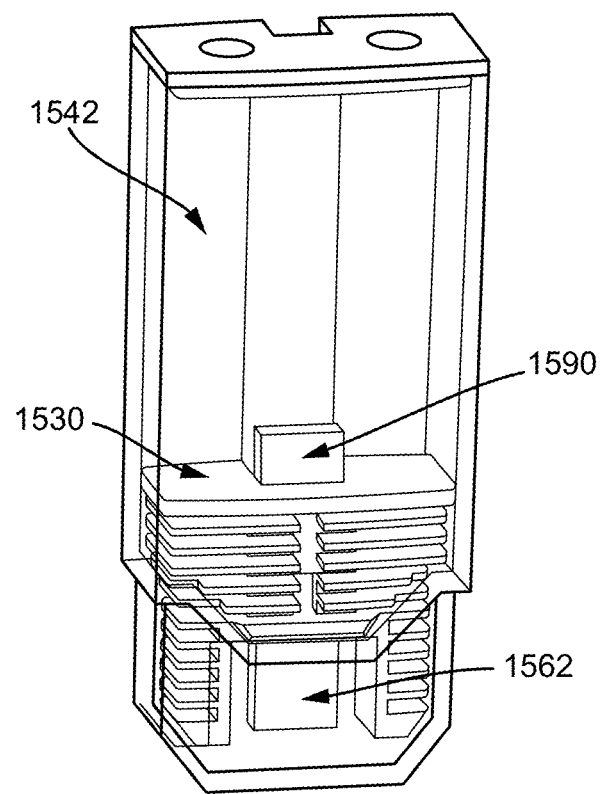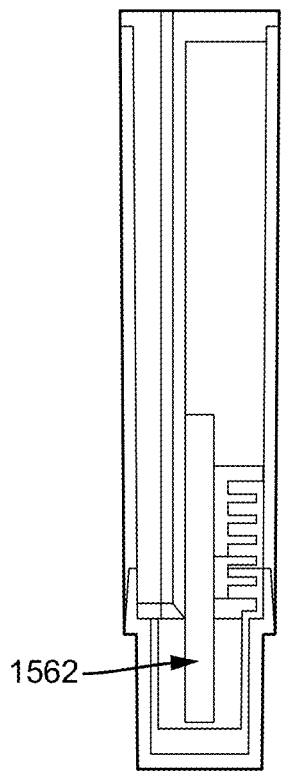
FIG. 17A     FIG. 17B

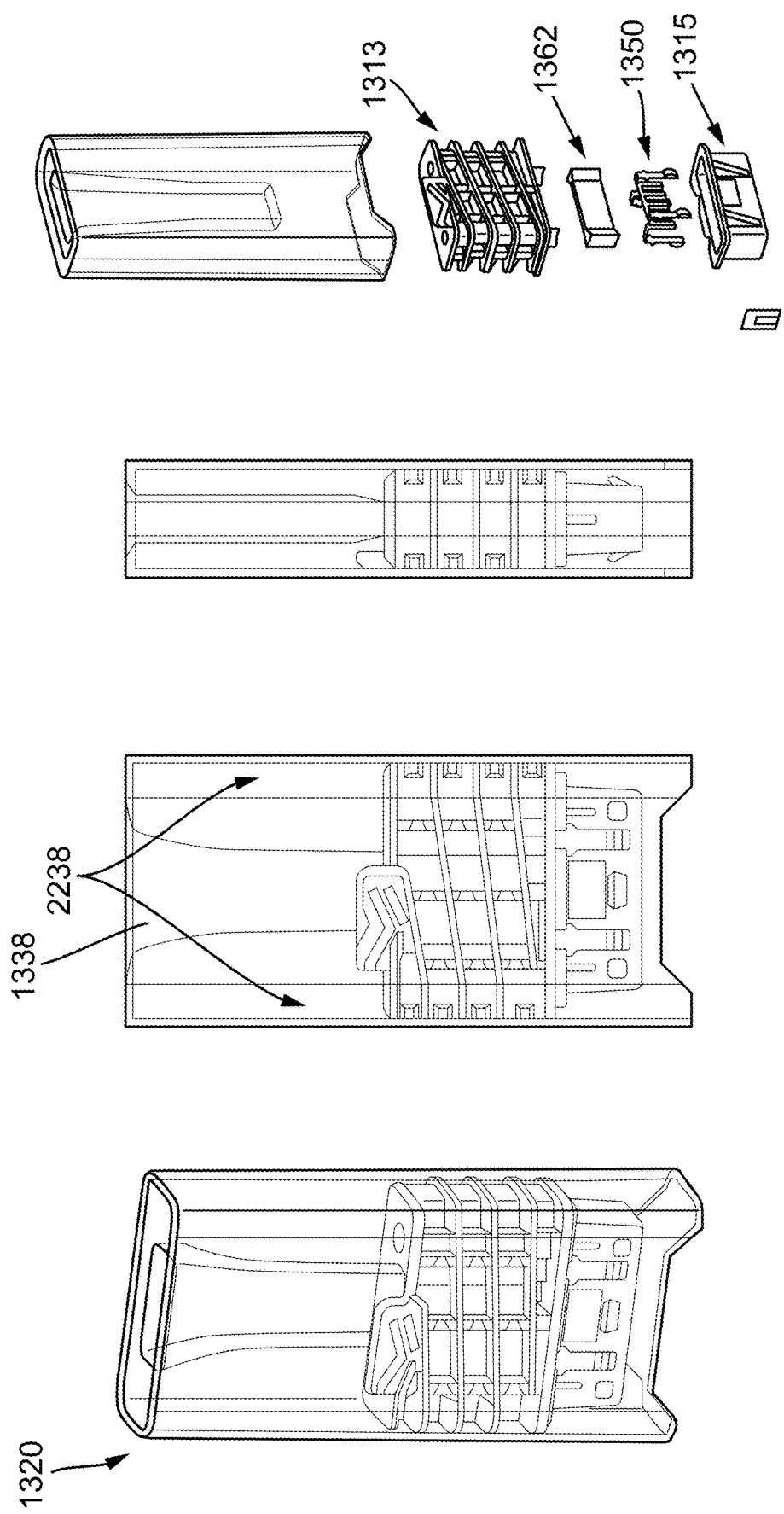

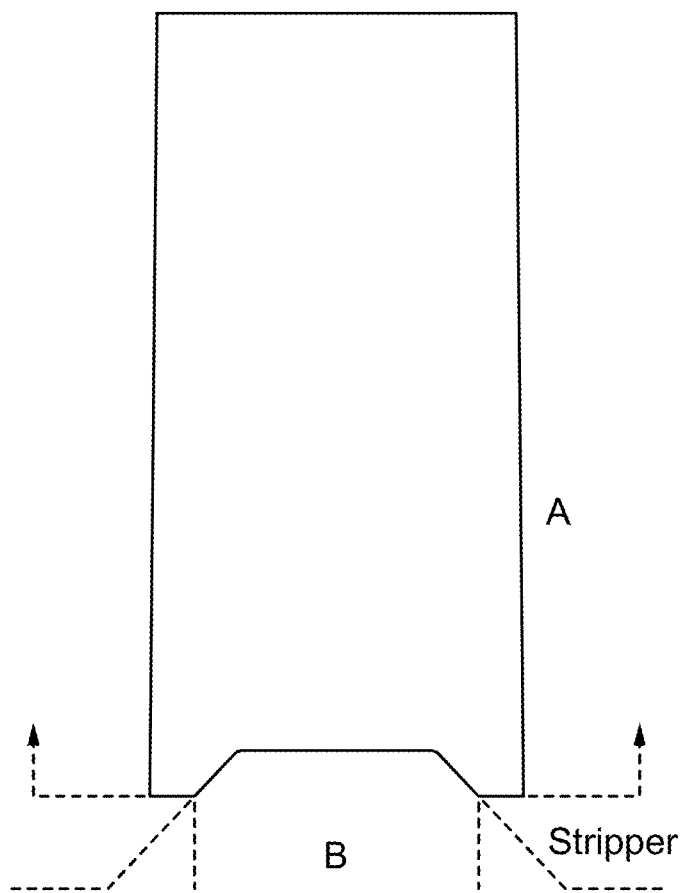 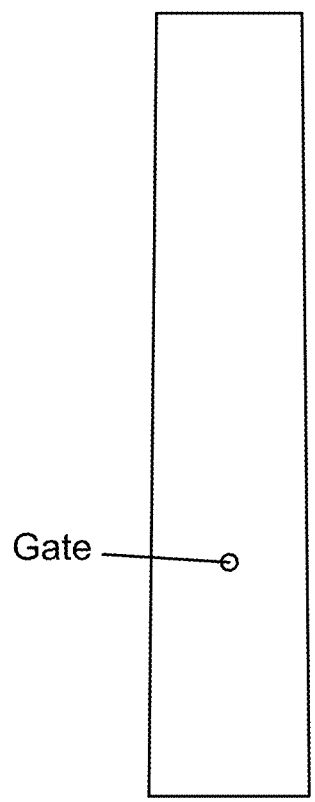
FIG. 34A  FIG. 34B

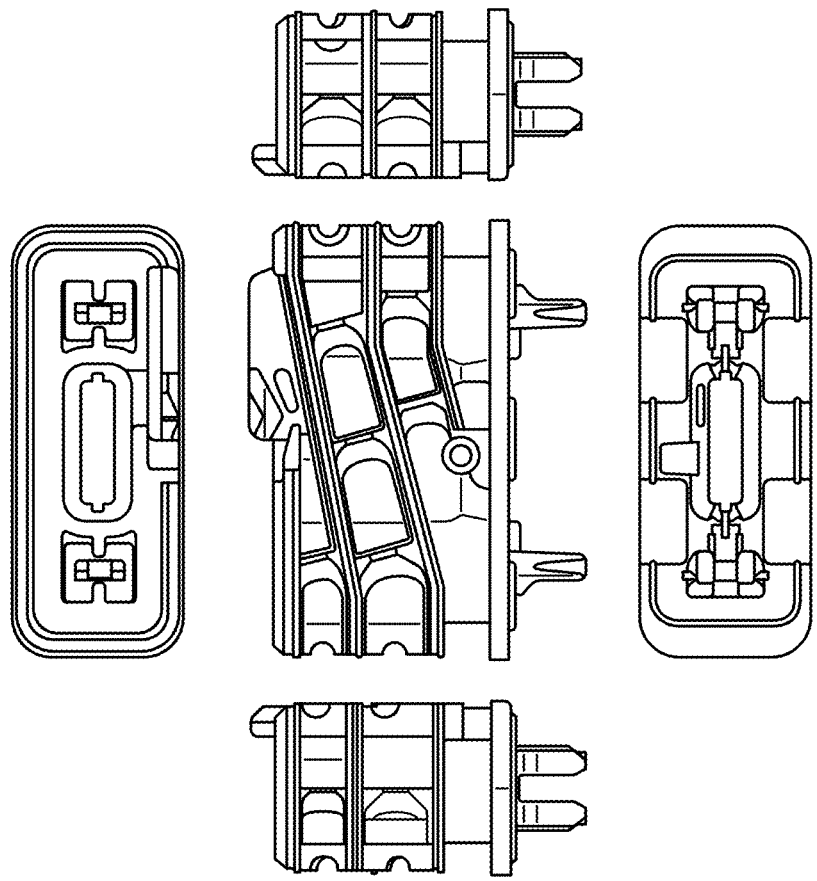
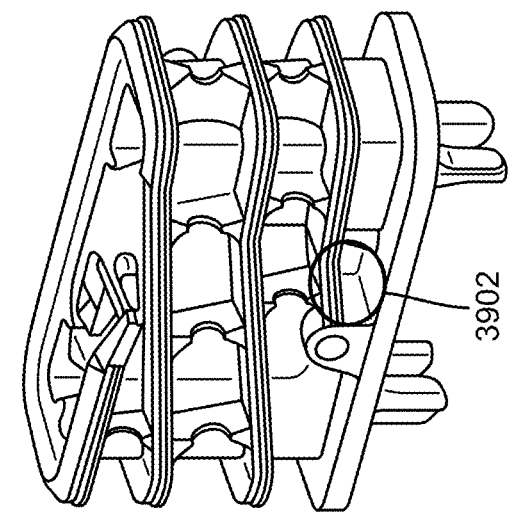
FIG. 42B

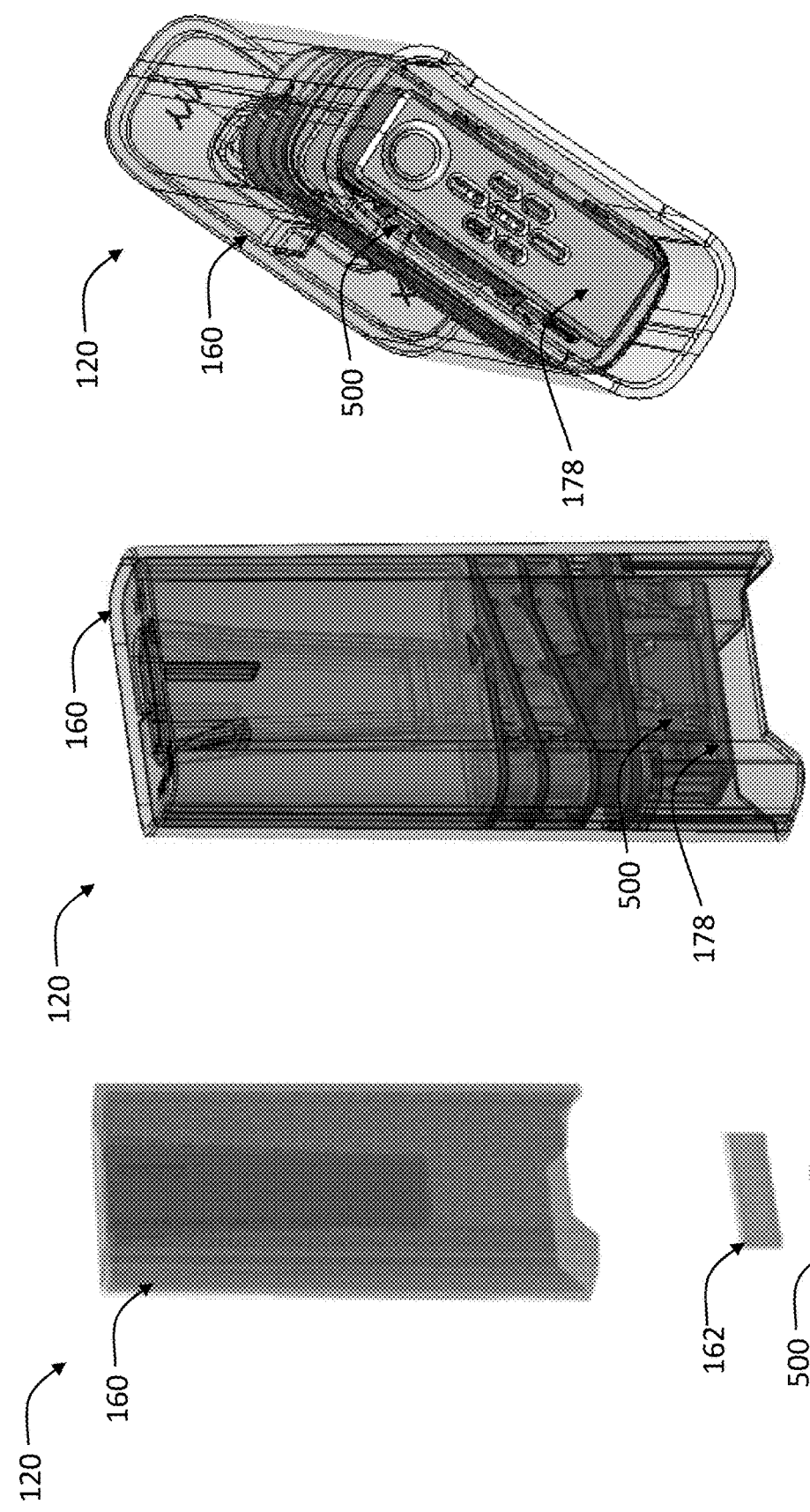

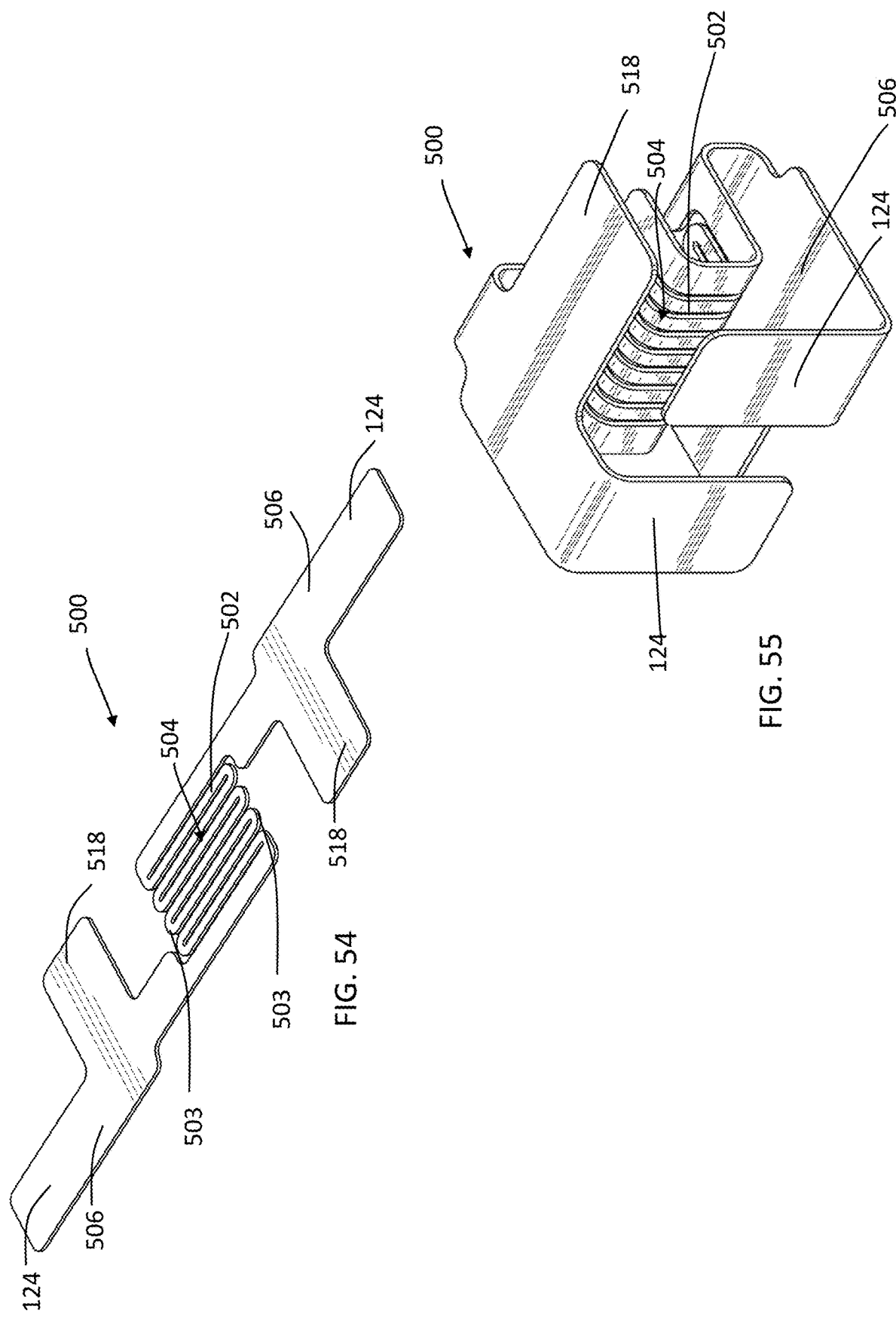

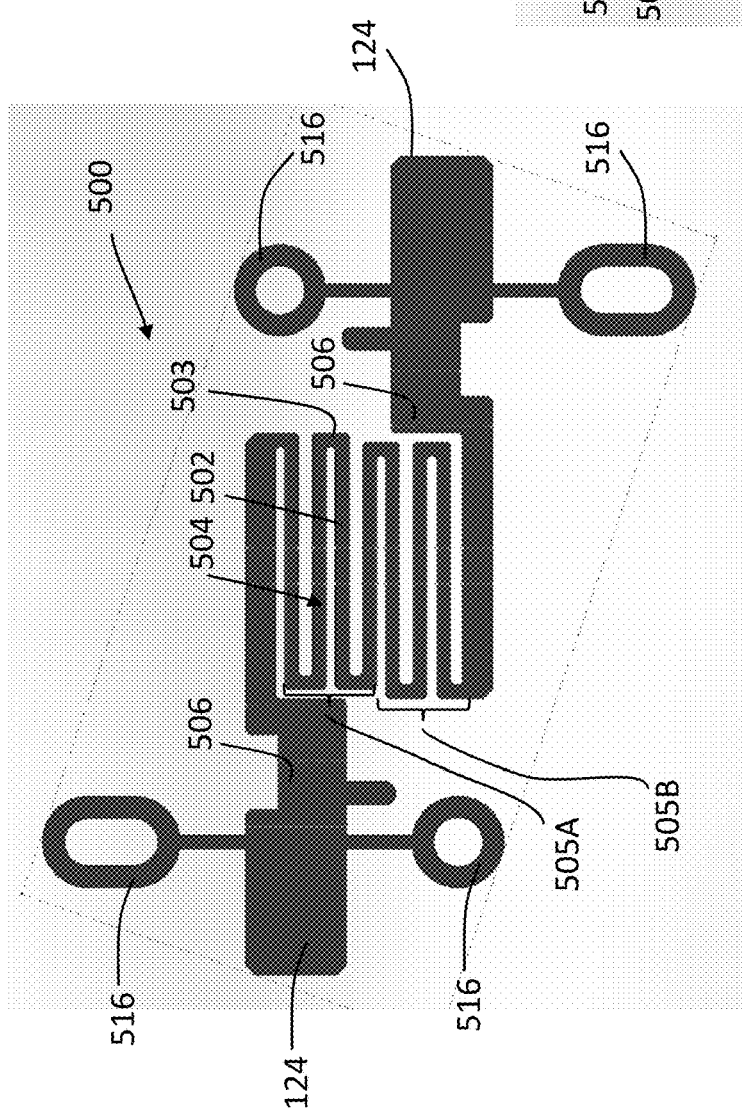
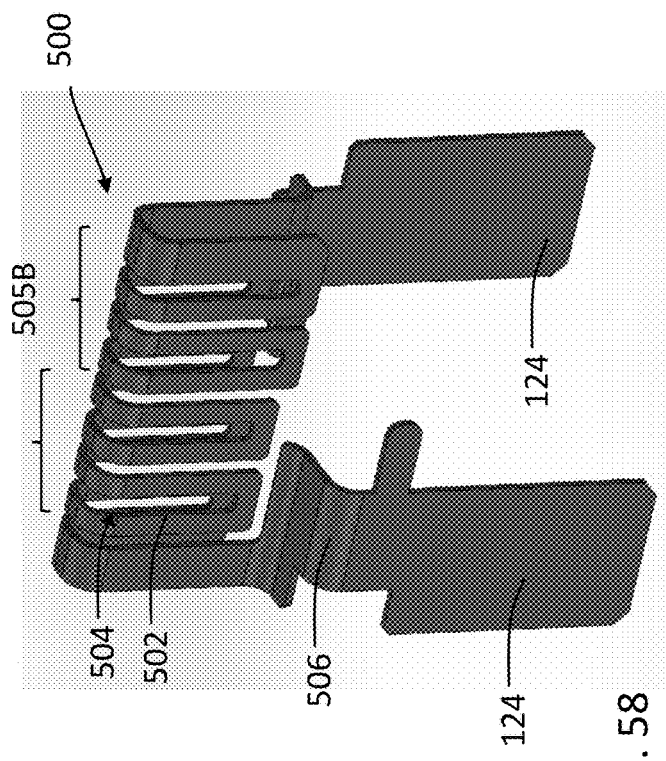
FIG. 57
FIG. 58

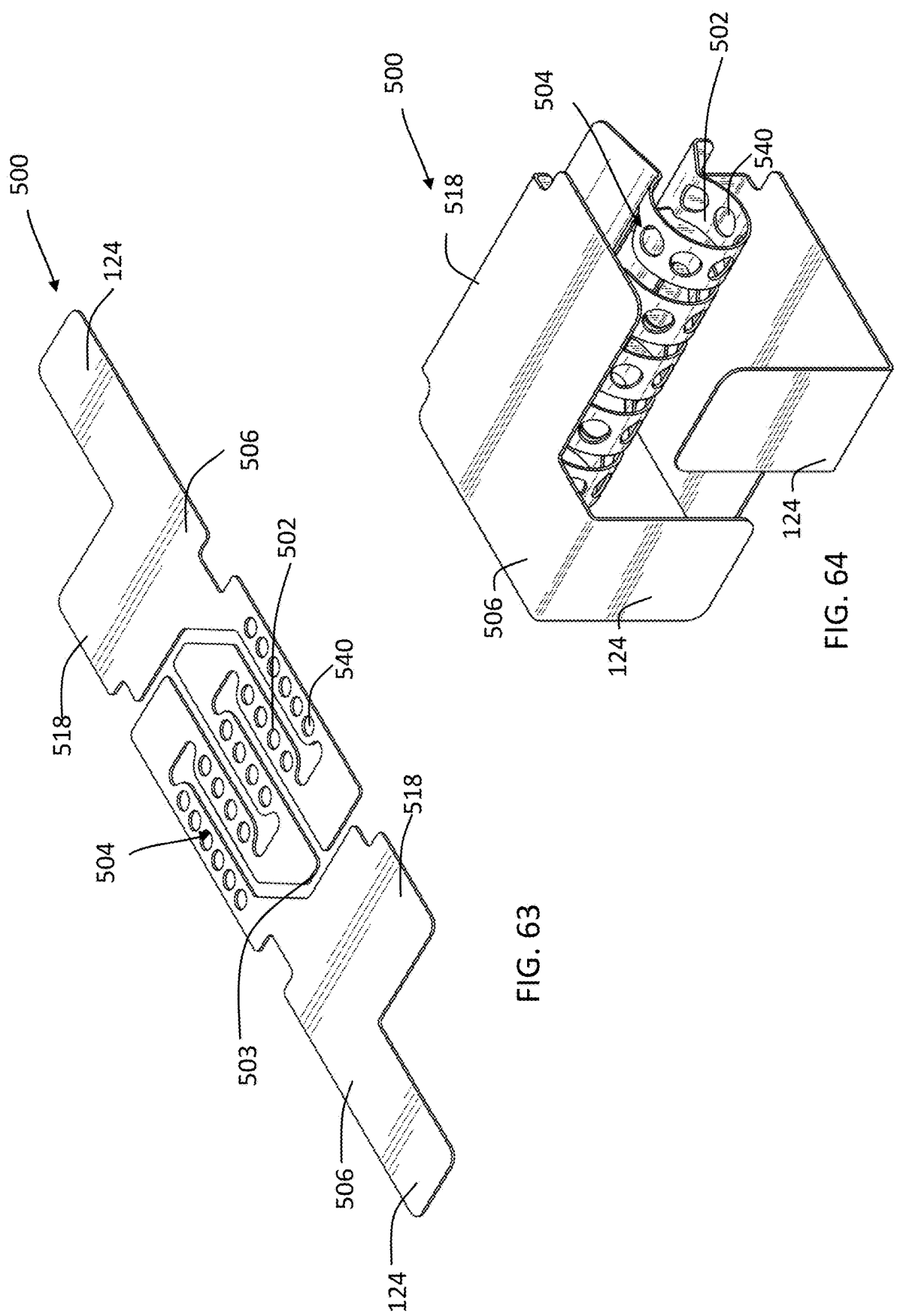

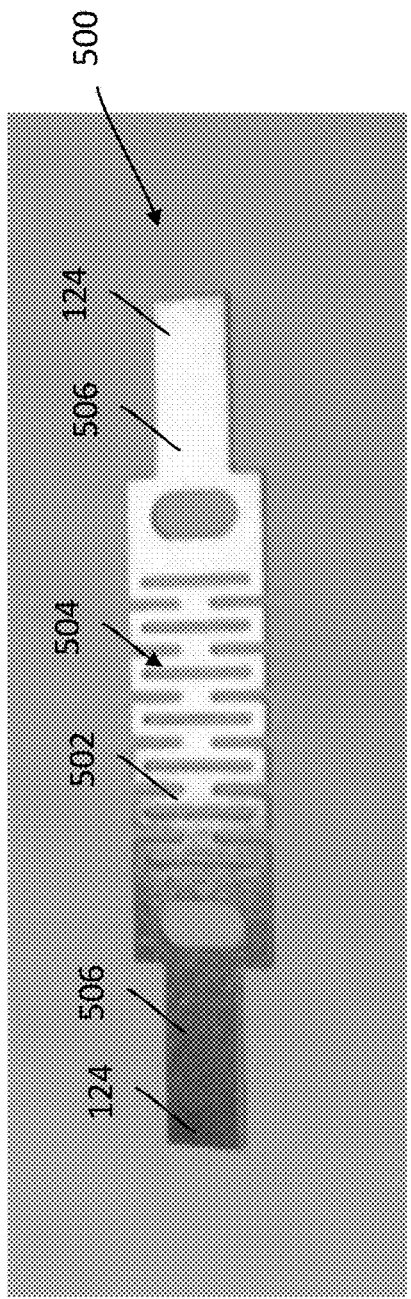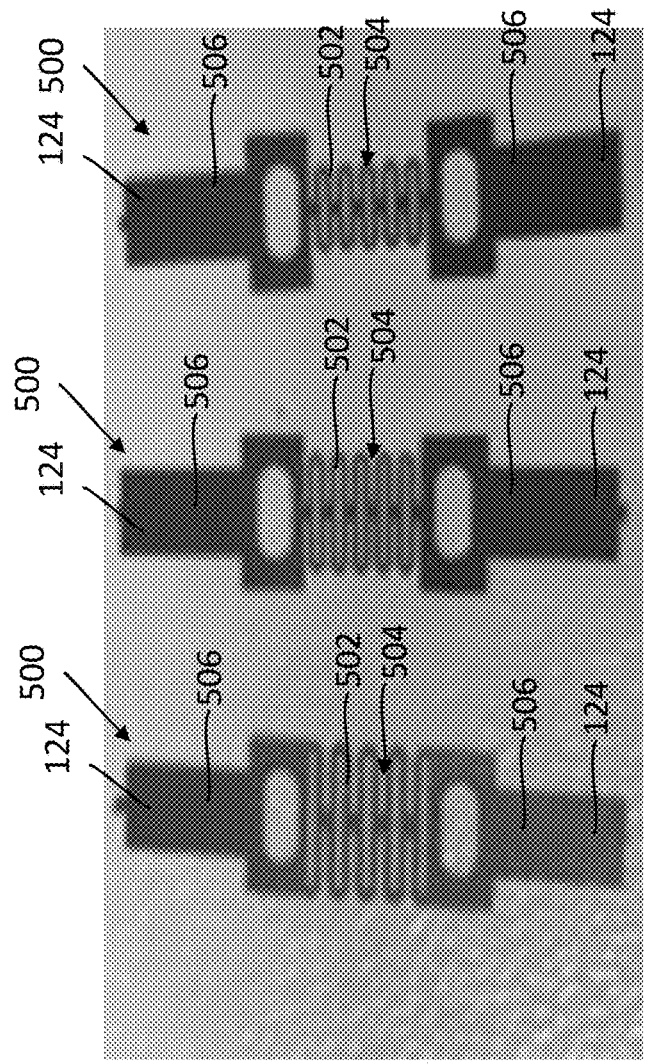
FIG. 71  FIG. 72  FIG. 73  FIG. 74

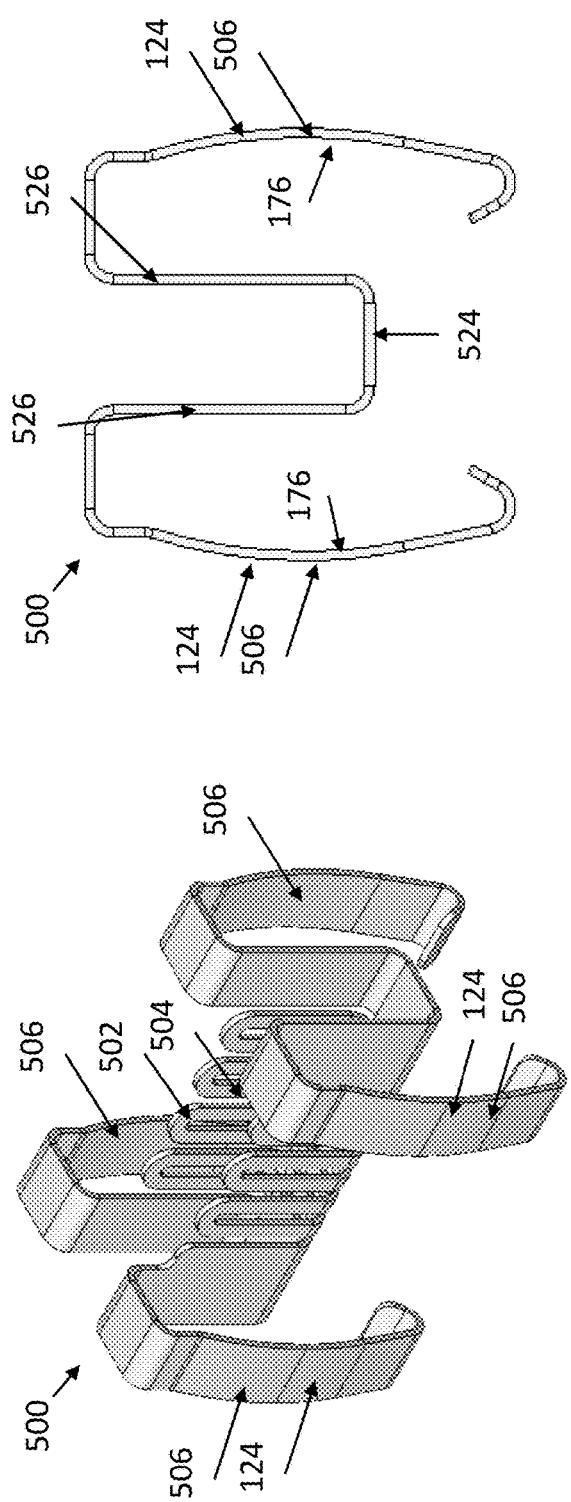
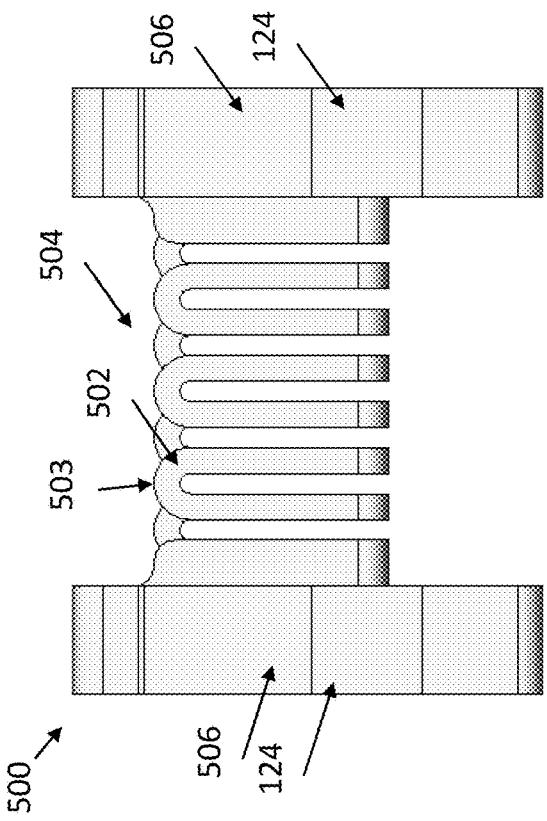
FIG. 83
FIG. 84
FIG. 82

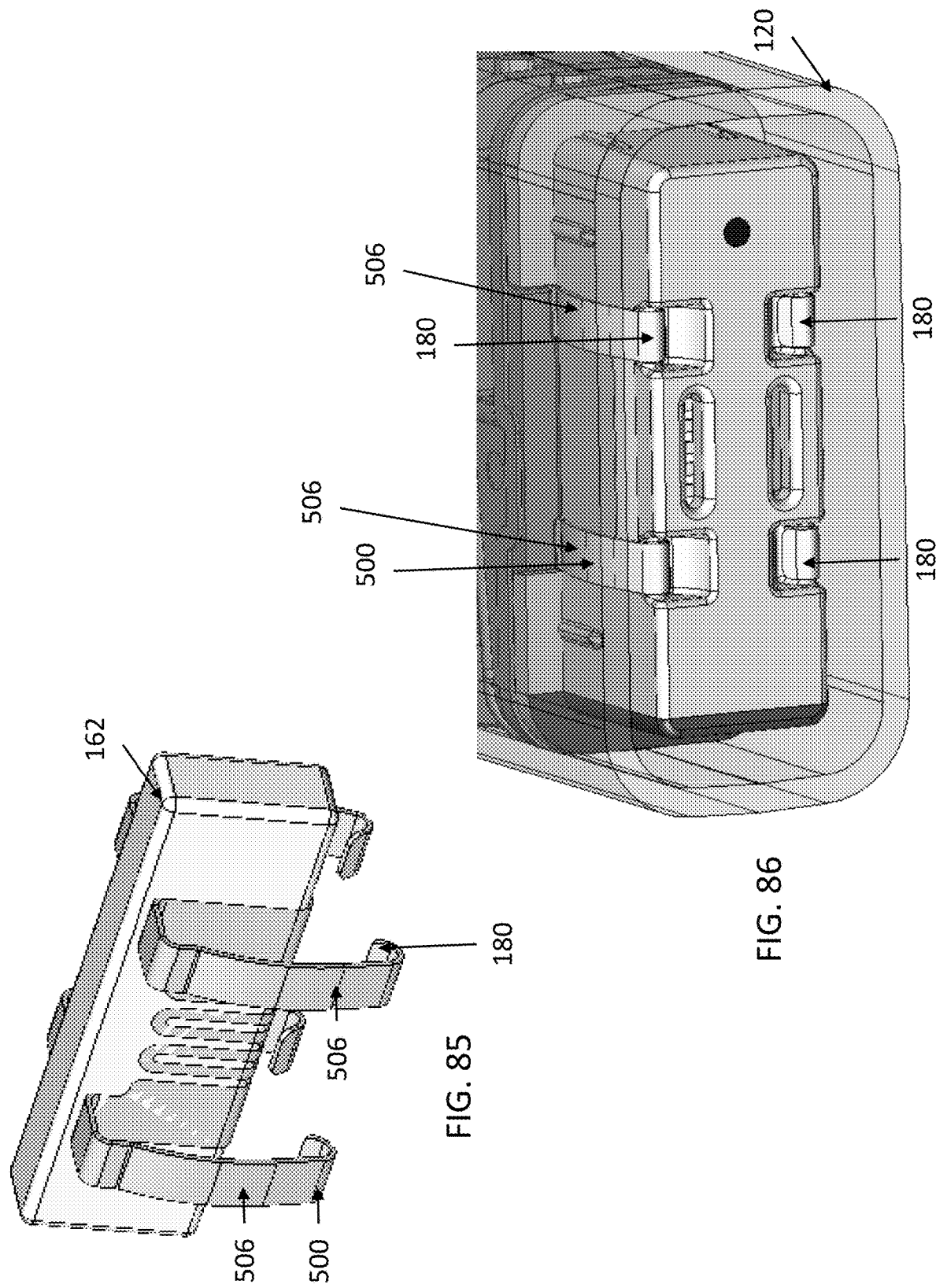

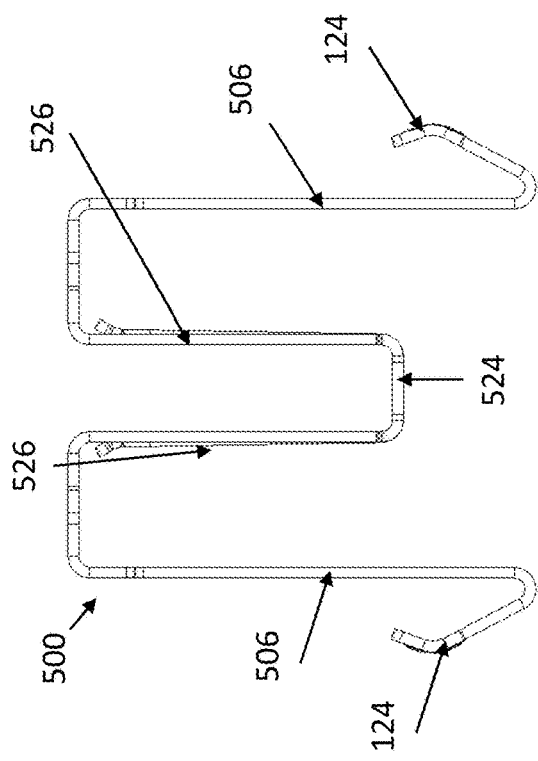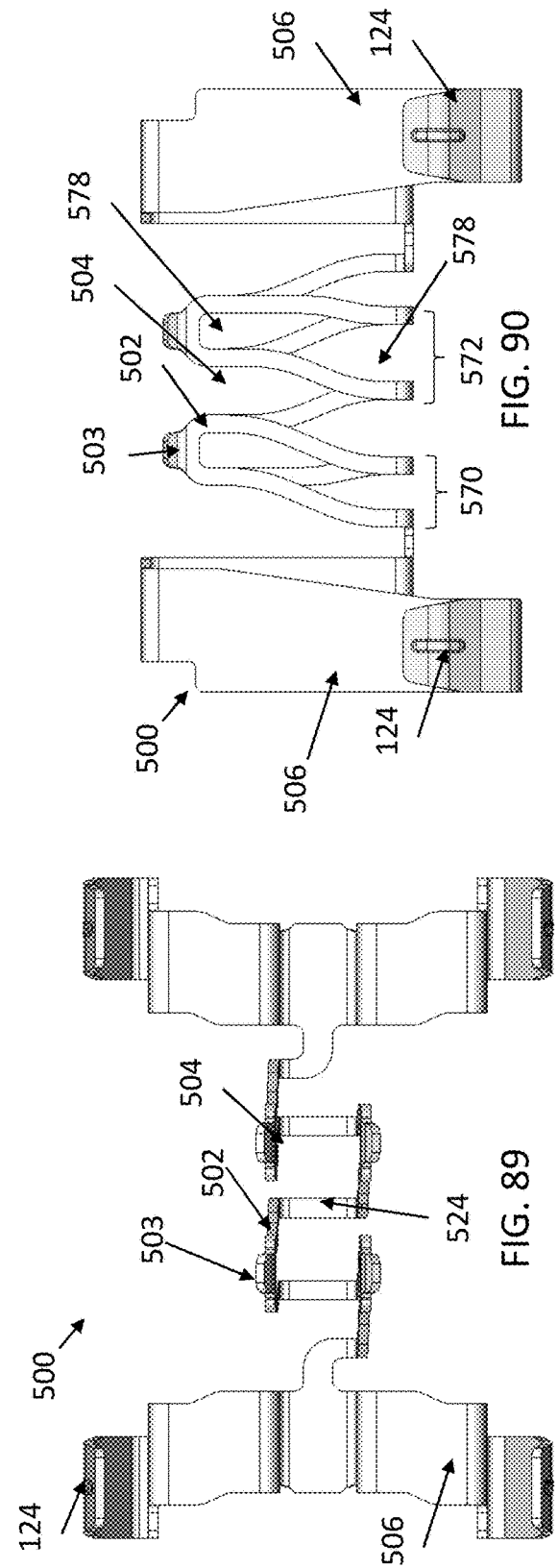

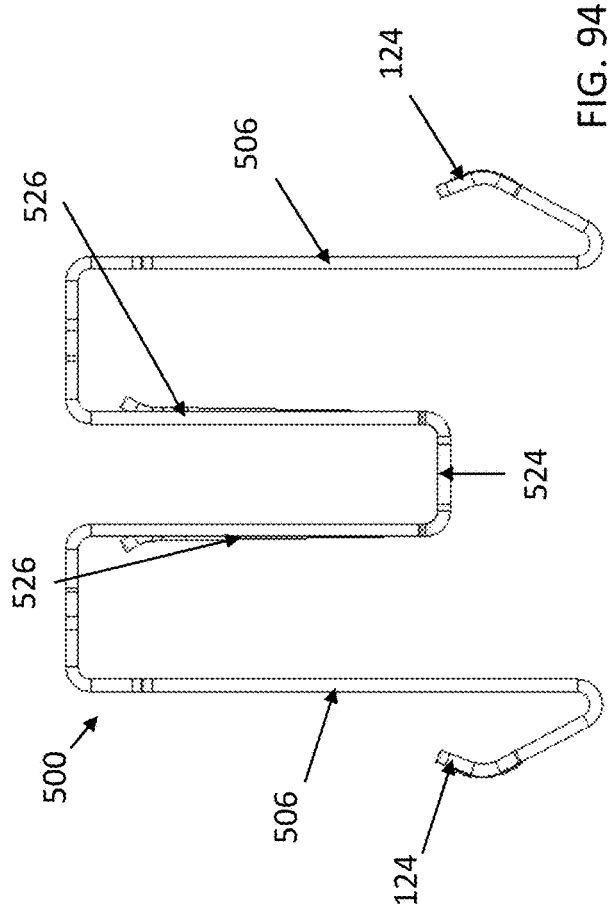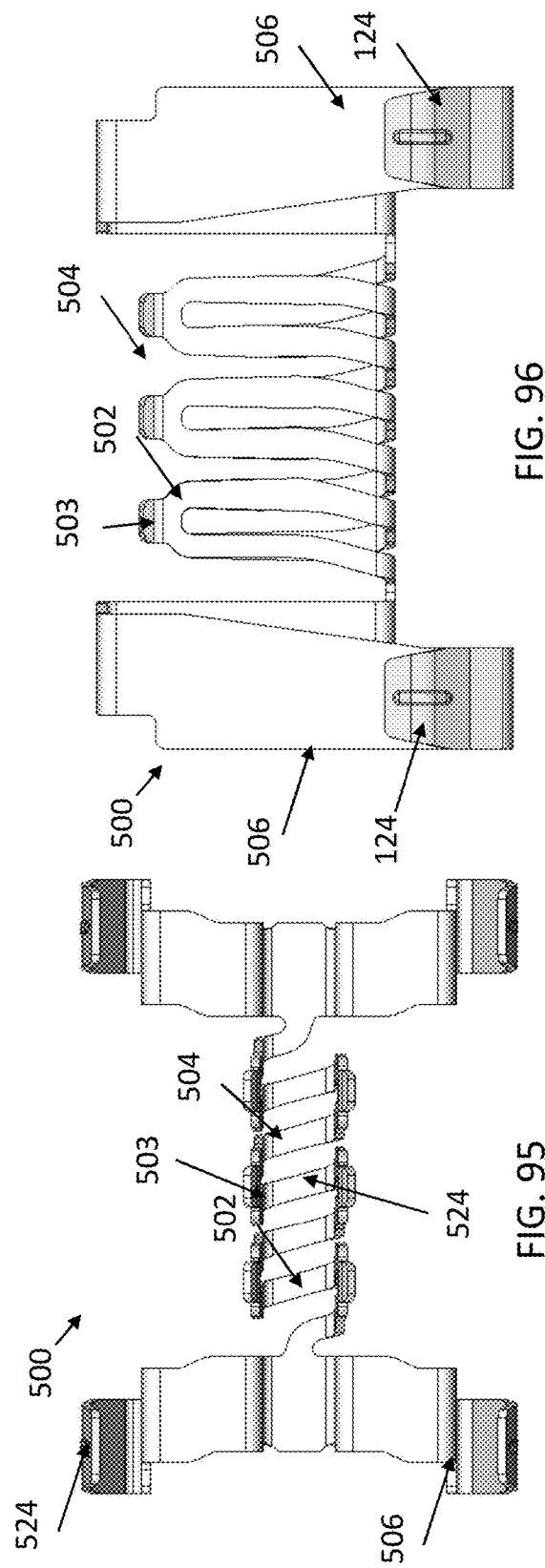

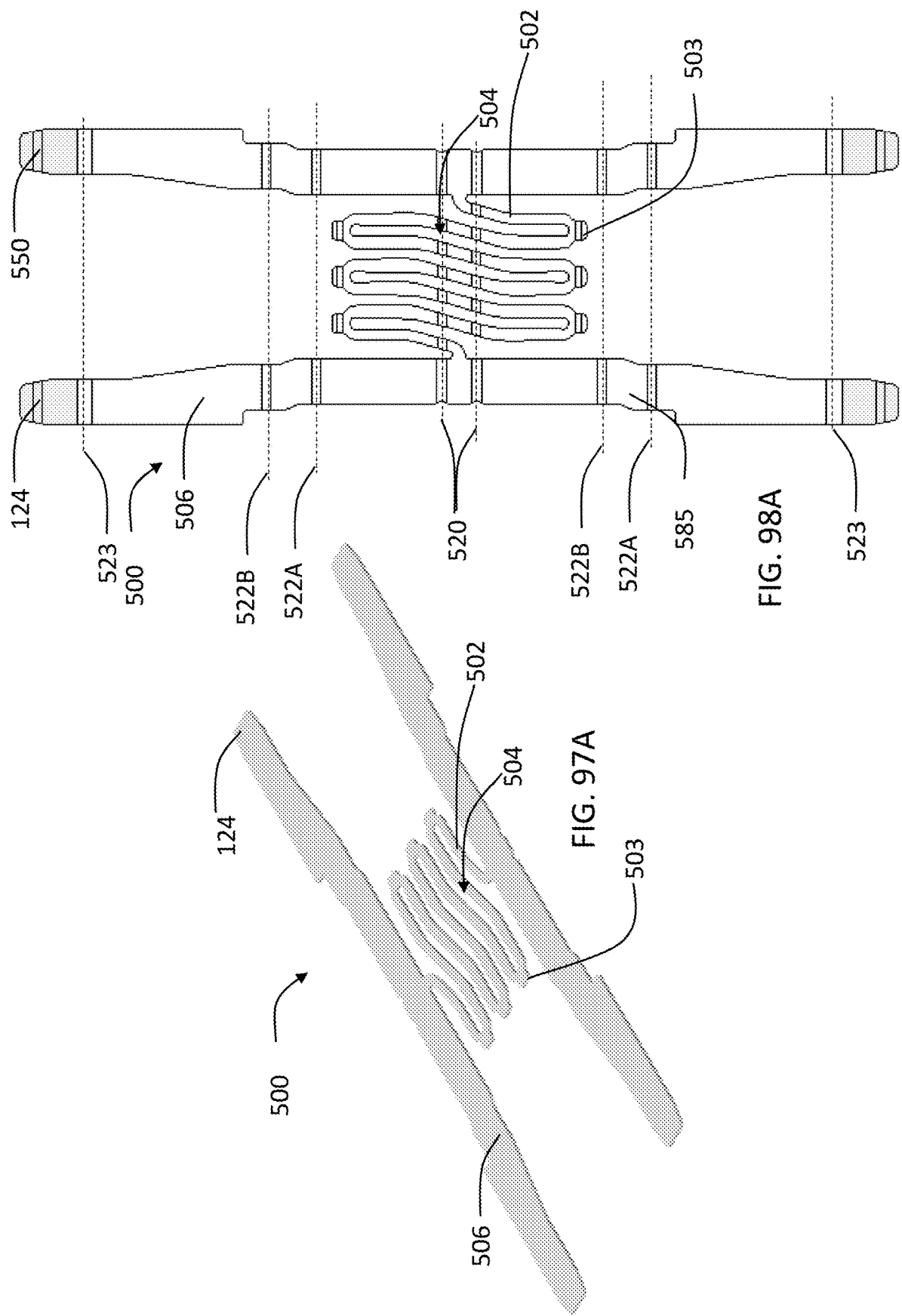

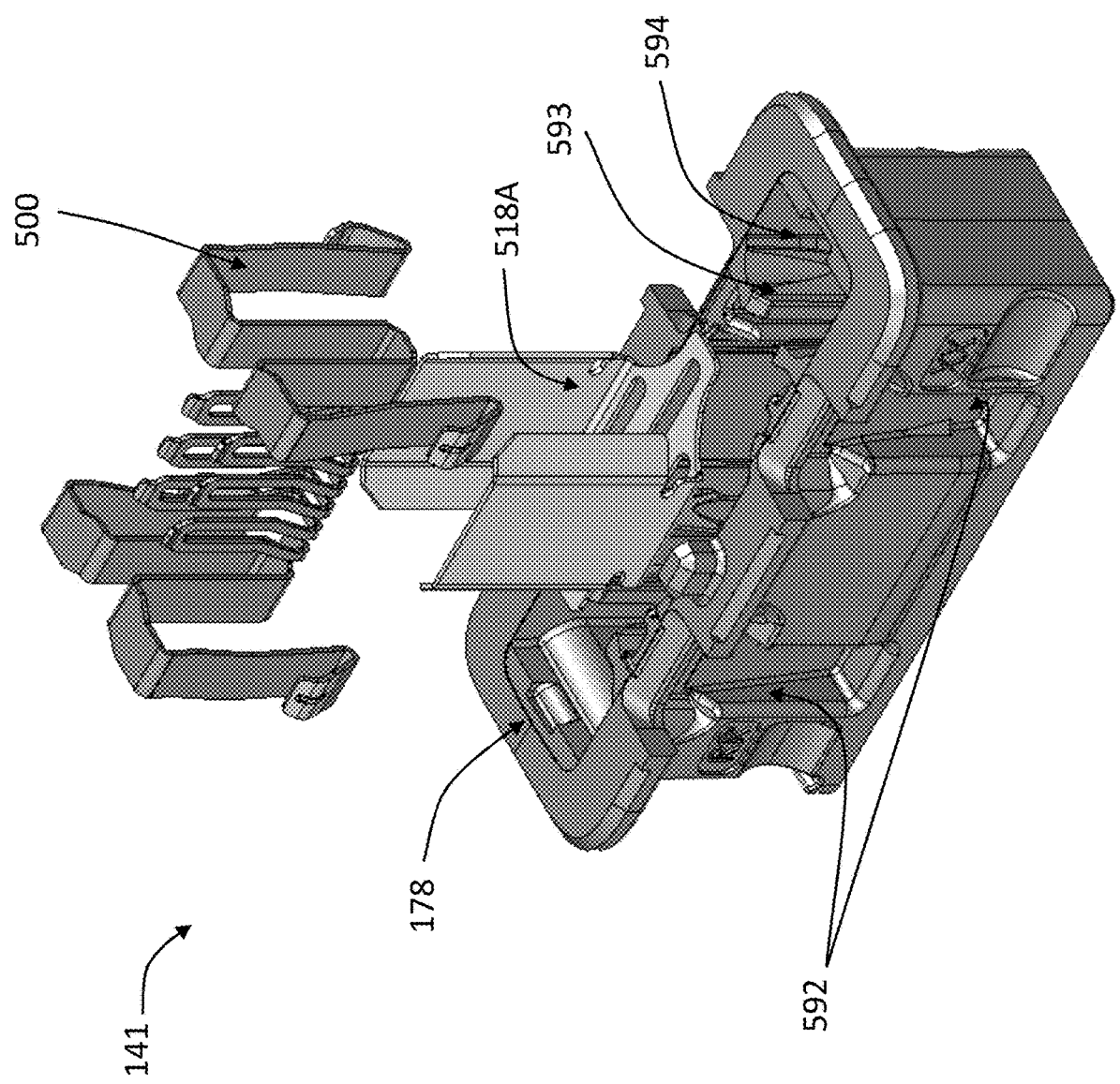

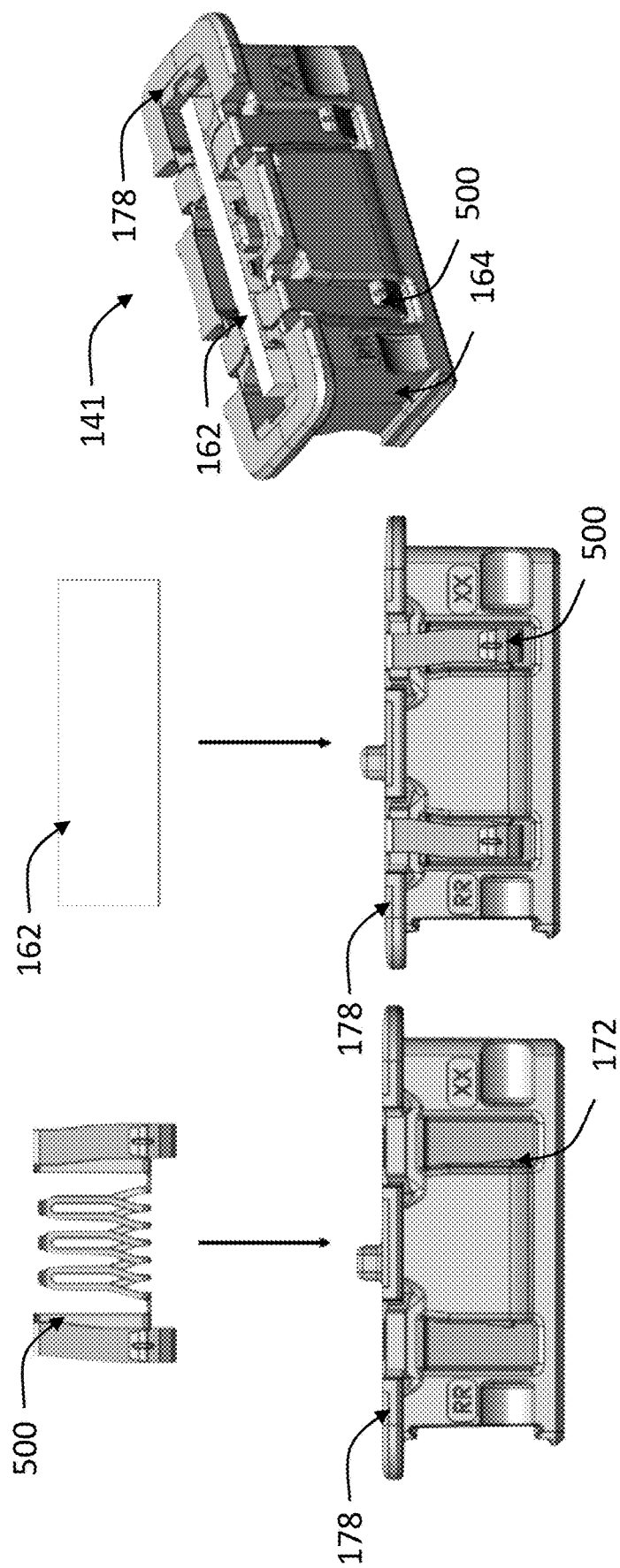

CARTRIDGE FOR A VAPORIZER DEVICE

CROSS-REFERENCE TO RELATED APPLICATIONS

The present application claims priority to U.S. Provisional Application No. 62/915,005, filed on Oct. 14, 2019, and titled "CARTRIDGE FOR A VAPORIZER DEVICE," U.S. Provisional Application No. 62/812,161, filed on Feb. 28, 2019, and titled "CARTRIDGE FOR A VAPORIZER DEVICE," U.S. Provisional Application No. 62/747,099, filed on Oct. 17, 2018, and titled "WICK FEED AND HEATING ELEMENTS IN A VAPORIZER DEVICE," U.S. Provisional Application No. 62/812,148, filed on Feb. 28, 2019, and titled "RESERVOIR OVERFLOW CONTROL WITH CONSTRICTION POINTS," U.S. Provisional Application No. 62/747,055, filed on Oct. 17, 2018, and titled "RESERVOIR OVERFLOW CONTROL," U.S. Provisional Application No. 62/747,130, filed on Oct. 17, 2018, and titled "VAPORIZER CONDENSATE COLLECTION AND RECYCLING," U.S. patent application Ser. No. 16/653,455, filed on Oct. 15, 2019, and titled "HEATING ELEMENT," and U.S. Provisional Application No. 62/913,135, filed on Oct. 9, 2019, and titled "HEATING ELEMENT," the entirety of each of which is incorporated by reference herein.

FIELD

The disclosed subject matter generally relates features of a cartridge for a vaporizer, and in some examples to management of leaks of liquid vaporizable material, control of airflow within and near a cartridge, heating of vaporizable material to result in formation of an aerosol, and/or other assembly features of the cartridge and a device to which it may be separably connected.

BACKGROUND

Vaporizer devices, which are generally referred to herein as vaporizers, include devices that heat a vaporizable material (e.g., a liquid, a plant material, some other solid, a wax, etc.) to a temperature sufficient to release one or more compounds from the vaporizable material into a form (e.g., a gas, an aerosol, etc.) that may be inhaled by a user of the vaporizer. Some vaporizers, for example those in which at least one of the compounds released from the vaporizable material is nicotine, may be useful as an alternative to smoking of combustible cigarettes.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein. The various features and items described herein may be incorporated together or separable, except as would not be feasible based on the current disclosure and what a skilled artisan would understand from it.

In one aspect, a vaporizer includes a reservoir configured to contain a liquid vaporizable material. The reservoir is at least partially defined by at least one wall, and the reservoir includes a storage chamber and an overflow volume. The vaporizer further includes a collector disposed in the overflow volume. The collector includes a capillary structure configured to retain a volume of the liquid vaporizable material in fluid contact with the storage chamber. The capillary structure includes a microfluidic feature configured to prevent air and liquid from bypassing each other during filling and emptying of the collector.

In an interrelated aspect which may be included in a vaporizer of the preceding aspect, a microfluidic gate for controlling flow of liquid vaporizable material between a storage chamber and an adjoining overflow volume in a vaporizer includes a plurality of openings connecting the storage chamber and the collector and a pinch-off point between the plurality of openings. The plurality of openings includes a first channel and a second channel. The first channel has a higher capillary drive than the second channel. Optionally, the microfluidic gate may include a rim of an aperture between the storage chamber and the collector that is flatter on a first side facing the storage compartment than a second, more rounded, side facing the collector.

In another interrelated aspect that may be incorporated with other aspects, a collector configured for insertion into a vaporizer cartridge includes a capillary structure configured to retain a volume of the liquid vaporizable material in fluid contact with a storage chamber of the vaporizer cartridge. The capillary structure includes a microfluidic feature configured to prevent air and liquid from bypassing each other during filling and emptying of the collector.

In optional variations, one or more of the following features may also be included in any feasible combination. For example, a primary passageway may be included to provide a fluid connection between the storage chamber and an atomizer configured to convert the liquid vaporizable material to a gas-phase state. The primary passageway may be formed through a structure of the collector.

The primary passageway may include a first channel configured to allow for the liquid vaporizable material to flow from the storage chamber toward a wicking element in the atomizer. The first channel may have a cross-sectional shape with at least one irregularity configured to allow liquid in the first channel to bypass an air bubble blocking a remainder of the first channel. The cross-sectional shape may resembles a cross. The capillary structure may include a secondary passageway that includes the microfluidic feature, and the microfluidic feature may be configured to allow the liquid vaporizable material to move along a length of the secondary passageway only with a meniscus fully covering a cross-sectional area of the secondary passageway. The cross-sectional area may be sufficiently small that, for a material from which walls of the secondary passageway are formed and a composition of the liquid vaporizable material, the liquid vaporizable material preferentially wets the secondary passageway around an entire perimeter of the secondary passageway.

The storage chamber and the collector may be configured to maintain a continuous column of the liquid vaporizable material in the collector in contact with the liquid vaporizable material in the storage chamber such that a reduction in pressure in the storage chamber relative to ambient pressure causes the continuous column of the liquid vaporizable material in the collector to be at least partially drawn back into the storage chamber. The secondary passageway may include a plurality of spaced-apart constriction points having a smaller cross-sectional area than parts of the secondary passageway between the constriction points. The constriction points may have a flatter surface directed along the secondary passageway toward the storage compartment and a rounder surface directed along the secondary passageway away from the storage compartment.

A microfluidic gate may be positioned between the collector and the storage compartment. The microfluidic gate may include a rim of an aperture between the storage chamber and the collector that is flatter on a first side facing the storage compartment than a second, more rounded, side facing the collector. The microfluidic gate may include a plurality of openings connecting the storage chamber and the collector and a pinch-off point between the plurality of openings. The plurality of openings may include a first channel and a second channel, wherein the first channel has a higher capillary drive than the second channel. An air-liquid vaporizable material meniscus reaching the pinch-off point may be routed to the second channel due to the higher capillary drive in the first channel such that an air bubble is formed to escape into the liquid vaporizable material in the storage chamber.

The liquid vaporizable material may include one or more of propylene glycol and vegetable glycerin.

A collector may include a primary passageway providing a fluid connection between the reservoir and an atomizer configured to convert the liquid vaporizable material to a gas-phase state, wherein the primary passageway is formed through a structure of the collector. IN optional variations, the capillary structure may include a secondary passageway comprising the microfluidic feature, and the microfluidic feature may be configured to allow the liquid vaporizable material to move along a length of the secondary passageway only with a meniscus fully covering a cross-sectional area of the secondary passageway. The cross-sectional area may be sufficiently small that, for a material from which walls of the secondary passageway are formed and a composition of the liquid vaporizable material, the liquid vaporizable material preferentially wets the secondary passageway around an entire perimeter of the secondary passageway. The storage chamber and the collector may be configured to maintain a continuous column of the liquid vaporizable material in the collector in contact with the liquid vaporizable material in the storage chamber such that a reduction in pressure in the storage chamber relative to ambient pressure causes the continuous column of the liquid vaporizable material in the collector to be at least partially drawn back into the storage chamber. The secondary passageway may include a plurality of spaced-apart constriction points having a smaller cross-sectional area than parts of the secondary passageway between the constriction points. The constriction points may have a flatter surface directed along the secondary passageway toward the storage compartment and a rounder surface directed along the secondary passageway away from the storage compartment.

In yet another interrelated aspect, a vaporizer cartridge includes a cartridge housing, a storage chamber disposed within the cartridge housing and configured to contain a liquid vaporizable material, an inlet configured to allow air to enter an internal airflow path within the cartridge housing, an atomizer configured to cause conversion of at least some of the liquid vaporizable material to an inhalable state, a collector as described in the preceding aspect.

In optional variations, such a vaporizer cartridge may include one or more features as described herein, such as for example a wicking element positioned within the internal airflow path and in fluid communication with the reservoir. The wicking element may be configured to draw the liquid vaporizable material from the storage chamber under capillary action. A heating element may be positioned to cause heating of the wicking element to result in conversion of at least some of the liquid vaporizable material drawn from the storage chamber to a gaseous state. The inhalable state may include an aerosol formed by condensation of at least some of the liquid vaporizable material from the gaseous state. The cartridge housing may include a monolithic hollow structure having a first, open end, and a second end opposite the first end. The collector may be insertably received within the first end of the monolithic hollow structure.

In yet another interrelated aspect, a reservoir for a cartridge usable with a vaporizer device is provided. In one embodiment, the reservoir comprises a storage chamber (e.g., a reservoir) for storing vaporizable material, as well as an overflow volume separable from the storage chamber and in communication with the storage chamber via a vent leading to a passageway in the overflow volume.

The passageway in the overflow volume may lead to a port connected to ambient air. The storage chamber or the reservoir may also include a first wick feed, and optionally a second wick feed, implemented respectively in the form of a first cavity and a second cavity going through a collector placed inside the cartridge. The collector may include one or more supporting structures which form the passageway in the overflow volume. The first and second cavities may control flow of the vaporizable material toward a wick housing configured to receive a wicking element.

The wicking element positioned in the wick housing or the wicking element housing may be configured to absorb the vaporizable material traveling through the first and second wick feeds such that, in thermal interaction with an atomizer, the vaporizable material absorbed in the wicking element is converted to at least one of vapor or aerosol and flowing through an exit tunnel structure formed through the collector and the storage chamber to reach an opening in the mouthpiece. The mouthpiece may be formed proximate to the storage chamber.

The collector may have a first end and a second end. The first end may be coupled to the opening in the mouthpiece and the second end, opposite to the first end, may be configured to house a wick or wicking element. A wick housing in accordance with certain embodiments may include a set of prongs projecting outward from the second end to at least partially receive the wicking element, and one or more compression ribs positioned in the proximity of the first or second wick feeds and extending from the second end of the collector to compress the wicking element.

In yet another interrelated aspect, a vent may be provided to maintain an equilibrium pressure state in the cartridge's storage chamber and to prevent pressure in the storage chamber from increasing to a point that would cause the vaporizable material to flood the wick housing. The equilibrium pressure state may be maintained by way of establishing a liquid seal at the opening of the vent positioned at a point where the storage chamber communicates with a passageway in an overflow volume in the cartridge. The liquid seal is established and maintained at the vent by maintaining sufficient capillary pressure for the vaporizable material menisci to be formed at a portion of the vent leading to the passageway in the overflow volume.

The capillary pressure for the vaporizable material menisci may be controlled by, for example, venting structures that form a primary channel and a secondary channel that effectively construct a fluidic valve to control at least a pinch-off point at one of the primary channel or the secondary channel. Depending on implementation, the primary channel and the secondary channel may have tapered geometries such that, as the menisci continue to recede, a capillary drive of the primary channel decreases at a greater rate than that of the capillary drive of the secondary channel. A gradual reduction in the capillary drives of the primary and the secondary channels reduces the partial headspace vacuum maintained in the storage chamber.

In yet another interrelated aspect, the drain pressure of the primary channel drops below the drain pressure of the secondary channel as a result of the gradual reduction in the capillary drives of the primary and the secondary channels in relation to one another. The meniscus in the primary channel continues to drain when the drain pressure of the primary channel changes, while the meniscus in the secondary channel remains static. The drain pressure involving receding contact angle of the primary channel may drop below the flooding pressure involving advancing contact angle of the secondary channel, causing the primary and secondary channels to fill with vaporizable material.

Accordingly, in response to an increased pressure state inside the storage chamber, vaporizable material flows into the collector's passageway (i.e., the overflow volume) through the vent, wherein the vent is constructed to maintain a liquid seal at the pinch-off point, desirably, at all times. In certain embodiments, the vent is constructed to promote a liquid seal at the opening from which vaporizable material flows between the reservoir's storage chamber and the collector's passageway in the overflow volume.

In yet another interrelated aspect, one or more wick feed channels may be implemented to control the direct flow of the vaporizable material toward the wick. A first wick feed channel may be formed through the collector positioned in the overflow volume and independent of the primary and secondary channels of the control valve noted above. The collector may include a supporting structure that forms the first channel or additional wick feed channels. The wick may be positioned in the wick housing such that the wick is configured to absorb the vaporizable material traveling through the first channel. Depending on implementation, the first channel may have a cross shaped cross-section or have a partial dividing wall. The shape of the first channel may provide for one or more non-primary sub-channels and one or more primary sub-channels that are larger in diameter in comparison to the non-primary sub-channels.

Depending on implementation, when a primary sub-channels or non-primary sub-channel is restricted or plugged (e.g., due to air bubble formation), vaporizable material may travel through an alternate sub-channel or primary channel. In a cross-shaped wick feed, a primary sub-channel may extend through the center of the cross-shaped wick feed. When the primary sub-channel is restricted due to the formation of a gas bubble in a portion of the primary sub-channel, vaporizable material flows through at least one of the non-primary sub-channels.

In some embodiments, the collector may have a first end and a second end, the first end facing the storage chamber and the second end facing away from the storage chamber and being configured to include the wick housing. A second wick feed may be implemented in the form of a second channel to allow for the vaporizable material stored in the storage chamber to flow toward the wick simultaneously as the vaporizable material flows through the first wick feed. The second wick feed may have a cross-shaped cross-sectional.

In accordance with one or more aspects, a reservoir for a cartridge usable with a vaporizer device may comprise a storage chamber configured to contain vaporizable material. The reservoir may be in an operational relationship with an atomizer configured to convert the vaporizable material from a liquid phase to a vapor or aerosol phase for inhalation by a user of the vaporizer device. The cartridge may also include an overflow volume for retaining at least some portion of the vaporizable material, for example, when one or more factors cause the vaporizable material in the reservoir chamber to travel into the overflow volume in the cartridge.

The one or more factors may include the cartridge being exposed to a pressure state, which is different than an earlier ambient pressure state (e.g., by going from a first pressure state to a second pressure state). In some aspects, the overflow volume may include a passageway that connects to an opening or air control port leading to the exterior of the cartridge (i.e., to ambient air). The passageway in the overflow volume may also be in communication with the reservoir chamber such that the passageway may act as an air vent to allow equalization of pressure in the reservoir chamber. In response to a negative pressure event in the cartridges ambient environment, vaporizable material may be drawn from the reservoir chamber to the atomizer and converted to vapor or aerosol phases, reducing the volume of the vaporizable material remaining in the reservoir's storage chamber.

The storage chamber may be coupled to the overflow volume by way of one or more openings between the storage chamber and the overflow volume, for example, such that the one or more openings lead to one or more passageways through the overflow volume. The flow of the vaporizable material into the passageway via the opening may be controllable by way of capillary properties of a fluidic vent leading to the one or more passageways or the capillary properties of the passageways themselves. Furthermore, the flow of the vaporizable material into the one or more passageways may be reversible, allowing for the vaporizable material to be displaced from the overflow volume back into the reservoir chamber.

In at least one embodiment, flow of the vaporizable material may be reversed, in response to change in pressure state (e.g., when a second pressure state in the cartridge reverts back to a first pressure state). The second pressure state may be associated with a negative pressure event. A negative pressure event may be the result of a drop in ambient pressure relative to that of one or more volumes of air retained within the reservoir chamber or other part of the cartridge. Alternatively, a negative pressure event may result from the compression of an internal volume of the cartridge due to mechanical pressure on one or more outer surfaces of the cartridge.

A heating element may include a heating portion and at least two legs. The heating portion may include at least two tines spaced apart from one another. The heating portion may be preformed to define an interior volume configured to receive the wicking element such that the heating portion secures at least a portion of the wicking element to the heating element. The heating portion may be configured to contact at least two separate surfaces of the wicking element. The at least two legs may be coupled to the at least two tines and spaced apart from the heating portion. The at least two legs may be configured to electrically communicate with a power source. Power is configured to be supplied to the heating portion from the power source to generate heat, thereby vaporizing the vaporizable material stored within the wicking element.

In some implementations, the at least two legs includes four legs. In some implementations, the heating portion is configured to contact at least three separate surfaces of the wicking element.

In some implementations, the at least two tines includes a first side tine portion, a second side tine portion opposing the first side tine portion, and a platform tine portion connecting the first side tine portion with the second side tine portion. The platform tine portion may be positioned approximately perpendicular to a portion of the first side tine portion and the second side tine portion. The first side tine portion, the second side tine portion, and the platform tine portion defines the interior volume in which the wicking element is positioned. In some implementations, the at least two legs are located away from the heating portion by a bridge.

In some implementations, each of the at least two legs includes a cartridge contact positioned at an end of each of the at least two legs. The cartridge contact may electrically communicate with the power source. The cartridge contact may be angled and extend away from the heating portion.

In some implementations, the at least two tines includes a first pair of tines and a second pair of tines. In some implementations, the tines of the first pair of tines are evenly spaced from one another. In some implementations, the tines of the first pair of tines are spaced apart by a width. In some implementations, the width is greater at an inner region of the heating element adjacent the platform tine portion than the width at an outer region of the heating element adjacent an outer edge of the first side tine portion opposite the inner region.

In some implementations, the vaporizer device is configured to measure a resistance of the heating element at each of the four legs to control a temperature of the heating element. In some implementations, the heating element includes a heat shield configured to insulate the heating portion from a body of the vaporizer device.

In some implementations, the vaporizer device further includes a heat shield configured to surround at least a portion of the heating element and insulate the heating portion from a body of a wick housing configured to surround at least a portion of the wicking element and the heating element.

In some implementations, the heating portion is folded between the heating portion and the at least two legs to isolate the heating portion from the at least two legs. In some implementations, the heating portion further includes at least one tab that extends from a side of the at least two tines to allow for easier entry of the wicking element to the interior volume of the heating portion. In some implementations, the at least one tab extends away from the interior volume at an angle.

In some implementations, the at least two legs includes a capillary feature. The capillary feature may cause an abrupt change in capillary pressure to thereby prevent the vaporizable material from flowing beyond the capillary feature. In some implementations, the capillary feature comprises one or more bends in the at least two legs. In some implementations, the at least two legs extend at an angle towards the interior volume of the heating portion, the angled at least two legs defining the capillary feature.

In some implementations, a vaporizer device includes a reservoir containing vaporizable material, a wicking element in fluid communication with the reservoir, and a heating element. The heating element includes a heating portion and at least two legs. The heating portion may include at least two tines spaced apart from one another. The heating portion may be preformed to define an interior volume configured to receive the wicking element such that the heating portion secures at least a portion of the wicking element to the heating element. The heating portion may be configured to contact at least two separate surfaces of the wicking element. At least two legs may be coupled to the at least two tines and spaced apart from the heating portion. The at least two legs may be configured to electrically communicate with a power source. Power is configured to be supplied to the heating portion from the power source to generate heat, thereby vaporizing the vaporizable material stored within the wicking element.

A method of forming an atomizer assembly for a vaporizer device may include securing a wicking element to an interior volume of a heating element. The heating element may include a heating portion comprising at least two tines spaced apart from one another, and at least two legs spaced from the heating portion. The legs may be configured to electrically communicate with a power source of the vaporizer device. The heating portion is configured to contact at least two surfaces of the wicking element. The method may also include coupling the heating element to a wick housing configured to surround at least a portion of the wicking element and the heating element. The securing may also include sliding the wicking element into the interior volume of the heating element.

In some implementations, a vaporizer device includes a heating portion comprising one or more heater traces integrally formed and spaced apart from one another, the one or more heater traces configured to contact at least a portion of a wicking element of the vaporizer device, a connecting portion configured to receive power from a power source and direct the power to the heating portion, and a plating layer having a plating material that is different from a material of the heating portion. The plating layer may be configured to reduce contact resistance between the heating element and the power source, thereby localizing heating of the heating element to the heating portion.

In certain aspects of the current subject matter, challenges associated with condensate collecting along one or more internal channels and outlets (e.g., along a mouthpiece) of some vaporizer devices can be addressed by inclusion of one or more of the features described herein or comparable/equivalent approaches as would be understood by one of ordinary skill in the art. Aspects of the current subject matter relate to systems and methods for capturing vaporizable material condensate in a vaporizer device.

In some variations, one or more of the following features may optionally be included in any feasible combination.

Aspects of the current subject matter relate to a cartridge for a vaporizer device. The cartridge may include a reservoir including a reservoir chamber defined by a reservoir barrier. The reservoir may be configured to contain a vaporizable material in the reservoir chamber. The cartridge may include a vaporization chamber in communication with the reservoir and may include a wicking element configured to draw the vaporizable material from the reservoir chamber to the vaporization chamber to be vaporized by a heating element. The cartridge may include an airflow passageway that extends through the vaporization chamber. The cartridge may include at least one capillary channel adjacent the airflow passageway. Each capillary channel of the at least one capillary channel may be configured to receive a fluid and direct the fluid from a first location toward a second location via capillary action.

In one aspect consistent with the current disclosure, each capillary channel of the at least one capillary channel may taper in size. The taper in size may result in an increase in capillary drive through each capillary channel of the at least one capillary channel. Each capillary channel of the at least one capillary channel may be formed by a groove defined between a pair of walls. The at least one capillary channel may fluidly communicates with a wick. The first location may be adjacent an end of the airflow passageway and a mouthpiece. The at least one capillary channel may collect a fluid condensate.

In an interrelated aspect, a vaporizer device may include a vaporizer body including a heating element configured to heat a vaporizable material. The vaporizer device may include a cartridge configured to be releasably coupled to the vaporizer body. The cartridge may include a reservoir including a reservoir chamber defined by a reservoir barrier. The reservoir may be configured to contain the vaporizable material in the reservoir chamber. The cartridge may include a vaporization chamber in communication with the reservoir and may include a wicking element configured to draw the vaporizable material from the reservoir chamber to the vaporization chamber to be vaporized by the heating element. The cartridge may include an airflow passageway that extends through the vaporization chamber. The cartridge may include at least one capillary channel adjacent the airflow passageway. Each capillary channel of the at least one capillary channel may be configured to receive a fluid and direct the fluid from a first location toward a second location via capillary action.

Each capillary channel of the at least one capillary channel may taper in size. The taper in size may result in an increase in capillary drive through each capillary channel of the at least one capillary channel. Each capillary channel of the at least one capillary channel may be formed by a groove defined between a pair of walls. The at least one capillary channel may fluidly communicates with a wick. The first location may be adjacent an end of the airflow passageway and a mouthpiece. The at least one capillary channel may collect a fluid condensate.

In an interrelated aspect, a method of a cartridge of a vaporization device may include collecting a condensate in a first capillary channel of at least one capillary channel of the cartridge. Each of the at least one capillary channel may be configured to receive a fluid and direct the fluid from a first location toward a second location via capillary action. The cartridge may include a reservoir including a reservoir chamber defined by a reservoir barrier. The reservoir may be configured to contain a vaporizable material in the reservoir chamber. The cartridge may include a vaporization chamber in communication with the reservoir and may include a wicking element configured to draw the vaporizable material from the reservoir chamber to the vaporization chamber to be vaporized by a heating element. The cartridge may include an airflow passageway that may extend through the vaporization chamber. The at least one capillary channel may be adjacent the airflow passageway. The method may include directing the collected condensate towards the vaporization chamber and along the first capillary channel.

The method may include vaporizing, at the vaporization chamber, the collected condensate. The first capillary channel may taper in size. Each capillary channel of the at least one capillary channel may be formed by a groove defined between a pair of walls. The at least one capillary channel may fluidly communicates with a wick. The first location may be adjacent an end of the airflow passageway and a mouthpiece.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

FIGS. 7A through 7D illustrate example embodiments for a cartridge connecting port having a male or a female construction, in accordance with one or more implementations;

FIGS. 10C through 10E illustrate perspective frontal and side views of example cartridge structural components with a flow management collector having one or more flow channels, in accordance with one or more implementations;

FIGS. 16A through 16C illustrate a cross-sectional planar side view of an example cartridge, planar side view of an example wicking element housed in a collector structure, and a perspective view of the example cartridge with the collector structure, respectively, in accordance with one or more implementations;

FIGS. 17A and 17B illustrate a perspective view of a first side of a cartridge and a cross-sectional view of a second side of the cartridge having a wicking element that protrudes into the storage chamber, in accordance with one or more implementations;

FIG. 25 illustrates perspective, frontal, side, and exploded views of an example embodiment of a cartridge;

FIGS. 34A and 34B illustrate frontal and side views of an example cartridge body with an external airflow path;

FIGS. 42A and 42B illustrate various perspective, top and side views of an example collector with different structural implementations;

FIG. 44A illustrates a perspective exploded view of an embodiment of a cartridge, consistent with implementations of the current subject matter;

FIG. 44B illustrates a top perspective view of an embodiment of a cartridge consistent with implementations of the current subject matter;

FIG. 44C illustrates a bottom perspective view of an embodiment of a cartridge consistent with implementations of the current subject matter;

FIG. 54 shows a heating element in an unbent position consistent with implementations of the current subject matter;

FIG. 55 shows a heating element in a bent position consistent with implementations of the current subject matter;

FIG. 57 shows a heating element in an unbent position consistent with implementations of the current subject matter;

FIG. 58 shows a heating element in a partially bent position consistent with implementations of the current subject matter;

FIG. 63 shows a heating element in an unbent position consistent with implementations of the current subject matter;

FIG. 64 shows a heating element in a bent position consistent with implementations of the current subject matter;

FIG. 71 shows a heating element in an unbent position consistent with implementations of the current subject matter;

FIG. 72 shows a heating element in an unbent position consistent with implementations of the current subject matter;

FIG. 73 shows a heating element in an unbent position consistent with implementations of the current subject matter;

FIG. 74 shows a heating element in an unbent position consistent with implementations of the current subject matter;

FIG. 82 shows a perspective view of a heating element in a bent position consistent with implementations of the current subject matter;

FIG. 83 shows a side view of a heating element in a bent position consistent with implementations of the current subject matter;

FIG. 84 shows a front view of a heating element in a bent position consistent with implementations of the current subject matter;

FIG. 85 shows a perspective view of a heating element in a bent position and a wicking element consistent with implementations of the current subject matter;

FIG. 86 shows a heating element positioned within a vaporizer cartridge consistent with implementations of the current subject matter;

FIG. 88 shows a side view of a heating element in a bent position consistent with implementations of the current subject matter;

FIG. 89 shows a top view of a heating element in a bent position consistent with implementations of the current subject matter;

FIG. 90 shows a front view of a heating element in a bent position consistent with implementations of the current subject matter;

FIG. 94 shows a side view of a heating element in a bent position consistent with implementations of the current subject matter;

FIG. 95 shows a top view of a heating element in a bent position consistent with implementations of the current subject matter;

FIG. 96 shows a front view of a heating element in a bent position consistent with implementations of the current subject matter;

FIG. 97A shows a perspective view of a heating element in an unbent position consistent with implementations of the current subject matter;

FIG. 97B shows a perspective view of a heating element in an unbent position consistent with implementations of the current subject matter;

FIG. 98A shows a top view of a heating element in an unbent position consistent with implementations of the current subject matter;

FIG. 98B shows a top view of a heating element in an unbent position consistent with implementations of the current subject matter;

FIG. 99 shows a top perspective view of an atomizer assembly consistent with implementations of the current subject matter;

FIG. 100 shows a bottom perspective view of an atomizer assembly consistent with implementations of the current subject matter;

FIG. 101 shows an exploded perspective view of an atomizer assembly consistent with implementations of the current subject matter;

FIG. 102 shows a perspective view of a heat shield consistent with implementations of the current subject matter;

FIG. 103A shows a side cross-sectional view of an atomizer assembly consistent with implementations of the current subject matter;

FIG. 103B shows another side cross-sectional view of an atomizer assembly consistent with implementations of the current subject matter;

Figure 104:
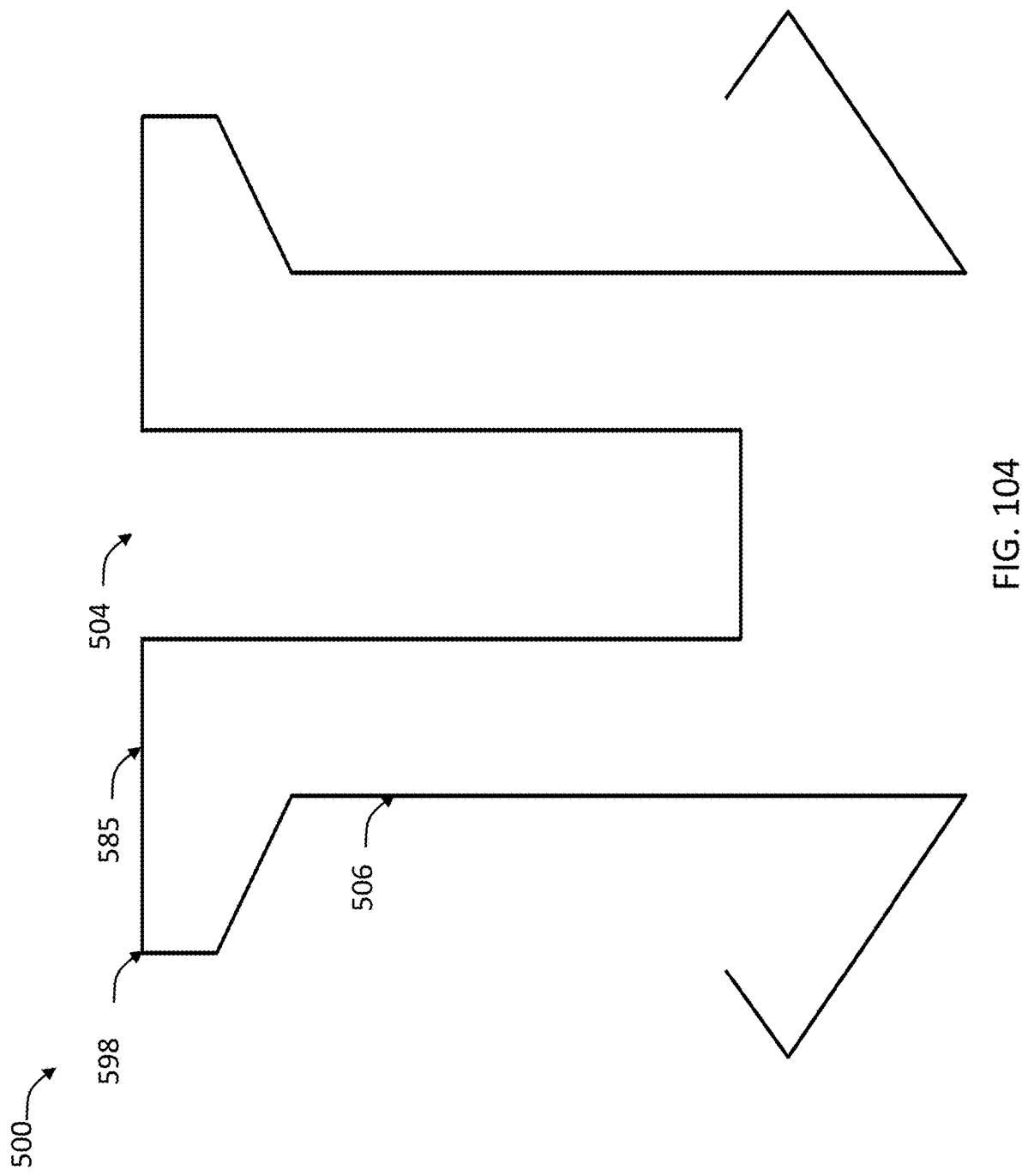
Figure 106:
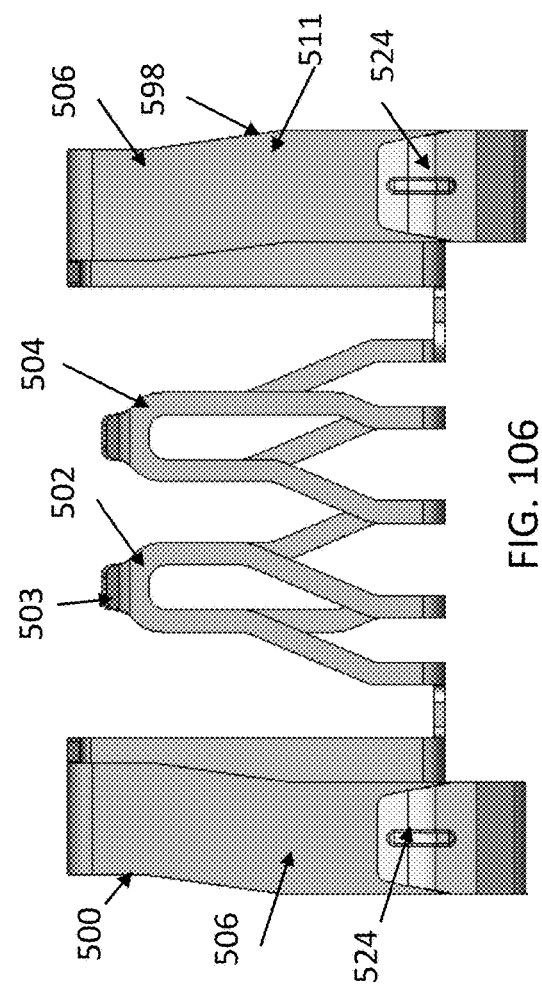
Figure 105:
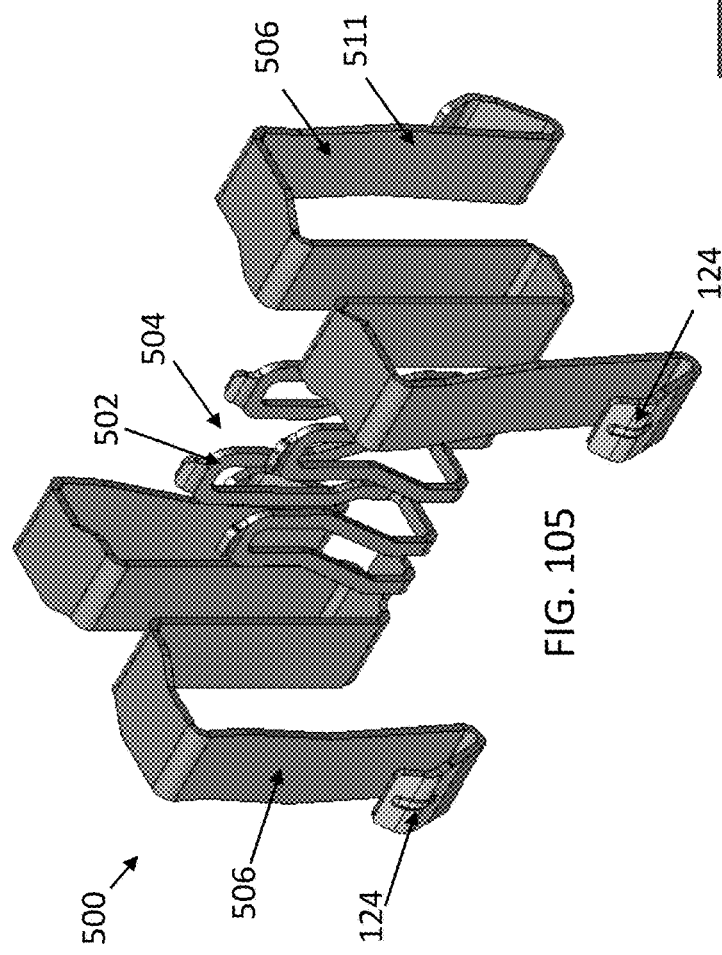
Figure 107:
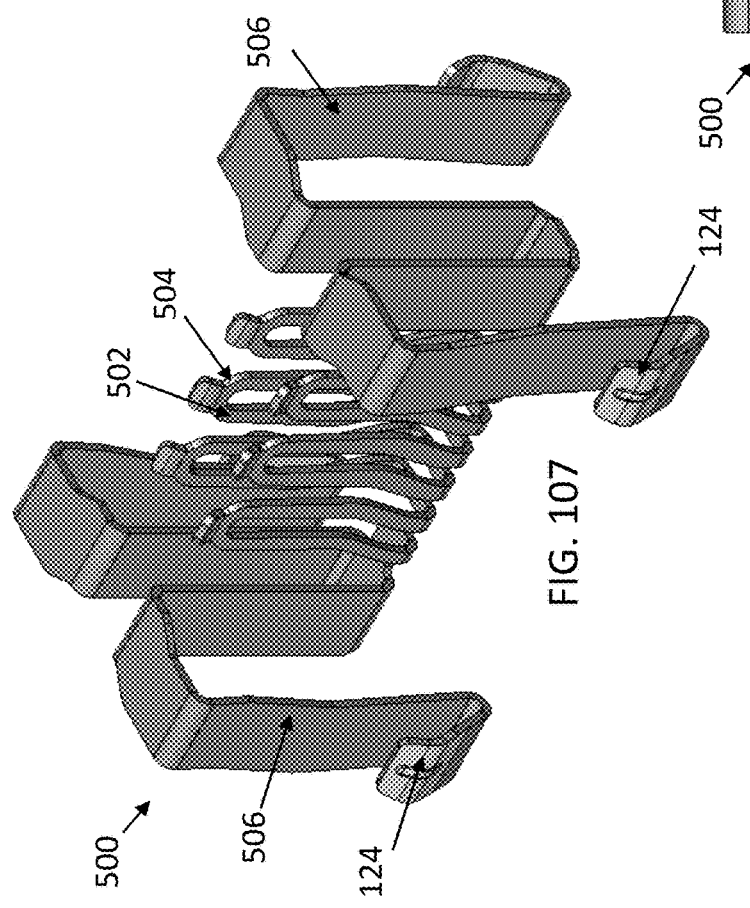
Figure 108:
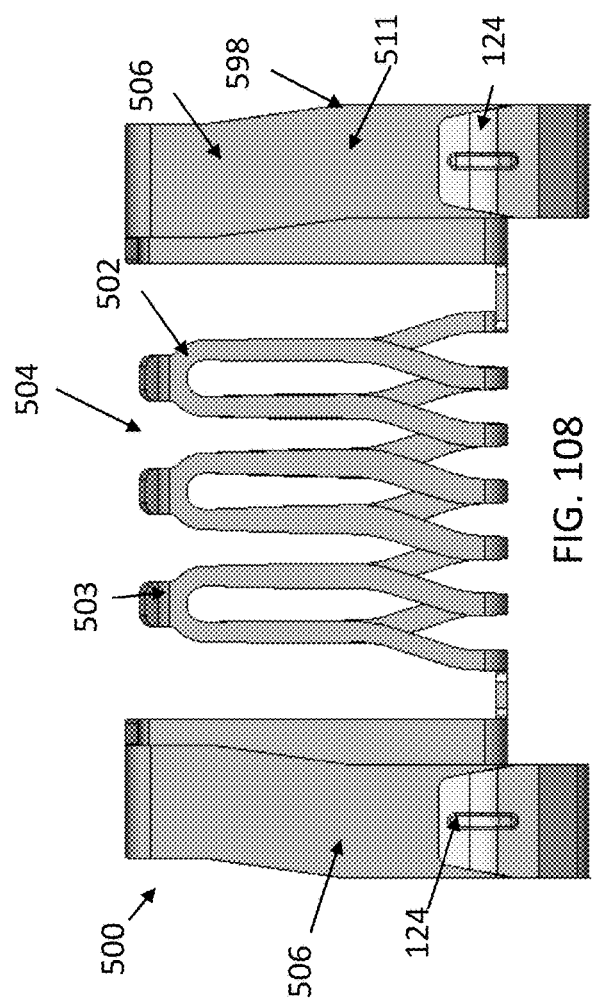
Figures 109, 110:
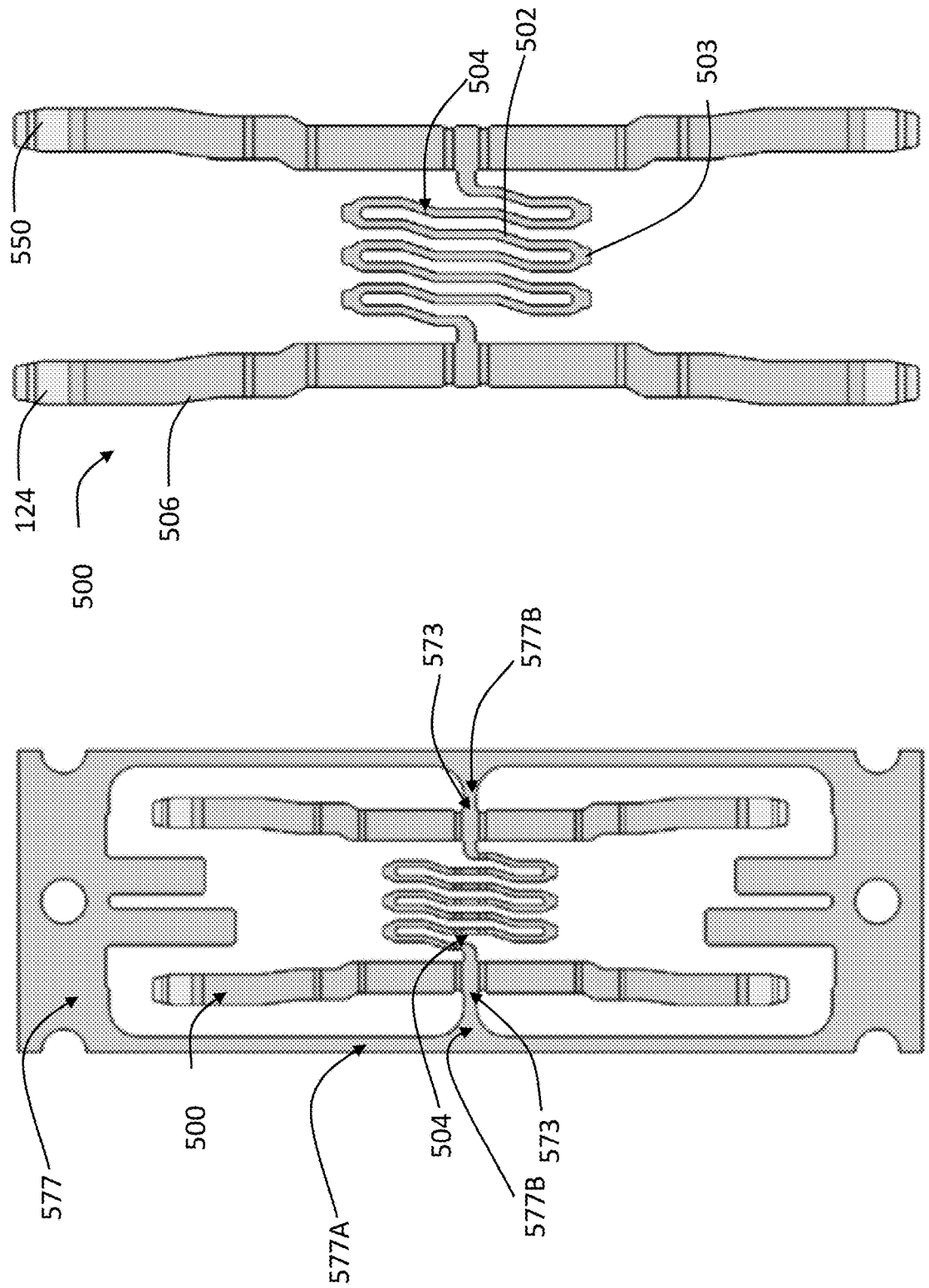
Figure 111A:
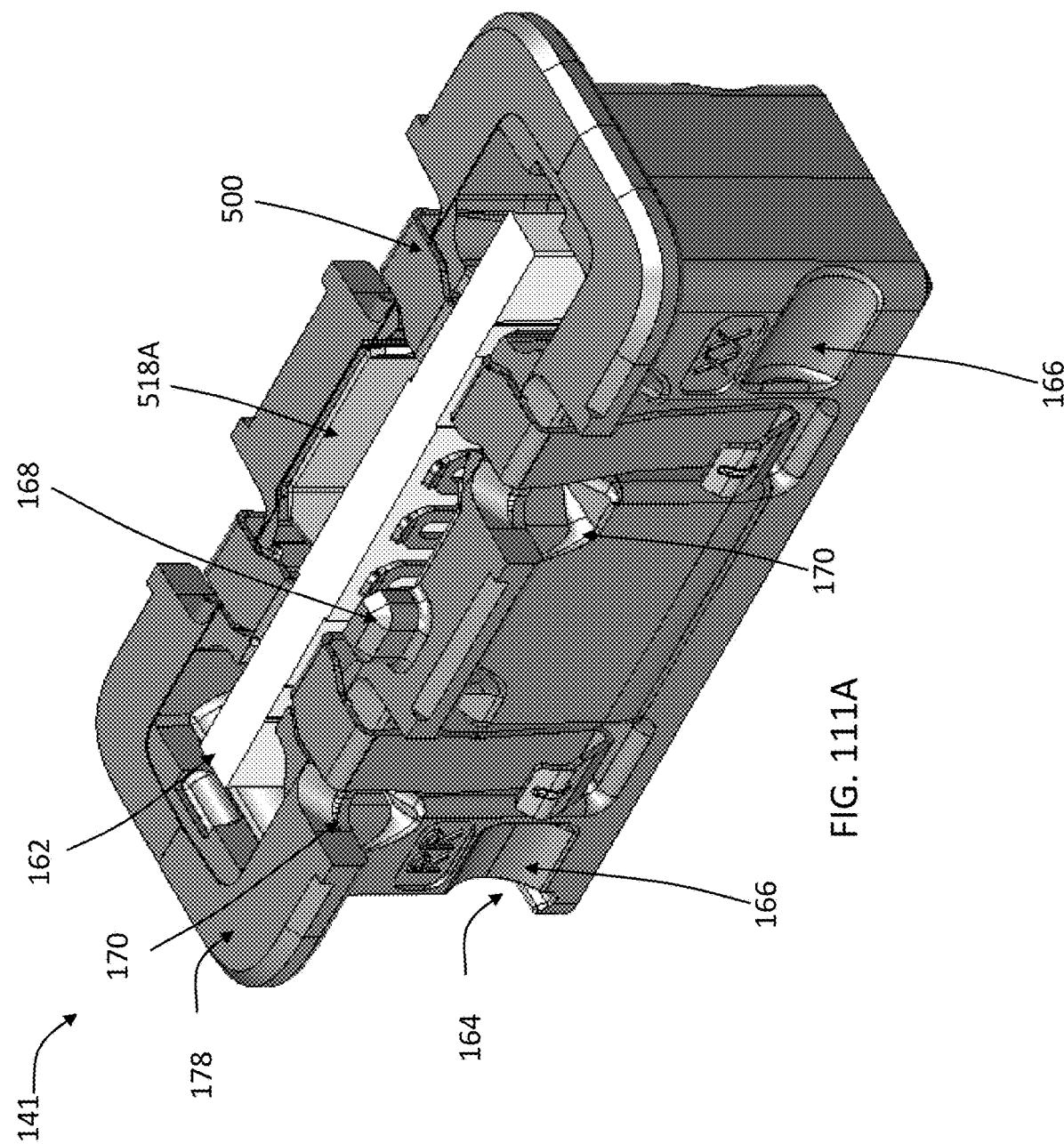
Figure 111B:
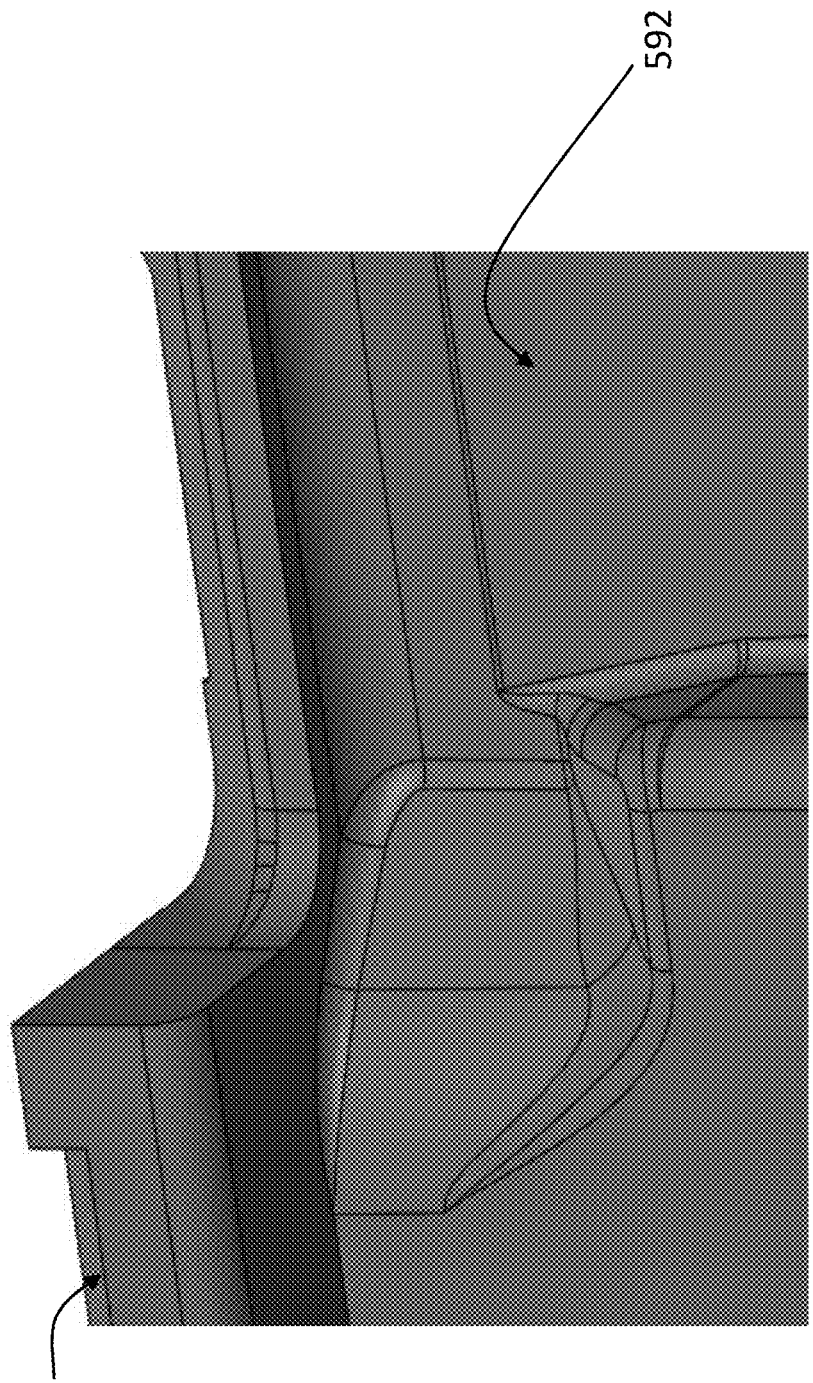
Figure 112:
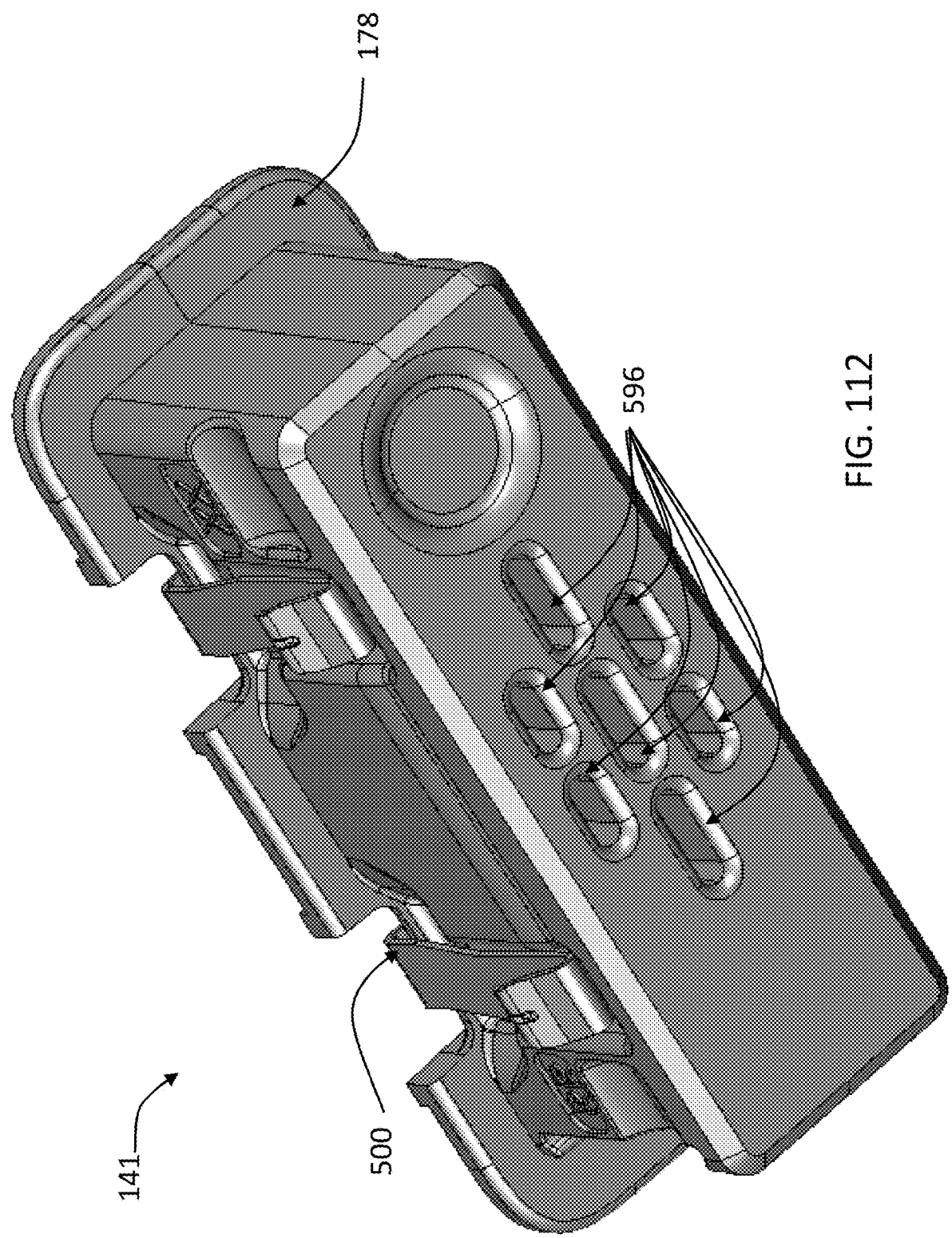
Figure 114C:
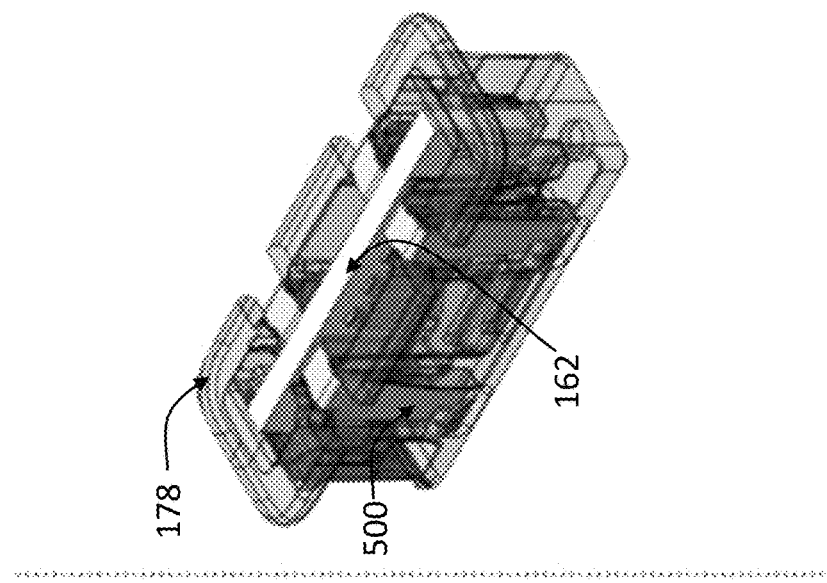
Figure 114B:
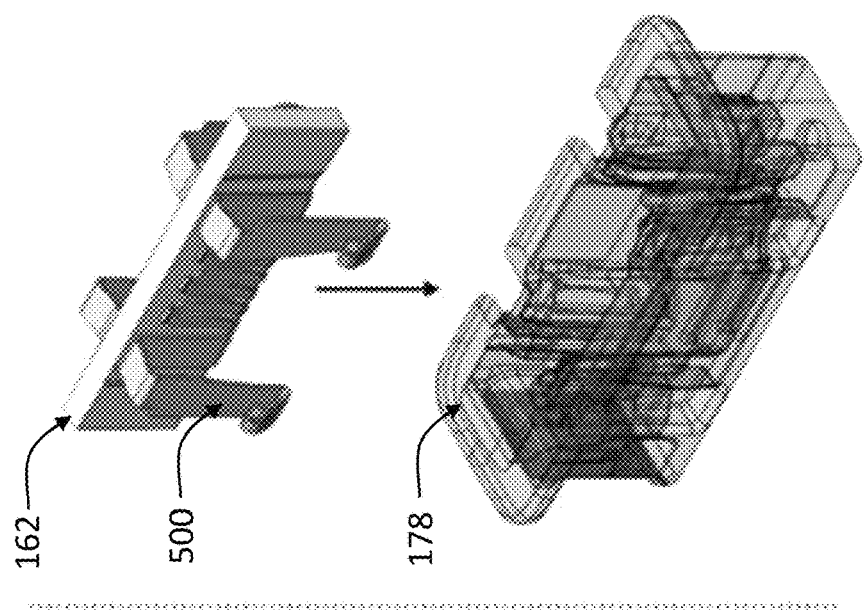
Figure 114A:
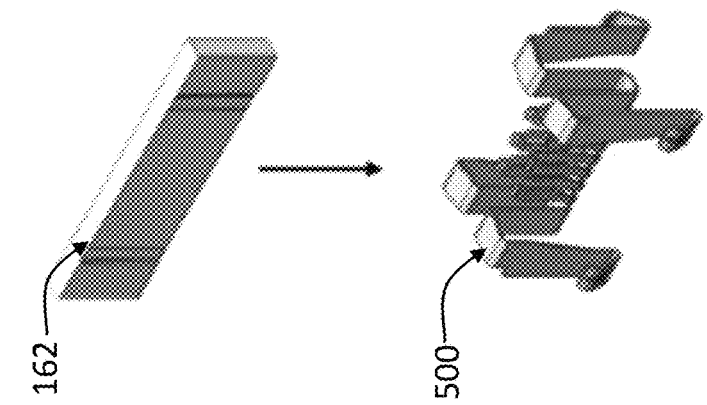
Figure 116:
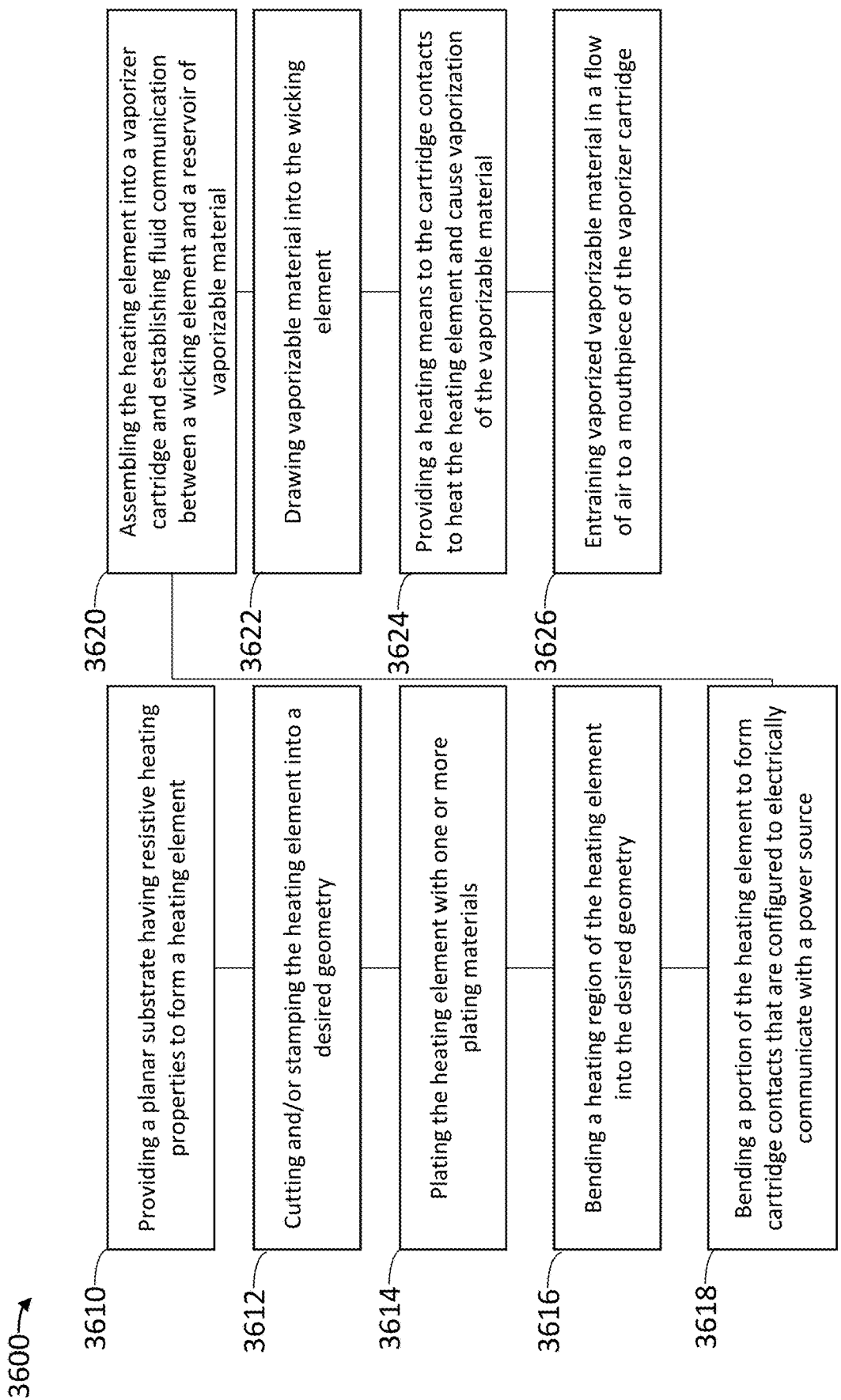
Figure 117:
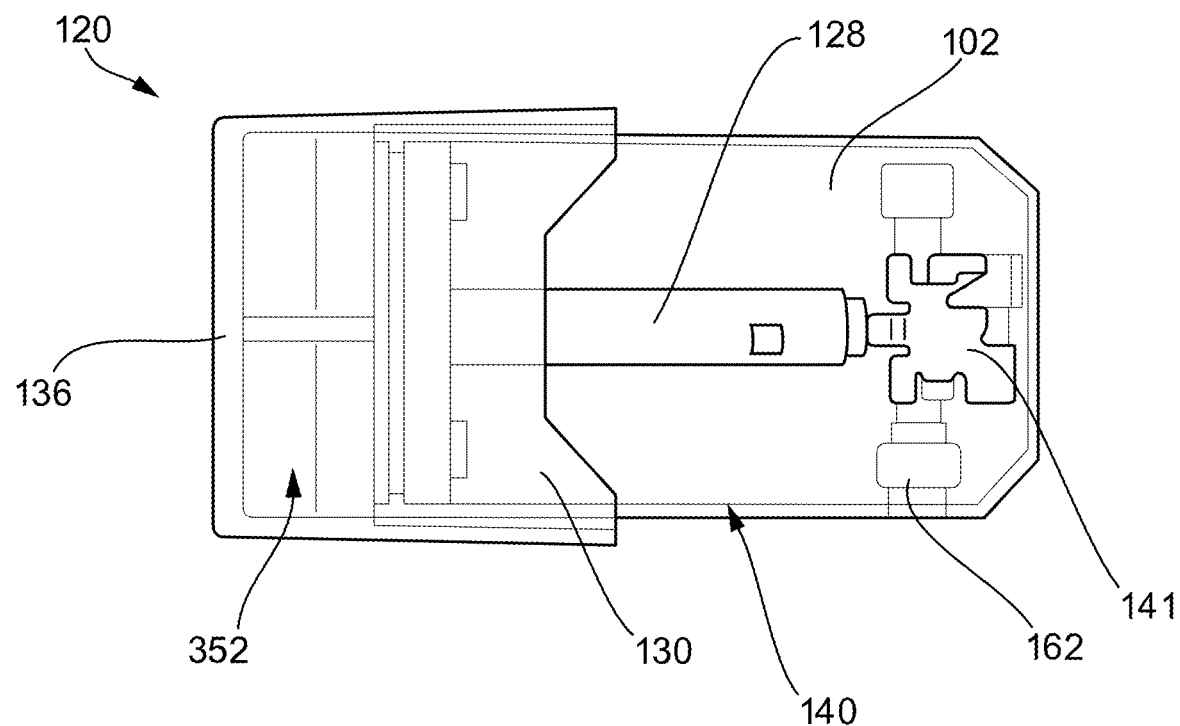
Figure 118:
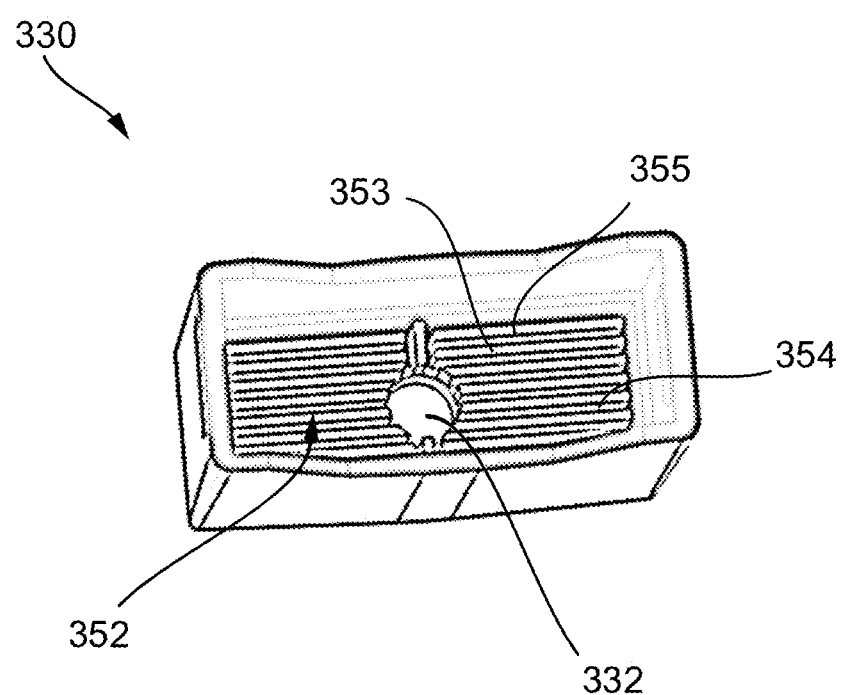
Figure 119A:
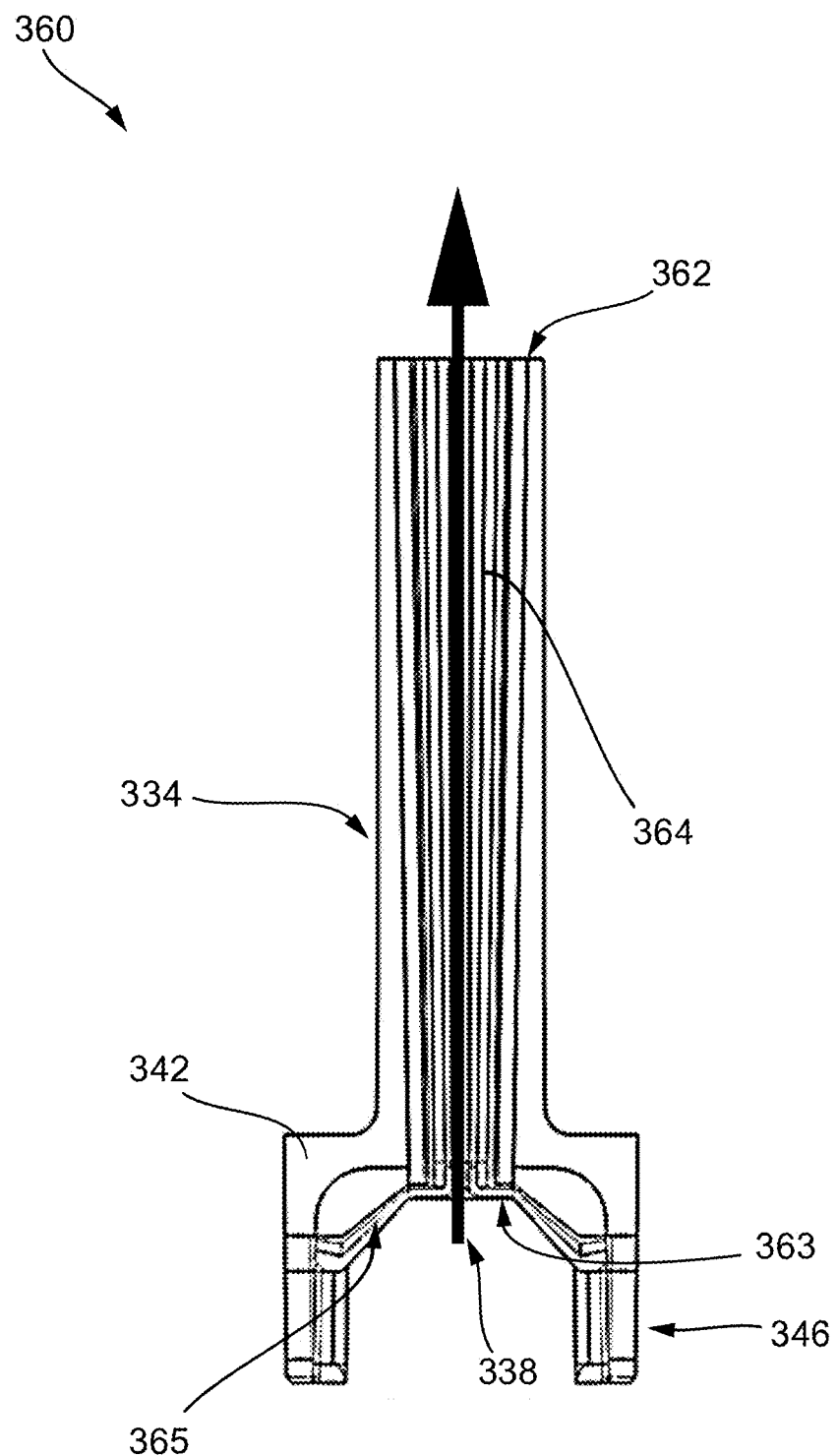
Figure 119B:
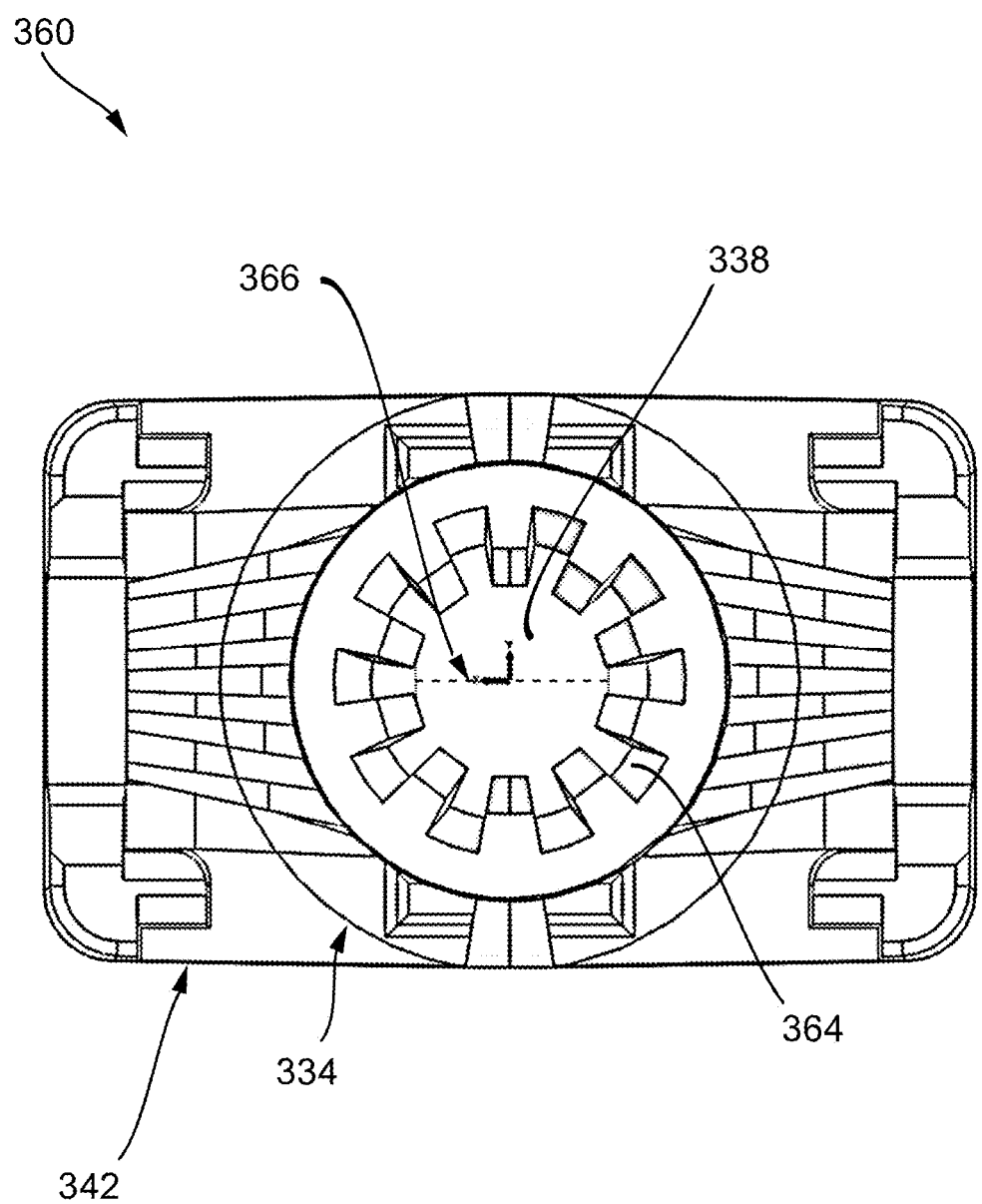
Figure 119C:
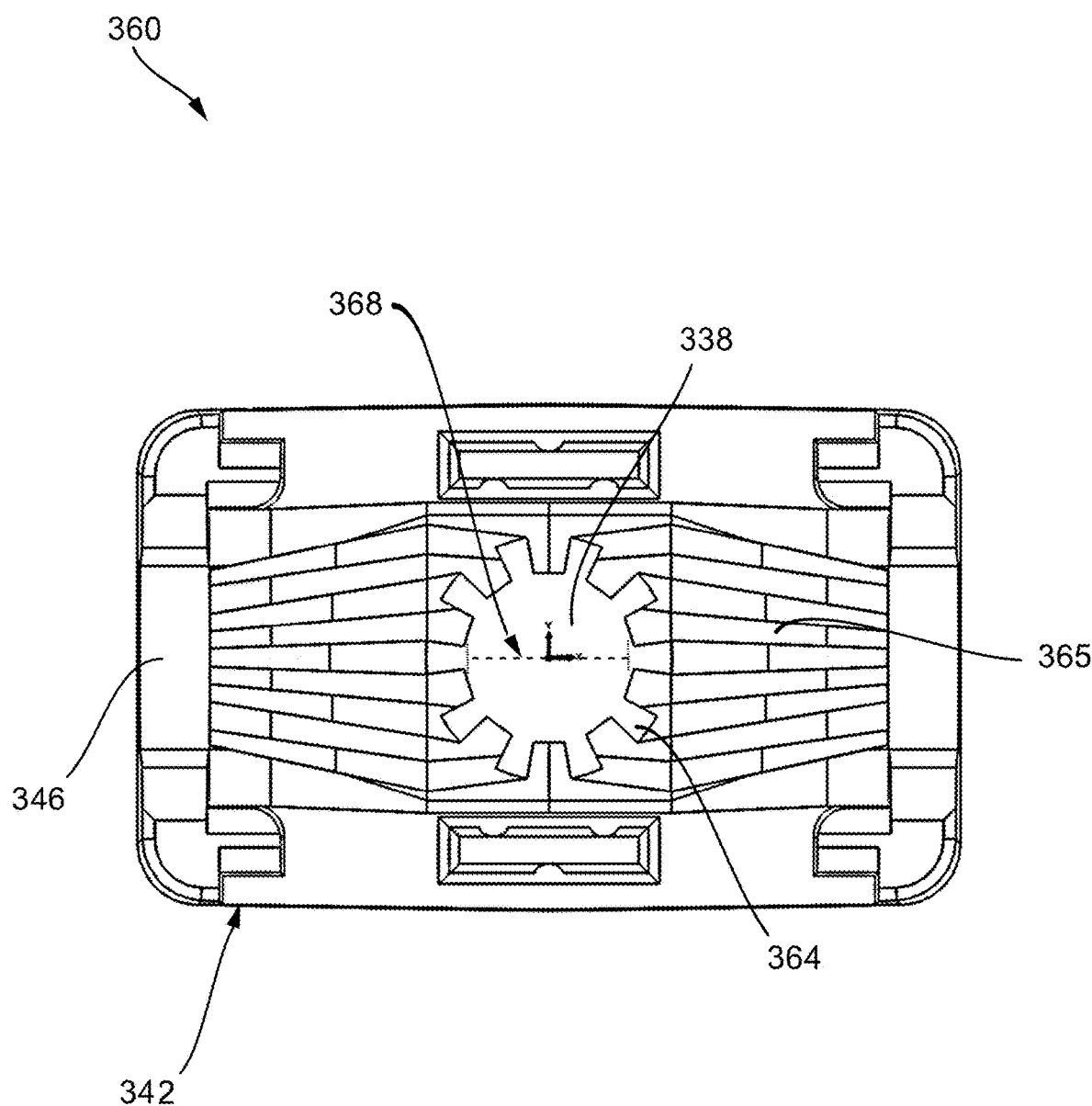

FIG. 104 schematically shows a heating element consistent with implementations of the current subject matter;

FIG. 105 shows a perspective view of a heating element in a bent position consistent with implementations of the current subject matter;

FIG. 106 shows a side view of a heating element in a bent position consistent with implementations of the current subject matter;

FIG. 107 shows a perspective view of a heating element in a bent position consistent with implementations of the current subject matter;

FIG. 108 shows a side view of a heating element in a bent position consistent with implementations of the current subject matter;

FIG. 109 shows a top view of a substrate material with a heating element consistent with implementations of the current subject matter;

FIG. 110 shows a top view of a heating element in an unbent position consistent with implementations of the current subject matter;

FIG. 111A shows a top perspective view of an atomizer assembly consistent with implementations of the current subject matter;

FIG. 111B shows a close-up view of a portion of a wick housing of an atomizer assembly consistent with implementations of the current subject matter;

FIG. 112 shows a bottom perspective view of an atomizer assembly consistent with implementations of the current subject matter;

FIG. 113 shows an exploded perspective view of an atomizer assembly consistent with implementations of the current subject matter;

FIGS. 114A-114C show a process of assembling an atomizer consistent with implementations of the current subject matter;

FIGS. 115A-115C show a process of assembling an atomizer consistent with implementations of the current subject matter;

FIG. 116 shows a process flow chart illustrating features of a method of forming and implementing a heating element consistent with implementations of the current subject matter;

FIG. 117 illustrates an embodiment of a vaporizer cartridge;

FIG. 118 illustrates an embodiment of a mouthpiece of a vaporizer cartridge and/or vaporizer device;

FIG. 119A illustrates a side cross-sectional view of a condensate recycler system of a vaporizer cartridge;

FIG. 119B illustrates a first perspective view of the condensate recycler system of FIG. 119A; and FIG. 119C illustrates a second perspective view of the condensate recycler system of FIG. 119A.

Where practical, the same or similar reference numbers denote the same, similar, or equivalent structures, features, aspects, or elements, in accordance with one or more implementations.

DETAILED DESCRIPTION OF EXAMPLE EMBODIMENTS

A vaporizer configured to convert a liquid vaporizable material to the gas-phase and/or aerosol phase (e.g., a suspension of gas-phase and particulate-phase material in air that is in a relative local equilibrium between the phases) may typically include a reservoir or storage container (also referred to herein as a reservoir, storage compartment, or storage volume) containing a volume of the liquid vaporizable material, an atomizer (which may also be referred to as an atomizer assembly), a heater element (e.g., an electrically resistive element through which electrical current is caused to pass to result in the conversion of the electrical current to heat energy) that heats the liquid vaporizable material to result in the conversion at least some of the liquid vaporizable material to the gas phase, and a wicking element (which may be referred to simply as a wick, but which generally refers to an element or combination of elements that exerts a capillary force to draw the liquid vaporizable material from the reservoir to where it is heated by action of the heating element). The resulting gas-phase liquid vaporizable material may in some cases (dependent on a variety of factors) subsequently (and optionally nearly immediately) begin to at least partially condense to form an aerosol in air passing through, over, near, around etc. the atomizer.

As the liquid vaporizable material in the wicking element is heated and converted to the gas phase (and subsequently optionally into an aerosol), the volume of the liquid vaporizable material in the reservoir is reduced. Absent a mechanism for allowing air or some other substance into the void space (e.g., a part of the reservoir volume not occupied by liquid vaporizable material) created within the reservoir when the volume of the liquid vaporizable material therein is reduced by conversion to the gas-/aerosol phase, a reduced pressure state (e.g., an at least partial vacuum) results within the reservoir. This reduced pressure state may adversely affect the efficacy of the wicking element for drawing the vaporizable material from the storage compartment or reservoir into proximity of the heating element for being vaporized into the gas phase as the partial vacuum pressure acts contrary to the capillary pressure created within the wicking element.

More particularly, a reduced pressure state in the reservoir can result in insufficient saturation of the wick and ultimately the lack of sufficient vaporizable material being delivered to the atomizer for dependable operation of the vaporizer. To counteract the reduced pressure state, ambient air may be allowed to enter the reservoir to equalize the pressure between the interior of the reservoir and ambient pressure. Allowing air to back-fill the void space in the reservoir that is created by vaporized liquid vaporizable material may occur in some vaporizers by air passing into the reservoir through the wicking element. However, this process may generally require that the wicking element be at least partially dry. As a dry wicking element may not be readily achievable and/or may not be desirable for dependable operation of the vaporizer, another typical approach is to provide a vent to allow equalization of pressure between ambient conditions and within the reservoir.

Presence of air in the void space of a reservoir, whether through the wick or through some other vent or venting structure, may create one or more other issues. For example, once the air pressure within the void space of the reservoir is equalized (or at least close to equalized) with ambient pressure, and especially when the void space filled with air increases in volume relative to the total reservoir volume, creation of a negative pressure differential (e.g., the air in the void space being at a higher pressure than ambient) between the air in the void space and ambient conditions may lead to liquid vaporizable material leaking out of the reservoir, for example through the wick, through any vent that is provided, etc. A negative pressure differential between air within the reservoir and current ambient pressure may be created by one or more of several factors, for example, heating of the air within the void space (e.g., by holding the reservoir in a hand, taking the vaporizer from a cold area to a warmer area, etc.), mechanical forces that may distort the shape of and thereby reduce the interior volume of the reservoir (e.g., squeezing on a part of the vaporizer causing distortion of the reservoir volume, etc.), a rapid drop in the ambient pressure (e.g., such as may occur in an airplane cabin during air travel, when a car or train enters or exits a tunnel, when a window is opened or closed while a vehicle is traveling at an elevated speed, etc.), or the like.

Leaks of liquid vaporizable material from a reservoir of a vaporizer such as those described above are generally undesirable, as the leaked liquid vaporizable material may create an unwanted mess (e.g., by staining clothes or other items in proximity to the vaporizer), may make its way into an inhalation path of the vaporizer and thereby being ingested by a user, may interfere with functioning of the vaporizer (e.g., by fouling a pressure sensor, affecting operability of electrical circuitry and/or switches, fouling charging ports and/or connections between a cartridge and a vaporizer body, etc.), or the like. Liquid vaporizable material leaks can thus interfere with the functionality and cleanliness of the vaporizer.

Figure 1:
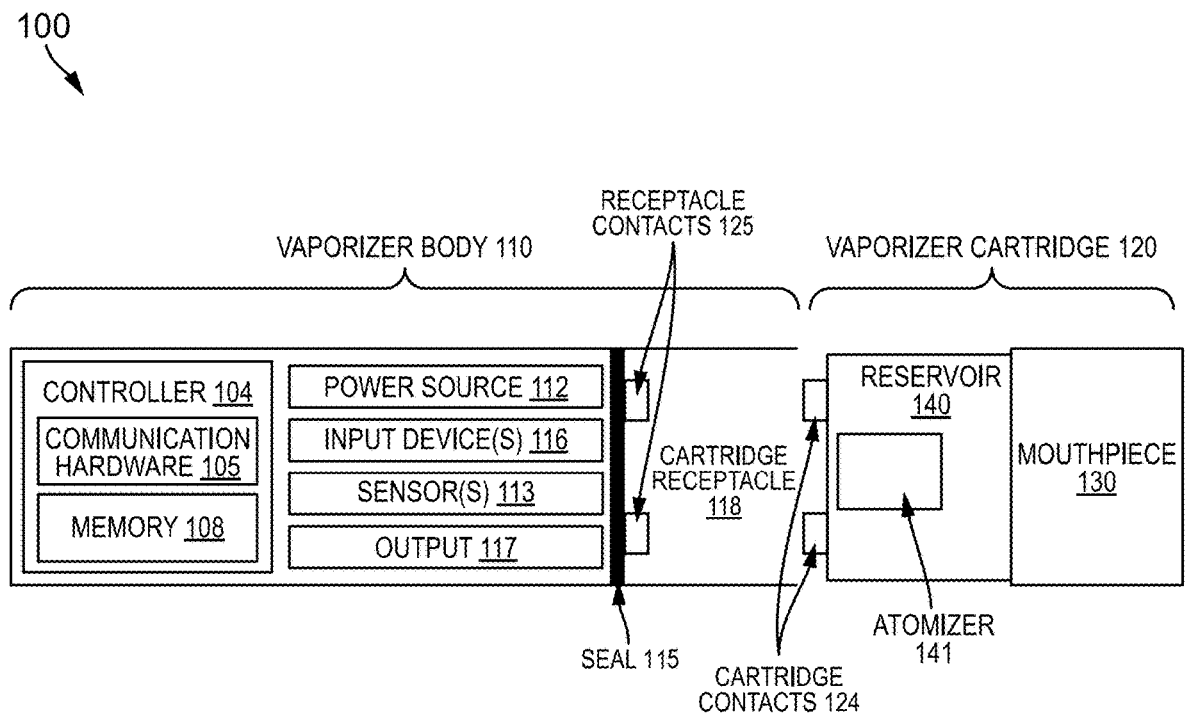
FIG. 1 illustrates a block diagram of an example vaporizer device, in accordance with one or more implementations.

Examples of vaporizers include, without limitation, electronic vaporizers, electronic nicotine delivery systems (ENDS), or devices and systems with same, similar, or equivalent structural or functional features or capabilities. FIG. 1 shows an example block diagram of an example vaporizer 100. The vaporizer 100 may include a vaporizer body 110 and a vaporizer cartridge 120 (also referred to simply as a vaporizer cartridge 120). The vaporizer body 110 may include a power source 112 (e.g., a battery which may be rechargeable), and a controller 104 (e.g., programmable logic device, processor, or circuitry capable of executing logic code) for controlling delivery of heat to an atomizer 141 to cause a vaporizable material (not shown) to be converted from a condensed form (e.g., a solid, a liquid, a solution, a suspension, an at least partially unprocessed plant material, etc.) to a gas phase, or more generically, for the vaporizable material to be converted to an inhalable form or a precursor of an inhalable form. In this context, and inhalable form may be a gas or an aerosol, or some other airborne form. A precursor of an inhalable form may include a gas-phase state of the vaporizable material that condenses a least partially to form an aerosol at some time (optionally immediately or nearly immediately or alternatively with some delay or after some amount of cooling) after formation of the gas-phase state. The controller 104 may be part of one or more printed circuit boards (PCBs) consistent with certain implementations and may be utilized to control certain features of the vaporizer body 110 in association with one or more sensors 113.

As shown, the vaporizer body 110 may, in some implementations of the current subject matter, include one more sensors 113, vaporizer body contacts 125, a seal 115, and, optionally, a cartridge receptacle 118 configured to receive at least part of a vaporizer cartridge 120 for coupling with the vaporizer body 110 through one or more of a variety of attachment structures. As discussed below with reference to FIGS. 7A through 7D, a male or a female receptacle construction or some combination thereof may be employed to couple the vaporizer cartridge 120 with the vaporizer body 110. For example, in some implementations of the current subject matter, an inner part of a first end of the cartridge may be received in a cartridge receptacle 118 of the vaporizer body 110 while an outer part of the first end of the cartridge at least partially covers some part of an outside surface of a structure on the vaporizer body 110 that forms the cartridge receptacle 118. Such an arrangement for coupling a vaporizer cartridge 120 to a vaporizer body 110 may allow for a convenient, easy to use method of joining that also provides sufficient mechanical coupling strength to avoid unwanted separate of the vaporizer cartridge 120 and vaporizer body 110. Such a configuration may also provide desirable resistance to flexing of the vaporizer formed by coupling the vaporizer cartridge 120 to the vaporizer body 110. Regarding the vaporizer body contacts 125, it will be understood that these may also be referred to as "receptacle contacts 125," particularly in implementations in which the corresponding cartridge contacts 124 (discussed below) are on a part of a vaporizer cartridge 120 that is inserted into a receptacle or receptacle-like structure on the vaporizer body 110. However, the terms "vaporizer body contacts 125" and/or "receptacle contacts 125" are also used herein as aspects of the current subject matter are not limited to (and may be used to provide various advantages in systems other than those in which) electrical coupling between a vaporizer cartridge 120 and a vaporizer body 110 occurs between contacts within a cartridge receptacle 118 on the vaporizer body 110 and on a part of the vaporizer cartridge 120 that is inserted into cartridge receptacle 118.

In some examples, the vaporizer cartridge 120 may include a reservoir 140 for containing a liquid vaporizable material and a mouthpiece 130 for delivering a dose of an inhalable form of the vaporizable material. The mouthpiece may optionally be a separate component from the structure that forms the reservoir 140, or alternatively it may be formed from a same part or component that forms at least part of one or more walls of the reservoir 140. The liquid vaporizable material within the reservoir 140 may be a carrier solution in which active or inactive ingredients may be suspended, dissolved, or held in solution or a neat liquid form of the vaporizable material itself.

In accordance with one implementation, a vaporizer cartridge 120 may include an atomizer 141, which may include a wick or a wicking element as well as a heater (e.g., a heating element). As noted above, the wicking element may include any material capable of causing fluid absorption by capillary pressure through the wick to convey an amount of a liquid vaporizable material to a part of the atomizer 141 that includes the heating element. The wick and the heating element are not shown in FIG. 1, but are disclosed and discussed in further detail herein with reference to at least FIGS. 3A, 3B and 4. Briefly, the wicking element may be configured to draw liquid vaporizable material from a reservoir 140 configured to contain the liquid vaporizable material, so that the liquid vaporizable material may be vaporized (i.e., converted to a gas-phase state) by heat delivered from the heating element to the wicking element and the liquid vaporizable material drawn into the wicking element. In some implementations, air may enter a reservoir 140 through the wicking element or other opening to at least partially equalize pressure in the reservoir 140 in response to liquid vaporizable material being removed from the reservoir 140 during vapor and/or aerosol formation.

As shown in FIG. 1, the pressure sensor (and any other sensors) 113 may be positioned on or coupled (e.g., electrically, electronically, physically or via a wireless connection) to the controller 104. Controller 104 may be a printed circuit board assembly or other type of circuit board. To take measurements accurately and maintain durability of the vaporizer 100, it may be beneficial to provide a resilient seal 115 to separate an airflow path from other parts of the vaporizer 100. The seal 115, which may be a gasket, may be configured to at least partially surround the pressure sensor 113 such that connections of the pressure sensor 113 to internal circuitry of the vaporizer may be separated from a part of the pressure sensor exposed to the airflow path.

The liquid vaporizable material used with the vaporizer 100 may be provided within a vaporizer cartridge 120 that may be refillable when empty or disposable in favor of a new cartridge containing additional vaporizable material of a same or different type. A vaporizer may be a cartridge-using vaporizer or a multi-use vaporizer capable of use with or without a cartridge. For example, a multi-use vaporizer may include a heating chamber (e.g., an oven) configured to receive a vaporizable material directly in the heating chamber and also to receive a cartridge or other replaceable device having a reservoir, a volume, or other functional or structural equivalent for at least partially containing a usable amount of vaporizable material.

In an example of a cartridge-using vaporizer, the seal 115 may also separate parts of one or more electrical connections between the vaporizer body 110 and the vaporizer cartridge 120. Such arrangements of the seal 115 in the vaporizer 100 may be helpful in mitigating against potentially disruptive impacts on vaporizer components resulting from interactions with one or more environmental factors, such as condensed water, vaporizable material that leaks from a reservoir and/or condenses after vaporization, to reduce the escape of air from a designed airflow path in the vaporizer, or the like.

Unwanted air, liquid, or other fluid passing or contacting the circuitry of the vaporizer 100 may cause various unwanted effects, such as altered pressure readings, or may result in the buildup of unwanted material (e.g., moisture, vaporizable material, and/or the like) in parts of the vaporizer 100 where the unwanted material may cause poor pressure signal, degradation of the pressure sensor or other electrical or electronic components, and/or a shorter life of the vaporizer. Leaks in the seal 115 may also result in a user inhaling air that has passed over parts of the vaporizer 100 containing or constructed of materials unsuitable for inhalation.

Vaporizers configured to generate at least part of an inhalable dose of a non-liquid vaporizable material via heating of a non-liquid vaporizable material may be also within the scope of the disclosed subject matter. For example, instead of or in addition to a liquid vaporizable material, the vaporizer cartridge 120 may include a mass of a plant material or other non-liquid material (e.g., a solid form of the vaporizable material itself such as a "wax") that is processed and formed to have direct contact with at least a portion of one or more resistive heating elements (or to be radiatively and/or convectively heated by a heating element), which may optionally be included in a vaporizer cartridge 120 or in part of a vaporizer body 110. A solid vaporizable material (e.g., one that includes a plant material) may emit only part of the plant material as the vaporizable material (e.g., such that some part of the plant material remains as waste after the vaporizable material is emitted for inhalation) or may be capable of having all of the solid material eventually be vaporized for inhalation. A liquid vaporizable material may likewise be capable of being completely vaporized or may include some part of the liquid material that remains after all of the material suitable for inhalation has been consumed.

When configured with the vaporizable material and the heating element in the vaporizer cartridge 120, the vaporizer cartridge 120 may couple mechanically and electrically to the vaporizer body 110, which may include a processor, a power source 112, and one or more vaporizer body contacts 125 for connecting to corresponding cartridge contacts 124 to complete a circuit with the resistive heating element included in the vaporizer cartridge 120. A variety of vaporizer configurations may be implemented with one or more of the features described herein.

In some implementations, the vaporizer 100 may include a power source 112 as part of the vaporizer body 110 while a heating element may be disposed in the vaporizer cartridge 120 configured to couple with the vaporizer body 110. Configured as such, the vaporizer 100 may include electrical connection features for completing a circuit that includes the controller 104, the power source 112, and the heating element included in the vaporizer cartridge 120.

The connection features may, in some implementations of the current subject matter, include at least two cartridge contacts 124 on a bottom surface of the vaporizer cartridge 120 and at least two contacts 125 disposed near a base of the cartridge receptacle of the vaporizer 100, such that the cartridge contacts 124 and the receptacle contacts 125 make electrical connections when the vaporizer cartridge 120 is inserted into and coupled with the cartridge receptacle 118. In some implementations of the current subject matter, the vaporizer body contacts 125 may be compressible pins (e.g., pogo pins) that are retracted under pressure of corresponding cartridge contacts 124 when a vaporizer cartridge is inserted and secured in the cartridge receptacle 118. Other configurations are also contemplated. For example, brush contacts that make electrical connections with corresponding contacts on a mating part of a vaporizer cartridge may be used. Such contacts need not make an electrical connection with cartridge contacts on a bottom end of the vaporizer cartridge 120, but may instead be coupled by being urged outward from one or more side walls of the cartridge receptacle 118 against cartridge contacts 124 on a part of a side of the vaporizer cartridge 120 that is within the receptacle when the vaporizer cartridge 120 is properly inserted into the cartridge receptacle 118.

The circuit completed by the electrical connections may allow delivery of electrical current to the resistive heating element and may further be used for additional functions such as for measuring a resistance of the resistive heating element for use in determining or controlling a temperature of the resistive heating element based on a thermal coefficient of resistivity of the resistive heating element, for identifying a vaporizer cartridge 120 based on one or more electrical characteristics of a resistive heating element or the other circuitry of the vaporizer cartridge 120.

In some examples, at least two cartridge contacts 124 and at least two vaporizer body contacts 125 (e.g., receptacle contacts for an implementation in which part of a vaporizer cartridge 120 is inserted into a cartridge receptacle 118) may be configured to electrically connect in either of at least two orientations. In other words, one or more circuits configured for operation of the vaporizer 100 may be completed by insertion (or other joining) of at least part of a vaporizer cartridge 120 in the cartridge receptacle 118 in a first rotational orientation (e.g., around an axis along which the end of the vaporizer cartridge having the vaporizer cartridge 120 is inserted into the cartridge receptacle 118 of the vaporizer body 110) such that a first cartridge contact of the at least two cartridge contacts 124 is electrically connected to a first receptacle contact of the at least two receptacle contacts 125 and a second cartridge contact of the at least two cartridge contacts 124 is electrically connected to a second receptacle contact of the at least two receptacle contacts 125.

Furthermore, the one or more circuits configured for operation of the vaporizer 100 may be completed by insertion (or other joining) of a vaporizer cartridge 120 in the cartridge receptacle 118 in a second rotational orientation such that the first cartridge contact of the at least two cartridge contacts 124 is electrically connected to the second receptacle contact of the at least two receptacle contacts 125 and the second cartridge contact of the at least two cartridge contacts 124 is electrically connected to the first receptacle contact of the at least two receptacle contacts 125. A vaporizer cartridge 120 may be reversibly insertable into a cartridge receptacle 118 of the vaporizer body 110 as provided in further detail herein.

In one example of an attachment structure for coupling a vaporizer cartridge 120 to a vaporizer body 110, the vaporizer body 110 may include a detent (e.g., a dimple, protrusion, etc.) protruding inwardly from an inner surface of the cartridge receptacle 118. One or more exterior surfaces of the vaporizer cartridge 120 may include corresponding recesses (not shown in FIG. 1) that may fit or otherwise snap over such detents when an end of the vaporizer cartridge 120 is inserted into the cartridge receptacle 118 on the vaporizer body 110.

The vaporizer cartridge 120 and the vaporizer body 110 may be coupled, for example, by insertion of an end of the vaporizer cartridge 120 into the cartridge receptacle 118 of the vaporizer body 110. The detent in the vaporizer body 110 may fit within and/or otherwise be held within the recesses of the vaporizer cartridge 120 to hold the vaporizer cartridge 120 in place when assembled. Such a detent-recess assembly may provide enough support to hold the vaporizer cartridge 120 in place to ensure sufficient contact between the at least two cartridge contacts 124 and the at least two receptacle contacts 125, while allowing release of the vaporizer cartridge 120 from the vaporizer body 110 when a user pulls with reasonable force on the vaporizer cartridge 120 to disengage the vaporizer cartridge 120 from the cartridge receptacle 118.

Further to the discussion above about the electrical connections between the vaporizer cartridge 120 and the vaporizer body 110 being reversible such that at least two rotational orientations of the vaporizer cartridge 120 in the cartridge receptacle 118 may be possible, in some implementations of the vaporizer 100 the shape of the vaporizer cartridge 120, or at least a shape of the end of the vaporizer cartridge 120 that is configured for insertion into the cartridge receptacle 118 may have rotational symmetry of at least order two. In other words, the vaporizer cartridge 120 or at least the mechanical mating features and the electrical contacts on the insertable end of the vaporizer cartridge 120 may be symmetric upon a rotation of 180° around the axis along which the vaporizer cartridge 120 is inserted into the cartridge receptacle 118. In such a configuration, the circuitry of the vaporizer 100 may support identical operation regardless of which symmetrical orientation of the vaporizer cartridge 120 occurs. It will be understood that the entirety of the insertable end of the cartridge need not be symmetrical in all implementations of the current subject matter. For example, a vaporizer cartridge 120 that has rotationally symmetric mechanical features for cooperatively engaging with corresponding features within or on the outside of a cartridge receptacle 118, that is shaped and sized to fit within the cartridge receptacle 118 of the vaporizer body 110, and that likewise has cartridge electrical contacts 124 with rotational symmetry and internal circuitry (which can optionally be in either or both of the vaporizer cartridge 120 and the vaporizer body 110) that is compatible with reversing the electrical contacts is consistent with the current disclosure even if the overall shape and appearance of the insertable end of the vaporizer cartridge 120 is not rotationally symmetrical.

As noted above, in some example embodiments, the vaporizer cartridge 120, or at least an end of the vaporizer cartridge 120, is configured for insertion in the cartridge receptacle 118 and may have a non-circular cross-section transverse to the axis along which the vaporizer cartridge 120 is inserted into the cartridge receptacle 118. For example, the non-circular cross-section may be approximately rectangular, approximately elliptical (e.g., have an approximately oval shape), non-rectangular but with two sets of parallel or approximately parallel opposing sides (e.g., having a parallelogram-like shape), or other shapes having rotational symmetry of at least order two. In this context, approximately having a shape indicates that a basic likeness to the described shape is apparent, but that sides of the shape in question need not be completely linear and vertices need not be completely sharp. Some amount of rounding of both or either of edges or vertices of the cross-sectional shape is contemplated in the description of any non-circular cross-section referred to herein.

The at least two cartridge contacts 124 and the at least two receptacle contacts 125 may take various forms. For example, one or both sets of contacts may include conductive pins, tabs, posts, receiving holes for pins or posts, or the like. Some types of contacts may include springs or other urging features to cause better physical and electrical contact between the contacts on the vaporizer cartridge and the vaporizer body. The electrical contacts may be gold-plated, and/or may include other materials.

A vaporizer 100 consistent with implementations of the disclosed subject matter may be configured to connect (e.g., wirelessly or via a wired connection) to one or more computing devices in communication with the vaporizer 100. To this end, the controller 104 may include communication hardware 105. The controller 104 may also include a memory 108. A computing device may be a component of a vaporizer system that also includes the vaporizer 100, and may include an independent communication hardware, which may establish a wireless communication channel with the communication hardware 105 of the vaporizer 100.

A computing device used as part of the vaporizer system may include a general-purpose computing device (e.g., a smartphone, a tablet, a personal computer, some other portable device such as a smartwatch, or the like) that executes software to produce a user interface for enabling a user of the device to interact with a vaporizer 100. In other implementations, a device used as a part of the vaporizer system may be a dedicated piece of hardware such as a remote control or other wireless or wired device having one or more physical or soft interface controls (e.g., configurable on a screen or other display device and selectable via user interaction with a touch-sensitive screen or some other input device like a mouse, pointer, trackball, cursor buttons, or the like). The vaporizer 100 may also include one or more outputs 117 or devices for providing information to the user.

A computing device that is part of a vaporizer system as defined above may be used for any of one or more functions, such as controlling dosing (e.g., dose monitoring, dose setting, dose limiting, user tracking, etc.), controlling sessioning (e.g., session monitoring, session setting, session limiting, user tracking, etc.), controlling nicotine delivery (e.g., switching between nicotine and non-nicotine vaporizable material, adjusting an amount of nicotine delivered, etc.), obtaining locational information (e.g., location of other users, retailer/commercial venue locations, vaping locations, relative or absolute location of the vaporizer itself, etc.), vaporizer personalization (e.g., naming the vaporizer, locking/password protecting the vaporizer, adjusting one or more parental controls, associating the vaporizer with a user group, registering the vaporizer with a manufacturer or warranty maintenance organization, etc.), engaging in social activities (e.g., social media communications, interacting with one or more groups, etc.) with other users, or the like. The terms "sessioning", "session", "vaporizer session," or "vapor session," may be used to refer to a period devoted to the use of the vaporizer. The period may include a time period, a number of doses, an amount of vaporizable material, or the like.

In the example in which a computing device provides signals related to activation of the resistive heating element, or in other examples of coupling of a computing device with a vaporizer 100 for implementation of various control or other functions, the computing device executes one or more computer instructions sets to provide a user interface and underlying data handling. In one example, detection by the computing device of user interaction with one or more user interface elements may cause the computing device to signal the vaporizer 100 to activate the heating element, either to a full operating temperature for creation of an inhalable dose of vapor/aerosol. Other functions of the vaporizer 100 may be controlled by interaction of a user with a user interface on a computing device in communication with the vaporizer 100.

In some embodiments, a vaporizer cartridge 120 usable with a vaporizer body 110 may include an atomizer 141 having a wicking element and a heating element. Alternatively, one or both of the wicking element and the heating element may be part of the vaporizer body 110. In implementations in which any part of the atomizer 141 (e.g., a heating element or a wicking element) is part of the vaporizer body 110, the vaporizer 100 may be configured to supply liquid vaporizable material from a reservoir 140 in the vaporizer cartridge to the wick and other atomizer parts, such as for example a wicking element, a heating element, etc. Capillary structures that include a wicking element will be understood by a skilled artisan to be but one potential embodiment usable with other features described herein.

Activation of the heating element may be caused by automatic detection of the puff based on one or more of signals generated by one or more sensors 113, such as for example a pressure sensor or sensors disposed to detect pressure along the airflow path relative to ambient pressure (or may measure changes in absolute pressure), one or more motion sensors of the vaporizer 100, one or more flow sensors of the vaporizer 100, a capacitive lip sensor of the vaporizer 100; in response to detection of interaction of a user with one or more input devices 116 (e.g., buttons or other tactile control devices of the vaporizer 100), receipt of signals from a computing device in communication with the vaporizer 100, or via other approaches for determining that a puff is occurring or imminent.

The heating element may be or may include one or more of a conductive heater, a radiative heater, and a convective heater. One type of heating element may be a resistive heating element, which may be constructed of or at least include a material (e.g., a metal or alloy, for example a nickel-chromium alloy, or a non-metallic resistor) configured to dissipate electrical power in the form of heat when electrical current is passed through one or more resistive segments of the heating element.

In some implementations, the atomizer 141 may include a heating element that includes resistive coil or other heating element wrapped around, positioned within, integrated into a bulk shape of, pressed into thermal contact with, positioned near, configured to heat air to cause convective heating of, or otherwise arranged to deliver heat to a wicking element to cause a liquid vaporizable material drawn by the wicking element from a reservoir 140 to be vaporized for subsequent inhalation by a user in a gas and/or a condensed (e.g., aerosol particles or droplets) phase. Other wicking element, heating element, or atomizer assembly configurations may be also possible, as discussed further below.

After conversion of the vaporizable material to the gas phase, and depending on the type of vaporizer, the physical and chemical properties of the vaporizable material, or other factors, at least some of the gas-phase vaporizable material may condense to form particulate matter in at least a partial local equilibrium with the gas phase as part of an aerosol, which may form some or all of an inhalable dose provided by the vaporizer 100 for a given puff or draw on the vaporizer.

It will be understood that the interplay between gas and condensed phases in an aerosol generated by a vaporizer may be complex and dynamic, as factors such as ambient temperature, relative humidity, chemistry (e.g., acid-base interactions, protonation or lack thereof of a compound released from the vaporizable material by heating, etc.), flow conditions in airflow paths (both inside the vaporizer and in the airways of a human or other animal), mixing of the gas-phase or aerosol-phase vaporizable material with other air streams, or the like may affect one or more physical and/or chemical parameters of an aerosol. In some vaporizers, and particularly in vaporizers for delivery of more volatile vaporizable materials, the inhalable dose may exist predominantly in the gas phase (i.e., formation of condensed phase particles may be very limited).

As noted elsewhere herein, certain vaporizers may also (or may alternatively) be configured to create an inhalable dose of gas-phase and/or aerosol-phase vaporizable material at least in part via heating of a non-liquid vaporizable material, such as for example a solid-phase vaporizable material (e.g., a wax or the like) or plant material (e.g., tobacco leaves or parts of tobacco leaves) containing the vaporizable material. In such vaporizers, a resistive heating element may be part of or otherwise incorporated into or in thermal contact with the walls of an oven or other heating chamber into which the non-liquid vaporizable material is placed.

Alternatively, a resistive heating element or elements may be used to heat air passing through or past the non-liquid vaporizable material to cause convective heating of the non-liquid vaporizable material. In still other examples, a resistive heating element or elements may be disposed in intimate contact with plant material such that direct conductive heating of the plant material occurs from within a mass of the plant material (e.g., as opposed to by conduction inward form walls of an oven).

The heating element may be activated by way of a controller 104, which may be part of a vaporizer body 110. The controller 104 may cause current to pass from the power source 112 through a circuit including the resistive heating element, which may be part of a vaporizer cartridge 120. The controller 104 may be activated in association with a user puffing (e.g., drawing, inhaling, etc.) on a mouthpiece 130 of the vaporizer 100 that may cause air to flow from an air inlet, along an airflow path that passes an atomizer 141. An atomizer 141 may include a wick in combination with a heating element, for example.

Airflow, caused by the user puffing, may pass through one or more condensation areas or chambers in and/or downstream of the atomizer 141 and then toward an air outlet in the mouthpiece. Incoming air passing along the airflow path may thus pass over, through, near, around, etc. the atomizer 141, such that gas phase vaporizable material (or some other inhalable form of the vaporizable material) is entrained into the air due to the atomizer 141 converting some amount of the vaporizable material to the gas phase. As noted above, entrained gas-phase vaporizable material may condense as it passes through the remainder of the airflow path such that an inhalable dose of the vaporizable material in an aerosol form may be delivered from the air outlet (e.g., through a mouthpiece 130 for inhalation by a user).

The temperature of a resistive heating element of a vaporizer 100 may depend on one or more of a number of factors, including an amount of electrical power delivered to the resistive heating element or a duty cycle at which the electrical power is delivered, conductive and/or radiative heat transfer to other parts of the vaporizer 100 or to the environment, specific heat transfer to air and/or liquid or gas-phase vaporizable material (e.g., raising the temperature of a vaporizable material to its vaporization point or elevating a temperature of a gas such as air and/or air mixed with vaporized vaporizable material), latent heat losses due to vaporization of a vaporizable material from the wick and/or the atomizer 141 as a whole, convective heat losses due to airflow (e.g., air moving across the heating element or the atomizer 141 as a whole when a user inhales on the vaporizer 100), etc.

As noted above, to reliably activate the heating element or heat the heating element to a desired temperature, a vaporizer 100 may, in some implementations, make use of signals from a pressure sensor to determine when a user is inhaling. The pressure sensor may be positioned in the airflow path or may be connected (e.g., by a passageway or other path) to an airflow path connecting an inlet for air to enter the device and an outlet via which the user inhales the resulting vapor and/or aerosol such that the pressure sensor experiences pressure changes concurrently with air passing through the vaporizer 100 from the air inlet to the air outlet. In some implementations, the heating element may be activated in association with a user's puff, for example by automatic detection of the puff, for example by the pressure sensor detecting a pressure change in the airflow path.

Figure 2A:
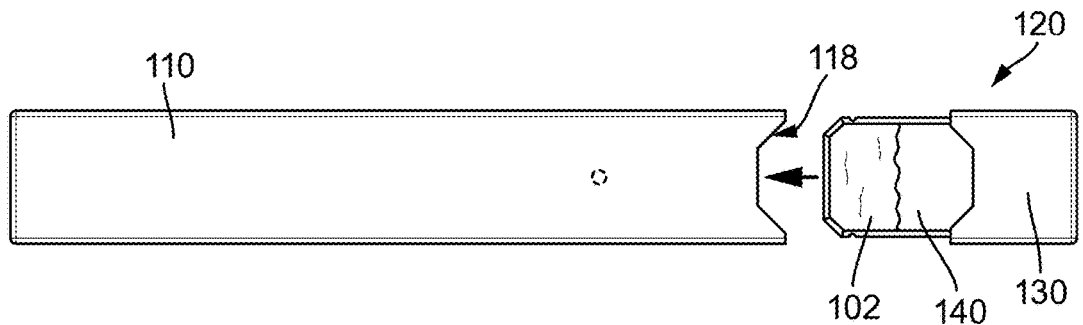
FIG. 2A illustrates a planar view of an example vaporizer body and insertable vaporizer cartridge, in accordance with one or more implementations.
Figure 2B:
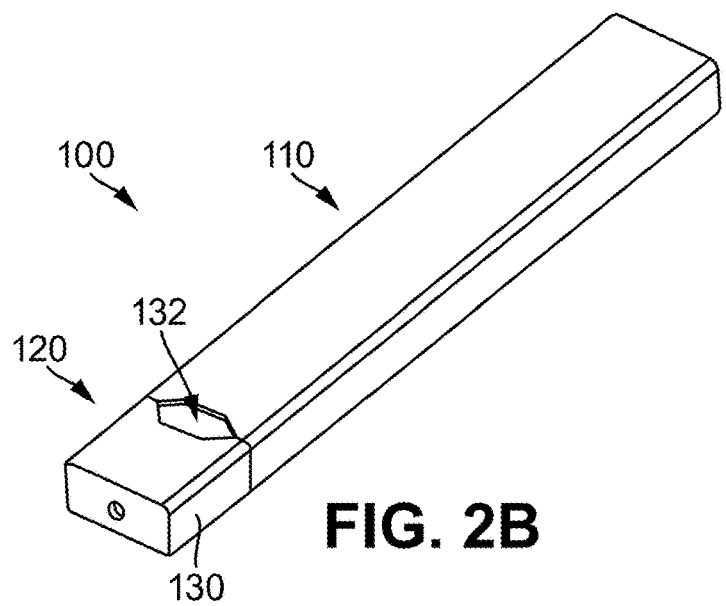
FIG. 2B shows a perspective view of the vaporizer device of FIG. 2A, in accordance with one or more implementations.

Referring to FIGS. 1, 2A and 2B, the vaporizer cartridge 120 may be detachably inserted in the vaporizer body 110 by way of the cartridge receptacle 118. As shown in FIG. 2A, which illustrates a planar view of a vaporizer body 110 next to a vaporizer cartridge 120, a reservoir 140 of the vaporizer cartridge 120 may be formed in whole or in part from translucent material such that a level of the liquid vaporizable material 102 in the vaporizer cartridge 120 may be visible. The vaporizer cartridge 120 may be configured such that the level of vaporizable material 102 in the reservoir 140 of the vaporizer cartridge 120 remains visible through a window in the vaporizer body 110 when the vaporizer cartridge 120 is received in the cartridge receptacle 118. Alternatively or in addition, a level of liquid vaporizable material 102 in the reservoir 140 may be viewable through a clear or translucent outer wall or window formed in an outer wall of the vaporizer cartridge 120.

Airflow Path Embodiments

Figure 2C:
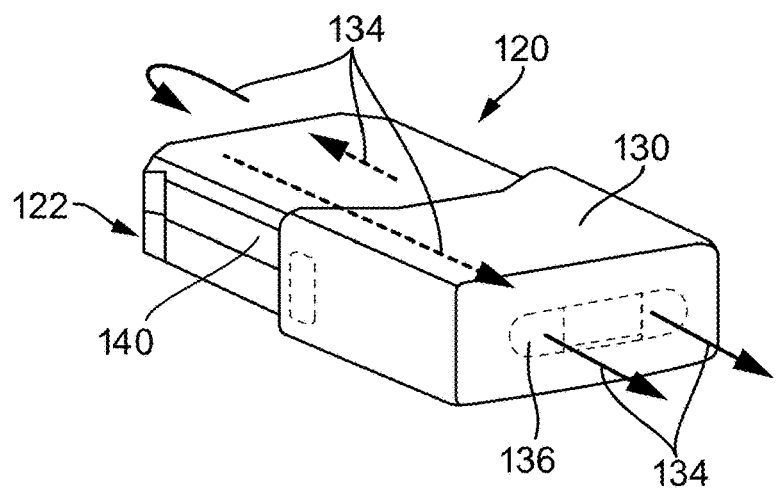
FIG. 2C shows a perspective view of the cartridge of FIG. 2A, in accordance with one or more implementations.
Figure 2D:
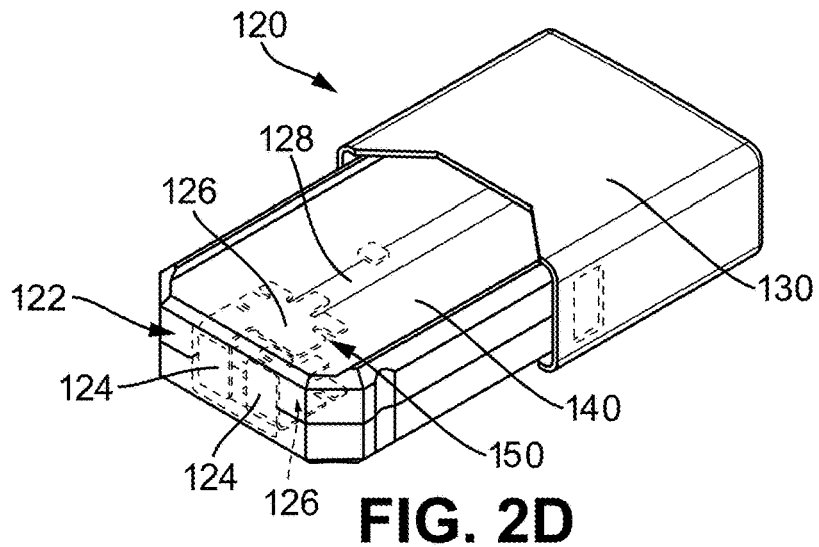
FIG. 2D shows another perspective view of the cartridge of FIG. 2C, in accordance with one or more implementations.

Referring to FIGS. 2C and 2D, an example vaporizer cartridge 120 is illustrated in which an airflow path 134 is created during a puff by a user on the vaporizer 100. The airflow path 134 can direct air to a vaporization chamber 150 (see, for example, FIG. 2D) contained in a wick housing where the air is combined with inhalable aerosol for delivery to a user via a mouthpiece 130, which can also be part of the vaporizer cartridge 120. The vaporization chamber 150 can include and/or at least partially enclose an atomizer 141 consistent with the remainder of this disclosure. For example, when a user puffs on the vaporizer 100, the airflow path 134 may pass between an outer surface of the vaporizer cartridge 120 (e.g., the window 132) and an inner surface of a cartridge receptacle 118 on the vaporizer body 110. Air can then be drawn into an insertable end 122 of the cartridge, through the vaporization chamber 150 that includes or contains the heating element and wicking element, and out through an outlet 136 of the mouthpiece 130 for delivery of the inhalable aerosol to a user. Other airflow path configurations are also within the scope of the current disclosure, including but not limited to those discussed in further detail below.

FIG. 2D shows additional features that may be included in a vaporizer cartridge 120 consistent with the current subject matter. For example, the vaporizer cartridge 120 can include a plurality of cartridge contacts (such as cartridge contacts 124) disposed on the insertable end 122, which is configured to be inserted into the cartridge receptacle 118 of a vaporizer body 110. The cartridge contacts 124 can optionally each be part of a single piece of metal that forms a conductive structure (such as conductive structure 126) connected to one of two ends of a resistive heating element. The conductive structure can optionally form opposing sides of a heating chamber and can optionally act as heat shields and/or heat sinks to reduce transmission of heat to outer walls of the vaporizer cartridge 120. Further details of this aspect are described below.

FIG. 2D also shows a cannula 128 (which is an example of a more general concept also referred to herein as an airflow passageway) within the vaporizer cartridge 120 that defines part of the airflow path 134 passing between a heating chamber (also referred to herein as an atomizer chamber, a vaporization chamber, or the like), which may be formed at least in part by the conductive structure 126, and the mouthpiece 130. Such configuration causes air to flow down around the insertable end 122 of the vaporizer cartridge 120 into the cartridge receptacle 118 and then flow back in the opposite direction after passing around the insertable end 122 (e.g., an end opposite an end that includes the mouthpiece 130) of the vaporizer cartridge 120 as it enters into the cartridge body toward the vaporization chamber 150. The airflow path 134 then travels through the interior of the vaporizer cartridge 120, for example via one or more tubes or internal channels (such as cannula 128) and through one or more outlets (such as outlet 136) formed in the mouthpiece 130.

Pressure Equalization Vent

As mentioned above, removal of vaporizable material 102 from the reservoir 140 (e.g., via capillary draw by the wicking element) can create an at least partial vacuum (e.g., a reduced pressure created in a part of the reservoir that has been emptied by consumption of liquid vaporizable material) relative to ambient air pressure in the reservoir 140, and such vacuum can interfere with capillary action provided by the wicking element. This reduced pressure may in some examples be sufficiently large in magnitude to reduce the effectiveness of the wicking element for drawing liquid vaporizable material 102 into the vaporization chamber 150, thereby reducing the effectiveness of the vaporizer 100 to vaporize a desired amount of vaporizable material 102, such as when a user takes a puff on the vaporizer 100. In extreme cases, a vacuum created in the reservoir 140 could result in the inability to draw all of the vaporizable material 102 into the vaporization chamber 150, thereby leading to incomplete usage of the vaporizable material 102. One or more venting features may be included in association with a vaporizer reservoir 140 (regardless of positioning of the reservoir 140 in a vaporizer cartridge 120 or elsewhere in a vaporizer) to enable at least partial equalizing (optionally completely equalizing) of pressure in the reservoir 140 with ambient pressure (e.g., pressure in ambient air outside of the reservoir 140) to alleviate this issue.

In some cases, while allowing pressure equalization within the reservoir 140 improves efficiency of delivery of the liquid vaporizable material to the atomizer 141, it does so by causing the otherwise empty void volume (e.g., space emptied by use of the liquid vaporizable material) within the reservoir 140 to be filled with air. As discussed in further detail below, this air-filled void volume may subsequently experience pressure changes relative to ambient air, which may result, under certain conditions, in leakage of liquid vaporizable material out of the reservoir 140 and ultimately outside of a vaporizer cartridge 120 and/or other part of a vaporizer that contains the reservoir 140. Implementations of the current subject matter may also provide advantages and benefits in regard to this issue.

Various features and devices are described below that improve upon or overcome these issues. For example, various features are described herein for controlling airflow as well as flow of the vaporizable material, which may provide advantages and improvements relative to existing approaches, while also introducing additional benefits as described herein. The vaporizer devices and/or cartridges described herein include one or more features that control and improve airflow in the vaporization device and/or cartridge, thereby improving the efficiency and effectiveness of vaporizing the liquid vaporizable material by the vaporizer device without introducing additional features that might lead to leaks of liquid vaporizable material.

Figure 2E:
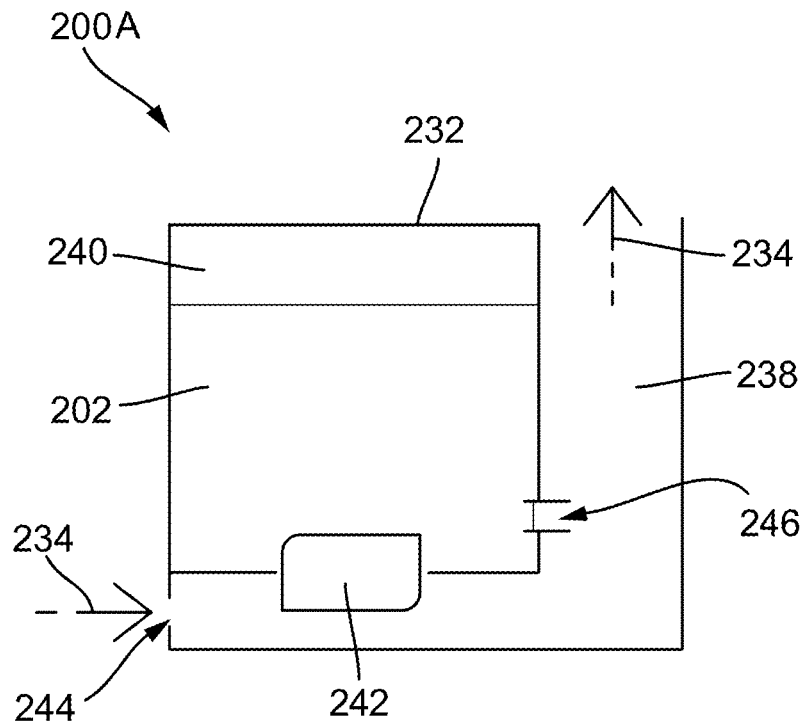
FIG. 2E illustrates a diagram of a reservoir system configured for a vaporizer cartridge and/or vaporizer device for improving airflow in the vaporizer device, in accordance with one or more implementations.
Figure 2F:
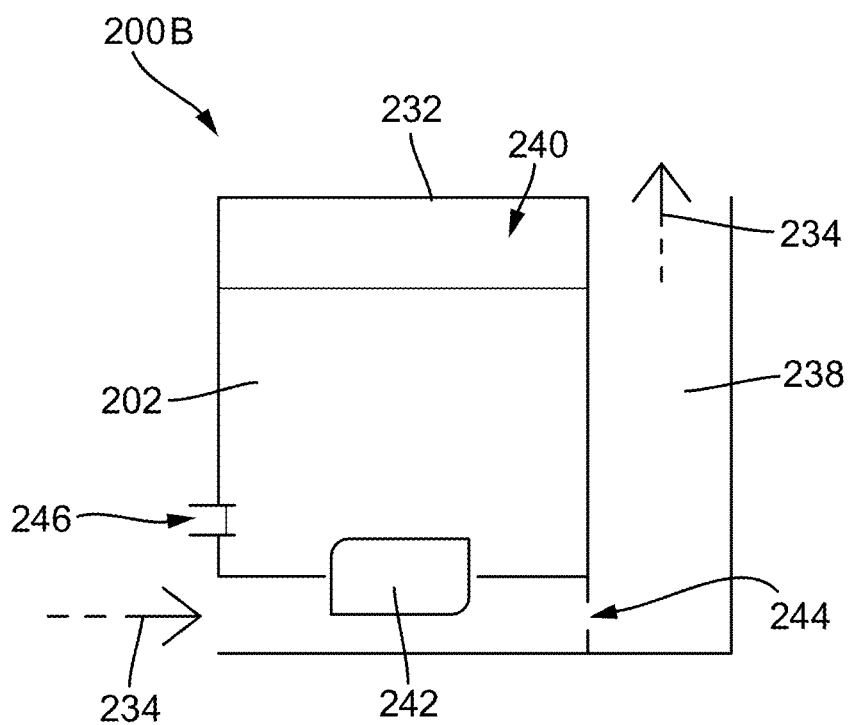
FIG. 2F illustrates a diagram of a reservoir system configured for a vaporizer cartridge or vaporizer device for improving airflow in the vaporizer device, in accordance with another implementation.

FIGS. 2E and 2F illustrate diagrams of first and second embodiments, respectively, of reservoir systems 200A, 200B configured for a vaporizer cartridge (such as vaporizer cartridge 120) and/or vaporizer device (such as vaporizer 100) for improving pressure equalization and airflow in the vaporizer. More specifically, the reservoir systems 200A, 200B illustrated in FIGS. 2E and 2F improve the regulation of pressure within the reservoir 240 such that a vacuum created in the reservoir 240 is relieved after a user puffs on the vaporizer while reducing or even eliminating incidence of leakage of liquid vaporizable material through the venting structure. This allows the capillary action of the porous material (e.g., a wicking element) associated with the reservoir 240 and vaporization chamber 242 to continue to effectively draw a vaporizable material 202 from the reservoir 240 into the vaporization chamber 242 after each puff.

As shown in FIGS. 2E and 2F, the reservoir systems 200A, 200B include a reservoir 240 configured to contain a liquid vaporizable material 202. The reservoir 240 is sealed on all sides by reservoir walls 232 except for through a wick housing area that extends between the reservoir 240 and the vaporization chamber 242. A heating element or heater may be contained within the vaporization chamber 242 and coupled to the wicking element. The wicking element is configured to provide the capillary action that draws the vaporizable material 202 from the reservoir 240 to the vaporization chamber 242 to be vaporized into aerosol by the heater. The aerosol is then combined with airflow 234 traveling along an airflow passageway 238 of the vaporizer for inhalation by a user.

The reservoir systems 200A, 200B also include an airflow restrictor 244 that restricts the passage of airflow 234 along the airflow passageway 238 of the vaporizer, such as when a user puffs on the vaporizer. The restriction of airflow 234 caused by the airflow restrictor 244 can allow a vacuum to be formed along a part of the airflow passageway 238 downstream from the airflow restrictor 244. The vacuum created along the airflow passageway 238 can assist with drawing aerosol formed in a vaporization chamber 242 (e.g., a chamber containing at least part of the atomizer 141) along the airflow passageway 238 for inhalation by a user. At least one airflow restrictor 244 can be included in each of the reservoir systems 200A, 200B and the airflow restrictor 244 can include any number of features for restricting the airflow 234 along the airflow passageway 238.

As shown in FIGS. 2E and 2F, each of the reservoir systems 200A, 200B can also include a vent 246 configured to selectively allow the passage of air into the reservoir 240 for increasing the pressure within the reservoir 240, such as to relieve the reservoir 240 from negative pressure (vacuum) relative to ambient pressure resulting from the vaporizable material 202 being drawn out of the reservoir 240, as discussed above. At least one vent 246 can be associated with the reservoir 240. The vent 246 can be an active or passive valve and the vent 246 can include any number of features for allowing air to pass into the reservoir 240 to relieve negative pressure created in the reservoir 240.

For example, an embodiment of the vent 246 can include a vent passageway that extends between the reservoir 240 and the airflow passageway 238 and includes a diameter (or more generally, a cross sectional area) that is sized such that a fluid tension (also referred to as a surface tension) of the vaporizable material 202 prevents the vaporizable material 202 from passing through the passageway when the pressure is equalized across the vent 246 (e.g., the pressure in the reservoir 240 is approximately the same as the pressure in the airflow passageway 238). However, the diameter (or more generally, the cross-sectional area) of the vent 246 and/or the vent passageway can be sized such that a vacuum pressure created in the reservoir 240 is capable of overcoming the surface tension of the vaporizable material 202 within the vent 246 or the vent passageway to cause an air bubble to be released into the reservoir 240 through the vent in response to sufficiently low pressure within the reservoir 240 relative to ambient pressure.

Accordingly, a volume of air may pass from the airflow passageway 238 to the reservoir 240 and relieve the vacuum pressure. Once the volume of air is added to the reservoir 240, the pressure is again more closely equalized across the vent 246, thereby allowing the surface tension of the vaporizable material 202 to prevent air from entering the reservoir 240, as well as preventing the vaporizable material from leaking out of the reservoir 240 through the vent passageway.

In one example embodiment, a diameter of the vent 246 or vent passageway may be in a range of approximately 0.3 mm to 0.6 mm, and may also include diameters in a range of approximately 0.1 mm to 2 mm. In some examples, the vent 246 and/or vent passageway may be non-circular, such that it may be characterized by a non-circular cross section along a direction of fluid flow within the vent passageway. In such an example, the cross-section is not defined by a diameter, but rather by a cross-sectional area. Generally speaking, whether the cross-sectional shape of the vent 246 and/or the vent passageway is circular or non-circular, in certain implementations of the current subject matter it may be advantageous for the cross-sectional area of the vent 246 to differ along its path between exposure to ambient air pressure and the interior of the reservoir 240. For example, a part of the vent 246 closer to the outside ambient pressure may advantageously have a smaller cross-sectional area (e.g., a smaller diameter in the example in which the vent 246 has a circular cross-section) relative a part of the vent 246 closer to the interior of the reservoir 240. The smaller cross-section area closer to the exterior of the system may provide a greater resistance to escape of liquid vaporizable material while the larger cross-sectional area closer to the interior of the reservoir 240 may provide a relatively lessened resistance to escape of an air bubble from the vent 246 into the reservoir 240. In some implementations of the current subject matter, the transition between the smaller and the larger cross-sectional area can advantageously not be continuous, but instead involve a discontinuity along a length of the vent 246 and/or the vent passageway. Such a structure may be useful in providing a larger overall resistance to escape of liquid material than to equilibration of reservoir pressure by release of air bubbles from the vent 246 because the larger cross-sectional area near the reservoir may have a lower capillary drive relative to the smaller cross-sectional area exposed to ambient air.

The material of the vent 246 and/or vent passageway can also assist with controlling the vent 246 and/or vent passageway, such as by affecting a contact angle between the walls of the vent 246 and/or vent passageway and the vaporizable material 202. The contact angle can have an effect on the surface tension created by the vaporizable material 202 and thus affects the threshold pressure differential that can be created across the vent 246 and/or vent passageway before a volume of fluid is allowed to pass through the vent 246, such as described above. The vent 246 can include a variety of shapes/sizes and configurations that are within the scope of this disclosure. Additionally, various embodiments of cartridges and parts of cartridges that include one or more of a variety of venting features are described in greater detail below.

Positioning of the vent 246 (e.g., a passive vent) and the airflow restrictor 244 relative to the vaporization chamber 242 assists with effective functioning of the reservoir systems 200A, 200B. For example, improper positioning of either the vent 246 or the airflow restrictor 244 can result in unwanted leaking of the vaporizable material 202 from the reservoir 240. The present disclosure addresses effective positioning of the vent 246 and airflow restrictor 244 relative to the vaporization chamber 242 (containing the wick). For example, a small or no pressure differential between a passive vent and the wick can result in an effective reservoir system for relieving vacuum pressure in the reservoir and resulting in effective capillary action of the wick while preventing leaking. Configurations of the reservoir system having effective positioning of the vent 246 and airflow restrictor 244 relative to the vaporization chamber 242 is described in greater detail below.

As shown in FIG. 2E, the airflow restrictor 244 may be positioned upstream from the vaporization chamber 242 along the airflow passageway 238 and the vent 246 is positioned along the reservoir 240 such that it provides fluid communication between the reservoir 240 and a part of the airflow passageway 238 that is downstream from the vaporization chamber 242. As such, when a user puffs on the vaporizer, a negative pressure is created downstream from the airflow restrictor 244 such that the vaporization chamber 242 experiences negative pressure. Similarly, a side of the vent 246 in communication with the airflow passageway 238 also experiences the negative pressure.

As such, a small to nonexistent amount of pressure differential is created between the vent 246 and the vaporization chamber 242 during the puff (e.g., when the user draws in or sucks in air from the vaporization device). However, after the puff the capillary action of the wick will draw the vaporizable material 202 from the reservoir 240 to the vaporization chamber 242 to replenish the vaporizable material 202 that was vaporized and inhaled as a result of the previous puff. As a result, a vacuum or negative pressure will be created in the reservoir 240. A pressure differential will then occur between the reservoir 240 and the airflow passageway 238. As discussed above, the vent 246 can be configured such that a pressure differential (e.g., a threshold pressure difference) between the reservoir 240 and the airflow passageway 238 allows a volume of air to pass from the airflow passageway 238 into the reservoir 240 thereby relieving the vacuum in the reservoir 240 and returning to an equalized pressure across the vent 246 and a stable reservoir system 200A.

In another embodiment, as shown in FIG. 2F, the airflow restrictor 244 may be positioned downstream from the vaporization chamber 242 along the airflow passageway 238 and the vent 246 may be positioned along the reservoir 240 such that it provides fluid communication between the reservoir 240 and a part of the airflow passageway 238 that is upstream from the vaporization chamber 242. As such, when a user puffs on the vaporizer, the vaporization chamber 242 and vent 246 experience little to no suction or negative pressure as a result of the puff, thus resulting in little to no pressure differential between the vaporization chamber 242 and the vent 246. Similar to the case in FIG. 2E, the pressure differential created across the vent 246 will be a result of the capillary action of the wick drawing the vaporizable material 202 to the vaporization chamber 242 after the puff. As a result, a vacuum or negative pressure will be created in the reservoir 240. A pressure differential will then occur across the vent 246.

As discussed above, the vent 246 can be configured such that a pressure differential (e.g., a threshold pressure difference) between the reservoir 240 and the airflow passageway 238 or atmosphere allows a volume of air to pass into the reservoir 240 thereby relieving the vacuum in the reservoir 240. This allows the pressure to be equalized across the vent 246 and the reservoir systems 200B to be stabilized. The vent 246 can include various configurations and features and can be positioned in a variety of positions along the vaporizer cartridge 120, such as to achieve various results. For example, one or more vents 246 can be positioned adjacent or forming a part of the vaporization chamber 242 or wick housing. In such a configuration, the one or more vents 246 can provide fluid (e.g., air) communication between the reservoir 240 and the vaporization chamber 242 (through which airflow passes through when a user puffs on the vaporizer and is thus part of the airflow pathway).

Similarly, as described above, a vent 246 placed adjacent to or forming a part of the vaporization chamber 242 or wick housing can allow air from inside the vaporization chamber 242 to travel into the reservoir 240 via the vent 246 to increase the pressure inside the reservoir 240 thereby effectively relieving the vacuum pressure created as a result of the vaporizable material 202 being drawn into the vaporization chamber 242. As such, relief of the vacuum pressure allows for continued efficient and effective capillary action of the vaporizable material 202 into the vaporization chamber 242 via the wick for creating inhalable vapor during subsequent puffs on the vaporizer by a user. The below provides various example embodiments of a venting vaporization chamber element (e.g., an atomizer assembly) that includes a wick housing 1315, 178 (that houses the vaporization chamber) and at least one vent 596 coupled to or forming a part of the wick housing 1315, 178 for achieving the above effective venting of the reservoir 140.

Open-Faced Cartridge Assembly Embodiments

Figure 3A:
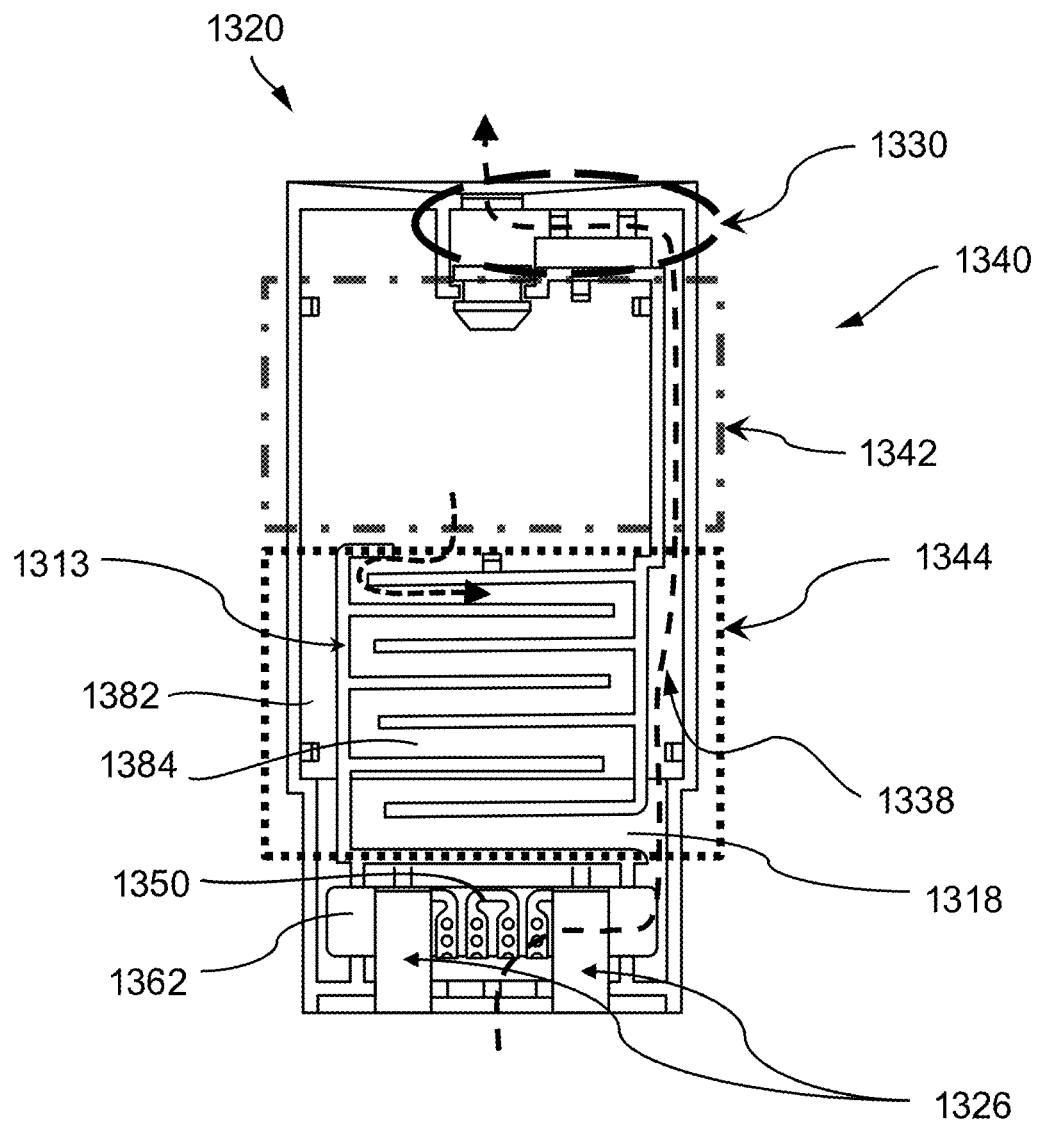
FIGS. 3A and 3B illustrate an example planar cross-sectional view of a cartridge having a storage chamber and an overflow volume, in accordance with one or more implementations.
Figure 3B:
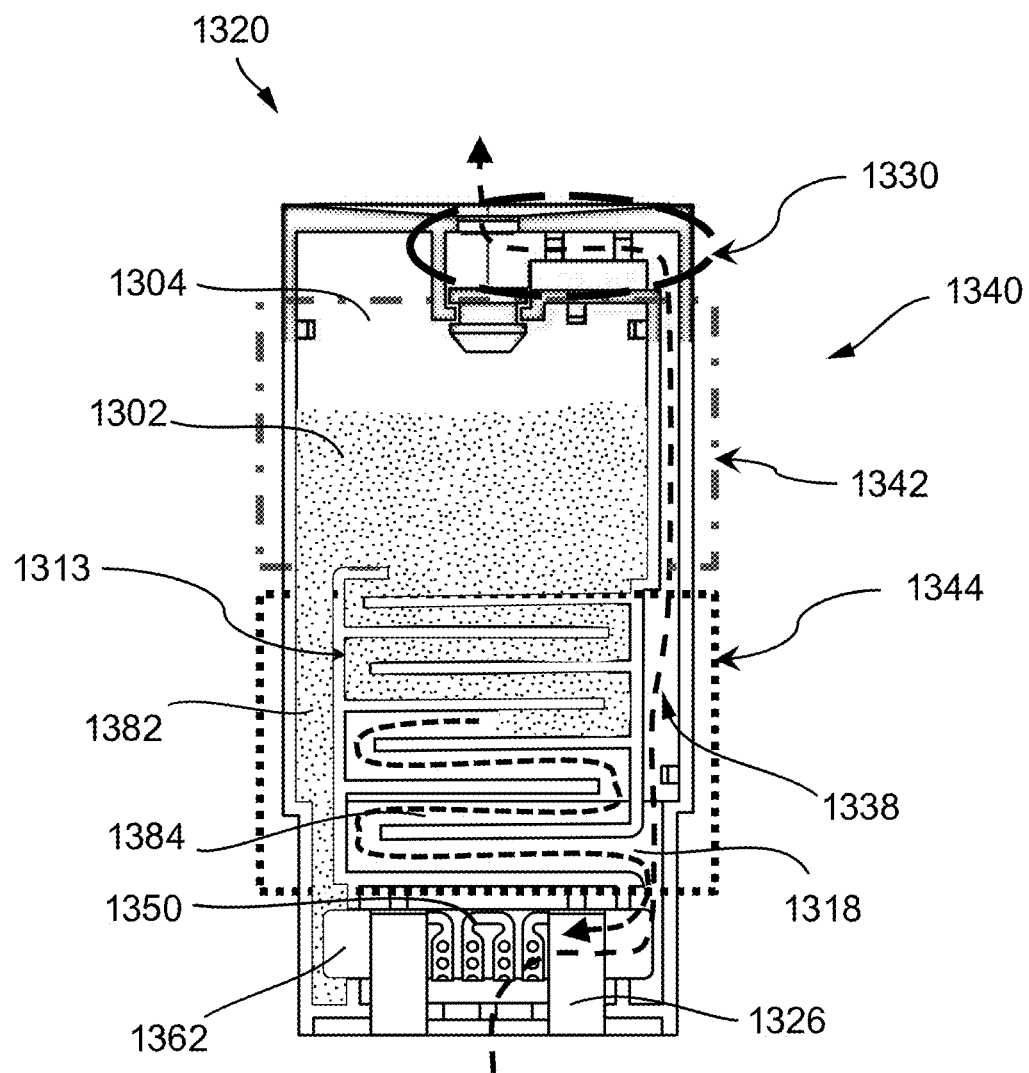

Referring to FIGS. 3A and 3B, an example planar cross-sectional view of an alternative cartridge embodiment 1320 is shown in which the cartridge 1320 includes a mouthpiece or mouthpiece area 1330, a reservoir 1340 and an atomizer (not shown individually). The atomizer may include a heating element 1350 and a wicking element 1362, together or separately, depending on implementation, such that the wicking element 1362 is thermally or thermodynamically coupled to the heating element 1350 for the purpose of vaporizing a vaporizable material 1302 drawn from or stored in the wicking element 1362.

Plates 1326 may be included, in one embodiment, to provide for an electrical connection between a heating element 1350 and a power source 112 (see FIG. 1). An airflow passageway 1338, defined through or on a side of reservoir 1340, may connect an area in a cartridge 1320 that houses the wicking element 1362 (e.g., a wick housing not shown separately) to an opening that leads to mouthpiece or mouthpiece area 1330 to provide a route for the vaporized vaporizable material 1302 to travel from the heating element 1350 area to the mouthpiece area 1330.

As provided above, the wicking element 1362 may be coupled to an atomizer or heating element 1350 (e.g., a resistive heating element or coil) that is connected to one or more electrical contacts (e.g., plates 1326). The heating element 1350 (and other heating elements described herein in accordance with one or more implementations) may have various shapes and/or configurations and may include one or more heating elements 1350, 500, or features thereof, as provided in more detail below with respect to FIGS. 44A-116.

In accordance with one or more example implementations, the heating element 1350 of the cartridge 1320 may be made (e.g., stamped) from a sheet of material and either crimped around at least a portion of a wicking element 1362 or bent to provide a preformed element configured to receive the wicking element 1362 (e.g., the wicking element 1362 is pushed into the heating element 1350 and/or the heating element 1350 is held in tension and is pulled over the wicking element 1362).

The heating element 1350 may be bent such that the heating element 1350 secures the wicking element 1362 between at least two or three portions of the heating element 1350. The heating element 1350 may be bent to conform to a shape of at least a portion of the wicking element 1362. Configurations of the heating element 1350 allow for more consistent and enhanced quality manufacturing of the heating element 1350. Consistency of manufacturing quality of the heating element 1350 may be especially important during scaled and/or automated manufacturing processes. For example, the heating element 1350 in accordance with one or more implementations helps to reduce tolerance issues that may arise during manufacturing processes when assembling a heating element 1350 having multiple components.

The heating element 1350 may also improve the accuracy of measurements taken from the heating element 1350 (e.g., a resistance, a current, a temperature, etc.) due at least in part to the improved consistency in manufacturability of the heating element 1350 having reduced tolerance issues. A heating element 1350 made (e.g., stamped) from a sheet of material and either crimped around at least a portion of a wicking element 1362 or bent to provide a preformed element desirably helps to minimize heat losses and helps to ensure that the heating element 1350 behaves predictably to be heated to the appropriate temperature.

Additionally, discussed further below in regards to an included embodiment relating to a heating element formed of crimped metal, the heating element 1350 may be entirely and/or selectively plated with one or more materials to enhance heating performance of the heating element 1350. Plating all or a portion of the heating element 1350 may help to minimize heat losses. Plating may also help in concentrating heat to a portion of the heating element 1350, thereby providing a heating element 1350 that is more efficiently heated and further reducing heat losses. Selective plating may help to direct the current provided to the heating element 1350 to the proper location. Selective plating may also help to reduce the amount of plating material and/or costs associated with manufacturing the heating element 1350.

In addition to or in combination with the example heating elements described and/or discussed below, the heating element may include a flat heating element 1850 (see FIGS. 18A-18D) positioned within a vaporizer cartridge 1800 including two airflow passageways 1838, a folded heating element 1950 (see FIGS. 19A-19C, 22A-22B, and 44A-116) positioned within a vaporizer cartridge 1900 including two airflow passageways 1938, and a folded heating element 2050 (see FIGS. 20A-20C) positioned within a vaporizer cartridge 2000 including a single airflow passageway 2038.

As noted above, a heating element 1350, in one embodiment, may contain a wicking element 1362. For example, a wicking element 1362 may extend near or next to plates 1326 and through resistive heating elements in contact with plates 1326. A wick housing may surround at least a portion of a heating element 1350 and connect a heating element 1350 directly or indirectly to an airflow passageway 1338. Vaporizable material 1302 may be drawn by a wicking element 1362 through one or more passageways connected to a reservoir 1340. In one embodiment, one or both of the primary passageway 1382 or a secondary passageway 1384 may be utilized to help route or deliver vaporizable material 1302 to one or both ends of a wicking element 1362 or radially along a length of a wicking element 1362.

Overflow Collector Embodiments

As provided in further detail below, particularly with reference to FIGS. 3A and 3B, exchange of air and liquid vaporizable material into and out of a cartridge reservoir 1340 may be advantageously controlled, and a volumetric efficiency of the a vaporizer cartridge (defined as a volume of liquid vaporizable material that is eventually converted to inhalable aerosol relative to a total volume of the cartridge itself) may also optionally be improved through incorporation of a structure referred to as a collector 1313.

In accordance with some implementations, a cartridge 1320 may include a reservoir 1340 that is at least partially defined by at least one wall (which can optionally be a wall that is shared with an outer shell of the cartridge) configured to contain a liquid vaporizable material 1302. The reservoir 1340 may include a storage chamber 1342 and an overflow volume 1344, which may include or otherwise contain the collector 1313. The storage chamber 1342 may contain vaporizable material 1302 and the overflow volume 1344 may be configured for collecting or retaining at least some portion of the vaporizable material 1302, when one or more factors cause vaporizable material 1302 in the reservoir storage chamber 1342 to travel into the overflow volume 1344. In some implementations of the current subject matter, the cartridge may be initially filled with liquid vaporizable material such that void space within the collector is pre-filled with the liquid vaporizable material.

In example embodiments, the volumetric size of the overflow volume 1344 may be configured to be equal to, approximately equal to, or greater than the amount of increase in the volume of the content (e.g., vaporizable material 1302 and air) contained in the storage chamber 1342, when the volume of the content in the storage chamber 1342 expands due to a maximum expected change in pressure that the reservoir may undergo relative to ambient pressure.

Depending on changes in ambient pressure or temperature or other factors, a cartridge 1320 may experience a change from a first pressure state to a second pressure state (e.g., a first relative pressure differential between the interior of the reservoir and ambient pressure and a second relative pressure differential between the interior of the reservoir and ambient pressure). In some aspects, the overflow volume 1344 may have an opening to the exterior of cartridge 1320 and may be in communication with the reservoir storage chamber 1342 so that the overflow volume 1344 may act as a venting channel to provide for the equalization of pressure in the cartridge 1320 and/or to collect and at least temporarily retain and optionally reversibly return liquid vaporizable material that may move out of the storage chamber in response to variations in pressure differential between the storage chamber and ambient air. As described herein, a pressure differential refers to a difference in absolute pressure between an internal part of the reservoir and ambient air. Vaporizable material 1302 may be drawn from the storage chamber 1342 to the atomizer and converted to vapor or aerosol phases, reducing the volume of the vaporizable material remaining in storage chamber 1342 and, absent some mechanism for returning air to the storage chamber to equalize pressure therein with ambient pressure, may lead to the at least partial vacuum condition discussed previously herein.

Continuing to refer to FIGS. 3A and 3B, the reservoir 1340 may be implemented to include first and second separable areas, such that the volume of the reservoir 1340 is divided into a reservoir storage chamber 1342 and a reservoir overflow volume 1344. The storage chamber 1342 may be configured for storing the vaporizable material 1302 and may be further coupled to the wicking element 1362 via one or more primary passageways 1382. In some examples, a primary passageway 1362 may be very short in length (e.g., a pass-through hole from a space containing a wicking element or other parts of an atomizer). In other examples, the primary passageway may be part of a longer containing fluid path between the storage chamber and the wicking element. The overflow volume 1344 may be configured for storing and containing portions of the vaporizable material 1302 that may overflow from the storage chamber 1342 in a second pressure state in which the pressure in the storage chamber 1342 is greater than ambient pressure, as provided in further detail below.

In a first pressure state, the vaporizable material 1302 may be stored in the storage chamber 1342 of the reservoir 1340. The first pressure state may exist, for example, when ambient pressure is approximately the same or more than the pressure inside the cartridge 1320. In this first pressure state, the structural and functional properties of the primary passageway 1382 and the secondary passageway 1384 are such that the vaporizable material 1302 may flow from the storage chamber 1342 toward the wicking element 1362 by way of the primary passageway 1382, for example under capillary action of the wicking element to draw liquid into proximity with a heating element that acts to convert the liquid vaporizable material to the gas phase.

In one embodiment, in the first pressure state, none or limited amounts of the vaporizable material 1302 flow into the secondary passageway 1384. In the second pressure state, the vaporizable material 1302 may flow from the storage chamber 1342 into the overflow volume 1344 of the reservoir 1340 that, for example, includes a collector 1313 to prevent or limit an undesirable (e.g., excessive) flow of the vaporizable material 1302 out of the reservoir. The second pressure state may exist or be caused, for example, when a bubble of air expands in the storage chamber 1342 (e.g., due to ambient pressure becoming less than the pressure inside the cartridge 1320).

Advantageously, flow of the vaporizable material 1302 may be controlled by way of routing vaporizable material 1302 driven from the storage chamber 1342 by a pressure increase to the overflow volume 1344. The collector 1313 within the overflow volume may include one or more capillary structures that contain at least some (and advantageously all) of the excess liquid vaporizable material pushed out of the storage chamber 1342 without allowing the liquid vaporizable material to reach an outlet of the collector 1313. The collector 1313 also advantageously includes capillary structures that enable the liquid vaporizable material pushed into the collector 1313 by excess pressure in the storage chamber 1342 relative to ambient pressure to be reversibly drawn back into the storage chamber 1342 when the pressure equalizes or is otherwise reduced in the storage chamber 1342 relative to ambient pressure. In other words, the secondary passageway 1384 of the collector 1313 may have microfluidic features or properties that prevent air and liquid from bypassing each other during filling and emptying of the collector 1313. That is, microfluidic features may be used to manage the flow of the vaporizable material 1302 both into and out of the collector 1313 (i.e., provide flow reversal features) to prevent or reduce leaks of the vaporizable material 1302 or entrapment of air bubbles into the storage chamber 1342 or overflow volume 1344.

Depending on implementation, the microfluidic features or properties noted above may be related to the size, shape, surface coating, structural features, and capillary properties of the wicking element 1362, the primary passageway 1382, and the secondary passageway 1384. For example, the secondary passageway 1384 in the collector 1313 may optionally have different capillary properties than the primary passageway 1382 that leads to the wicking element 1362 to allow a certain volume of the vaporizable material 1302 pass from the storage chamber 1342 into the overflow volume 1344, during the second pressure state.

In one example implementation, overall resistance of the collector 1313 to allowing liquid to flow out is larger than overall wick resistance, for example, to allow the vaporizable material 1302 to primarily flow through the primary passageway 1382 toward the wicking element 1362 during the first pressure state.

The wicking element 1362 may provide a capillary pathway through or into the wicking element 1362 for vaporizable material 1302 stored in reservoir 1340. The capillary pathway (e.g., the primary passageway 1382) may be large enough to permit a wicking action or capillary action to replace vaporized vaporizable material 1302 in the wicking element 1362, and may be small enough to prevent leakage of vaporizable material 1302 out of the cartridge 1320 during a negative pressure event. The wick housing or the wicking element 1362 may be treated to prevent leakage. For example, the cartridge 1320 may be coated after filling to prevent leakage or evaporation through the wicking element 1362. Any appropriate coating may be used, including a heat-vaporizable coating (e.g., a wax or other material), for example.

When a user inhales from a mouthpiece area 1330, for example, air flows into the cartridge 1320 through an inlet or opening in operational relationship with the wicking element 1362. The heating element 1350 may be activated in response to a signal generated by one or more sensors 113 (see FIG. 1). The one or more sensors 113 may include at least one of pressure sensor, motion sensor, flow sensor, or other mechanism capable of detecting changes in airflow passageway 1338. When the heating element 1350 is activated, the heating element 1350 may have a temperature increase as a result of current flowing through the plates 1326. Or through some other electrically resistive part of the heating element that act to convert electrical energy to heat energy.

In one embodiment, the generated heat may be transferred to at least a portion of the vaporizable material 1302 in the wicking element 1362 through conductive, convective, or radiative heat transfer such that at least a portion of the vaporizable material 1302 drawn into the wicking element 1362 is vaporized. Depending on implementation, air entering the cartridge 1320 flows over (or around, near, etc.) the wicking element 1362 and the heated elements in the heating element 1350 and strips away the vaporized vaporizable material 1302 into the airflow passageway 1338, where the vapor may optionally be condensed and delivered in aerosol form, for example, through an opening in the mouthpiece area 1330.

Referring to FIG. 3B, the storage chamber 1342 may be connected to the airflow passageway 1338 (i.e., via secondary passageway 1384 of overflow volume 1344) for the purpose of allowing liquid vaporizable material driven from the storage chamber 1342 by increased pressure in the storage chamber 1342 relative to ambient to be retained without escaping from the vaporizer cartridge. While the implementations described herein relate to a vaporizer cartridge containing a reservoir 1340, it will be understood that the approaches described are also compatible with and contemplated for use in a vaporizer that does not have a separable cartridge.

Returning to the example, air admitted to the storage chamber 1342 may expand due to a pressure differential relative to ambient air. The expansion of this air in the void space of the storage chamber 1342 can cause liquid vaporizable material to travel through at least some part of the secondary passageway 1384 in the collector 1313. Microfluidic features of the secondary passageway 1384 can cause the liquid vaporizable material to move a long a length of the secondary passageway 1384 in the collector 1313 only with a meniscus fully covering the cross-sectional area of the secondary passageway 1384 transverse to the direction of flow along the length.

In some implementations of the current subject matter, the microfluidic features can include a cross-sectional area sufficiently small that for the material from which walls of the secondary passageway are formed and the composition of the liquid vaporizable material, the liquid vaporizable material preferentially wets the secondary passageway 1384 around an entire perimeter of the secondary passageway 1384. For an example in which the liquid vaporizable material includes one or more of propylene glycol and vegetable glycerin, wetting properties of such a liquid are advantageously considered in combination with geometry of the second passageway 1384 and materials form which the walls of the secondary passageway are formed. In this manner, as the sign (e.g., positive, negative, or equal) and magnitude of the pressure differential between the storage chamber 1340 and ambient pressure varies, a meniscus is maintained between liquid in the secondary passageway 1384 and air entering from the ambient atmosphere, and liquid and air are not able to move past one another. As pressure in the storage chamber 1342 drops sufficiently relative to ambient pressure and if there is sufficient void volume in the storage chamber 1342 to allow it, liquid in the secondary passageway 1384 of the collector 1313 may be withdrawn into the storage chamber 1342 sufficiently to cause the leading liquid-air meniscus to reach a gate or port between the secondary passageway 1384 of the collector 1313 and the storage chamber 1342. At such time, if the pressure differential in the storage chamber 1342 relative to ambient pressure is sufficiently negative to overcome surface tension maintaining the meniscus at the gate or port, the meniscus becomes free of the gate or port walls and forms and one or more air bubbles, which are released into the storage chamber 1342 with sufficient volume to equalize storage chamber pressure relative to ambient.

When air admitted into the storage chamber 1340 as discussed above (or otherwise becomes present therein) experiences an elevated pressure condition relative to ambient (e.g., due to a drop in ambient pressure such as might occur in an airplane cabin or other high altitude locations, when a window of a moving vehicle is opened, when a train or vehicle leaves a tunnel, etc. or an elevation in internal pressure in the storage chamber 1340 such as might occur due to local heating, mechanical pressure that distorts a shape and thereby reduces a volume of the storage chamber 1340, etc., or the like), the above-described process may be reversed. Liquid passes through the gate or port into the secondary passageway 1384 of the collector 1313 and a meniscus forms at the leading edge of a column of liquid passing into the secondary passageway 1384 to prevent air from bypassing and flowing counter to the progression of the liquid. By maintaining this meniscus due to the presence of the aforementioned microfluidic properties, when the elevated pressure in the storage chamber 1340 is later reduced, the column of liquid is withdrawn back into the storage chamber, optionally until the meniscus reaches the gate or port. If the pressure differential sufficiently favors ambient pressure relative to the pressure in the storage chamber, the above-described bubble formation process occurs until pressures equalize. In this manner, the collector acts as a reversible overflow volume that accepts liquid vaporizable material pushed out of the storage chamber under transient conditions of greater storage chamber pressure relative to ambient and allows at least some (and desirably all or most) of this overflow volume to be returned to the storage compartment for later delivery to an atomizer for conversion to an inhalable form.

Depending on implementation, the storage chamber 1342 may or may not be connected to the wicking element 1362 via the secondary passageway 1384. In embodiments in which a second end of the secondary passageway 1384 leads to the wicking element 1362, any of the vaporizable material 1302 that may exit the secondary passageway 1384 at the second end (opposite to a first end defining the point of connection to storage chamber 1342) may further saturate the wicking element 1362.

The storage chamber 1342 may optionally be positioned closer to an end of the reservoir 1340 that is near the mouthpiece area 1330. The overflow volume 1344 may be positioned near an end of the reservoir 1340 closer to the heating element 1350, for example, between the storage chamber 1342 and the heating element 1350. The example embodiments shown in the figures are not to be construed as limiting the scope of the claimed subject matter as to the position of the various components disclosed herein. For example, the overflow volume 1344 may be positioned at the top, middle or bottom portion of the cartridge 1320. The location and positioning of the storage chamber 1342 may be adjusted relative to the position of the overflow volume 1344, such that the storage chamber 1342 may be positioned at the top, middle or bottom portion of the cartridge 1320 according to one or more variations.

In one implementation, when the vaporizer cartridge 1320 is filled to capacity, the volume of liquid vaporizable material may be equal to the internal volume of the storage chamber 1342 plus the overflow volume 1344 (which may in some examples be the volume of the secondary passageway 1384 between the gate or port connecting the secondary passageway 1384 to the storage chamber 1340) and an outlet of the secondary passageway 1384. In other words, a vaporizer cartridge consistent with implementations of the current subject matter may be originally filled with liquid vaporizable material such that all or at least some of the internal volume of the collector is filled with liquid vaporizable material. In such an example, liquid vaporizable material is delivered to an atomizer as needed for delivery to a user. The delivered liquid vaporizable material may be drawn from the storage chamber 1340, thereby causing liquid in the secondary passageway 1384 of the collector 1313 to be drawn back into the storage chamber 1340 as air cannot enter through the secondary passageway 1384 due to the meniscus maintained by the microfluidic properties of the secondary passageway 1384 which prevent air from flowing past liquid vaporizable material in the secondary passageway 1384. After sufficient liquid vaporizable material has been delivered to the atomizer from the storage chamber 1340 (e.g., for vaporization and user inhalation) to cause the original volume of the collector 1313 to be drawn into the storage chamber 1340, the above-discussed action occurs—air bubbles may be released from a gate or port between the secondary passage 1384 and the storage chamber to equalize pressure in the storage compartment as more liquid vaporizable material is used. When air that has so entered the storage compartment experiences elevated pressure relative to ambient, liquid vaporizable material moves out of the storage chamber 1340 past the gate or port into the secondary passageway until the elevated pressure condition in the storage compartment no longer exists, at which point the liquid vaporizable material in the secondary passageway 1384 may be drawn back into the storage chamber 1340.

In certain embodiments, the overflow volume 1344 is sufficiently large to contain a percentage of the vaporizable material 1302 stored in the storage chamber 1342, optionally up to approximately 100%. In one embodiment, the collector 1313 is configured to contain at least 6% to 25% of the volume of the vaporizable material 1302 storable in the storage chamber 1342. Other ranges are possible.

The structure of the collector 1313 may be configured, constructed, molded, fabricated or positioned in the overflow volume 1344, in different shapes and having different properties, to allow for overflowing portions of the vaporizable material 1302 to be at least temporarily received, contained or stored in the overflow volume 1314 in a controlled manner (e.g., by way of capillary pressure), thereby preventing the vaporizable material 1302 from leaking out of the cartridge 1320 or excessively saturating the wicking element 1362. It will be understood that the above description referring to a secondary passageway is not intended to be limiting to a single such secondary passageway 1384. One, or optionally more than one, secondary passageway may be connected to the storage chamber 1340 via one or more than one gate or port. In some implementations of the current subject matter, a single gate or port may connect to more than one secondary passageways, or a single secondary passageway may split into more than one secondary passageways to provide additional overflow volume or other advantages.

In some implementations of the current subject matter, an air vent 1318 may connect the overflow volume 1344 to the airflow passageway 1338 that ultimately leads to ambient air environment outside of the cartridge 1320. This air vent 1318 may allow for a path for air or bubbles that may have been formed or trapped in the collector 1313 to escape through the air vent 1318, for example during a second pressure state as the secondary passageway 1384 fills with overflowing of the vaporizable material 1302.

In accordance with some aspects, the air vent 1318 may act as a reverse vent and provide for the equalization of pressure within the cartridge 1320 during a reverting back to the first pressure state, from the second pressure state, as the overflow of the vaporizable material 1302 returns back to the storage chamber 1342 from the overflow volume 1344. In this implementation, as ambient pressure becomes larger than the internal pressure in the cartridge 1320, ambient air may flow through the air vent 1318 into the secondary passageway 1384 and effectively help push the vaporizable material 1302 temporarily stored in the overflow volume 1344 in a reverse direction back into the storage chamber 1342.

In one or more embodiments, the secondary passageway 1384 in a first pressure state may include air. In the second pressure state, the vaporizable material 1302 may enter the secondary passageway 1384, for example through an opening (i.e., vent) at the point of interface between the storage chamber 1342 and the overflow volume 1344. As a result, air in the secondary passageway 1384 is displaced and may exit through the air vent 1318. In some embodiments, the air vent 1318 may act as or include a control valve (e.g., a selective osmosis membrane, a microfluidic gate, etc.) that allows for air to exit the overflow volume 1344, but blocks the vaporizable material 1302 from exiting from the secondary passageway 1384 into the airflow passageway 1338. As noted earlier, the air vent 1318 may act as an air exchange port to allow air to enter and exit the collector 1313 as, for example, the collector 1313 fills during a negative pressure event and empties following the negative pressure event (i.e., during a transition between the first and second pressure states discussed earlier).

Accordingly, the vaporizable material 1302 may be stored in the collector 1313 until pressure inside the cartridge 1320 is stabilized (e.g., when the pressure returns to ambient or meets a designated equilibrium) or until the vaporizable material 1302 is removed from the overflow volume 1344 (e.g., by way of vaporization in an atomizer). Thus, the level of the vaporizable material 1302 in the overflow volume 1344 may be controlled by managing the flow of vaporizable material 1302 into and out of the collector 1313 as ambient pressure changes. In one or more embodiments, overflow of the vaporizable material 1302 from the storage chamber 1342 into the overflow volume 1344 may be reversed or may be reversible depending on detected changes in environment (e.g., when a pressure event that caused the vaporizable material 1302 overflow subsides or is concluded).

As noted above, in some implementations of the current subject matter, in a state when pressure inside of the cartridge 1320 becomes relatively lower than the ambient pressure (e.g., when going from the second pressure state noted earlier back to the first pressure state), flow of the vaporizable material 1302 may be reversed in a direction that causes the vaporizable material 1302 to flow back from the overflow volume 1344 into the storage chamber 1342 of the reservoir 1340. Thus, depending on implementation, the overflow volume 1344 may be configured for temporarily containing the overflow portions of the vaporizable material 1302 during a second pressure state. Depending on implementation, during or after a reversal back to a first pressure state, at least some of the overflow of the vaporizable material 1302 retained in the collector 1313 is returned back to the storage chamber 1342.

To control the vaporizable material 1302 flow in the cartridge 1320, in other implementations of the current subject matter, the collector 1313 may optionally include absorbent or semi-absorbent material (e.g., material having sponge-like properties) for permanently or semi-permanently collecting or containing the overflow of the vaporizable material 1302 travelling through the secondary passageway 1384. In an example embodiment, in which absorbent material is included in the collector 1313, the reverse flow of the vaporizable material 1302 from the overflow volume 1344 to the storage chamber 1342 may not be as practical or possible as compared to embodiments that are implemented without (or without as much) absorbent material in the collector 1313. Accordingly, the reversibility or the reversibility rate of the vaporizable material 1302 to the storage chamber 1342 may be controlled by including more or less densities or volumes of absorbent material in the collector 1313 or by controlling texture of the absorbent material, where such characteristics result in a higher or lower rate of absorption, either immediately or over longer time periods.

Figure 4:
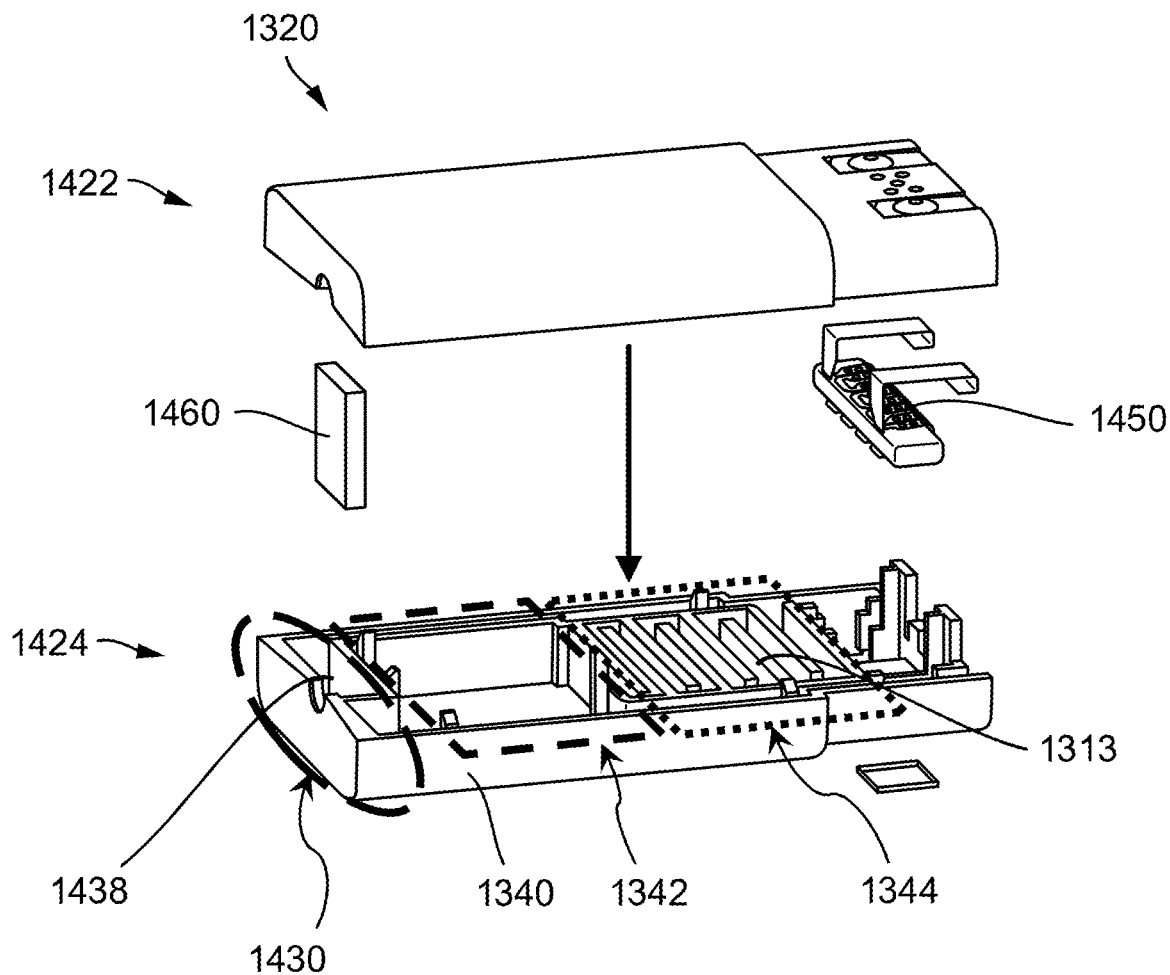
FIG. 4 illustrates an exploded perspective view of an example implementation of a cartridge of FIGS. 3A and 3B, in accordance with one or more implementations.

FIG. 4 is an exploded perspective view of an example implementation of a cartridge 1320. As shown, the body of the cartridge 1320 may be made of two connectable (or separable) pieces, such as a first portion 1422 (e.g., upper housing) and a second portion 1424 (e.g., lower housing) that may fit together according to a top-down architectural implementation model or assembly process. This separable architecture simplifies assembly and manufacturing processes and may not involve the assembly or construction of multiple smaller pieces to construct a larger piece. Instead, as in the example embodiment illustrated in FIG. 4, larger pieces (e.g., a first portion 1422 and a second portion 1424) may be connected to, for example, form external cartridge features (e.g., siding) and smaller internal cartridge components (e.g., opposing rib-shaped elements that form one or more of a collector 1313, a reservoir 1340, a storage chamber 1342, an overflow volume 1344, etc.).

Referring to FIG. 4, a heating element 1450 may be positioned in a cavity or housing implemented in between a first portion 1422 and a second portion 1424 of the body of the cartridge 1420. In one example, a sponge or other absorbent material 1460 may be also positioned in a mouthpiece area 1430 for the purpose of collecting excess liquid vaporizable material (e.g., as might form by condensation of vaporized material and/or water vapor to form larger droplets that can create an unpleasant sensation when ingested during inhalation) traveling through an airflow passageway 1438. Accordingly, the assembly or disassembly of additional components (e.g., a heating element 1450 or sponge 1460) may be performed in a simple and efficient manner, where a large number of machinery or assembly automation parts may not be needed for constructing the cartridge 1320 from a small set of components into a unified separable two-piece housing in the example implementation disclose herein.

The separable two-piece construction described herein may provide one or more of the following example advantages or improvements over an alternative implementation: lower part count, lower assembly or manufacturing costs (e.g., the embodiment illustrated in FIG. 4 requires four parts to be manufacture and assembled), no or reduced tooling requirements, no or limited deep, fragile, low draft tooling cores, rib structures that are relatively shallow. Depending on implementation, ultrasonic or laser welding techniques may be utilized to create a solid-state weld between a first portion 1422 and a second portion 1424 of a cartridge 1420.

Ultrasonic welding is a process commonly used for plastics in which high-frequency ultrasonic acoustic vibrations are locally applied to work pieces (e.g., a first portion 1422 and a second portion 1424) being held together under pressure to create a solid-state weld. Laser welding is a welding process used to join pieces of metal or thermoplastics through the use of a laser beam which provides a concentrated heat source (e.g., laser beam), allowing for narrow, deep welds at high welding rates.

Figure 5:
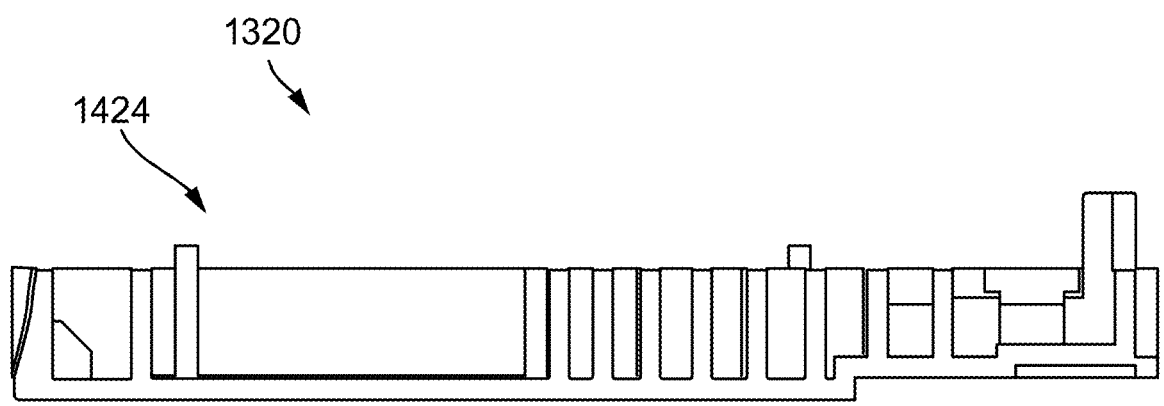
FIG. 5 illustrates a planar cross-sectional side view of a selected split portion of a cartridge, in accordance with one or more implementations.

Referring to FIG. 5, a planar cross-sectional side view of a selected portion of a cartridge 1320 is illustrated. Referring to both FIGS. 4 and 5, a first portion 1422 (not shown in FIG. 5) and a second portion 1424 of the cartridge 1420 may be molded from plastic parts by way of injection molding (e.g., in a top-down implementation model). In one example embodiment, a line of draw tooling technique may be used to allow for the separation of mold halves (e.g., a first portion 1422 and a second portion 1424, as shown in FIG. 4) allowing each portion to be ejected without any obstructions from the creating undercuts and further allowing for substantial mold cavitation, to help shorten the tooling cycle and allow for more efficient manufacturing time and process.

Figure 6A:
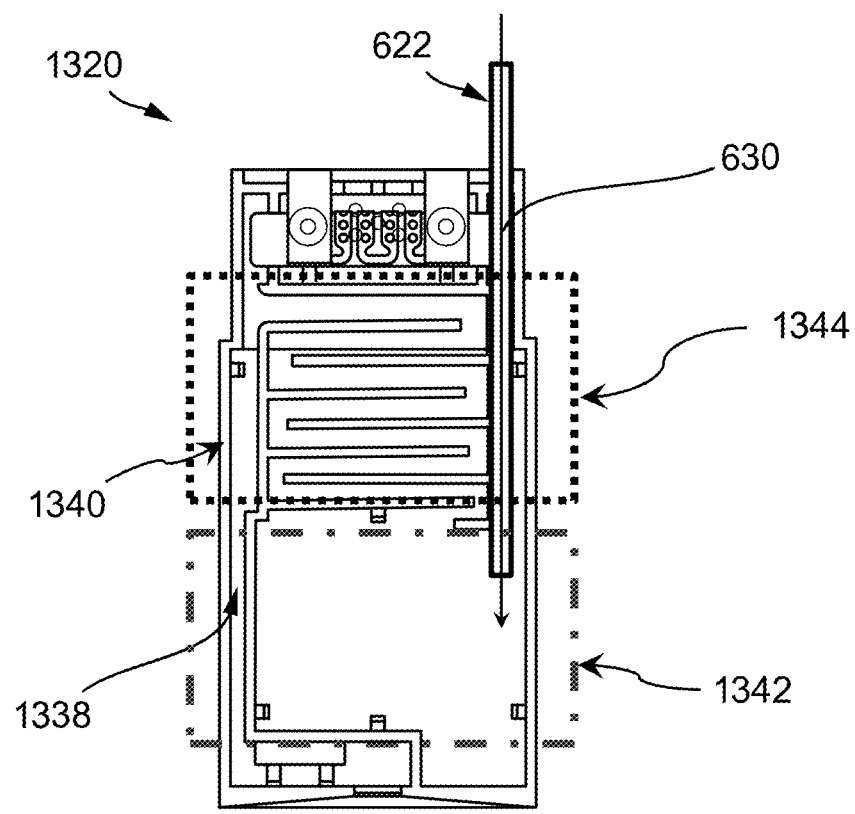
FIG. 6A illustrates a cross-sectional top view of an example cartridge structure, in accordance with one or more implementations.
Figure 6B:
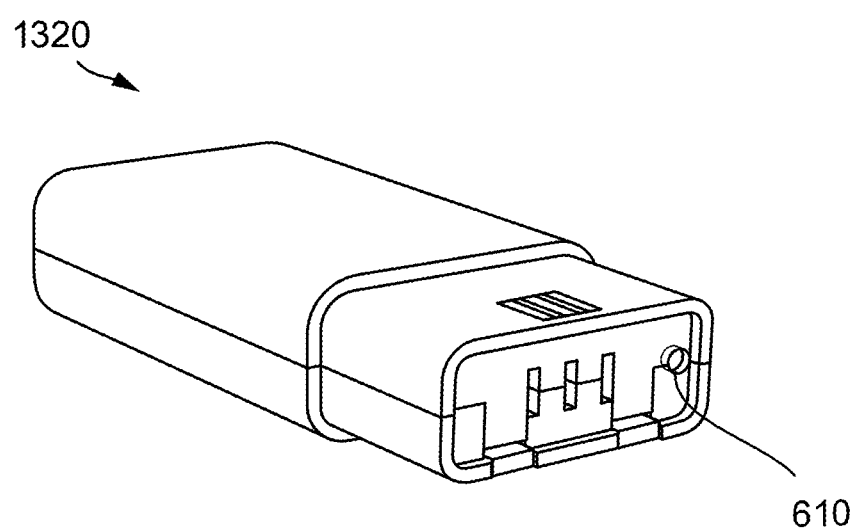
FIG. 6B illustrates a perspective side view of the example cartridge of FIG. 6A, in accordance with one or more implementations.

Referring to FIGS. 6A and 6B, a cross-sectional top view and a perspective side view of a cartridge 1320 are shown respectively. As shown, a fill port 610 may be implemented in one or more embodiments of the cartridge 1320 to allow for filling the reservoir storage chamber 1342 by way of, for example, a fill needle 622. As shown, the fill needle 622 may be easily and conveniently insertable into the fill port 610 by way of, for example, a fill passageway 630 leading to a storage chamber 1342 (or overflow volume 1344), depending on implementation. Accordingly, vaporizable material 1302 may be injected into a reservoir 1340 through a fill passageway 630, using a fill needle 622 for example. In some embodiments, the fill passageway 630 may be constructed or positioned on a side of the cartridge 1320, for example, opposite to the side where the airflow passageway 1338 is positioned.

FIGS. 7A through 7D illustrate design alternatives for a cartridge connecting port. FIGS. 7A and 7B are perspective views and FIGS. 7C and 7D are planar cross-sectional side views of alternative connecting port embodiments, which by way of example may include male or female engagement parts. Referring to FIGS. 1, 2 and 7A-7D, a cartridge 1320 may be implemented in different configurations at the end where the cartridge 1320 engages the vaporizer body 110. In one embodiment, as shown in FIGS. 1 and 2, the vaporizer body 110 may include a cartridge receptacle 118 for detachably receiving a cartridge 1320 with a male configured port 710 (see FIGS. 7A and 7C), such that in an attached state, cartridge contacts 124 positioned in the male port of cartridge 1320 are received by corresponding receptacle contacts 125 in a cartridge receptacle 118 in a snap-lock fashion, for example. A counterpart configuration may be directed to a cartridge 1320 having a female configured port 712 (see FIGS. 7B and 7D) for receiving an end of a vaporizer body 110, that includes receptacle contacts 125.

Figure 8:
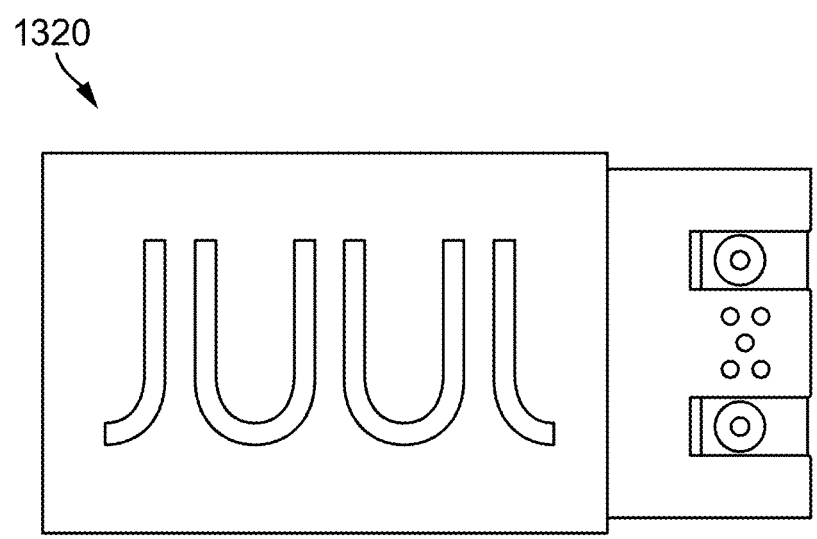
FIG. 8 illustrates a planar top view of cartridge with an example motif or logo, in accordance with one or more implementations.

Referring to FIG. 8, a planar top view of a cartridge 1320 is illustrated. In one example, the cartridge 1320 may be implemented using a separable two-piece construction, where a relief (e.g., an owner's trademark, a serial number, a patent number, etc.) or optionally decorative or ornamental features may be imprinted on the external walls of the cartridge 1320 by way of a molding process. The molding process allows for flexibility in designing the external shape or externally displayable logos or ornamental designs without affecting the positioning or formation of internal functional components (e.g., a reservoir 1340, a storage chamber 1342, or an overflow volume 1344).

Notably, the mark JUUL® as shown in FIG. 8 is a registered trademark of JUUL LABS, Inc. a Delaware Corporation, headquartered in San Francisco California. All rights are reserved by the mark's owner or assignee. Use of the example mark in FIG. 8 should not be construed as limiting the scope of the disclosed subject matter to include such exclusive design or marking. Certain embodiments may be unmarked or contain no ornamental or external design features, whatsoever. Thus, FIG. 8 provides an illustration of a molded relief that, without limitation, may appear as a mark or design on one or more sides of a cartridge 1320.

Figure 9A:
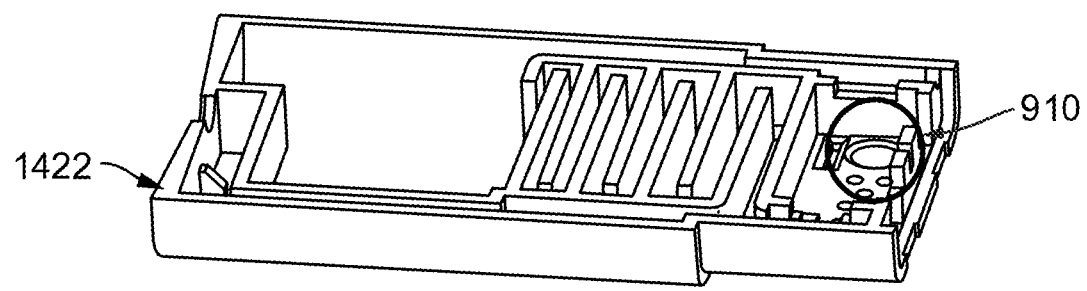
FIGS. 9A and 9B illustrate perspective and planar sectional views of a split portion of an example cartridge, in accordance with one or more implementations.
Figure 9B:
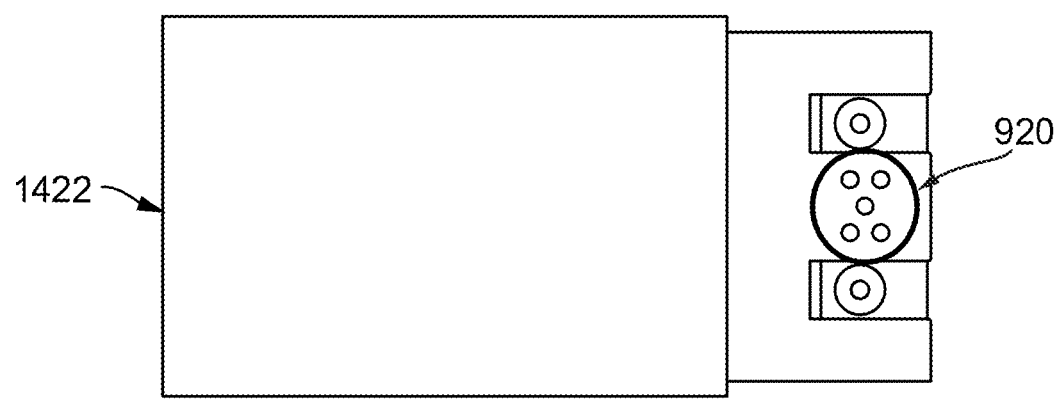

Referring to FIGS. 9A and 9B, perspective and planar sectional views of an example cartridge 1320 are illustrated, where a first portion 1422 of the cartridge 1320 is split from a second portion 1424 (see also FIG. 4). In one or more embodiments, the cartridge 1320 may be engineered and manufactured by way of part splitting. That is, depending on implementation, multiple split sections of a part are connected together to make a whole part as shown by way of example in FIG. 4.

Referring to FIG. 9A, part splitting may allow for molded compliance for electrical contact and heating element retention in a wick housing area 910 of the cartridge 1320. As shown in more detail in FIG. 9B, one or more vent holes 920 may be drilled or positioned by way of injection molding, or other suitable method, in the body of the cartridge 1320 in an area near the wick housing area 910 to allow for pinpoint vapor evacuation or airflow to the wick to, for example, help control condensation within the cartridge 1320 or affect capillary forces therein.

Figure 10A:
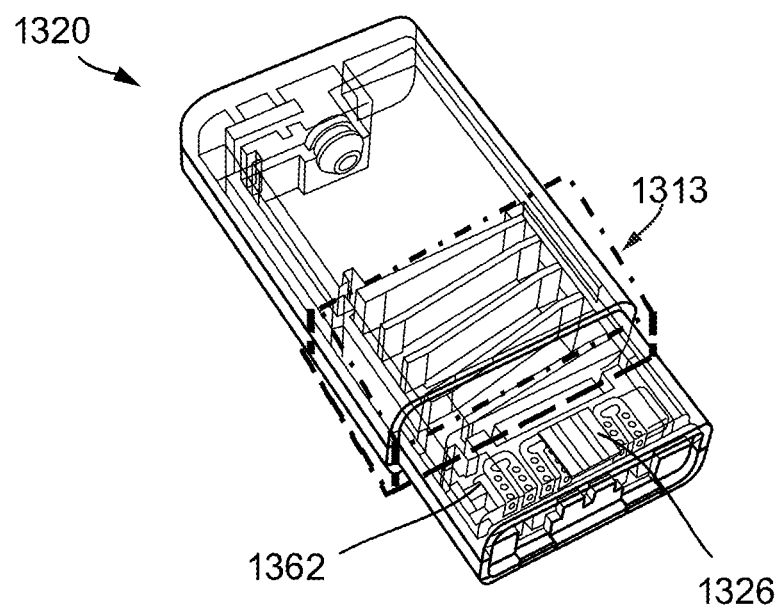
FIGS. 10A and 10B illustrate closed and exploded perspective views of an example cartridge implementation with separable structure for housing a collector mechanism, in accordance with one or more implementations.
Figure 10B:
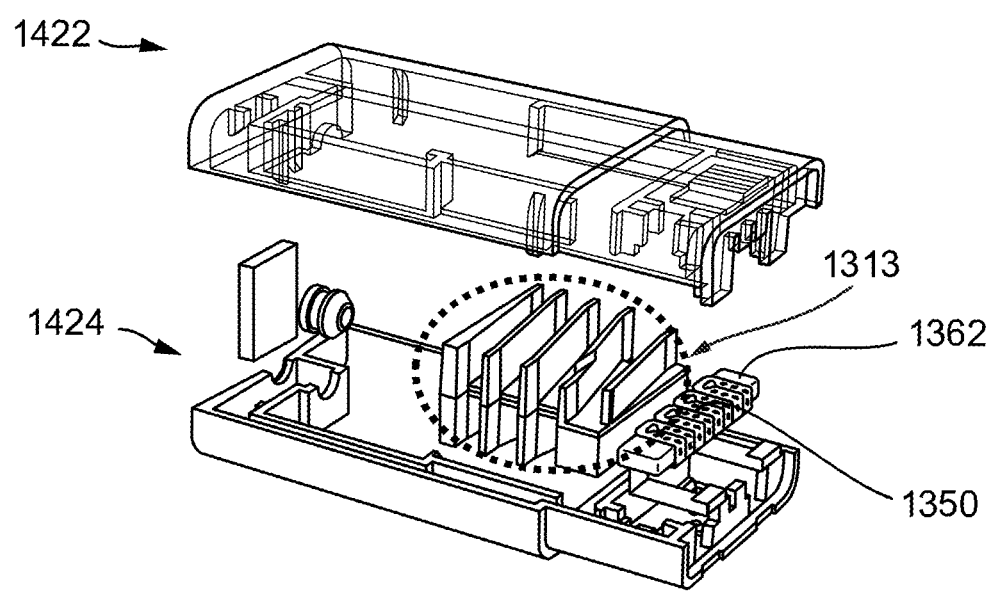

Referring to FIGS. 10A and 10B, assembled and exploded perspective views of an alternative example embodiment of a cartridge 1320 are respectively illustrated. As noted earlier, a top-down implementation model may be employed to construct an open-faced cartridge structure with, for example, two attachable (or detachable) housings including a first portion 1422 and a second portion 1424. As shown, the first portion 1422 (e.g., the upper housing) and the second portion 1424 (e.g., the lower housing) may provide for a two-piece construction having one or more internal cavities that may be utilized to house at least one of a heating element 1350, a wicking element 1362, or plates 1326. It will be understood that alternative assembly methods may be used to result in structures have some or all of the features described herein.

Particularly, in the example embodiment shown in FIGS. 10A and 10B, instead or in addition to using molded cavities and walls to form internal structures (e.g., a reservoir 1340 in FIG. 3A) of the cartridge, some features such as the secondary passageway 1384 (see FIG. 3A) may be embodied in a removable or attachable collector 1313 that may be independently constructed as a separate piece and may be later either encapsulated between a first portion 1422 and a second portion 1424 (e.g., see FIGS. 10A and 10B) or alternatively inserted into an optionally monolithic hollow cartridge body adapted to receive a collector 1313 from an open end (see FIGS. 10C, 10D, 11B, 13, 16C, 17A, 22F).

Referring to FIGS. 10A through 43B, various implementations are disclosed which may utilize a collector 1313 as configured, designed, manufactured, fabricated or constructed fully or partially independent from a cartridge 1320 housing. It is noteworthy that the disclosed implementations are provided by way of example. In alternate implementations or embodiments, a collector 1313 may be formed as shown in FIGS. 10A through 14B, having a construction that, at least structurally, is semi-dependent or fully independent of the construction of other components of the cartridge 1320.

In certain interchangeable implementations, various embodiments or types of collector 1313, as shown in FIGS. 10A through 14B, may be inserted or encapsulated in, for example, a standardized cartridge 1320 housing. As provided in further detail herein, because some of the main functionalities for controlling the flow of vaporizable material 1302 in the cartridge 1320 may be achieved by way of manipulating the collector 1313 structure or material properties thereof, cost savings and other efficiencies and advantages may be derived from having a construction that allows for interchangeable collector 1313 models that may fit different cartridge housings, for example.

Referring to FIGS. 10C and 10D, for example, in some implementations, instead of a separable two-piece construction illustrated in FIGS. 10A and 10B, a cartridge 1320 may have a cartridge housing formed of a monolithic hollow structure having a first end and a second end. The first end (i.e., a first end, also referred to as a receiving end of the cartridge housing) may be configured for insertably receiving at least a collector 1313. In one embodiment, the second end of the cartridge housing may act as a mouthpiece with an orifice or opening. The orifice or opening may be situated opposite of the receiving end of the cartridge housing where the collector 1313 may be insertably received. In some embodiments, the opening may be connected to the receiving end by way of an airflow passageway 1338 that may extend through the body of the cartridge 1320 and the collector 1313, for example. As in other cartridge embodiments consistent with the current disclosure, an atomizer, for example one including a wicking element and a heating element as discussed elsewhere herein, may be positioned adjacent to or at least partially in the airflow passageway 1338 such that an inhalable form, or optionally a precursor of the inhalable form, of the liquid vaporizable material may be released from the atomizer into air passing through the airflow passageway 1338 toward the orifice or opening.

Air Exchange Port Embodiments

Figure 11A:
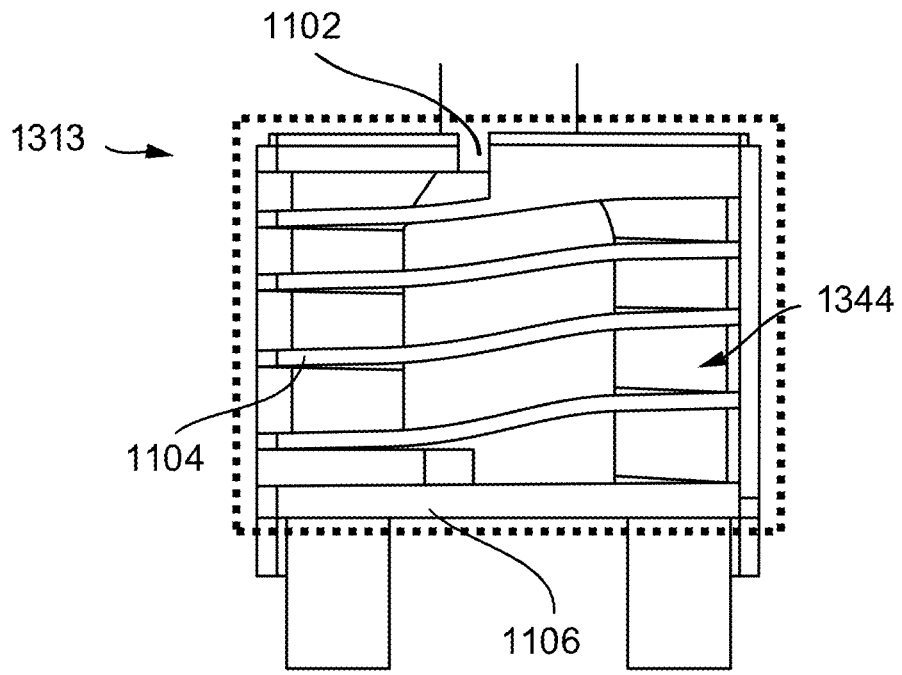
FIG. 11A illustrates a side planar view of an example single-vent single-channel collector structure, in accordance with one or more implementations.
Figure 11B:
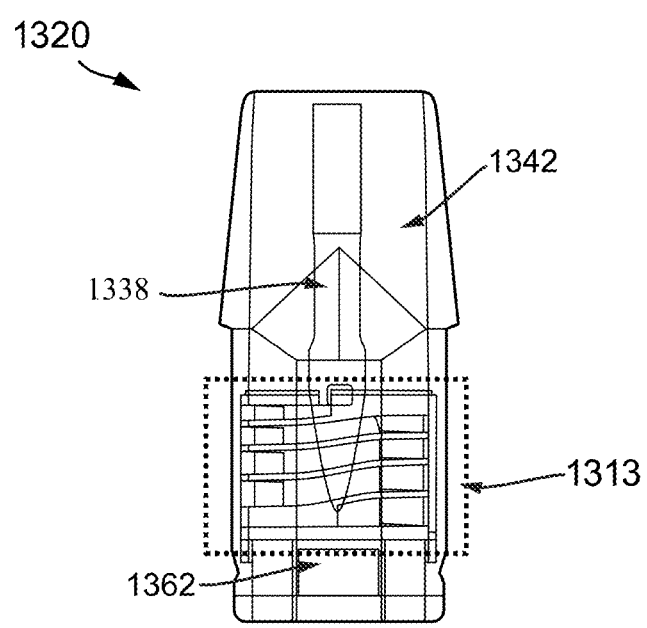
FIG. 11B is a side planar view of an example cartridge with a translucent housing structure containing an example collector, such as that shown in FIG. 11A, in accordance with one or more implementations.

Referring to FIGS. 11A and 11B, illustrative planar side views of a single-gate, single-channel collector 1313 are shown. In these example embodiments, a gate 1102 may be provided at an opening toward a first portion (e.g., upper portion) of the collector 1313 where the collector 1313 is in contact or in communication with the reservoir's storage chamber 1342 (see also FIGS. 3A and 3B discussed earlier). A gate 1102 may dynamically connect the storage chamber 1342 to an overflow volume 1344 formed by a second portion (e.g., a middle portion) of the collector 1313.

In one embodiment, the second portion of the collector 1313 may have a ribbed or multi-fin-shaped structure forming an overflow channel 1104 that spirals, tapers or slopes in a direction away from the gate 1102 and towards an air exchange port 1106, as shown in FIG. 11A, to lead or cause vaporizable material 1302 to move toward the air exchange port 1106 after vaporizable material 1302 enters the overflow volume 1344 through the gate 1102. The air exchange port 1106 may be connected to ambient air by way of an air path or airflow passageway that is connected to the mouthpiece. This air path or airflow passageway is not explicitly shown in FIG. 11A.

In some implementations, the collector 1313 is configured to have a central opening or tunnel through which an airflow channel leading to the mouthpiece is implemented, as provided in further detail below (e.g., see opening referenced by numeral 1100 in FIG. 11D). The airflow channel may be connected to the air exchange port 1106, such that the volume inside the overflow passageway of the collector 1313 is connected to ambient air via the air exchange port 1106 and also connected to the volume in the storage chamber 1342 via the gate 1102. As such, in accordance with one or more embodiments, the gate 1102 may be utilized as a control fluidic valve to mainly control liquid and air flow between the overflow volume 1344 and the storage chamber 1342. The air exchange port 1106 may be utilized to mainly control airflow (and on occasion liquid flow) between the overflow volume 1344 and an air path leading to the mouthpiece, for example. Overflow channel 1104 may be diagonal, vertical, or horizontal in relationship to the elongated body of the cartridge 1320.

Vaporizable material 1302, at the time the cartridge 1320 is filled, may have at least an initial interface with the collector 1313 by way of the gate 1102. This is because an initial interface between vaporizable material 1302 and the gate 1102 may, for example, prevent the possibility for air trapped in the overflow channel 1104 to enter a cartridge area where vaporizable material 1302 is stored (e.g., storage chamber 1342). Furthermore, such interface may initiate a first capillary interaction between vaporizable material 1302 and the walls of the overflow channel 1104, at an equilibrium state, to allow for a limited amount of vaporizable material 1302 to flow into the overflow channel 1104 to achieve or maintain the equilibrium state.

Equilibrium state refers to a state in which vaporizable material 1302 neither flows in nor flows out of the overflow volume 1344, or a state in which such forward or reverse flows are negligible. At least in some embodiments, the capillary action (or interaction) between the walls of the overflow channel 1104 and vaporizable material 1302 is such that an equilibrium state may be maintained when the cartridge 1320 is in the first pressure state, when the pressure inside the storage chamber 1342 is approximately equal to the ambient pressure.

Establishing of an equilibrium state and further capillary interaction between vaporizable material 1302 and the walls of the overflow channel 1104 may be established or configured by way of adapting or adjusting the volumetric size of the overflow channel 1104 along the length of the channel. As provided in further detail herein, the diameter (which is used herein to refer generically to a measure of the magnitude of the cross sectional area of the overflow channel 1104, including implementations of the current subject matter in which the overflow channel does not have a circular cross-section) of the overflow channel 1104 may be constricted at predetermined interval or points or throughout the length of the entire channel to allow for a sufficiently strong capillary interaction that provides for direct and reverse flows of vaporizable material 1302 into and out of the collector 1313, depending on changes in pressure and further to allow large overall volume of the overflow channel while still maintaining gate points for meniscus formation to prevent air from flowing past liquid in the overflow channel 1104.

As provided in further detail herein, the diameter of the overflow channel 1104 may be sufficiently small or narrow such that the combination of surface tension, caused by cohesion within vaporizable material 1302, and wetting forces between the vaporizable material 1302 and the walls of the overflow channel 1104 may act to cause formation of a meniscus that separates liquid from air in a dimension traverse to the axis of flow in the overflow channel 1104 such that air and liquid cannot pass each other. It will be understood that menisci have an inherent curvature, so reference to a dimension transverse to the direction of flow is not intended to imply that the air-liquid interface is planar in this or any other dimension.

The wicking element 1362 may be in a thermal or thermodynamic connection with a heating element 1350 (see FIGS. 3B and 11B, for example) to induce the generation of vapor from heating the vaporizable material 1302, as discussed in detail earlier with reference to FIGS. 3A and 3B. Alternatively, the air exchange port 1106 may be constructed to provide a gas escape route but prevent flow of the vaporizable material 1302 out of the overflow channel 1104.

Referring to both FIGS. 11A and 11B, direct or reverse flows of the vaporizable material 1302 in the collector 1313 may be controlled (e.g., enhanced or diminished) by way of implementing suitable structures (e.g., microchannel configurations) to introduce or take advantage of capillary properties that may exist between the vaporizable material 1302 and the retaining walls of the overflow channel 1104. For example, factors associated with length, diameter, inner surface texture (e.g., rough vs. smooth), projections, directional tapering of the channel structures, constrictions or material used for constructing or coating the surface of the gate 1102, the overflow channel 1104 or the air exchange port 1106 may positively or negatively affect the rate at which a liquid is drawn into or moves through the overflow channel 1104 by way of capillary action or other influential forces acting on cartridge 1320.

One or more factors noted above, depending on implementation, may be used to control displacement of the vaporizable material 1302 in the overflow channel 1104 to introduce a desirable degree of reversibility, as the vaporizable material 1302 is collected in the channel structures of the collector 1313. As such, in some embodiments, the flow of the vaporizable material 1302 into the collector 1313 may be fully reversible or semi-reversible by way of selectively controlling the various factors noted above and depending on changes in pressure state inside or outside of the cartridge 1320.

As shown in FIGS. 3A, 3B, 11A, and 11B, in one or more embodiments, the collector 1313 may be formed, constructed, or configured to have a single-channel single-vent structure. In such embodiments, the overflow channel 1104 may be a continuous passageway, tube, channel or other structure for connecting the gate 1102 to the air exchange port 1106, optionally positioned near the wicking element 1362 (e.g., see also FIGS. 3A and 3B showing a single elongated overflow channel 1104 in the overflow volume 1344). Accordingly, in such embodiments, the vaporizable material 1302 may enter or exit the collector 1313 from the gate 1102 and through a singularly constructed channel, where the vaporizable material 1302 flows in a first direction as the collector 1313 is being filled and in a second direction when the collector 1313 is being drained.

To help maintain an equilibrium status or, depending on implementation, to control flow of the vaporizable material 1302 in the overflow channel 1104, the shape and structural configuration of the overflow channel 1104, the gate 1102 or the air exchange port 1106 may be adapted or modified to balance the rate of flow of the vaporizable material 1302 in the overflow channel 1104, at different pressure states. In one example, the overflow channel 1104 may be tapered so that the tapered end (i.e., the end with smaller opening or diameter) leads to the gate 1102.

In one implementation, the untapered end (i.e., the end of the overflow channel 1104 with the larger opening or diameter) may lead to the air exchange port 1106 which may be connected to the ambient environment outside of the cartridge 1320 or to an airflow path from which vaporized vaporizable material 1302 is delivered to the mouthpiece (see for example FIG. 3A, air vent 1318 connected to airflow passageway 1338). In one embodiment, the untapered end may also lead to an area near the wick housing, such that if the vaporizable material 1302 exits the overflow channel 1104, the vaporizable material 1302 may be used to saturate the wicking element 1362.

A tapered channel structure, depending on implementation, may reduce or increase restriction on flow into the collector 1313. For example, in an embodiment where the overflow channel 1104 is tapered toward the gate 1102, a favorable capillary pressure towards a reverse flow is induced in the overflow channel 1104, such that direction of the vaporizable material 1302 flow is out of the collector 1313 and into the storage chamber 1342 when pressure state changes (e.g., when a negative pressure event is eliminated or subsided). Particularly, implementing the overflow channel 1104 with a smaller opening may prevent free flow of the vaporizable material 1302 into the collector 1313. An untapered configuration for the overflow channel 1104 in a direction leading towards the air exchange port 1106 provides for efficient storage of the vaporizable material 1302 in the collector 1313 during a second pressure state (e.g., a negative pressure state) as the vaporizable material 1302 flows into the collector 1313 from narrower sections of the overflow channel 1104 into larger volumetric sections of the overflow channel 1104.

As such, diameter and shape of the collector structure 1313 may be implemented so that the flow of the vaporizable material 1302 through the gate 1102 and into the overflow channel 1104 is controlled at a desirable rate, during a second pressure state (e.g., a negative pressure event) in a manner to prevent the vaporizable material 1302 from flowing too freely (e.g., beyond a certain flow rate or threshold) into the collector 1313, and also to favor a reverse flow back into the storage chamber 1342 in a first pressure state (e.g., when a negative pressure event is alleviated). It is noteworthy that the combination of the interactions between the vent 1002, the overflow channel 1104 in the collector 1313 that make up the overflow volume 1344 and the air exchange port 1106, in one embodiment, provides for the proper venting of air bubbles that may be introduced into the cartridge due to various environmental factors as well as the controlled flow of the vaporizable material 1302 into and out of the overflow channel 1104.

Mouthpiece Embodiments

Referring to FIG. 11B (also see FIGS. 10C, 10D), in some embodiments, a portion of the cartridge 1320 that includes the storage chamber 1342 may be configured to also include a mouthpiece that may be utilized by a user to inhale vaporized vaporizable material 1302. An airflow passageway 1338 may extend through the storage chamber 1342, thereby connecting a vaporization chamber. Depending on implementation, the airflow passageway 1338 may be a straw-shaped structure or hollow cylinder, for example, which forms a channel inside the storage chamber 1342 to allow for passage of vaporized vaporizable material 1302. While the airflow passage may have a circular or at least approximately circular cross-sectional shape, it will be understood that other cross-sectional shapes for the airflow passage are also within the scope of the current disclosure.

A first end of the airflow passageway 1338 may be connected to an opening at a first "mouthpiece" end of the storage chamber 1342 from which a user may inhale vaporized vaporizable material 1302. A second end of the airflow passageway 1338 (opposite the first end) may be received in an opening at a first end of the collector 1313, as provided in further detail herein. Depending on implementation, the second end of the airflow passageway 1338 may fully or partially extend through a receiving cavity that runs through the collector 1313 and connects to a wick housing, where the wicking element 1362 may be housed.

In some configurations, the airflow passageway 1338 may be an integral part of a monolithic molded mouthpiece that includes the storage chamber 1342 where the airflow passageway 1338 extends through the storage chamber 1342. In other configurations, the airflow passageway 1338 may be an independent structure that may be separately inserted into the storage chamber 1342. In some configurations, the airflow passageway 1338 may be a structural extension of the collector 1313 or the body of the cartridge 1320 as internally extending from the opening in the mouthpiece portion, for example.

Without limitation, a variety of different structural configurations may be possible for connecting the mouthpiece (and airflow passageway 1338 internal to the mouthpiece) to the air exchange port 1106 in collector 1313. As provided herein, the collector 1313 may be inserted into the body of the cartridge 1320, which may also act as a storage chamber 1342. In some embodiments, the airflow passageway 1338 may be constructed as an internal sleeve that is an integral part of a monolithic cartridge body, such that an opening in a first end of the collector 1313 may receive a first end of the sleeve structure forming the airflow passageway 1338.

Referring to FIGS. 18A-18D, certain embodiments may include a vaporizer cartridge 1800 including a double barrel mouthpiece 1830 connected with two airflow passageways 1838. In such embodiments, a higher dose of vaporized vaporizable material 1302 may be delivered in comparison to a single barrel mouthpiece. A double barrel mouthpiece 1830, depending on implementation, may also advantageously provide a smoother and more satisfying vaping experience.

Fluidic Gate Embodiments

Referring to FIGS. 10A through 11H, depending on implementation, various factors may be considered to help monitor and control forward and reverse flows of vaporizable material 1302 in and out of the collector 1313. Some of these factors may include configuring the capillary drive of a fluidic vent, referred to herein as the gate 1102. The capillary drive of the gate 1102 may be, for example, smaller than that of the wicking element 1362. Further, collector 1313 flow resistance may be larger than that of the wicking element 1362. The overflow channel 1104 may have smooth or rippled inner surfaces to control the flow rate of vaporizable material 1302 through the collector 1313. The overflow channel 1104 may be formed with a tapering curve to provide proper capillary interaction and forces that limit the rate of flow through the gate 1102 and into the overflow volume 1344 during a first pressure state to promote a reverse rate of flow through the gate 1102 and out of the overflow volume 1344 during a second pressure state.

Additional modifications to the shape and structure of collector 1313 components may be possible to help further regulate or fine-tune flow of vaporizable material 1302 into or out of the collector 1313. For example, a smoothly curved spiral channel configuration (i.e., as opposed to a channel with sharp turns or edges) as shown in FIGS. 11A through 11H may allow for additional features, such as one or more vents, channels, apertures or constricting structures to be included in the collector 1313 at predetermined intervals along the overflow channel 1104. As provided in further detail herein, such additional features, structures or configurations may help provide a higher level of flow control for vaporizable material 1302 along the overflow channel 1104 or through the gate 1102, for example.

It is noteworthy that regardless of the various structural elements and implementations discussed throughout this disclosure, certain features and functionalities (e.g., capillary interaction among various components) may be implemented in the collector 1313 structure to help control flow of vaporizable material 1302 through (1) single-vent, single-channel structures, (2) single-vent, multi-channel structures, or (3) multi-vent, multi-channel structures, for example.

Referring to FIGS. 10E, 11A, 11C, 11D, and 11E, example structural configurations for the collector 1313 are presented in accordance with certain variations. As shown, a fully or partially sloping spiral surface may be implemented to define one or more sides of the internal volume of the overflow channel 1104 of the collector 1313, such that vaporizable material 1302 may flow freely due to capillary pressure (or the force of gravity) through the overflow channel 1104 as vaporizable material 1302 enters the overflow channel 1104. One or more, optionally central, channels or tunnels, such as a central tunnel 1100, may be configured through the longitudinal height of the collector 1313, having two opposing ends.

At the first end, a central shaft or central tunnel 1100 through the collector structure 1313 may interact with or connect to a housing area in which a wicking element 1362 or an atomizer may be positioned. At the second end, the central tunnel 1100 may interact with, connect to, or receive one end of a duct or a tube that forms an airflow passageway 1338 in the mouthpiece portion of the cartridge 1320. A first end of the airflow passageway 1338 may connect (e.g., by way of insertion) to the second end of the central tunnel 1100. A second end of the airflow passageway 1338 may include an opening or orifice formed in the mouthpiece area.

In accordance with one or more embodiments, vaporized vaporizable material 1302 generated by an atomizer may enter through the first end of the central tunnel 1100 in the collector 1313, pass through the central tunnel 1100 and further out of the second end of the central tunnel 1100 into the first end of the airflow passageway 1338. Vaporized vaporizable material 1302 may then travel through the airflow passageway 1338 and exit through the mouthpiece opening formed at the second end of the airflow passageway 1338.

The collector 1313 may be configured as an independent piece with a construction or structure that is insertable into the body of the cartridge 1320 (e.g., see FIGS. 10C, 11B, 11C-11E). Upon insertion, an airtight seal may be formed between the inner walls of the shell body of the cartridge 1320 and the outer rims of the rib-like structure of the collector 1313 that forms the spiral sloping surface. In other words, three walls of the overflow channel 1104 as enclosed by the surface of the inner walls of the shell body of the cartridge 1320 form an overflow channel 1104 upon insertion of the collector 1313 into the body of the cartridge 1320.

Accordingly, an overflow channel 1104 may be formed by way of the inner walls of the body of the cartridge 1320 enclosing the inner walls of the rib-like structure. As shown, a gate 1102 may be positioned at one end of the overflow channel 1104, toward where the storage chamber 1342 is positioned, to control and provide for the ingress and egress of vaporizable material 1302 in the overflow channel 1104 in the collector 1313. An air exchange port 1106 may be positioned toward another end of the overflow channel 1104, preferably opposite the end where the gate 1102 is positioned.

The gate 1102 may control the flow of vaporizable material 1302 into and out of the overflow channel 1104 in the collector 1313. The air exchange port 1106 may, via a connection path to ambient air, control the flow of air into and out of the overflow channel 1104 to regulate air pressure in the collector 1313, and in turn in the storage chamber 1342 of the cartridge 1320 as provided in further detail herein. In certain embodiments, the air exchange port 1106 may be configured to prevent vaporizable material 1302 which may have filled the collector 1313 overflow channel 1104 (e.g., as a result of a negative pressure event) to exit the overflow channel 1104.

In a certain implementation, the air exchange port 1106 may be configured to cause vaporizable material 1302 to exit toward a route that leads to the area in which the wicking element 1362 is housed. This implementation may help avoid leakage of vaporizable material 1302 into an airflow passageway (e.g., central tunnel 1100) that leads to the mouthpiece, during a negative pressure event, for example. In some implementations, the air exchange port 1106 may have a membrane that allows the ingress and egress of gaseous material (e.g., air bubbles) but prevents vaporizable material 1302 from entering or exiting the collector 1313 through the air exchange port 1106.

Referring to FIGS. 11C through 11H, the rate of flow of vaporizable material 1302 into or out of the collector 1313 through the gate 1102 may be directly associated with the volumetric pressure inside the overflow channel 1104. Thus, the rate of flow into and out of the collector 1313, through the gate 1102, may be controlled by way of manipulating the hydraulic diameter of the overflow channel 1104 such that reducing the overall volume of the overflow channel 1104 (e.g., either uniformly or by way of introducing multiple constrictions points) may lead to increased pressure in the overflow channel 1104 and adjusting the rate of flow into the collector 1313. Accordingly, in at least one implementation, the hydraulic diameter of the overflow channel 1104 may be decreased (e.g., narrowed, pinched, constricted or restricted), either uniformly or by way of introducing one or more constriction points 1111a, along the length of the spiral path of the overflow channel 1104.

Figure 11E:
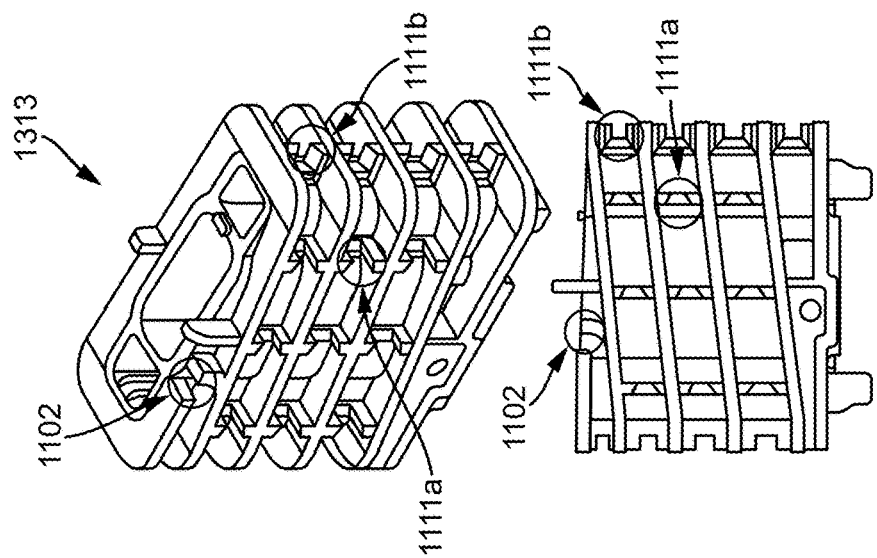
FIGS. 11C through 11E illustrate perspective and planar side views of example collector structures with flow management constrictors built into the flow channels, in accordance with one or more implementations.
Figure 11D:
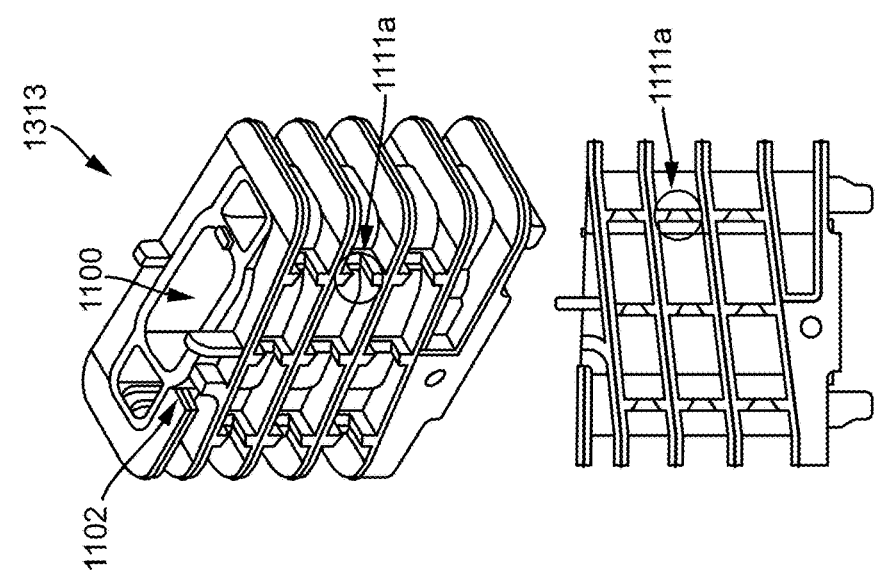
Figure 11C:
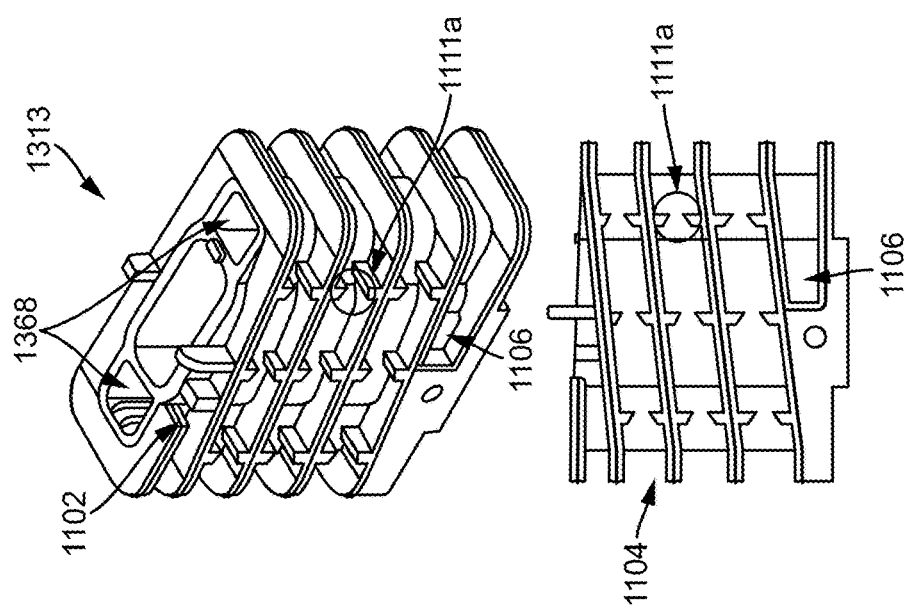

FIGS. 11C through 11E, by way of example, illustrate two partial-length and three full-length levels constructed on one or more sides of the collector 1313, with each full-length level, on the side shown in the figures, having three constriction points 1111a, for example. It is noteworthy that, in different implementations, more or fewer levels or constriction points 1111a may be implemented, defined, constructed, or introduced to adjust volumetric pressure in the collector 1313. A constriction point 1111a, for illustration purposes, is conspicuously marked by a circle in the middle level of the collector 1313.

Constriction points 1111a may be formed or introduced along the length of the overflow channel 1104 in a variety of manners and shapes. In the following, example embodiments with different constriction points or shapes are disclosed to better illustrate certain features. It is noted, however, that these example embodiments should not be construed as limiting the scope of the claimed subject matter to any particular configuration or shape.

Referring to FIG. 11C, in one example implementation, a constriction point 1111a may be formed by way of bumps, raised edges, protrusions or projections (hereafter referred to as "projections") extending from the ceiling or floor or side wall (or any or all such) surfaces of the overflow channel 1104 (i.e., the blades of the collector 1313). The shape of the projections may be defined as a bump, finger, prong, fin, edge, or any other shape that constricts a cross-sectional area transverse to a flow direction in the overflow channel. In the illustration of FIG. 11C, the cross-sectional side view of a projection is shown as being similar to the shape of a shark fin, for example, where the distal end of the projections is tapered to an edge.

As shown in FIG. 11C, the pointed or cantilevered edge of the shark fin shape may be rounded. In other embodiments, however, the cantilevered edge may be tapered to a sharp end. The sharpness, size, relative location, and placement frequency of the projections in the overflow channel 1104 may be manipulated to further fine-tune tendency of a meniscus separating liquid and air to form within the overflow channel 1104.

For example, as shown in FIG. 11C, the projections may have a rounded face on one side and a flat face on the opposite side. The rounded face of the projections may face (i.e., be directed towards) the outward flow of vaporizable material 1302 (i.e., flow out of the collector 1313 and into the storage chamber 1342), whereas the flat face of the projections may face the inward flow of vaporizable material 1302 (i.e., flow into the collector 1313 and from the storage chamber 1342) through the gate 1102.

As noted, in different implementations, formation of the projections along the overflow channel 1104 may be manipulated in number, size, shape, location, and frequency to fine-tune the hydraulic rate of flow of vaporizable material 1302 into and out of the collector 1313. For example, if it is desirable to instead maintain an incoming flow in the overflow channel 1104 at a higher rate than the outgoing flow, then the projections may be shaped to have a flat surface facing the outgoing flow and a rounded surface facing the incoming flow to facilitate formation and retention of a meniscus resisting outward flow of liquid (e.g., away from the storage chamber 1340) while making it easier for the meniscus to break free of the side of the projection facing back toward the storage compartment 1340. In this manner, a series of such projections may function as a sort of "hydraulic ratchet" system in which return flow of liquid into the storage compartment is microfluidically encouraged relative to outward flow from the storage compartment. This effect may be achieved, at least in part, by the relative tendency of a meniscus to break from the storage chamber side of the projections than from the opposite side.

Referring again to FIG. 11C, in one example implementation, in addition to (or instead of) the projections extending from the floor or ceilings of the overflow channel 1104, some projections may extend from the inner walls of the overflow channel 1104. As shown more clearly in FIG. 11F, a projection may extend from an inner wall of the overflow channel 1104 at the same constriction point 1111a, where two additional projections extend from the floor and the ceiling of the overflow channel 1104 to form a C-shaped constriction point 1111a. The example implementation illustrated in FIGS. 11D and 11F may more effectively tune the microfluidic properties of the overflow channel 1104 to encourage liquid flow to retract toward the storage chamber 1340 relative to the implementation in FIG. 11C, because the hydraulic diameter of the overflow channel 1104 is more constricted (i.e., narrowed) at the constriction point 1111a shown in FIGS. 11D and 11F.

The projections formed along the overflow channel 1104 need not be uniform in shapes, size, frequency, or symmetry. That is, depending on implementation, different constriction points 1111a or 1111b may be implemented in different sizes, designs, shapes, locations or frequency along the overflow channel 1104. In one example, the shape of a constriction point 1111a or 1111b may be similar to the shape of the letter C with a round internal diameter. In some embodiments, instead of a forming the internal diameter as a rounded C shape, the internal wall of the constriction point may have corners (e.g., sharp corners) such as those shown in FIGS. 11F and 11G.

In some examples, the overflow channel 1104, at a first level, may have projections extending from the ceiling of the overflow channel 1104, whereas at a second level, the projections may extend from the floor of the overflow channel 1104. At a third level, the projections may extend from the inner walls, for example. Alternatives of the above implementations may be possible by adjusting or changing the number of projections and shapes of projections or the positioning of the projections in different sequences or levels to help control the microfluidic effect on flow in the two directions within the overflow channel 1104. In one example, constriction points 1111a may be implemented on one or more (or all) levels, sides, or widths of the collector 1313, for example.

Figure 11F:
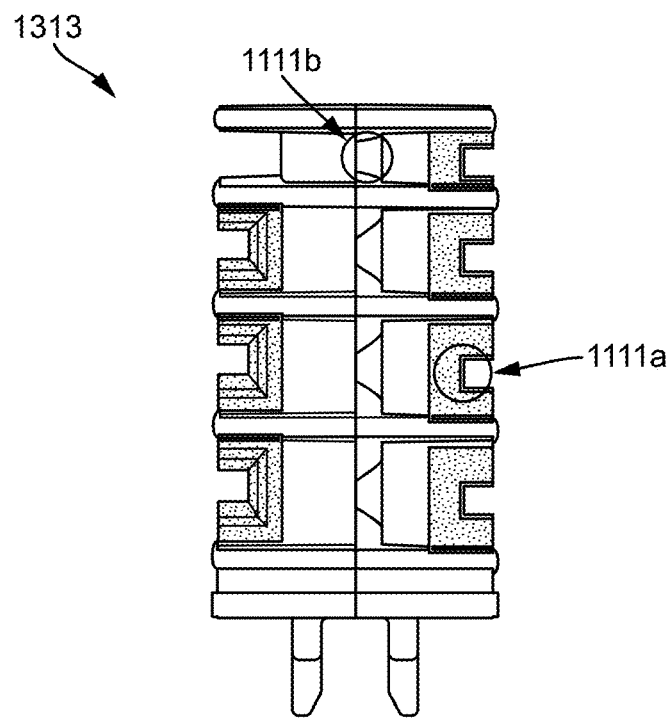
FIGS. 11F and 11G illustrate frontal and side views of an example collector structure with flow management constrictors built into the collector's flow channels, in accordance with one or more implementations.
Figure 11G:
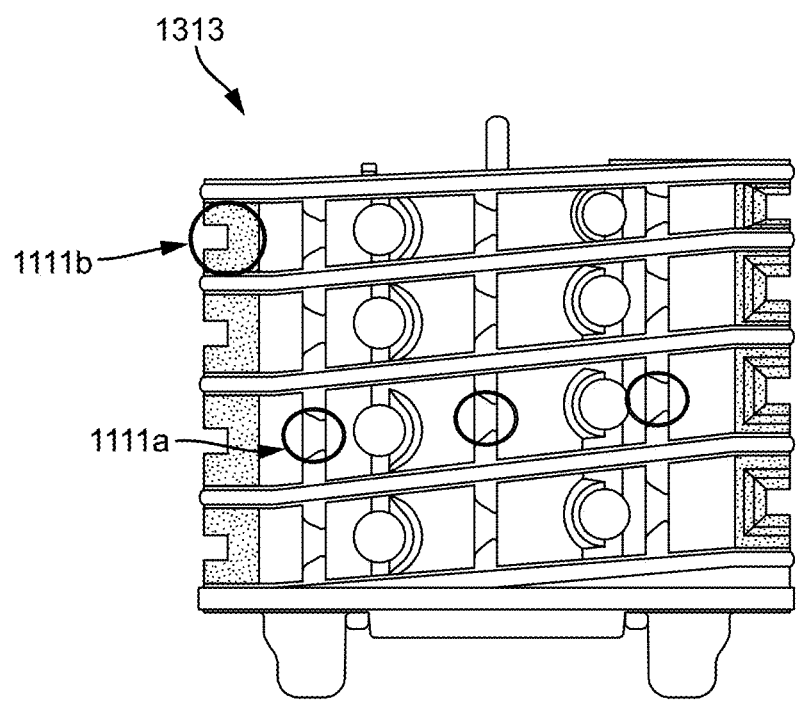

Referring to FIGS. 11E and 11G, in addition to defining constriction points 1111a along longer length of the overflow channel 1104, or a wider side of the collector 1313, one or more extra constriction points 1111b may be defined along the narrower side of the collector 1313. As such, the example implementation illustrated in FIGS. 11E and 11G may improve the adjusting of resistance to or encouragement of meniscus detachment in a desired direction in the overflow channel 1104 as compared to the implementation in FIG. 11D, because the overall hydraulic diameter (or flow volume) of the overflow channel 1104 is more constricted due to the addition of extra constriction points 1111b.

Referring to FIGS. 11F and 11G, for better clarity, each full level in the illustrated example may include three constriction points 1111a on each side, in addition to two more constriction points 1111b, for example. Thus, the collector 1313 of FIG. 11D may include a total of 18 constrictions points, whereas the collector 1313 of FIG. 11E may include a total of 26 constriction points. In this example, the embodiments illustrated in FIG. 11E provide for an improved microfluidic flow control (e.g., in the outward direction) due to the capillary pressure being reinforced at the multiple constriction points 1111a and 1111b.

Figure 11H:
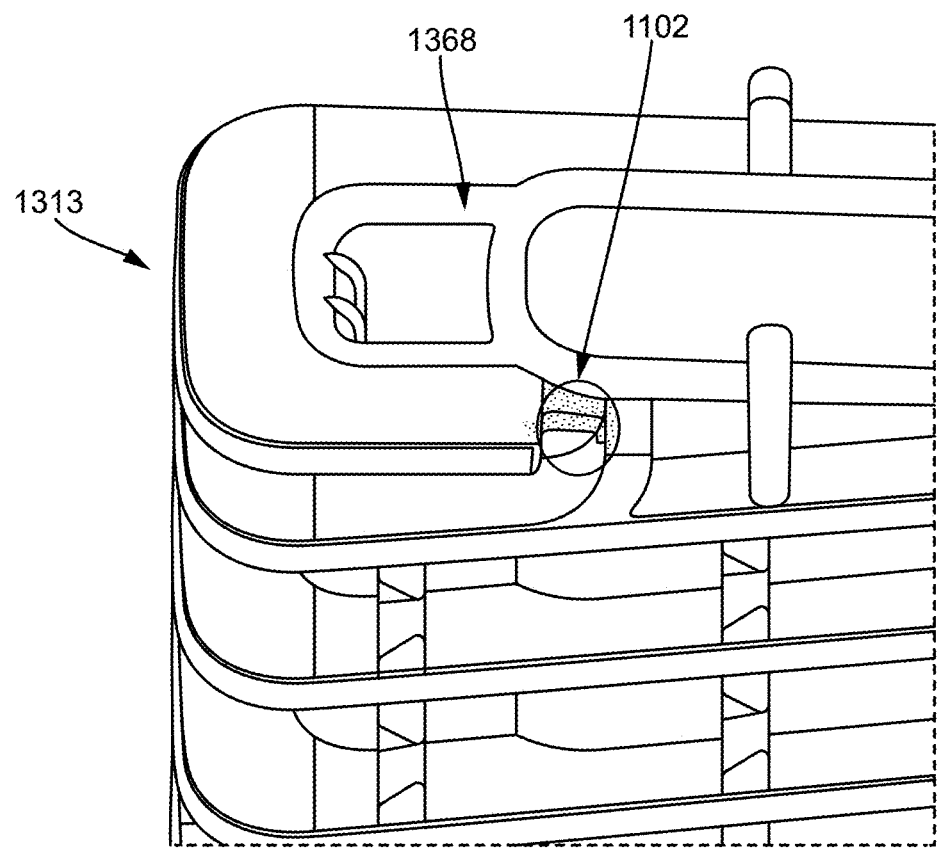
FIG. 11H illustrates a perspective close-up view of an example collector structure with one or more vents that may control liquid flow between a storage chamber and an overflow volume in a cartridge, in accordance with one or more implementations.

Referring to FIG. 11H, in some embodiments, the gate 1102 may be constructed to include an aperture or opening configuration that, similar to a constriction point 1111a or 1111b, has a tapered edge, rim, or flange that is more flat in one direction. For example, the rim of the gate 1102 aperture may be shaped to be flat on one side (e.g., the side facing towards the storage chamber 1342) and rounded on another side (e.g., the side facing away from the storage chamber 1342). In such a configuration, the microfluidic forces encouraging flow back toward the storage chamber 1340 over flow away from the storage chamber 1340 may be enhanced due to easier meniscus detachment on the less-rounded side relative to the more-rounded side.

Accordingly, depending on implementation and variations in the structure or construction of the constriction points and the gate 1102, the resistance to flow of vaporizable material 1302 out of the collector 1313 may be higher than the resistance to flow of vaporizable material 1302 into the collector 1313 and toward the storage chamber 1340. In certain implementations, the gate 1102 is constructed to maintain a liquid seal such that a layer of vaporizable material 1302 is present at the medium where the storage chamber 1342 communicates with the overflow channel 1104 in the overflow volume 1344. The presence of a liquid seal may help maintain a pressure equilibrium between the storage chamber 1342 and the overflow volume 1344 to promote a sufficient level of vacuum (e.g., partial vacuum) in the storage chamber 1342 to prevent vaporizable material 1302 from completely draining into the overflow volume 1344, as well as avoiding the wicking element 1362 being deprived of adequate saturation.

In one or more example implementations, a single passageway or channel in the collector 1313 may be connected to the storage chamber 1342 by way of two vents, such that the two vents maintain a liquid seal regardless of the positioning of the cartridge 1320. The formation of a liquid seal at the gate 1102 may also help prevent the air in the collector 1313 from entering the storage chamber 1342 even when the cartridge 1320 is held diagonally with respect to the horizon or when the cartridge 1320 is positioned with the mouthpiece facing downward. This is because if air bubbles from the collector 1313 enter the reservoir, the pressure inside the storage chamber 1342 will be equalized with that of ambient pressure. That is, the partial vacuum inside the storage chamber 1342 (e.g., created as a result of vaporizable material 1302 being drained through the wick feeds 1368) would be offset, if ambient air flows into the storage chamber 1342.

Figure 11I:
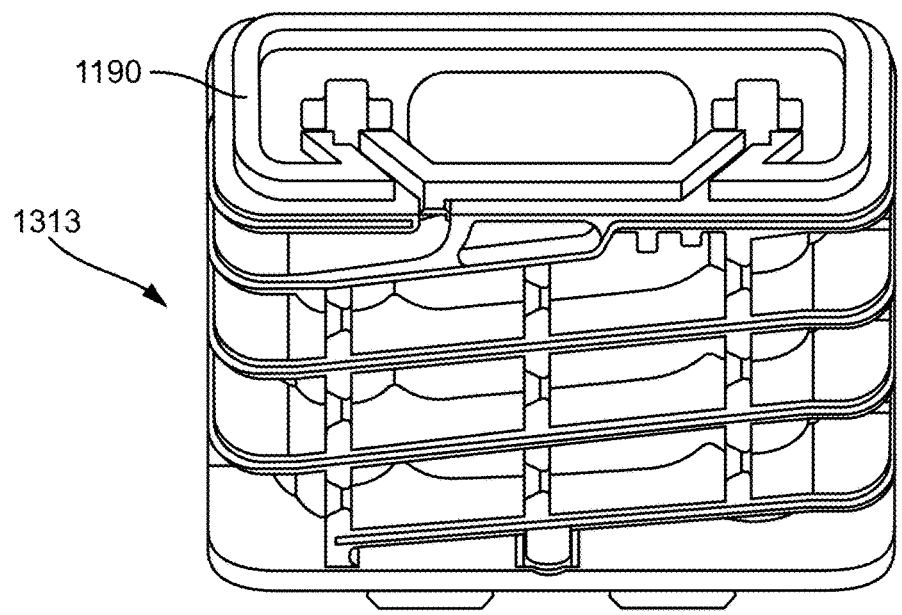
FIGS. 11I through 11K illustrate perspective views of an example collector structure with flow management control, in accordance with one or more implementations.
Figure 11J:
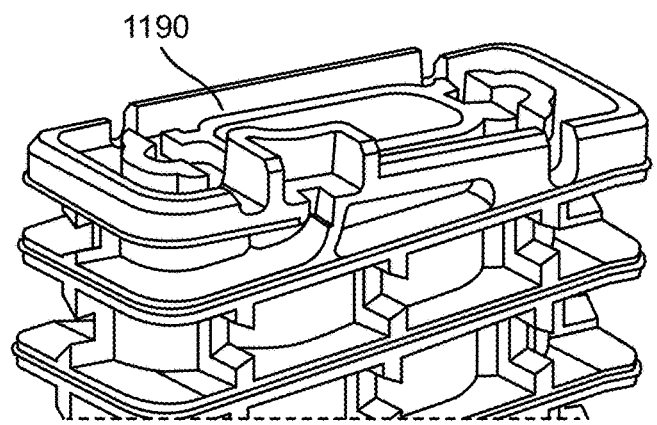
Figure 11K:
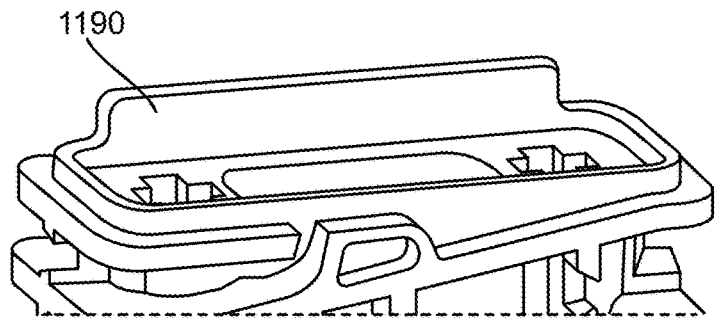

Referring to FIGS. 11I through 11K, perspective views of alternative gate 1102 configurations for the collector 1313 structure are provided. These alternative configurations may provide advantages relating to air and/or liquid vaporizable material 1302 flow management and control. In some scenarios, headspace vacuum may not be maintained when the empty space (i.e., the headspace above the vaporizable material 1302) in the storage chamber 1342 contacts the gate 1102. As a result, as noted earlier, the liquid seal established at the gate 1102 may be broken. This effect may be due to the gate 1102 being unable to maintain a fluidic film as the collector 1313 is drained and headspace comes into contact with the gate 1102, leading to a loss of partial headspace vacuum.

In certain embodiments, the headspace in the storage chamber 1342 may have ambient pressure and if there exists a hydrostatic offset between the gate 1102 and the atomizer in the cartridge 1320, the contents of the storage chamber 1342 drain into the atomizer resulting in wick-box flooding and leaking. To avoid leakage, one or more embodiments may be implemented to remove the hydrostatic offset between the gate 1102 and the atomizer and maintain gate 1102 functionality when the storage chamber 1342 is nearly drained.

As shown in the example embodiments of FIGS. 11I and 11J, miniaturized divider walls or maze-shaped structures 1190 may be constructed around the gate 1102 to establish a high-drive connection between the gate 1102 and the overflow channel 1104 in the collector 1313 to maintain the liquid seal at the gate 1102. In the example of FIG. 11J, a moat-shaped structure 1190 is shown as a means to further improve the maintenance of the liquid seal at the gate 1102 in accordance with one or more implementations.

Controlled Fluidic Gate Embodiments

Figure 11L:
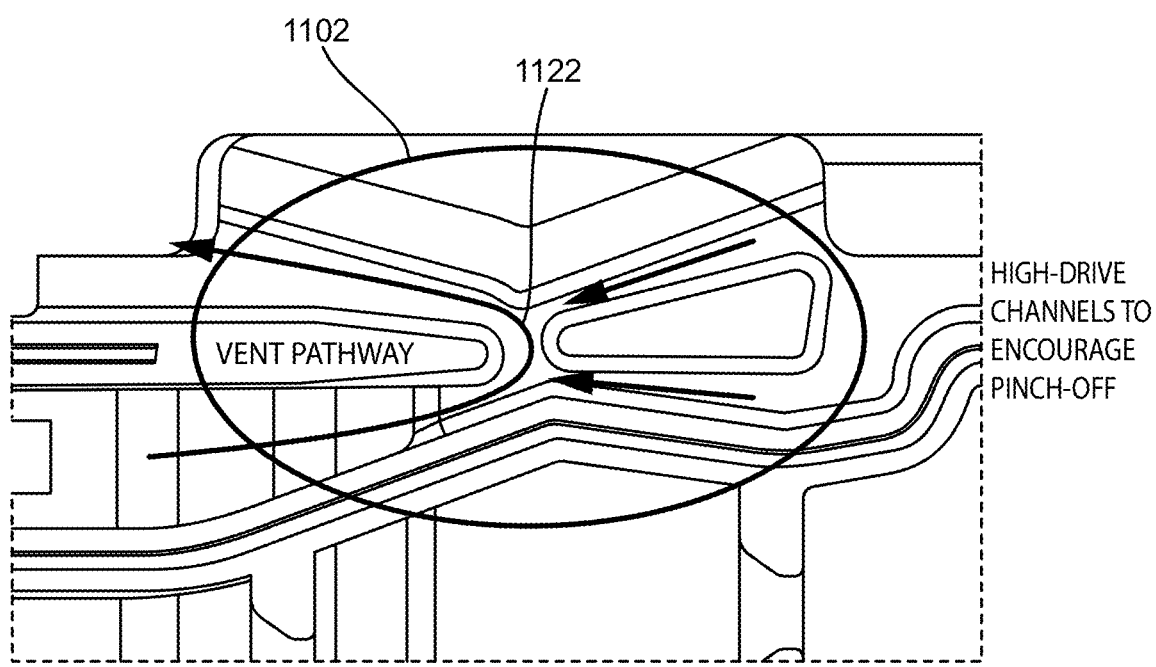
FIG. 11L through 11N illustrate frontal planar and close-up views of an example flow management mechanism in the collector structure, in accordance with one implementation.
Figure 11M:
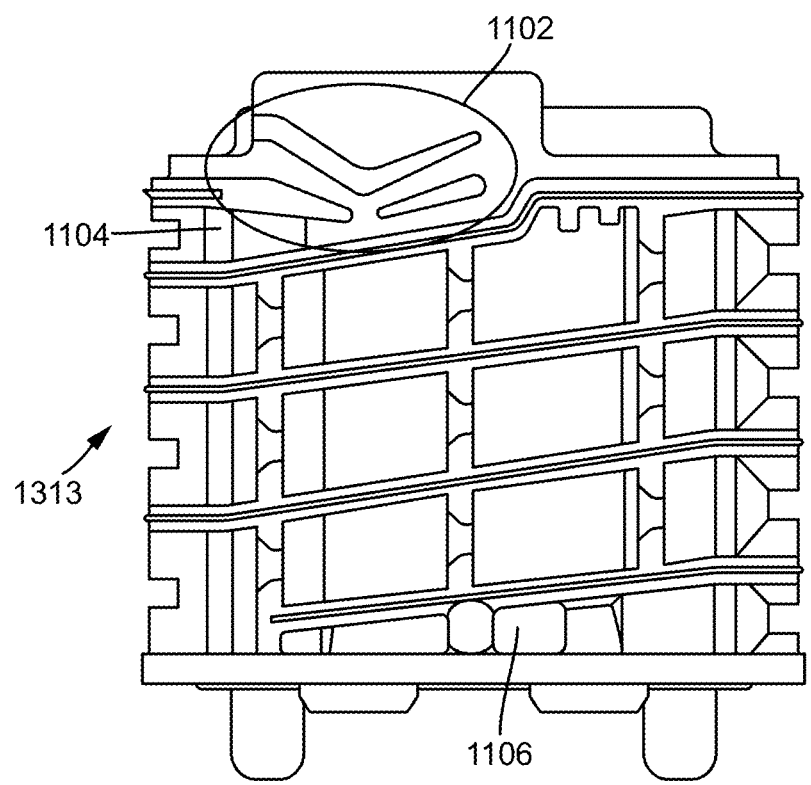
Figure 11N:
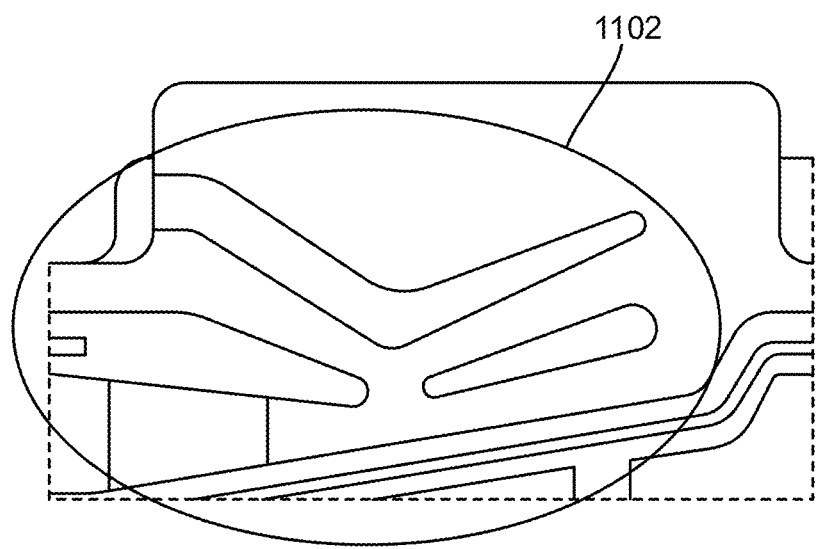

FIGS. 11L through 11N illustrate planar and close-up views of a controlled fluidic gate 1102 in the collector 1313 structure, in accordance with one or more implementations. As shown, the passageway or overflow channel 1104 in the collector 1313 may be connected to the storage chamber 1342 by way of a V-shaped or horn-shaped controlled fluidic gate 1102, for example, such that the V-shaped gate 1102 includes at least two (and desirably three) openings that are connected to the storage chamber 1342. As provided in further detail herein, a liquid seal may be maintained at the gate 1102 regardless of the vertical or horizontal orientation of the cartridge 1320.

As shown in FIG. 11L, on a first side of the vent, a vent pathway may be maintained between the overflow channel 1104 and the gate 1102 through which air bubbles can escape from the overflow channel 1104 in the collector into the reservoir. On a second side, one or more high-drive channels connected to the reservoir may be implemented to encourage pinch-off at a pinch-off point 1122 to maintain a liquid seal that prevent the premature venting of air bubbles out of the overflow channel 1104 and into the reservoir, as well as the undesirable entry of air or vaporizable material 1302 into the overflow channel 1104 from the reservoir.

Depending on implementation, the high-drive channels, shown by way of example on the right side of FIG. 11L, are preferably maintained sealed due to the capillary pressure exerted by the liquid vaporizable material 1302 in the cartridge reservoir. The low-drive channels formed on the opposite side (i.e., shown on left side in FIG. 11L) may be configured to have a relatively lower capillary drive in comparison to the high-drive channels but still have a sufficient capillary drive such that in, a first pressure state, a liquid seal is maintained in both the high-drive channels and the low-drive channels.

Accordingly, in the first pressure state (e.g., when the pressure inside the reservoir is approximately equal to or more than the ambient air pressure), then a liquid seal is maintained in both the low-drive and high-drive channels, preventing any air bubbles from flowing into the reservoir. Conversely, in a second pressure state (e.g., when the pressure inside the reservoir is less than the ambient air pressure), air bubbles formed in the overflow channel 1104 (e.g., by way of entry through the air exchange port 1106), or more generally a leading meniscus edge of a liquid vaporizable material-air interface may travel up and toward the controlled fluidic gate 1102. As the meniscus reaches the pinch-off point 1122 positioned between the low-drive and high-drive channels of the vent 1104, the air is preferentially routed through the low-drive channel or channels, due to a higher capillary resistance being present in the high-drive channel(s).

Once the air bubbles have passed through the low-drive channel portion of the gate 1102, the air bubbles enter the reservoir and equalize the pressure inside the reservoir with that of ambient air. As such, the air exchange port 1106 in combination with the controlled fluidic gate 1102 allows for the ambient air entering through the overflow channel 1104 to pass through into the reservoir, until an equilibrium pressure state is established between the reservoir and the ambient air. As noted earlier, this process may be referred to as the reservoir venting. Once an equilibrium pressure state is established (e.g., a transition from a second pressure state back to a first pressure state) then a liquid seal is again established at the pinch-off point 1122, due to the presence of liquid in both the high-drive channels and the low-drive channels that are fed by the liquid vaporizable material 1302 stored in the reservoir.

FIGS. 11O through 11X illustrate snapshots in time as the flow of air, collected in the example collector 1313 of FIGS. 11L through 11N, is managed to accommodate proper venting as the meniscus of vaporizable material 1302 continues to recede.

Figure 11O:
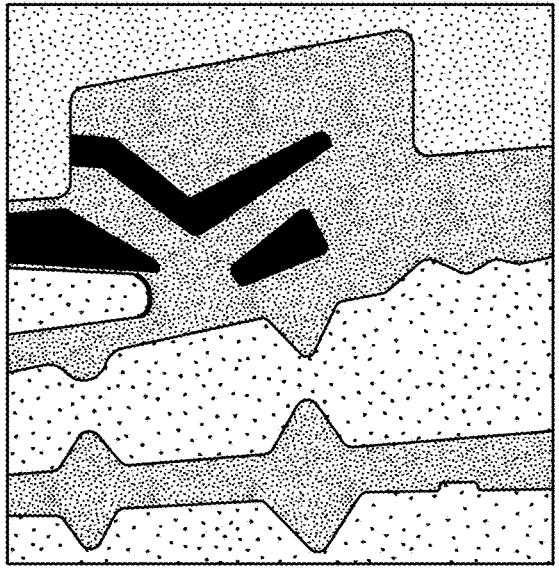
FIG. 11O through 11X illustrate snapshots in time as the flow of vaporizable material collected in the example collector of FIGS. 11L through 11N is managed to accommodate proper venting as the meniscus of vaporizable material stored in the overflow volume continues to recede, in accordance with one implementation.

FIG. 11O illustrates a receding meniscus where, as vaporizable material 1302 is removed from the reservoir into the wick, the partial headspace vacuum increases in strength. This is sufficient to overcome the receding capillary drive of the meniscus, moving the meniscus back through the collector towards the constriction point where the meniscus will see the highest pressure differential across as dictated by the geometry.

Figure 11P:
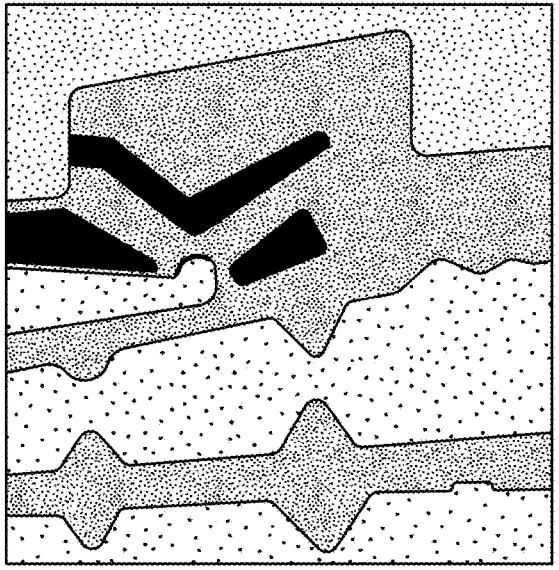

FIG. 11P illustrates how the meniscus crosses a first joint in the gate 1102, as the meniscus approaches the gate 1102. At this first joint, the headspace partial vacuum is maximized as it corresponds to the smallest geometry in the gate 1102 structure, and partial vacuum in the reservoir continues to grow until this point.

Figure 11Q:
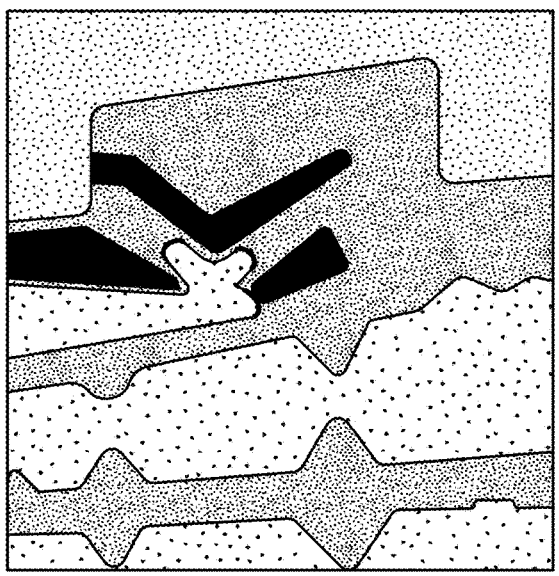

FIG. 11Q illustrates how multiple menisci recede as the headspace reaches the maximum partial vacuum. The menisci are at their tightest curvature across their principal planes and at these locations the drain pressures of the three channels are equal and three menisci recede simultaneously as opposed to solely from one channel. As the curvature of these menisci are now increasing as they recede, the pressure difference sustained across them decreases and the headspace partial vacuum thus begins to decrease.

Figure 11R:
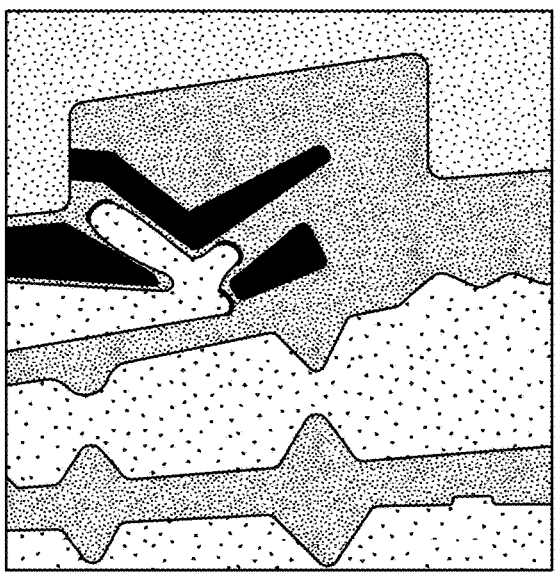

FIG. 11R illustrates how secondary menisci begin to fill the capillary channels. The tapers on these channel geometries are such that as the menisci continue to recede, the capillary drive of the primary channel decreases at a greater rate than that of the secondary channels. This gradual reduction in capillary drive will reduce the partial headspace vacuum maintained. When the drain pressure of the primary meniscus drops below the drain pressure of the secondary channels, this meniscus will continue to drain while the other menisci remain static. The drain pressure, involving the receding contact angle of the primary channel, may drop below the flooding pressure, involving the advancing contact angle of the secondary channels, causing them to refill as shown in the figures.

Figure 11S:
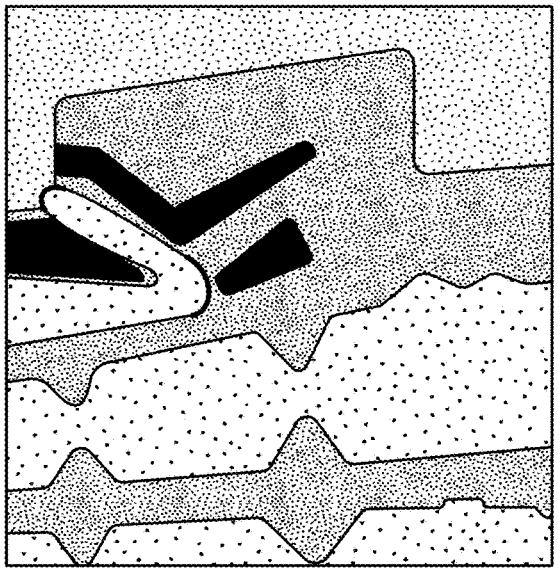

FIG. 11S illustrates how secondary menisci from one of the two menisci in each secondary channel will reach a point of tangency where the two menisci merge to become one. This combined meniscus will have increased curvature and thus a lower capillary drive. The higher drive of the primary meniscus may cause the system to momentarily react by making the primary meniscus the advancing meniscus. Subsequent receding of the primary meniscus will likely occur with the secondary meniscus held at this location.

Figure 11T:
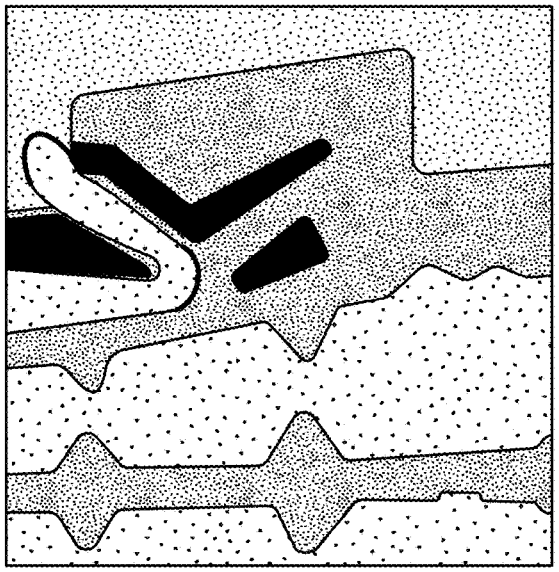

FIG. 11T illustrates how the secondary meniscus moves towards the collector. In a scenario when the storage chamber is full of liquid, the primary meniscus will continue to recede, further reducing the headspace partial vacuum as its curvature increases. As the partial vacuum drops below the advancing capillary pressure of the secondary meniscus, the secondary meniscus will begin to proceed once more, driving to close the gap. In a scenario when the storage chamber is empty or near empty, the liquid seal at the gate 1102 will be stable until the bubble ruptures, connecting the headspace to ambient.

Figure 11U:
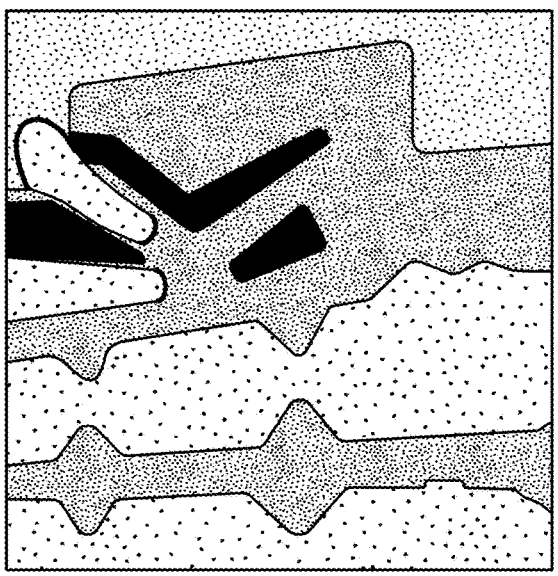

FIG. 11U illustrates how the secondary meniscus closes the joint at the gate 1102. As the secondary meniscus will advance until it meets the apex of the corner in the primary channel, the geometry is designed to encourage the secondary meniscus to split to fill both the gate 1102 and the collector 1313 channels. These two newly formed menisci may act to isolate the headspace from ambient air and thus a headspace partial vacuum can be re-established, ensuring that leaking via the liquid feed channels is mitigated. As the newly formed menisci have smaller curvatures than prior to splitting, the newly formed menisci will continue to proceed into the channels due to increased capillary drive.

Figure 11V:
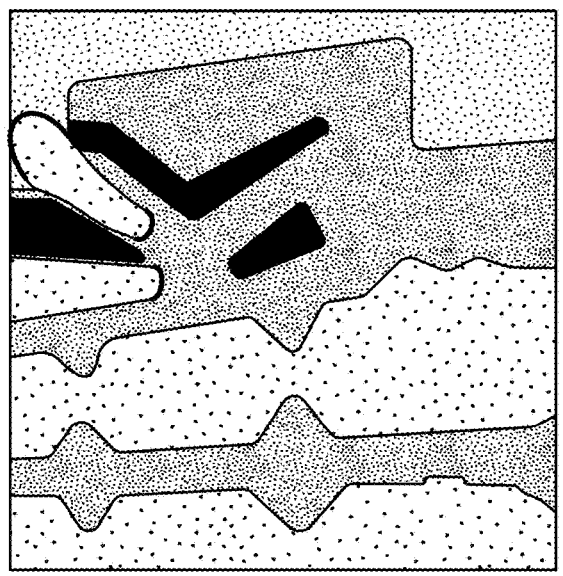
Figure 11W:
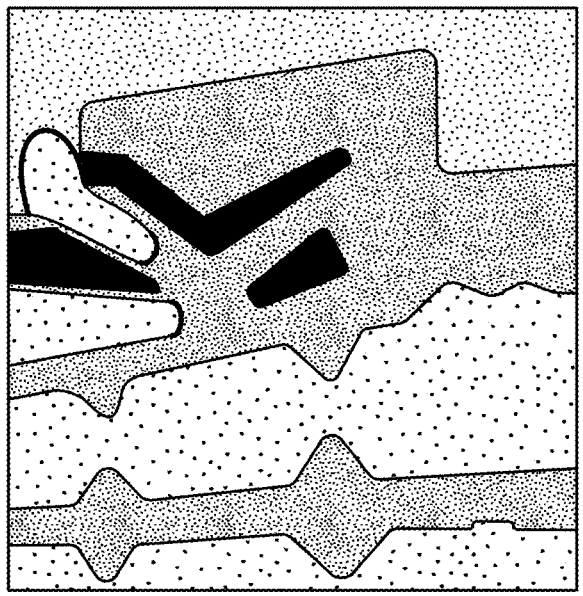
Figure 11X:
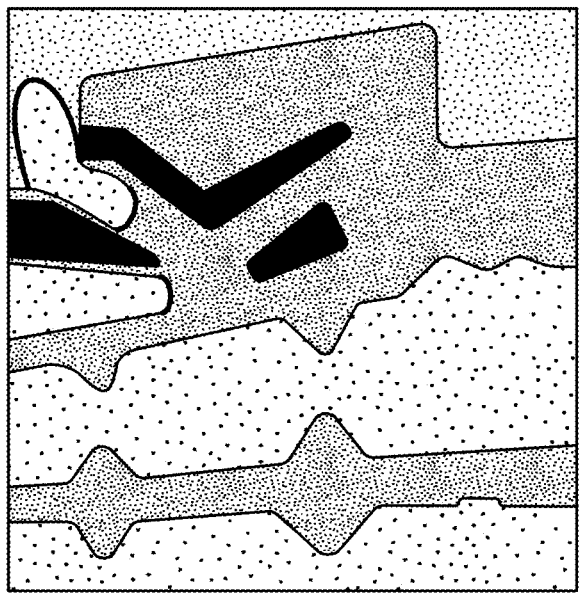

FIGS. 11V through 11X illustrate bubble release into the storage chamber 1342. The pressure within the cartridge 1320 at this point reaches stability as the air bubble trapped in the main meniscus channel is ejected by the imbalance created by the advancing and receding menisci. Vaporizable material 1302 is then allowed to enter and displace the bubble through the right top channel. Accordingly, while a high drive channel structure may be provided via a closed moat near the gate 1102, a shorter moat may be instead utilized to reduce the risk of bubbles becoming trapped.

In some implementations, tapered channels may be designed to increase drive towards the controlled vent. Considering the pinch-off of the two advancing menisci, the reservoir's tank wall and channel bottom may be configured to continue to provide drive, while the sidewalls provide a pinch-off location for the menisci. In one configuration, the net drive of the advancing menisci does not exceed that of the receding meniscus, thus maintaining the system statically stable.

Multi-Gate Multi-Channel Collector Embodiments

Figure 12A:
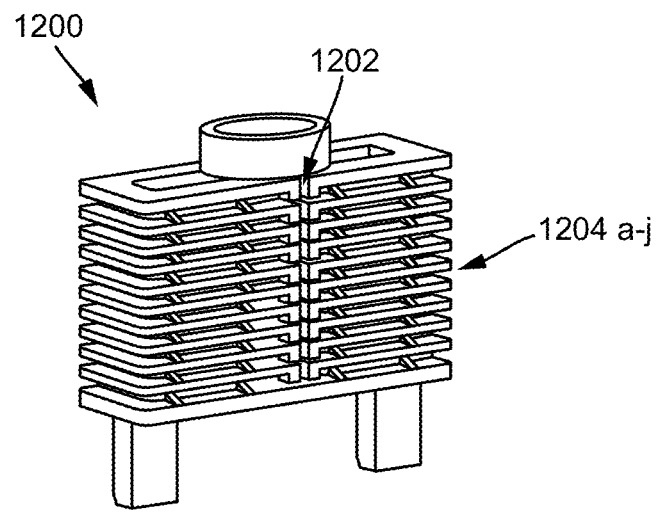
FIGS. 12A and 12B illustrate examples of single-vent multi-channel collector structures, in accordance with one or more implementations.
Figure 12B:
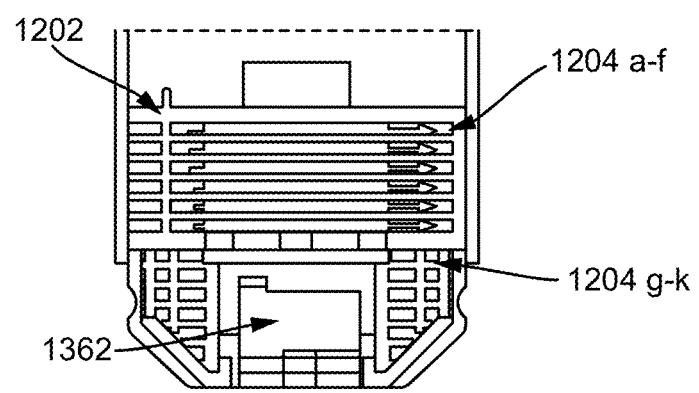

Referring to FIGS. 12A and 12B, an example perspective side view and an example planar side view of embodiments of a single-vent, multi-channel collector 1200 structure are illustrated. As shown in FIG. 12A, the collector 1200 is formed to have a single gate 1202 and multiple channels 1204(a) through 1204(j). As shown in FIG. 12A, in accordance with one or more implementations, the gate 1202 may be positioned at for example a central or midpoint of the longitudinal width of the collector 1313 to allow vaporizable material 1302 to enter at least a first channel 1204(a) of the collector 1313 and gradually spread into and through additional channels 1204(b)-1204(j).

Position of the gate 1202 may be modified depending on implementation to be in the middle, side or a corner or any other location along the length or width of the collector 1313. A single-vent, multi-channel collector 1200 structure may have the added advantage of allowing the vaporizable material 1302 to enter through a single gate 1202 at a first flow rate and spread at a second flow rate (e.g., a faster rate than the first rate) through multiple channels 1204(a)-1204(j) of the collector 1200.

Advantageously, a single-gate, multi-channel collector 1200 structure allows for controlled flow (e.g., restricted flow) of the vaporizable material 1302 from the storage chamber 1342 into the overflow volume 1344 (see FIG. 3A) and further allows for a less controlled (e.g., less restricted) flow once the vaporizable material 1302 is in the overflow volume 1344. In certain embodiments, a multi-tiered multi-channel structure may be implemented, such that, as shown in FIG. 12B, for example, the flow of the vaporizable material 1302 in a first set of channels 1204(a)-1204(f) is at a second rate and the flow of the vaporizable material 1302 in a second set of channels 1204(g)-1204(k) is at a third rate. The third rate may be faster or slower than the second rate.

Accordingly, in the example embodiment show in FIG. 12B, the vaporizable material 1302 may flow through the gate 1202 at a first rate, through channels 1204(a)-1204(f) at a second rate, and through channels 1204(g)-1204(k) at a third rate. In one or more embodiments, the second rate may be faster than both the first rate and the third rate, for example, so that the vaporizable material 1302 may have a restricted flow through the gate 1202, a less restricted flow through the first set of channels (e.g., tier 1) and a relatively more restricted flow in the second set of channels (e.g., tier 2). This multi-tier configuration may help improve flow rate through the collector 1200 but maintain a controllable restriction against a rapid flow of the vaporizable material 1302 toward the wicking element 1362, once the vaporizable material 1302 has entered the collector 1200.

In the double-tier embodiment shown in FIG. 12B, the first set of channels 1204(*a*)-1204(*f*) (e.g., tier 1) may have reversible configuration such that the vaporizable material 1302 collected in the first set of channels may flow back to the reservoir 1340. The second set of channels 1204(*g*)-1204(*k*) (e.g., tier 2), conversely, may not have reversible configurations. In such embodiments, because of the proximity of the second set of channels to the wicking element 1362, the vaporizable material 1302 is primarily drawn from the second set of channels and then from the first set of channels (e.g., tier 1 acting as a reserve compartment). Having a reversible and nonreversible construction, as discussed above, may help provide additional improvements over the other embodiments discussed herein.

In some multi-tiered embodiments, by configuring the second set of channels 1204(*g*)-1204(*k*) as nonreversible, there may be an extra assurance that the wicking element 1362 will not be starved as the vaporizable material 1302 may be available at a close proximity to the wicking element 1362 when stored in the second set of channels 1204(*g*)-1204(*k*) during an overflow event. Further, the chance for a strong flow of the vaporizable material 1302 into the wick housing during a negative pressure event may be prevented in multi-tiered implementations, because as provided earlier the second set of channels 1204(*g*)-1204(*k*) may be configured to have a more restrictive flow as compared to the first set of channels 1204(*a*)-1204(*f*). Further, due to reversibility, the first set of channels 1204(*a*)-1204(*f*) may not contain a relatively large volume of the vaporizable material 1302. In some embodiments, in order to increase or limit the reversibility or the flow of the vaporizable material 1302 in the first set of channels 1204(*a*)-1204(*f*) or the second set of channels 1204(*g*)-1204(*k*), absorbent material (e.g., sponges) may be introduced into one or both channel areas.

Figure 13:
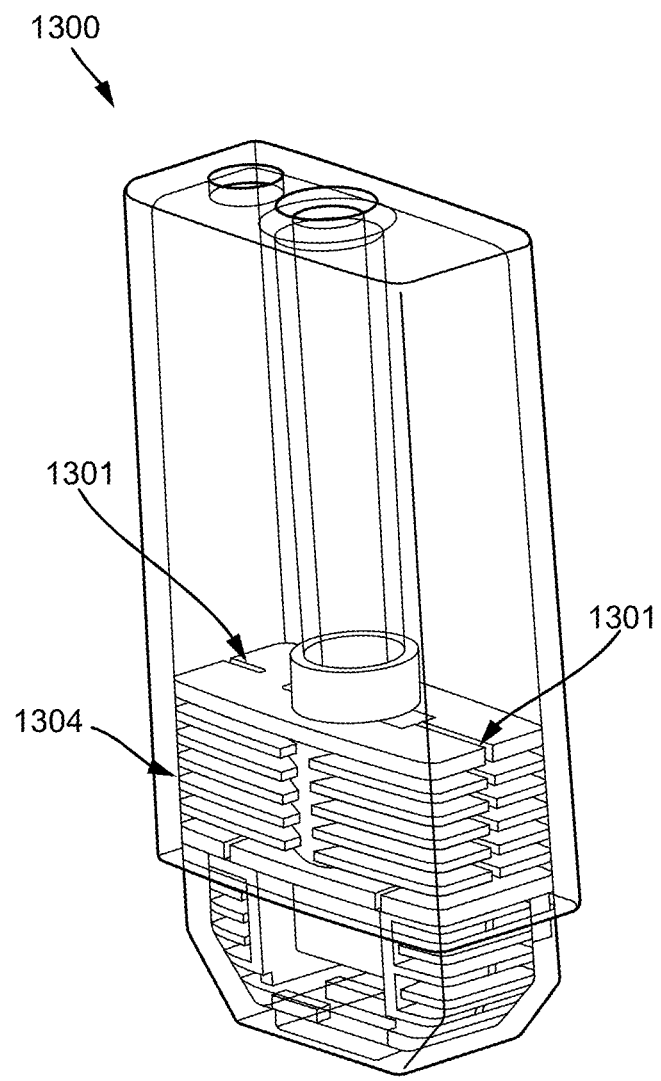
FIG. 13 illustrates an example double-vent multi-channel collector structure, in accordance with one or more implementations.

Referring to FIG. 13, an example perspective side view of a multi-vent, multi-channel collector 1300 structure is illustrated, in accordance with one or more implementations. As shown, the collector 1300 may be positioned inside a cartridge such that the collector 1300 has dual vents 1301. This implementation may allow for the vaporizable material 1302 to flow into the channels 1204 at a relatively faster rate, particularly in comparison to a single-vent collector 1200 shown in FIGS. 21A and 12B.

Wick Feed Embodiments

Referring back to FIGS. 10C, 10D, 11B, in certain variations, the collector 1313 may be configured to be insertably received by a receiving end of the storage chamber 1342. The end of the collector 1313 that is opposite to the end that is received by the storage chamber 1342 may be configured to receive a wicking element 1362. For example, fork-shaped projections may be formed to securely receive the wicking element 1362. A wick housing 1315 may be used to further secure the wicking element 1362 in a fixed position between the projections. This configuration may also help prevent the wicking element 1362 from substantial swelling and becoming weak due to over saturation.

Referring to FIGS. 11C, 11D, and 11E, depending on implementation, one or more additional ducts, channels, tubes or cavities that travel through the collector 1313 and may be constructed or configured as paths that feed the wicking element 1362 with vaporizable material 1302 stored in the storage chamber 1342. In certain configurations, such as those discussed in further detail herein, the wick feeding ducts, tubes or cavities (i.e., wick feeds 1368) may run approximately parallel to the central tunnel 1100. In at least one configuration, multiple wick feeds may be present that run diagonally along the length of the collector 1313, for example, either independently or in connection with a wick exchange, including one or more other wick feeds.

In certain embodiments, a plurality of wick feeds may be interactively connected in a multi-linked configuration such that an interchange of feeding paths, possibly crossing one another, may lead to the wick housing area. This configuration may help prevent complete blockage of the wick feeding mechanism if, for example, one or more feeding paths in the wick feed interchange are obstructed by way of the formation of gas bubbles or other types of clogging. Advantageously, instrumentation of multiple feeding paths may allow for vaporizable material 1302 to safely travel through one or more paths (or crossover to a different but open path) toward the wick housing area, even if some of the paths or certain routes in the wick feed interchange are fully or partially clogged or blocked.

Depending on implementation, a wick feed path may be shaped to be tubular with, for example, a circular or multi-faceted cross-diameter shape. For example, the hollow cross-section of the wick feed may be triangular, rectangular, pentagonal or in any other suitable geometrical shape. In one or more embodiments, the cross-sectional perimeter of the wick feed may be in shape of a hollow cross, for example, such that the arms of the cross have a narrower width in relationship to the diameter of the central crossover portion of the cross from which the arms extend. More generally, a wick feed channel (also referred to herein as a first channel) may have a cross-sectional shape with at least one irregularity (e.g., a protrusion, a side channel, etc.) that provides an alternative path for liquid vaporizable material to flow through in the even that an air bubble blocks the remainder of the cross-sectional area of the wick feed. The cross-shaped cross-section of the current example is an example of such a structure, but a skilled artisan will understand that other shapes are also contemplated and feasible consistent with the current disclosure.

A cross-shaped duct or tube implementation that is formed through a wick feed path may overcome clogging problems because a cross-shaped tube may be essentially considered as including five separate pathways (e.g., a central pathway formed at the hollow center of the cross and four additional pathways formed in the hollow arms of the cross). In such implementation, a blockage in the feeding tube by way of a gas bubble, for example, will likely be formed at the central portion of the cross-shaped tube, leaving sub-pathways (i.e., pathways that go through the arms of the cross-shaped tube) open to flow.

In accordance with one or more aspects, wick-feeding pathways may be sufficiently wide to allow for free travel of vaporizable material 1302 through the feeding pathways and toward the wick. In some embodiments, the flow through the wick feed may be enhanced or accommodated by way of devising the relative diameter of certain portions of the wick feed to enforce capillary pull or pressure on the vaporizable material 1302 travelling through a wick feed path. In other words, depending on the shape and other structural or material factors, some wick feeding pathways may rely on gravitational or capillary forces to induce movement of vaporizable material 1302 toward the wick-housing portion.

In the cross-shaped tube implementation, for example, the feeding paths that go through the arms of the cross-shaped tube may be configured to feed the wick by way of capillary pressure instead of reliance on gravitational force. In such implementation, the central portion of the cross-shaped tube may feed the wick due to gravitational force, for example, while the flow of vaporizable material 1302 in the arms of the cross-shaped tube may be supported by capillary pressure. It is noted that the cross-shaped tube disclosed herein is for the purpose of providing an example embodiment. The concepts and functionality implemented in this example embodiment may be extended to wick feed paths with different cross-sectional shapes (e.g., tubes with hollow star-shaped cross-sections having two or more arms extending from a central tunnel running along a wick feed path).

Referring to FIG. 11C, an example collector 1313 construction is illustrated in which two wick feeds 1368 are positioned on two opposite sides of the central tunnel 1100 such that vaporizable material 1302 may enter the feeds and flow directly towards the cavity area at the other end of the collector 1313, where the housing for the wick is formed.

Wick feed mechanisms may be formed through the collector 1313 such that at least one wick feed path in the collector 1313 may be shaped as a multifaceted cross-diameter hollow tube. For example, the hollow cross-section of the wick feed may be in shape of a plus sign (e.g., a hollow cross-shaped wick feed if viewed from a top cross-sectional view), such that the arms of the cross have a narrower width in relationship to the diameter of the central crossover portion of the cross from which the arms extend.

A duct or tube with a cross-shaped diameter formed through a wick feed path may overcome clogging problems because a tube with a cross-shaped diameter may be considered as including five separate pathways (e.g., a central pathway formed at the hollow center of the cross and four additional pathways formed in the hollow arms of the cross). In such implementation, a blockage in the feeding tube by way of a gas bubble (e.g., air bubble) will likely be formed at the central portion of the cross-shaped tube.

Such central positioning of the gas bubble would ultimately leave sub-pathways (i.e., pathways that go through the arms of the cross-shaped tube) that remain open to flow of vaporizable material 1302, even when the central path is blocked by the gas bubble. Other implementations for a wick feed passageway structure are possible that can accomplish the same or similar objective as that disclosed above with respect to trapping gas bubbles or avoiding trapped gas bubbles from fully clogging the wick feed passageway.

The addition of more vents in the structure of the collector 1300 may allow for faster flow rates, depending on implementation, as a relatively larger collective volume of the vaporizable material 1302 may be displaced when additional vents are available. As such, even though not explicitly shown, embodiments with more than two vents (e.g., triple-vent implementations, quadruple-vent implementations, etc.) are also within the scope of the disclosed subject matter.

Figure 14A:
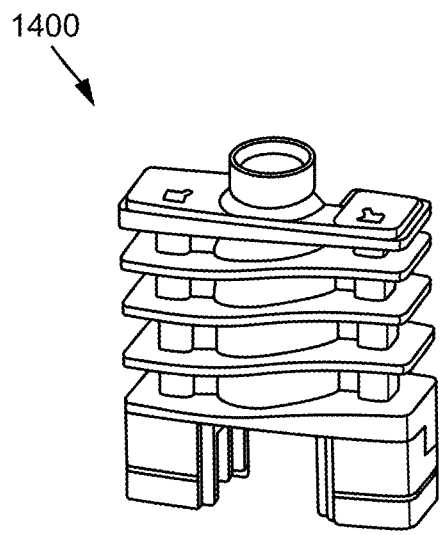
FIGS. 14A and 14B illustrate perspective and cross-sectional planar side views of an example collector structure for a cartridge with a dual wick feed, in accordance with one or more implementations.
Figure 14B:
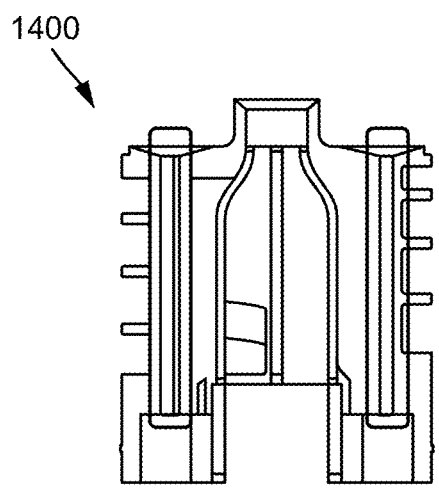

Referring to FIGS. 14A and 14B, certain embodiments may include a collector 1400 structure with dual feeds for the wick. In such embodiments, the wick may have a higher saturation level and less starvation chance in comparison to an embodiment in which a single feed is provided.

Figure 15A:
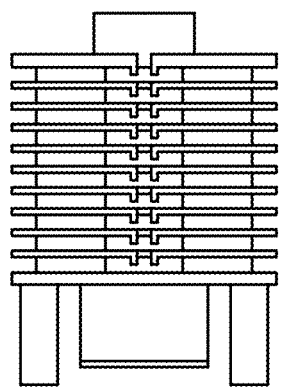
FIGS. 15A through 15C illustrate additional perspective and cross-sectional planar side views of an example collector structure for a dual wick feed structure, in accordance with one or more implementations.
Figure 15B:
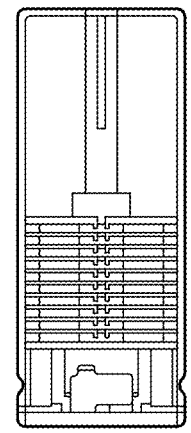
Figure 15C:
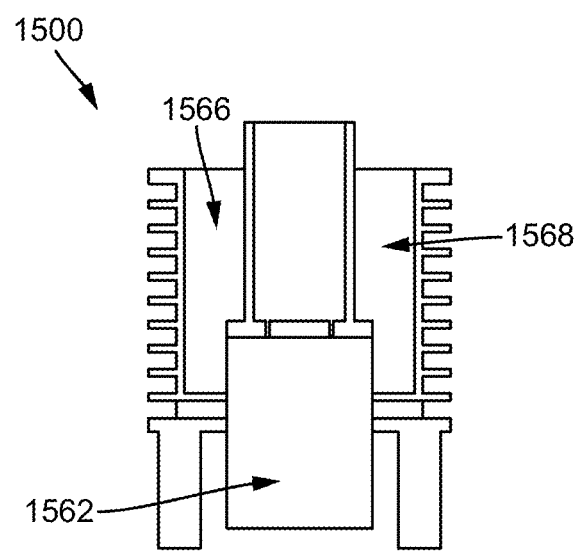
Figure 18A:
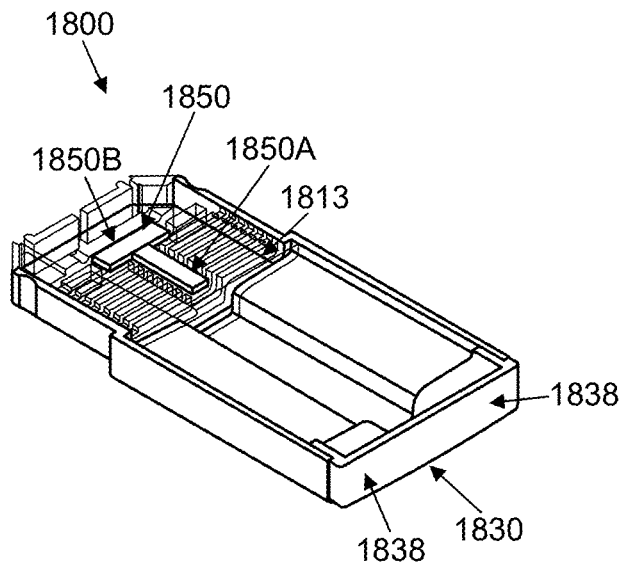
FIGS. 18A through 18D illustrate an example of a heating element and an airflow passageway in a vaporizer cartridge in accordance with one or more implementations.
Figure 18B:
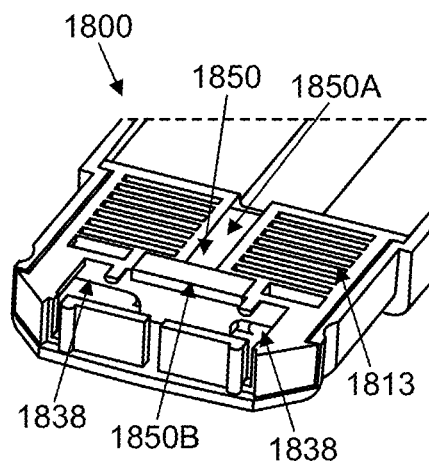
Figure 18C:
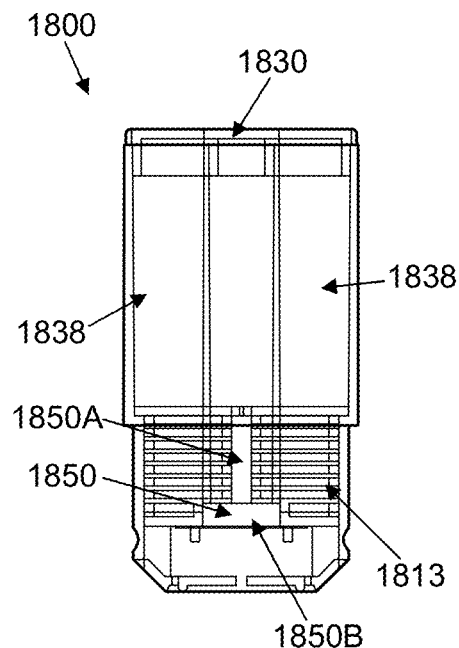
Figure 18D:
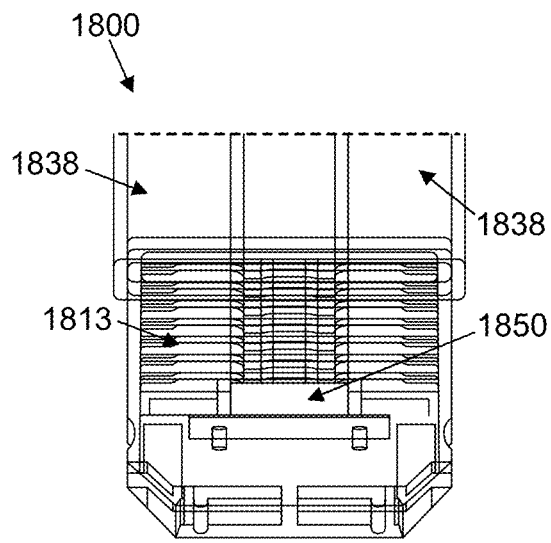

Referring to FIGS. 15A, 15B, and 15C, perspective and cross-sectional planar side views of an example collector structure for a dual feed wick 1562 are provided. As shown, a wick or wick 1562 may be disposed or housed in a cartridge 1500, such that at least two separate wick feeds 1566 and 1568 are provided to allow for the vaporizable material 1302 to travel toward an area of the cartridge 1500 where the wick 1562 is housed.

As noted earlier, a dual wick feed may have the advantage of providing the wick 1562 with, for example, twice the flow of the vaporizable material 1302 in comparison to a single wick feed alternative. Advantageously, a dual wick feed implementation provides ample feed to the wick 1562 and helps prevent a dry wick 1562 if, for example, one of the wick feeds is blocked. As shown, a lower portion of the wick 1562 may extend down into an area of the cartridge 1500 that forms the heating chamber or the atomizer.

Referring to FIG. 16A, a cross-sectional planar side view of an example cartridge is provided in which a dual-horn or dual feed wick 1562 is positioned within a collector structure. FIG. 16B is a planar cross-sectional side view of an example collector structure in which a wick 1562 may be housed. FIG. 16C provides an example perspective view of the cartridge, in accordance with one or more implementations. As shown, a first end of the wick 1562 may have two or more feeds, horns, or flanged ends for at least partially engaging two or more wick openings in a partition 1513 such that at least one of the flanged ends, for example, tangentially engages a volume in the storage chamber 1542 or, for example, at least partially extends into the volume in the storage chamber 1542.

In accordance with one or more implementations, the cartridge 1500 may include a reservoir with a storage chamber 1542 for storing the vaporizable material 1302. A secondary volume 1510 separable from the storage chamber 1542 may be also formed inside the cartridge 1500. The secondary volume 1510 may be in communication with the storage chamber 1542 via one or more wick feeds 1590. The secondary volume 1510 may be configured to at least house a wick 1562. The wick 1562 may be configured to absorb the vaporizable material 1302 traveling through the wick feed 1590 such that, in thermal interaction with an atomizer, the vaporizable material 1302 is absorbed in the wick 1562 and is converted to at least one of vapor or aerosol.

The wick 1562 may be at least partially confined by one or more heating elements of an atomizer positioned within the secondary volume 1510. A partition 1513 for at least partially separating the storage chamber 1542 from the secondary volume 1510 may be provided so that flow of the vaporizable material 1302 through the wick feeds 1590 is controllable. At least a first portion of the wick feed 1590 may be formed by at least one or more openings in the partition 1513.

At least a second portion of the wick feed 1590 may include a vaporizable material passageway connecting the one or more openings in the partition 1513 to the secondary volume 1510. An airflow passageway 1538 may be provided for connecting the secondary volume 1510 to a mouthpiece such that the vaporizable material 1302, which has been converted into vapor, travels out of the secondary volume 1510 toward the mouthpiece through the airflow passageway 1538.

Referring to FIGS. 16A, 16B, 16C, 17A, and 17B, a perspective view of a first side of a cartridge and a cross-sectional view of a second side of the cartridge having a wick 1562 that protrudes into the storage chamber 1542 are provided. The wick 1562 may include at least a first end 1592 and a second end 1594, the first end 1592 proximate to the partition 1513 and the second end extending distally in an opposite direction to the first end 1592.

A first end 1592 of the wick 1562 may at least partially protrude through a wick opening in the partition 1530 to at least partially extend into a volume in the storage chamber 1542. In one aspect, the first end 1592 of the wick 1562 may at least partially protrude through a wick opening in the partition 1530 to at least tangentially engage a volume in the storage chamber 1542.

Figure 26A:
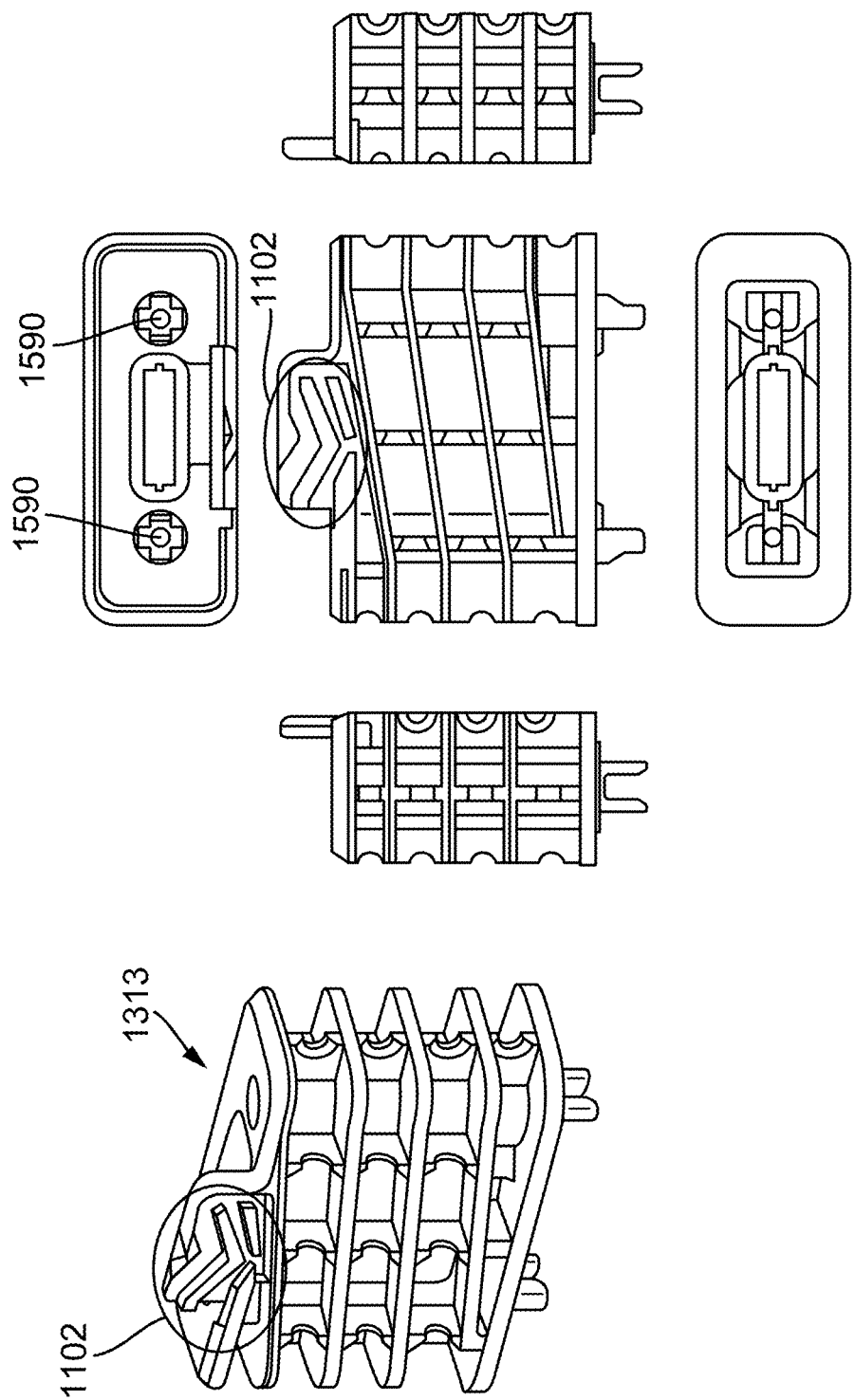
FIG. 26A illustrates perspective, frontal, side, bottom and top views of an example embodiment of a collector with a V-shaped vent.

FIG. 26A illustrates perspective, frontal, side, bottom and top views of an example embodiment of a collector 1313 with a V-shaped gate 1102. As shown in FIGS. 25 and 26, the collector 1313 may be fitted inside a hollow cavity in the cartridge 1320 along with the additional components (e.g., wicking element 1362, heating element 1350, and wick housing 1315). The wicking element 1362 may be positioned between a second end of the collector 1313 with the heating element 1350 wrapped around the wicking element 1362. During assembly, the collector 1313, wicking element 1362 and heating element 1350 may be fit together and covered by the wick housing 1315 before being inserted into the cavity inside the cartridge 1320.

The wick housing 1315 may be inserted along with the other noted components into an end of the cartridge 1320 that is opposite to the mouthpiece to hold the components inside in a pressure-sealed or pressure-fit manner. The seal or fit of the wick housing 1315 and collector 1313 inside the inner walls of the receiving sleeve of the cartridge 1320 is desirably sufficiently tight to prevent leakage of vaporizable material 1302 held in the reservoir of the cartridge 1320. In some embodiments, the pressure seal between the wick housing 1315 and the collector 1313 and the inner walls of the receiving sleeve of the cartridge 1320 is also sufficiently tight to prevent the manual disassembly of the components with a user's bare hands.

Figure 26B:
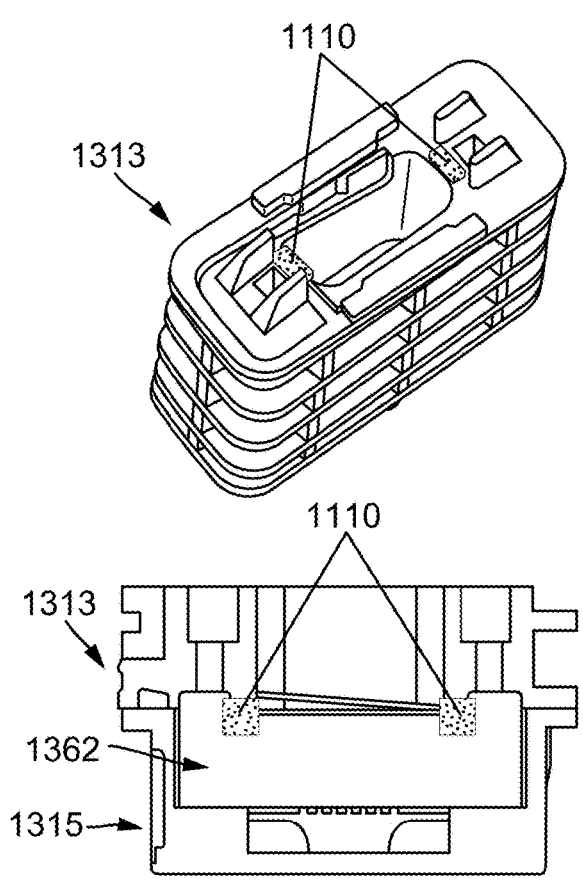
FIGS. 26B and 26C illustrate perspective and cross-sectional views of example collector structures from different viewing angles, with a focus on structural details for securing the placement of a wicking element and a wick housing in relation to an atomizer toward one end of a cartridge, in accordance with one or more implementations.
Figure 26C:
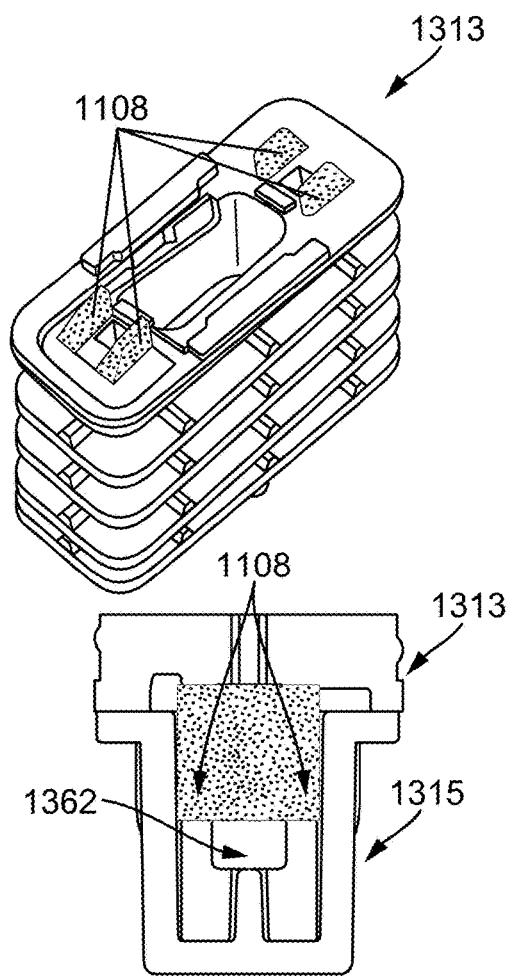

Referring to FIGS. 10C, 10D, 11B, 26B, and 26C, in certain variations, a collector 1313 may be configured to be insertably received by a receiving end of a storage chamber 1342. As shown in FIGS. 26B and 26C, the end of the collector 1313 that is opposite to the end that is received by the storage chamber 1342 may be configured to receive a wicking element 1362. For example, fork-shaped projections 1108 may be formed to securely receive the wicking element 1362. A wick housing 1315, as shown in the cross-sectional views toward the bottom of FIGS. 26B and 26C, may be used to further secure the wicking element 1362 in a fixed position between the fork-shaped projections 1108. This configuration may also help prevent the wicking element 1362 from substantial swelling and weakening due to over saturation.

Referring to FIG. 26B, in one embodiment, a wicking element 1362 may be constrained or compressed in certain locations along its length (e.g., toward the longitudinal distal ends of the wicking element 1362 positioned directly under wick feeds 1368) by way of compression ribs 1110 to help prevent leakage by, for example, maintaining a larger saturation area of the vaporizable material 1302 toward the ends of the wicking element 1362, so that the central part of the wicking element 1362 remains more dry and less leak prone. Further, use of compression ribs 1110 may further press the wicking element 1362 into the atomizer housing to prevent leakage into the atomizer.

Figure 26D:
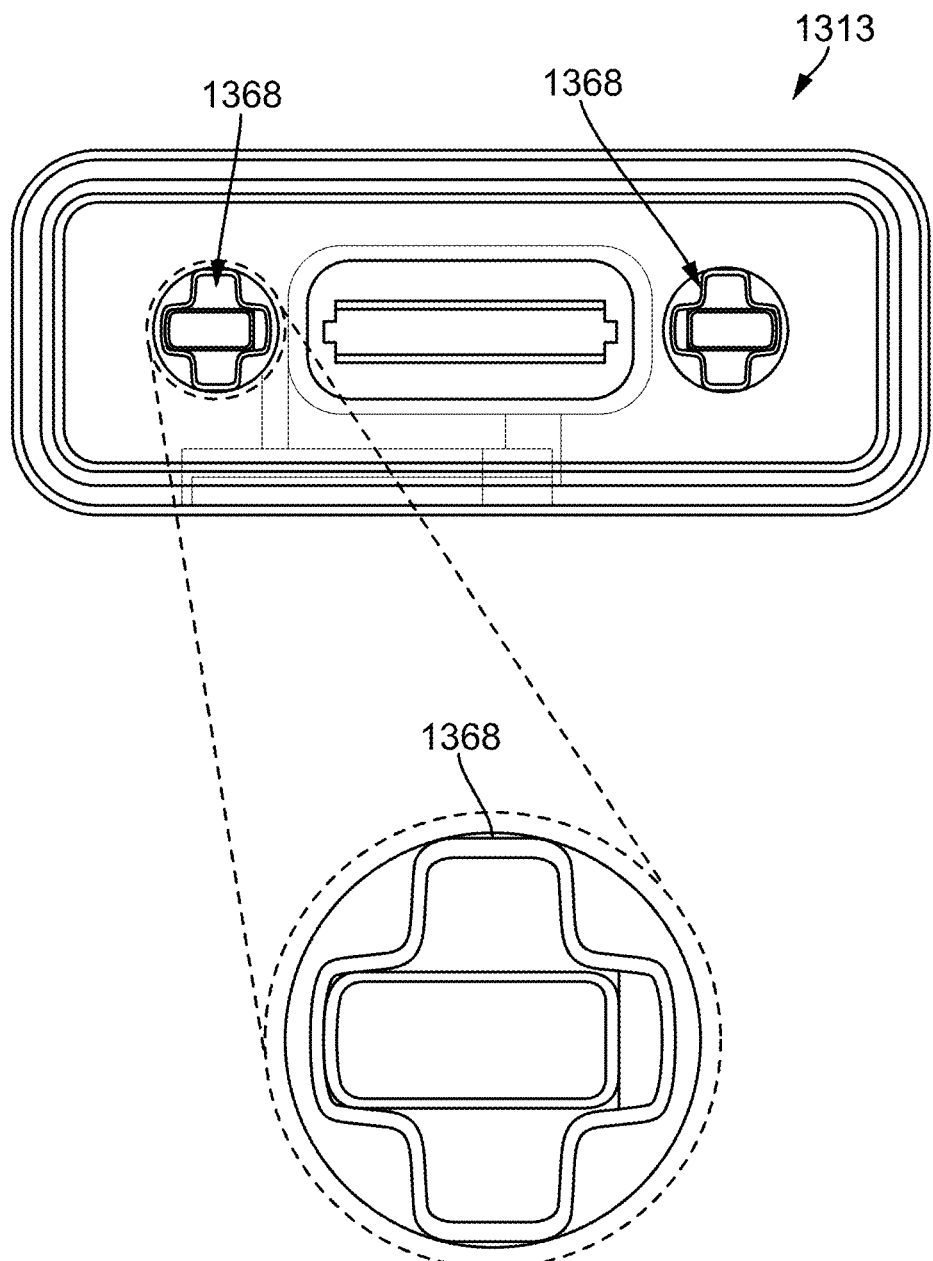
FIGS. 26D through 26F illustrate top planar views of example wick feed mechanisms formed or structured through the collector, in accordance with one or more implementations.
Figure 26E:
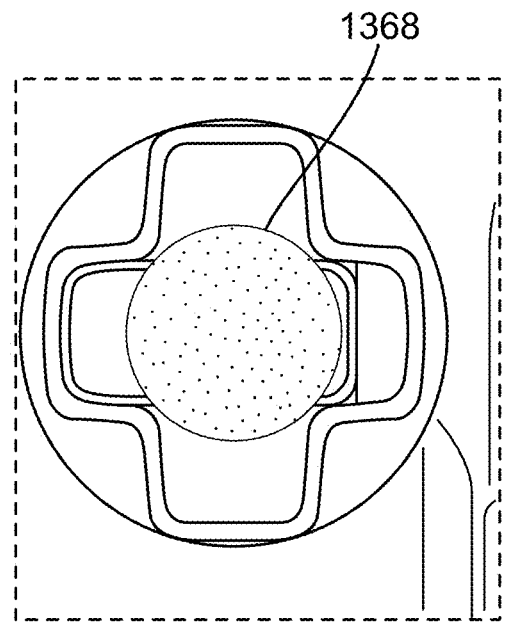
Figure 26F:
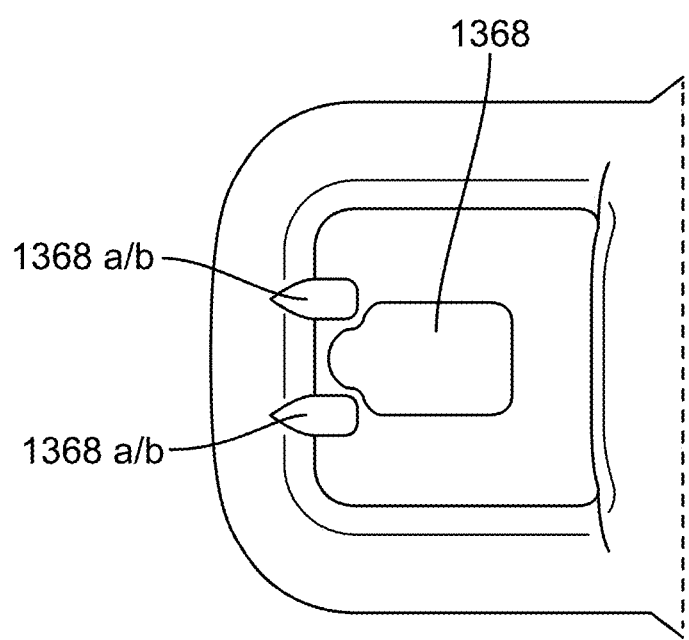

Referring to FIGS. 26D through 26F, top planar views of example wick feed mechanisms formed by or structured through the collector 1313 are illustrated, in accordance with one or more implementations. As shown in FIG. 26D, at least one wick feed 1368 path in the collector 1313 may be shaped as a multifaceted cross-diameter hollow tube. For example, the hollow cross-section of the wick feed 1368 path may be in shape of a plus sign (e.g., a hollow cross-shaped wick feed if viewed from a top cross-sectional view), such that the arms of the cross have a narrower width in relationship to the diameter of the central crossover portion of the cross from which the arms extend.

Referring to FIG. 26E, a duct or tube with a cross-shaped diameter formed through a wick feed 1368 path may overcome clogging problems because a tube with a cross-shaped diameter may be considered as including five separate pathways (e.g., a central pathway formed at the hollow center of the cross and four additional pathways formed in the hollow arms of the cross). In such implementation, a blockage in the feeding tube by way of a gas bubble (e.g., air bubble) will likely be formed at the central portion of the cross-shaped tube as shown in FIG. 26E. Such central positioning of the gas bubble would ultimately leave subpathways (i.e., pathways that go through the arms of the cross-shaped tube) that remain open to flow of vaporizable material 1302, even when the central path is blocked by the gas bubble.

Referring to FIG. 26F, other implementations for a wick feed 1368 path structure are possible that can accomplish the same or similar objective as that disclosed above with respect to trapping gas bubbles or avoiding trapped gas bubbles from fully clogging the wick feed 1368 path. As shown in the example illustration of FIG. 26F, one or more droplet-shaped projections 1368a/1368b (e.g., similar in shape to one or more separated nipples with a wick feed 1368 path therebetween) may be formed at an end of the wick feed 1368 path through which vaporizable material 1302 flows from the storage chamber 1342 into the collector 1313 to help lead the vaporizable material 1302 through the wick feed 1368 path, if a gas bubble is trapped in the central region of the wick feed 1368 path. In this manner, a reasonably controllable and consistent flow of vaporizable material 1302 may be streamed towards the wick, preventing a scenario in which the wick is inadequately saturated with the vaporizable material 1302.

Heating Element Embodiments

Referring to FIGS. 18A-18D, the vaporizer cartridge 1800 may also include a heating element 1850 (e.g., a flat heating element), as noted above. The heating element 1850 includes a first portion 1850A positioned approximately in parallel with the airflow passageways 1838 and a second portion 1850B positioned approximately perpendicular to the airflow passageways 1838. As shown, the first portion 1850A of the heating element 1850 may be positioned between opposite portions of a collector 1813. When the heating element 1850 is activated, a temperature increase results due to current flowing through the heating element 1850 to generate heat, for example.

The heat may be transferred to some amount of the vaporizable material 1302 through conductive, convective, and/or radiative heat transfer such that at least a portion of the vaporizable material 1302 vaporizes. The heat transfer can occur to vaporizable material 1302 in the reservoir, to vaporizable material 1302 drawn from the collector 1813, and/or to vaporizable material 1302 drawn into a wick retained by the heating element 1850. The air passing into the vaporizer device flows along an air path across the heating element 1850, stripping away the vaporized vaporizable material 1302 from the heating element 1850, and/or wick. The vaporized vaporizable material 1302 can be condensed due to cooling, pressure changes, etc., such that it exits the mouthpiece 1830 through at least one of the airflow passageways 1838 as an aerosol for inhalation by a user.

Figure 19A:
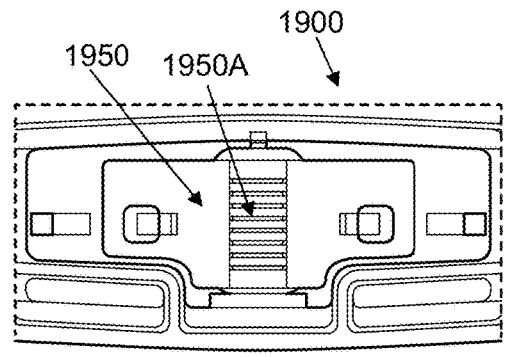
FIGS. 19A through 19C illustrate an example of a heating element and an airflow passageway in a vaporizer cartridge, in accordance with one or more implementations.
Figure 19B:
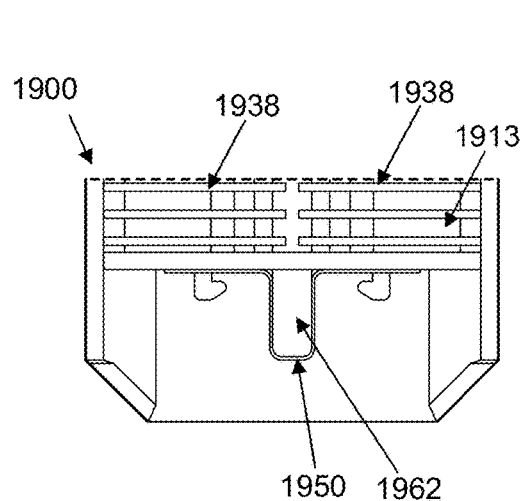
Figure 19C:
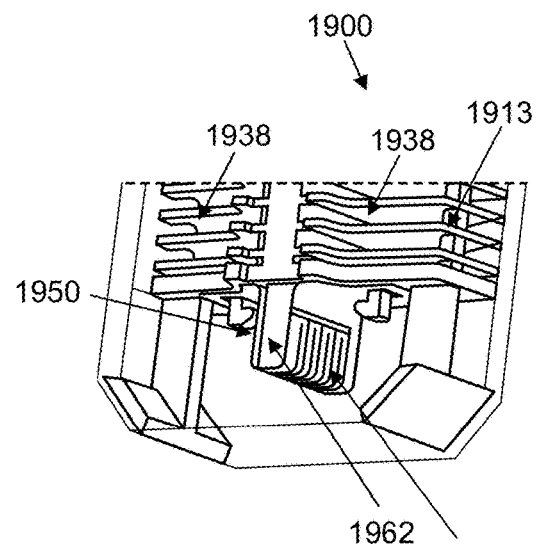

Referring to FIGS. 19A-19C, a vaporizer cartridge 1900 may include a folded heating element 1950 and two airflow passageways 1938. As mentioned above, the heating element 1950 may be crimped around a wick 1962 or preformed to receive the wick 1962. The heating element 1950 may include one or more tines 1950A. The tines 1950A may be located in a heating portion of the heating element 1950 and are designed so that the resistance of the tines 1950A matches the appropriate amount of resistance to influence localized heating in the heating element 1950 to more efficiently and effectively heat the vaporizable material 1302 from the wick 1962.

The tines 1950A form thin path heating segments or traces in series and/or in parallel to provide the desired amount of resistance. The particular geometry of the tines 1950A may be desirably selected to produce a particular localized resistance for heating the heating element 1950. For example, the tines 1950A may include one or more of the various tine configurations and features described and discussed in more detail below.

When the heating element 1950 is activated, a temperature increase results due to current flowing through the heating element 1950 to generate heat. The heat is transferred to some amount of the vaporizable material 1302 through conductive, convective, and/or radiative heat transfer such that at least a portion of the vaporizable material 1302 vaporizes. The heat transfer can occur to vaporizable material 1302 in the reservoir, to vaporizable material 1302 drawn from the collector 1913, and/or to vaporizable material 1302 drawn into the wick 1962 retained by the heating element 1950. In some implementations, the vaporizable material 1302 can vaporize along one or more edges of the tines 1950A.

The air passing into the vaporizer device flows along the air path across the heating element 1950, stripping away the vaporized vaporizable material 1302 from the heating element 1950 and/or the wick 1962. The vaporized vaporizable material 1302 can be condensed due to cooling, pressure changes, etc., such that it exits the mouthpiece through at least one of the airflow passageways 1938 as an aerosol for inhalation by a user.

Figure 20A:
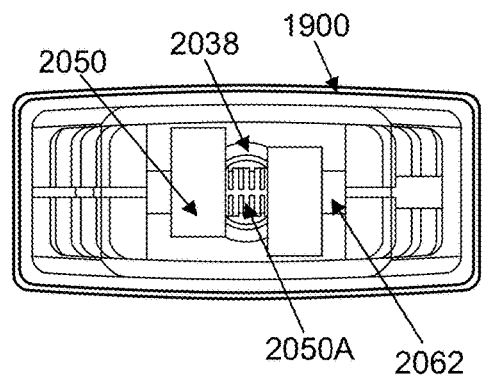
FIGS. 20A through 20C illustrate an example of a heating element and an airflow passageway in a vaporizer cartridge, in accordance with one or more implementations.
Figure 20B:
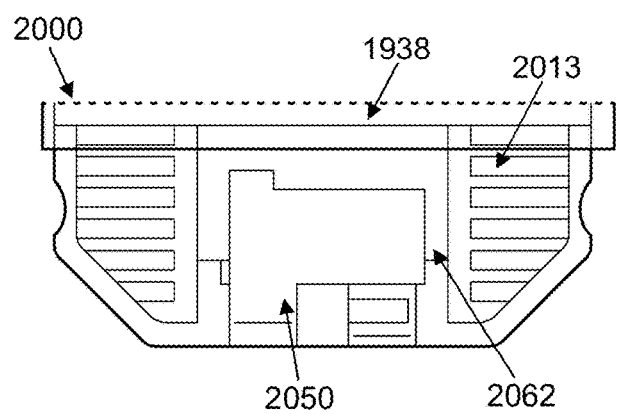
Figure 20C:
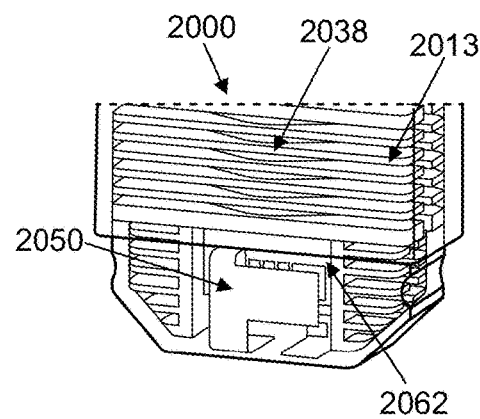

Referring to FIGS. 20A-20C, a vaporizer cartridge 2000 may include the folded heating element 2050 and a single (e.g., central) airflow passageway 2038. As mentioned above, the heating element 2050 may be crimped around a wick 2062 or preformed to receive the wick 2062. The heating element 2050 may include one or more tines 2050A. The tines 2050A may be located in a heating portion of the heating element 2050 and are designed so that the resistance of the tines 2050A matches the appropriate amount of resistance to influence localized heating in the heating element 2050 to more efficiently and effectively heat the vaporizable material from the wick 2062.

The tines 2050A form thin path heating segments or traces in series and/or in parallel to provide the desired amount of resistance. The particular geometry of the tines 2050A may be desirably selected to produce a particular localized resistance for heating the heating element 2050. For example, the tines 2050A may include one or more of the various tine configurations described in more detail below.

When the heating element 2050 is activated, a temperature increase results due to current flowing through the heating element 2050 to generate heat. The heat is transferred to some amount of the vaporizable material 1302 through conductive, convective, and/or radiative heat transfer such that at least a portion of the vaporizable material 1302 vaporizes. The heat transfer can occur to vaporizable material 1302 in the reservoir, to vaporizable material 1302 drawn from the collector 2013, and/or to vaporizable material 1302 drawn into the wick 2062 retained by the heating element 2050.

In some implementations, the vaporizable material 1302 can vaporize along one or more edges of the tines 2050A. The air passing into the vaporizer device flows along the air path across the heating element 2050, stripping away the vaporized vaporizable material 1302 from the heating element 2050 and/or the wick 2062. The vaporized vaporizable material 1302 can be condensed due to cooling, pressure changes, etc., such that it exits the mouthpiece through at least one of the airflow passageways as an aerosol for inhalation by a user.

Figure 21B:
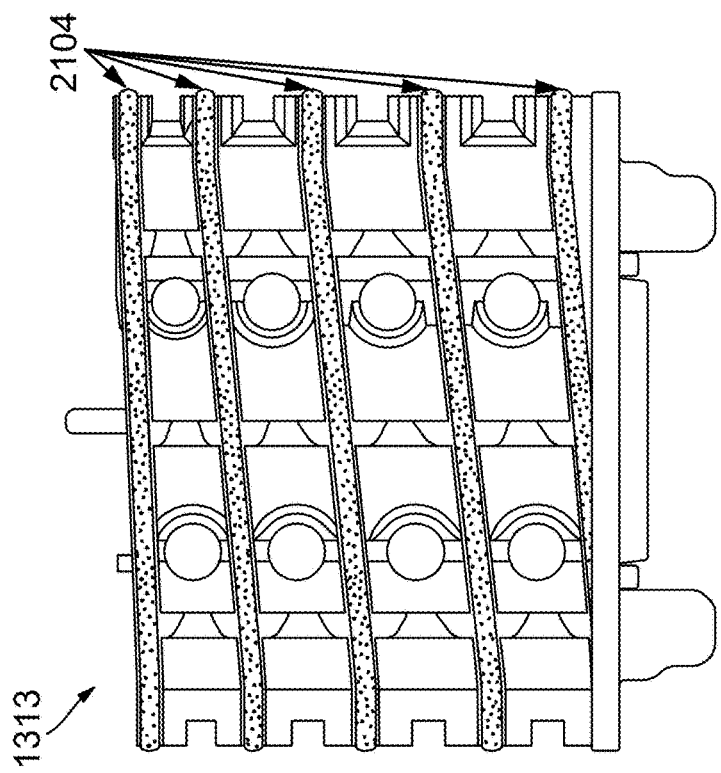
FIGS. 21A and 21B illustrate side views of example collector structures that include one or more ribs or seal bead profiles that support certain manufacturing techniques for securing the collector to a storage chamber in the cartridge.
Figure 21A:
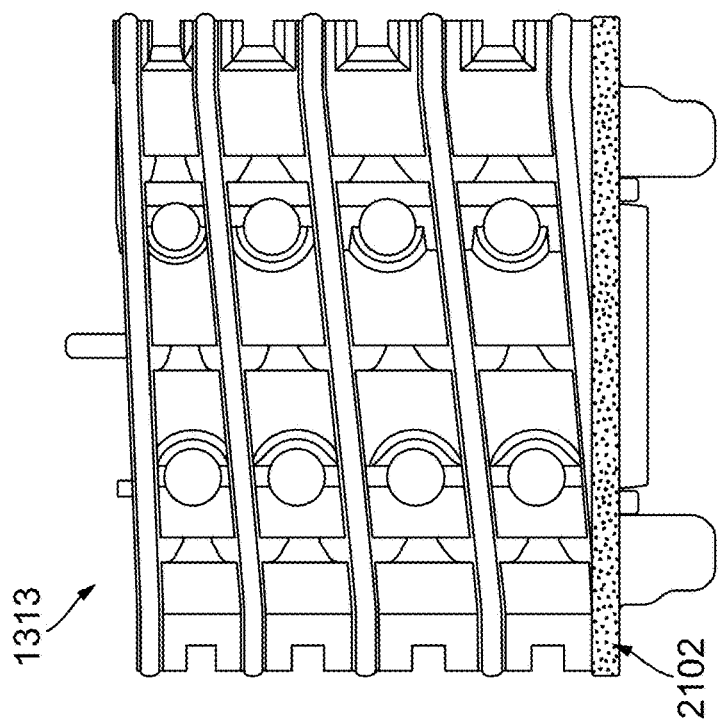
Figure 22A:
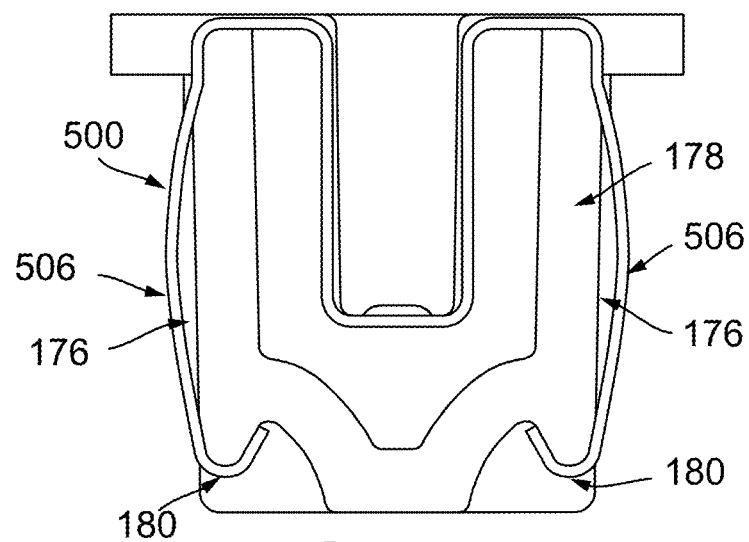
FIGS. 22A through 22B illustrate an example of a heating element, in accordance with one or more implementations.
Figure 22B:
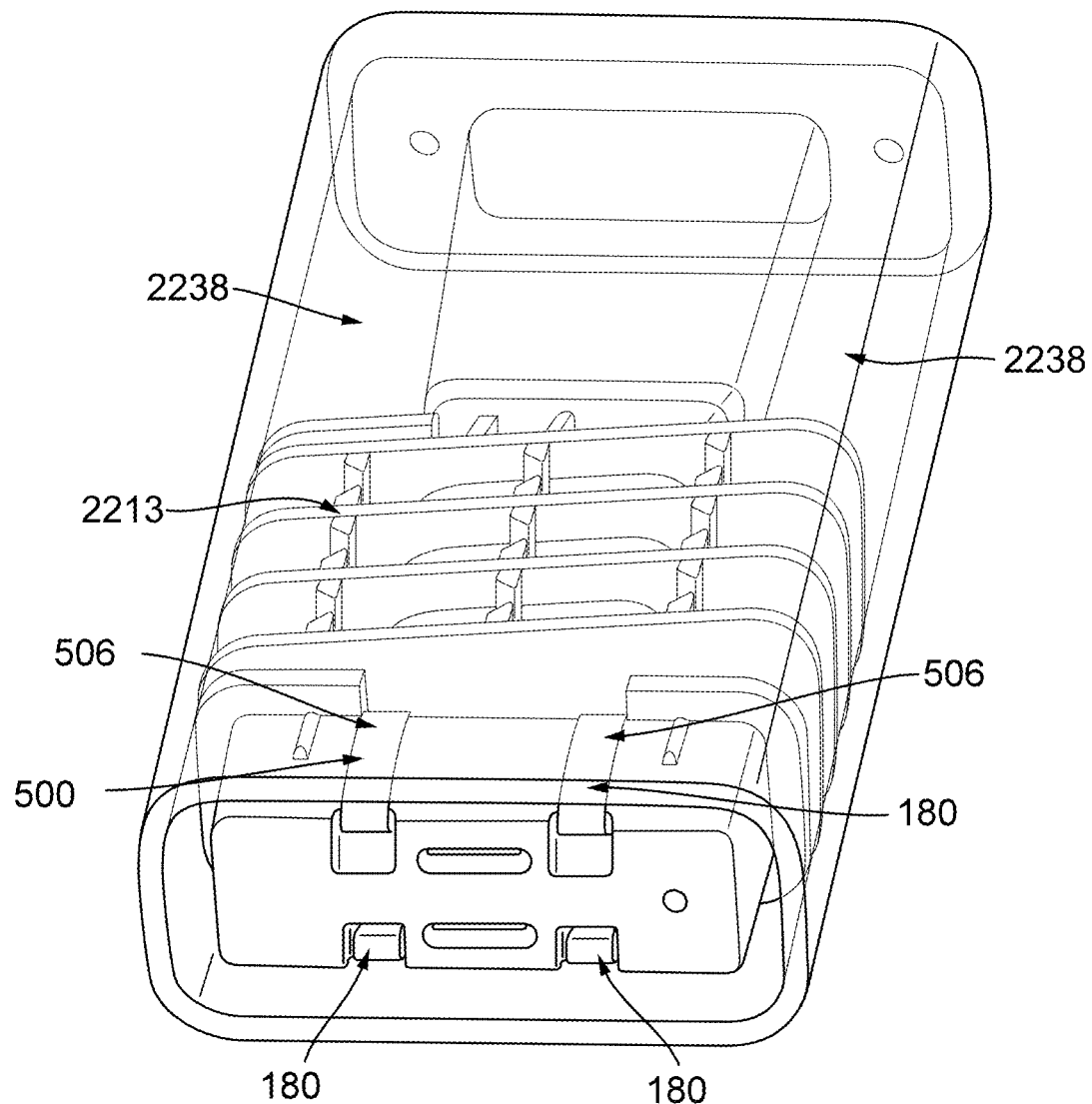

Referring to FIGS. 10C, 11B and 21A, in some embodiments, the collector 1313 may be configured to include a flat rib 2102 that extends out at the lower perimeter of the collector 1313 to create a suitable surface to weld the collector 1313 to the inner walls of the storage chamber 1342, after the collector 1313 has been inserted into a receiving cavity or receptacle in the storage chamber 1342.

Depending on implementation, a full perimeter weld or tack weld option may be employed to firmly fix the collector 1313 within a receiving cavity or receptacle in the storage chamber 1342. In some embodiments, a friction-tight and leak-proof coupling may be established without employing a welding technique. In certain embodiments, adhesive material may be utilized instead of or in addition to the coupling techniques noted above.

Referring to FIGS. 11B and 21B, in accordance with one or more aspects, a seal bead profile 2104 may be fashioned at the perimeter of collector 1313 spiral ribs that define an overflow channel 1104, such that the seal bead profile 2104 may support a quick turn injection molding process. Seal bead profile 2104 geometry may be devised in a variety of manners such that the collector 1313 may be inserted into a receiving cavity or receptacle in the storage chamber 1342 in a friction-tight manner, where vaporizable material 1302 may flow through the overflow channel 1104 without any leakage along the seal bead profile 2104.

Referring to FIGS. 22A, 22B, and 82-86, a vaporizer cartridge 2200 may include the folded heating element, such as heating element 500 and two airflow passageways 2238. As mentioned above, the heating element 500 may be crimped around a wick 2262 or preformed to receive the wick 2262. The heating element 500 may include one or more tines 502. The tines 502 may be located in a heating portion of the heating element 500 and are designed so that the resistance of the tines 502 matches the appropriate amount of resistance to influence localized heating in the heating element 500 to more efficiently and effectively heat the vaporizable material 1302 from the wick 2262.

The tines 502 form thin path heating segments or traces in series and/or in parallel to provide the desired amount of resistance. The particular geometry of the tines 502 may be desirably selected to produce a particular localized resistance for heating the heating element 500. For example, the tines 502, and heating element 500 may include one or more of the various tine configurations and features described in more detail below.

In some implementations, the tines 502 include a platform tine portion 524 and side tine portions 526. The platform tine portion 524 is configured to contact one end of the wick 2262 and the side tine portions 526 are configured to contact opposite sides of the wick 2262. The platform tine portion 524 and the side tine portions 526 form a pocket that is shaped to receive the wick 2262 and/or conform to the shape of at least a portion of the wick 2262. The pocket allows the wick 2262 to be secured and retained by the heating element 500 within the pocket.

In some implementations, the side tine portions 526 and the platform tine portion 524 retain the wick 2262 via compression. The platform tine portion 524 and the side tine portions 526 contact the wick 2262 to provide a multi-dimensional contact between the heating element 500 and the wick 2262. Multi-dimensional contact between the heating element 500 and the wick 2262 provides for a more efficient and/or faster transfer of the vaporizable material 1302 from the reservoir of the vaporizer cartridge to the heating portion (via the wick 2262) to be vaporized.

The heating element 500 may include one or more legs 506 extending from the tines 502, and the cartridge contacts 124 formed at the end portion and/or as part of at least one of the one or more legs 506. The heating element 500 shown in FIGS. 22A-22B and 82-86 includes four legs 506 by way of example. At least one of the legs 506 may include and/or define one of the cartridge contacts 124 that is configured to contact a corresponding one of the receptacle contacts 125 of the vaporizer. In some implementations, a pair of legs 506 (and the cartridge contacts 124) may contact a single one of the receptacle contacts 125.

The legs 506 may be spring-loaded to allow the legs 506 to maintain contact with the receptacle contacts 125. The legs 506 may include a portion that is curved to help maintain contact with the receptacle contacts 125. Spring-loading the legs 506 and/or the curvature of the legs 506 may help increase and/or maintain consistent pressure between the legs 506 and the receptacle contacts 125. In some implementations, the legs 506 are coupled with a support 176 to help increase and/or maintain consistent pressure between the legs 506 and the receptacle contacts 125. The support 176 may include plastic, rubber, or other materials to help maintain contact between the legs 506 and the receptacle contacts 125. In some implementations, the support 176 is formed as a part of the legs 506.

The legs 506 may contact one or more wiping contacts that are configured to clean the connection between the cartridge contacts 124 and other contacts or power source 112. For example, the wiping contacts would include at least two parallel, but offset, bosses that frictionally engage and slide against one another in a direction that is parallel or perpendicular to the insertion direction.

In some implementations, the legs 506 include retainer portions 180 that are configured to be bent around at least a portion of a wick housing 178 that surrounds at least a portion of the wick 2262. The retainer portions 180 form an end of the legs 506. The retainer portions 180 help to secure the heating element 500 and wick 2262 to the wick housing 178 (and to the vaporizer cartridge).

When the heating element 500 is activated, a temperature increase results due to current flowing through the heating element 500 to generate heat. The heat is transferred to some amount of the vaporizable material 1302 through conductive, convective, and/or radiative heat transfer such that at least a portion of the vaporizable material 1302 vaporizes. The heat transfer can occur to vaporizable material 1302 in the reservoir, to vaporizable material 1302 drawn from the collector 2213, and/or to vaporizable material 1302 drawn into the wick 2262 retained by the heating element 500.

In some implementations, the vaporizable material 1302 can vaporize along one or more edges of the tines 502. The air passing into the vaporizer device flows along the air path across the heating element 500, stripping away the vaporized vaporizable material 1302 from the heating element 500 and/or the wick 2262. The vaporized vaporizable material 1302 can be condensed due to cooling, pressure changes, etc., such that it exits the mouthpiece through at least one of the airflow passageways 2238 as an aerosol for inhalation by a user.

Figure 23:
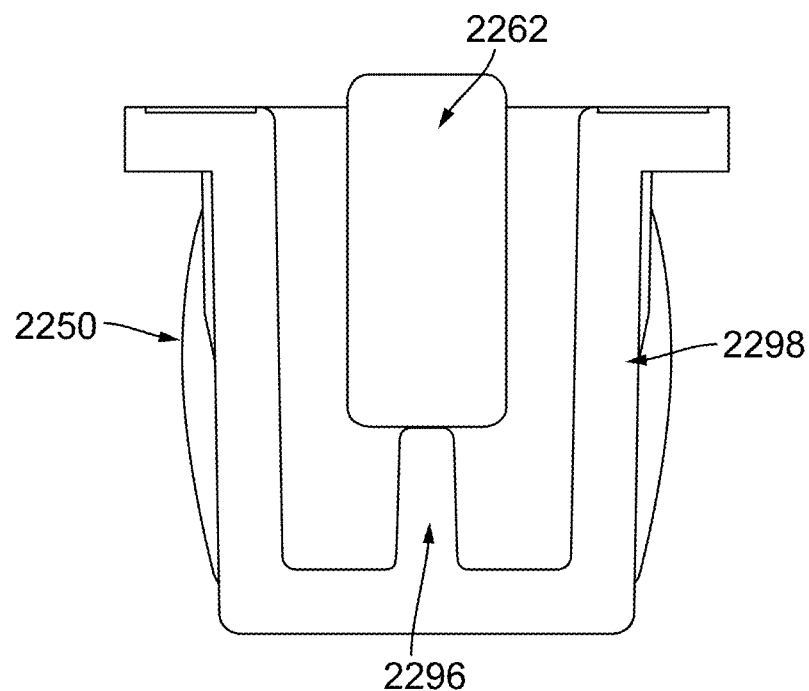
FIG. 23 illustrates an example of a portion of a wick housing, in accordance with one or more implementations.

FIG. 23 illustrates a cross-sectional view of the wick housing 178, consistent with implementations of the current subject matter. The wick housing 178 may include a wick support rib 2296 that extends from an outer shell of the wick housing 178 towards the wick 2262 when assembled. The wick support rib 2296 helps to prevent deformation of the wick 2262 during assembly.

Figure 24:
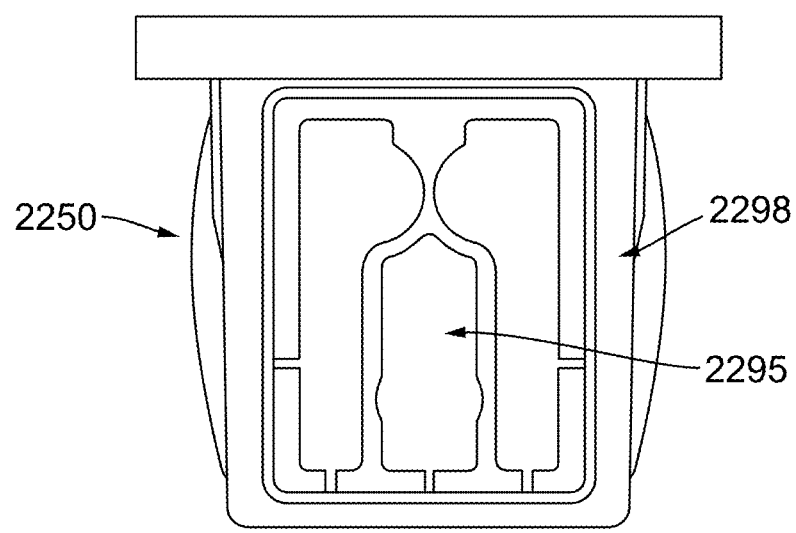
FIG. 24 illustrates an example of an identification chip, in accordance with one or more implementations.

FIG. 24 illustrates an example of the wick housing 178 including an identification chip 2295. The identification chip 2295 may be retained at least in part by the wick housing 178. The identification chip 2295 may be configured to communicate with a corresponding chip reader located on the vaporizer.

FIG. 25 illustrates perspective, frontal, side and exploded views of an example embodiment of a cartridge 1320 with pressure fitted components. As shown, the cartridge 1320 may include a mouthpiece-reservoir combination shaped in the form of a sleeve with an airflow passageway 1338 defined through the sleeve. An area in the cartridge 1320 houses the collector 1313, the wicking element 1362, the heating element 1350, and the wick housing 1315. An opening at a first end of the collector 1313 leads to the airflow passageway 1338 in the mouthpiece and provides a route for the vaporized vaporizable material 1302 to travel from the heating element 1350 area to the mouthpiece from which a user inhales.

Additional and/or Alternative Fluidic Vent Embodiments

Figure 27A:
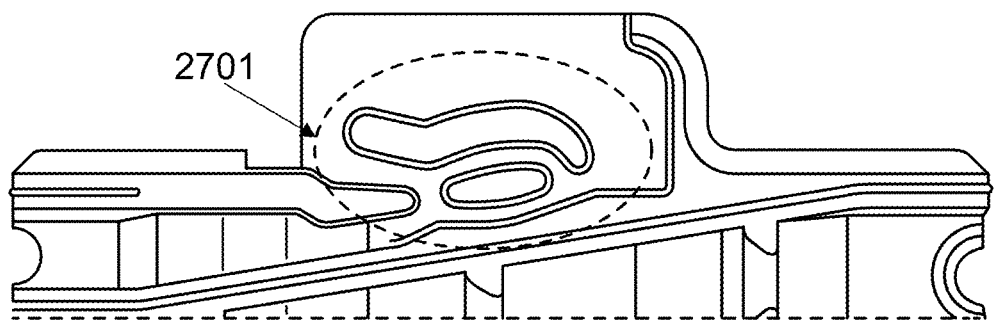
FIGS. 27A and 27B illustrate frontal views of example flow management mechanisms in the collector structure, in accordance with one or more implementations.
Figure 27B:
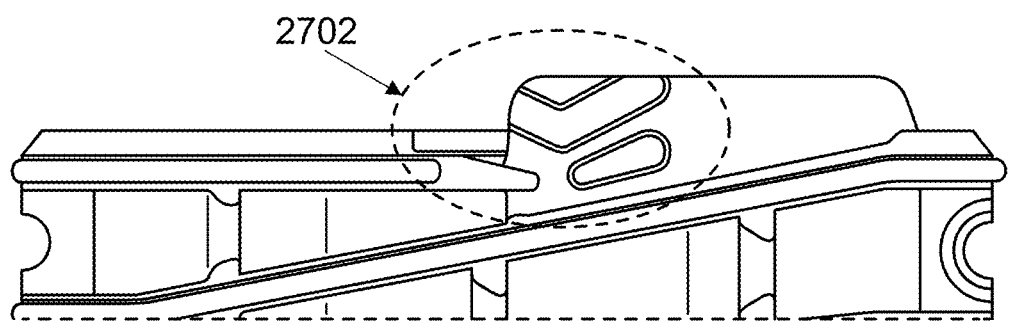

Referring to FIGS. 27A through 27B, frontal planar close-up views of example flow management mechanisms in the collector 1313 structure are illustrated. Similar to the flow management mechanism discuss with reference to FIGS. 11M and 11N, flow management vent mechanisms 2701 or 2702 may be implemented in various shapes in different embodiments. In the example of FIG. 27A, the passageways or overflow channel 1104 in the collector 1313 may be connected to the storage chamber by way of a fluidic vent 2701, for example, such that the vent 2701 includes at least two openings that are connected to the cartridge's storage chamber.

As provided earlier, a liquid seal may be maintained at the vent 2701 regardless of the positioning of the cartridge. On one side, a vent pathway may be maintained between the overflow channel and the vent 2701. On another side, high-drive channels may be implemented to encourage pinch-off to maintain a liquid seal.

FIG. 27B illustrates an alternative vent 2702 structure with three openings that are connected to the cartridge's storage chamber with a pinch-off path that prevents the liquid seal between the vent 2701 and the storage chamber from being broken.

Figure 28:
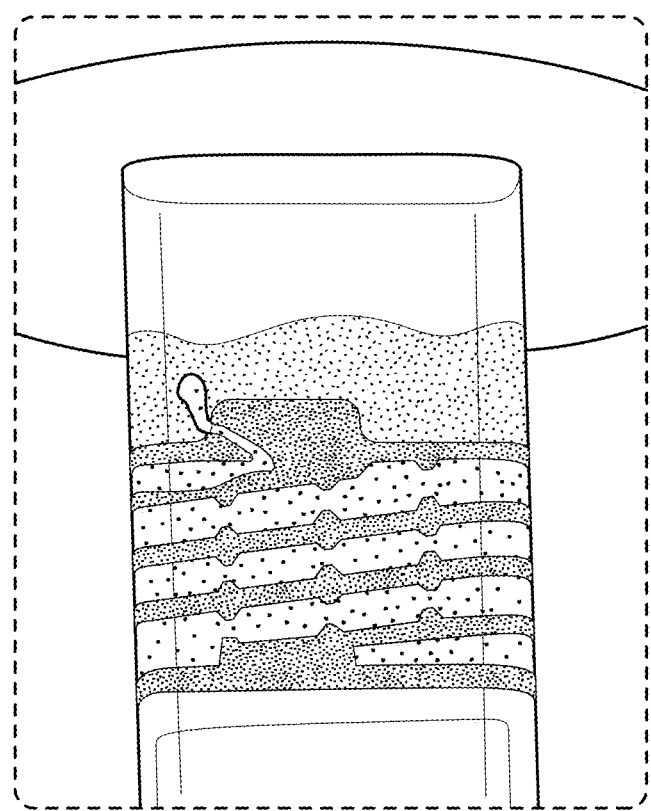
FIG. 28 illustrates a frontal view of an example cartridge containing an example collector structure.

FIG. 28 illustrates illustrate a snapshot in time when the flow of vaporizable material collected in the example collector of FIG. 27A or 27B is managed to accommodate proper venting in the cartridge storage chamber, in accordance with one implementation. As shown, the vent 2701 construction in FIG. 27A is distinguishable from the vent 2702 construction in FIG. 27B, in that the latter vent 2702 construction provides for an open area on one side, instead of the wall structure shown in FIG. 27A. This more open implementation provides for an enhanced microfluidic interaction between the vaporizable material 1302 and the open side of the vent 2702.

Figure 29C:
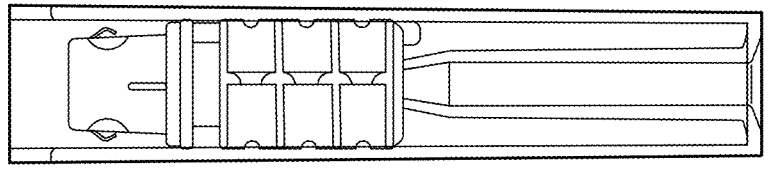
FIGS. 29A through 29C illustrate perspective, frontal, and side views, respectively, of an example embodiment of a cartridge.
Figure 29B:
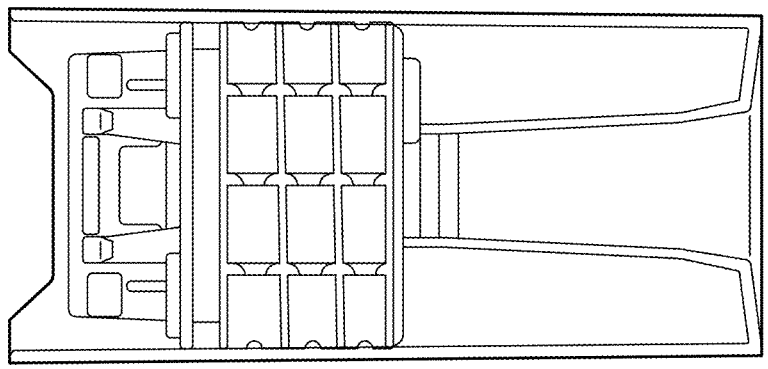
Figure 29A:
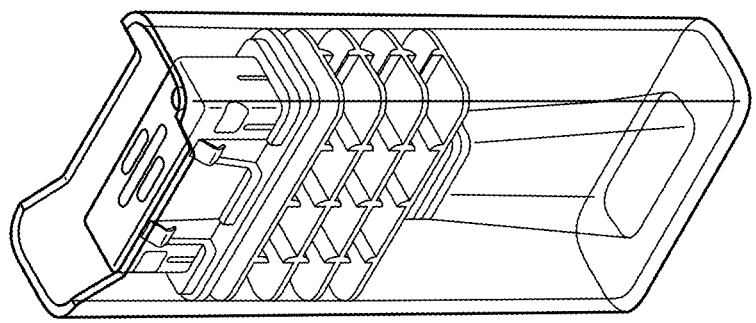

Referring to FIGS. 29A through 29C, perspective, frontal and side views of an example embodiment of a cartridge are illustrated. The cartridge as shown may be assembled from multiple components including a collector, a heating element, and a wick housing for holding the cartridge components in place as the components are inserted into a body of a cartridge. In one embodiment, a laser weld may be implemented at a circumferential juncture positioned at approximately the point at which one end of the collector structure meets the wick housing. A laser weld prevents the flow of liquid vaporizable material 1302 from the collector into the heating chamber where the atomizer is placed.

Referring to FIGS. 30A through 30F, perspective views of an example cartridge at different fill capacities are illustrated. As noted earlier, the volumetric size of the overflow volume may be configured to be equal to, approximately equal to or greater than the amount of increase in the volume of the content contained in the storage chamber. When the volume of the content in the storage chamber expands as a result of one or more environmental factors, if the volume of content contained in the storage chamber is X, when the pressure inside the storage chamber increases to Y, then Z amounts of vaporizable material 1302 may be displaced from the storage chamber into the overflow volume. As such, in one or more embodiments, the overflow volume is configured to at least be large enough to contain Z amounts of vaporizable material 1302.

Figure 30F:
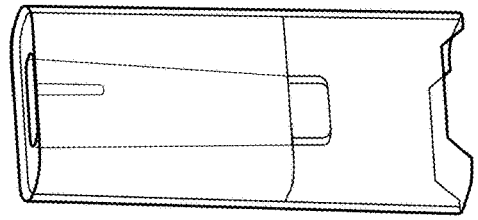
FIGS. 30A through 30F illustrate perspective views of an example cartridge at different fill levels, in accordance with one or more embodiments.
Figure 30E:
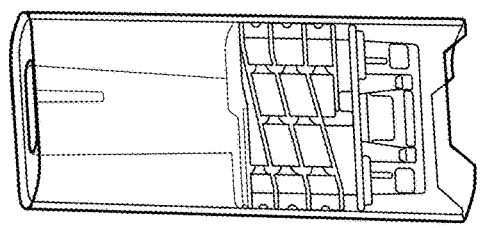
Figure 30D:
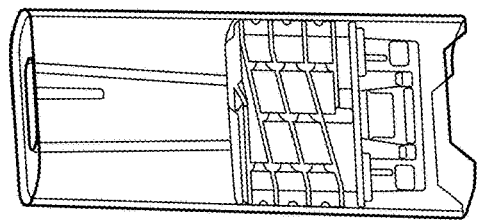
Figure 30C:
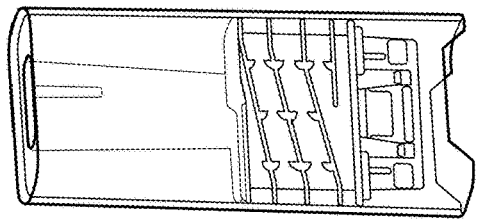
Figure 30B:
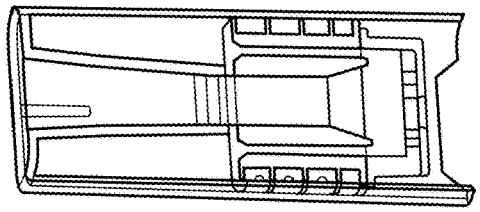
Figure 30A:
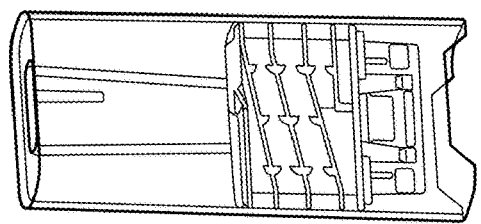

FIG. 30A illustrates a perspective view of an example cartridge body having a reservoir which, when filled, accommodates the storage of a volume of approximately 1.20 mL of vaporizable material 1302, for example. FIG. 30B illustrates a perspective view of an example cartridge in full assembly, wherein the storage chamber and the collector overflow passageways accommodate a combined volume of approximately 1.20 mL of vaporizable material 1302 when both are filled, for example. FIG. 30C illustrates a perspective view of an example cartridge in full assembly when the collector overflow passageway is filled to an approximate volume of 0.173 mL, for example. FIG. 30D illustrates a perspective view of an example cartridge in full assembly when the storage chamber is filled to an approximate volume of 0.934 mL, for example. FIG. 30E illustrates a perspective view of an example cartridge in full assembly with wick feed channels and airflow passageway in the mouthpiece shown in a cross-sectional view, the wick feed channels having a volume of approximately 0.094 mL, for example. FIG. 30F illustrates a perspective view of an example cartridge in full assembly with an overflow air channel incorporated into a portion of the collector toward the bottom rib, the airflow air channel having an approximate volume of 0.043 mL, for example.

Figure 31C:
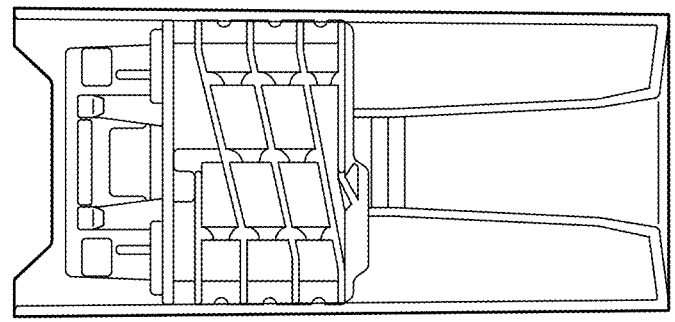
FIGS. 31A through 31C illustrate frontal views of an example cartridge as filled and assembled in accordance with one embodiment.
Figure 31B:
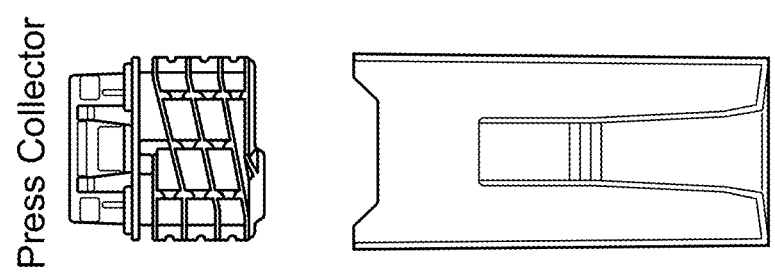
Figure 31A:
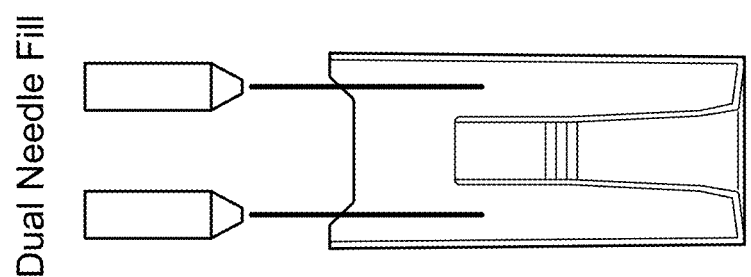

FIGS. 31A through 31C illustrate frontal views of an example cartridge, in accordance with one embodiment, in which a dual-needle fill application is implemented to fill the cartridge's reservoir (FIG. 31A) before the collector and an enclosing plug are inserted into the body of the cartridge (FIG. 31B) to form a fully assembled cartridge (FIG. 31C).

FIGS. 34A and 34B illustrate frontal and side views of an example cartridge body with an external airflow path. In some embodiments, one or more gates, also referred to as air inlet holes may be provided on the vaporizer body 110. The inlet holes may be positioned inside of an air inlet channel with a width, height, and depth that is sized to prevent the user from unintentionally blocking the individual air inlet holes, when the user is holding the vaporizer 100. In one aspect, the air inlet channel construction may be sufficiently long so as not to significantly block or restrict airflow through the air inlet channel, when for example a user's fingers block an area of the air inlet channel.

In some configurations, the geometric construction of the air inlet channel may provide for at least one of a minimum length, a minimum depth, or a maximum width, for example, to ensure a user can't completely cover or block the air inlet holes in the air inlet channel with a hand or other body part. For example, the length of the air inlet channel may be longer than the width of an average human finger and the width and depth of the air inlet channel may be such that when a user's finger is pressed on top of the channel, the skin folds created does not interface with the air inlet holes inside the air inlet channel.

The air inlet channel may be constructed or formed as having rounded edges or shaped to wrap around one or more corners or areas of the vaporizer body 110, so that the air inlet channel cannot be easily covered by a user's finger or body part. In certain embodiments, an optional cover may be provisioned to protect the air inlet channel so that a user's finger cannot not block or completely limit airflow into the air inlet channel. In one example implementation, the air inlet channel may be formed at the interface between the vaporizer cartridge 120 and the vaporizer body 110 (e.g., at the receptacle area—see FIG. 1). In such implementation, the air inlet channel may be protected from blockage due to the air inlet channel being formed inside the receptacle area. This implementation may also allow for a configuration in which the air inlet channel is hidden from view.

Figure 32A:
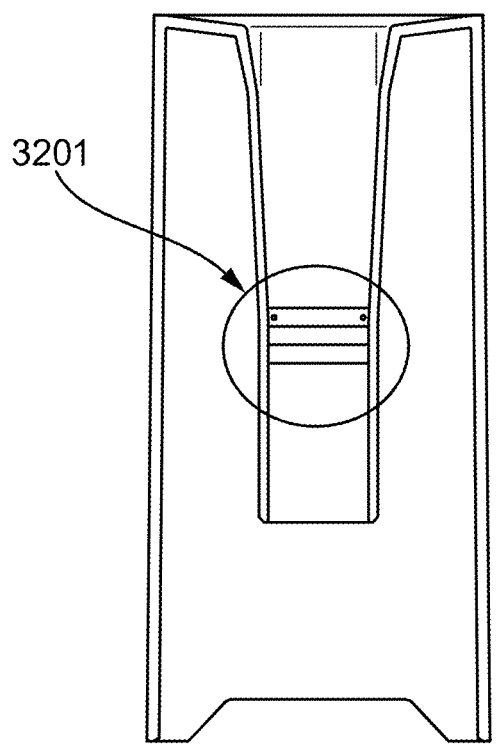
FIGS. 32A through 32C illustrate frontal, top, and bottom views of an example cartridge air path.
Figure 32B:
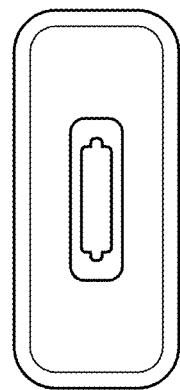
Figure 32C:
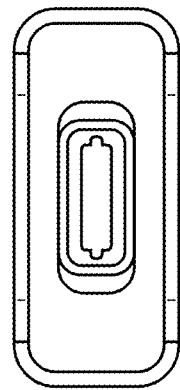

FIGS. 32A through 32C illustrate frontal, top, and bottom views of an example cartridge body, respectively, with a condensate collector 3201 incorporated inside the air path.

Figure 33A:
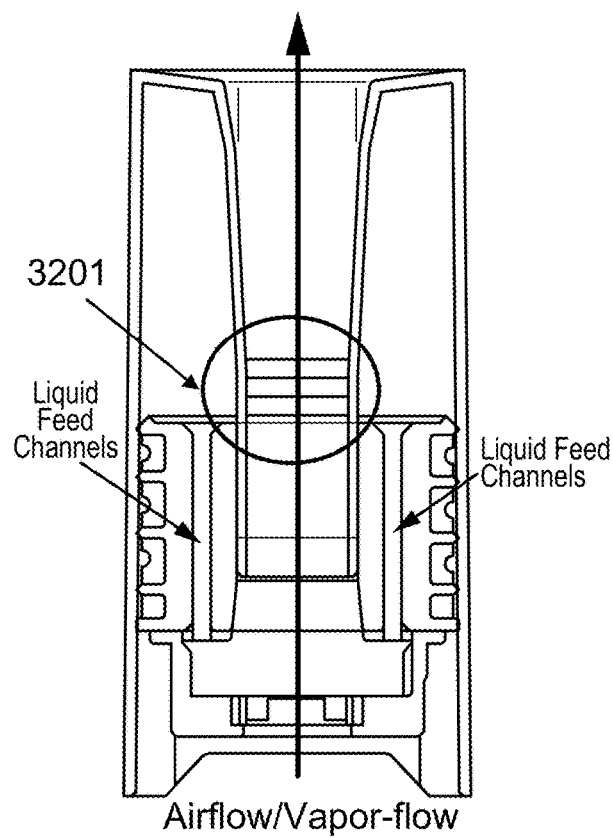
FIGS. 33A and 33B illustrate frontal and top views of an example cartridge with an airflow path, liquid feed channels, and a condensation collection system.
Figure 33B:
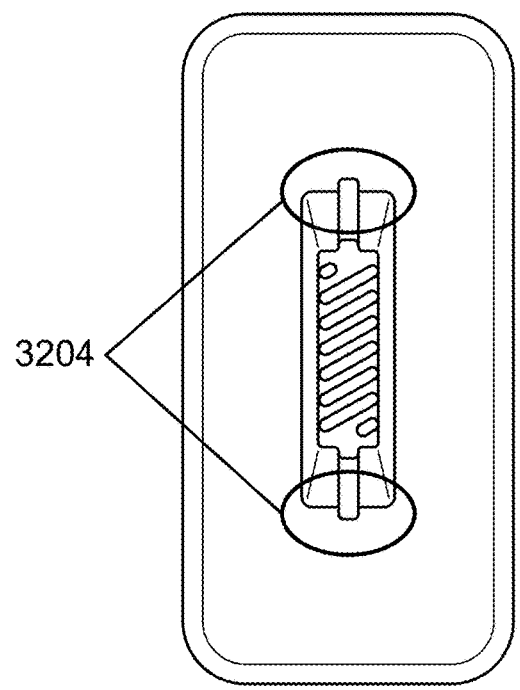
Figure 35:
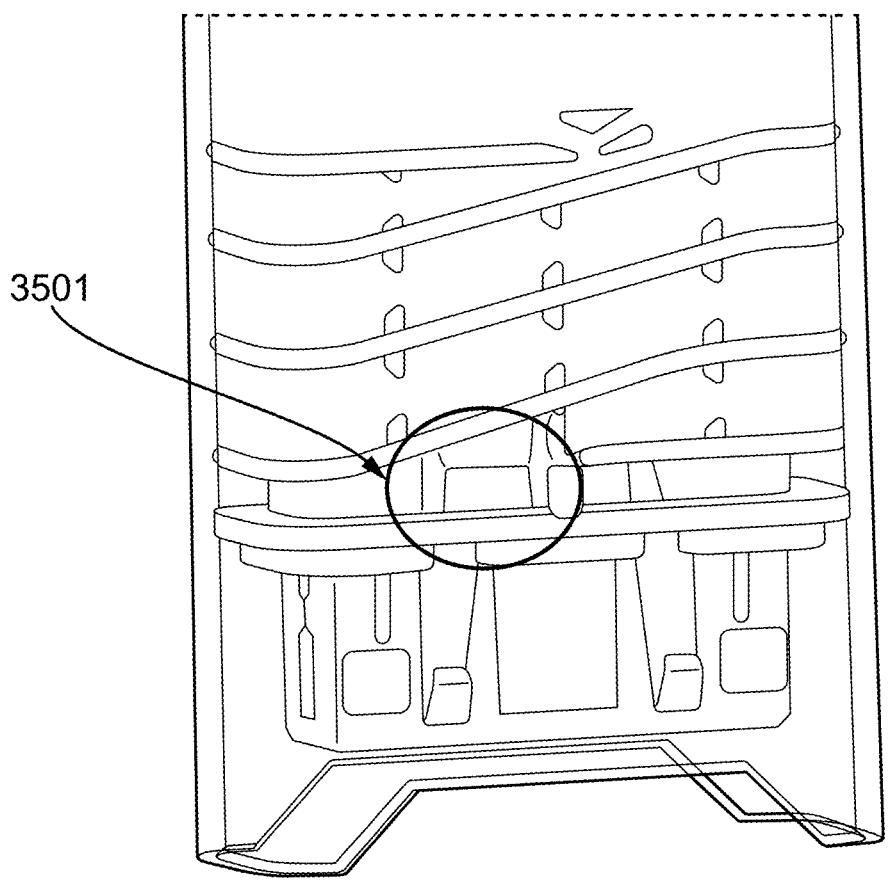
FIGS. 35 and 36 illustrate a perspective view of a portion of an example cartridge with a collector structure having an air gap at the bottom rib of the collector structure.
Figure 36:
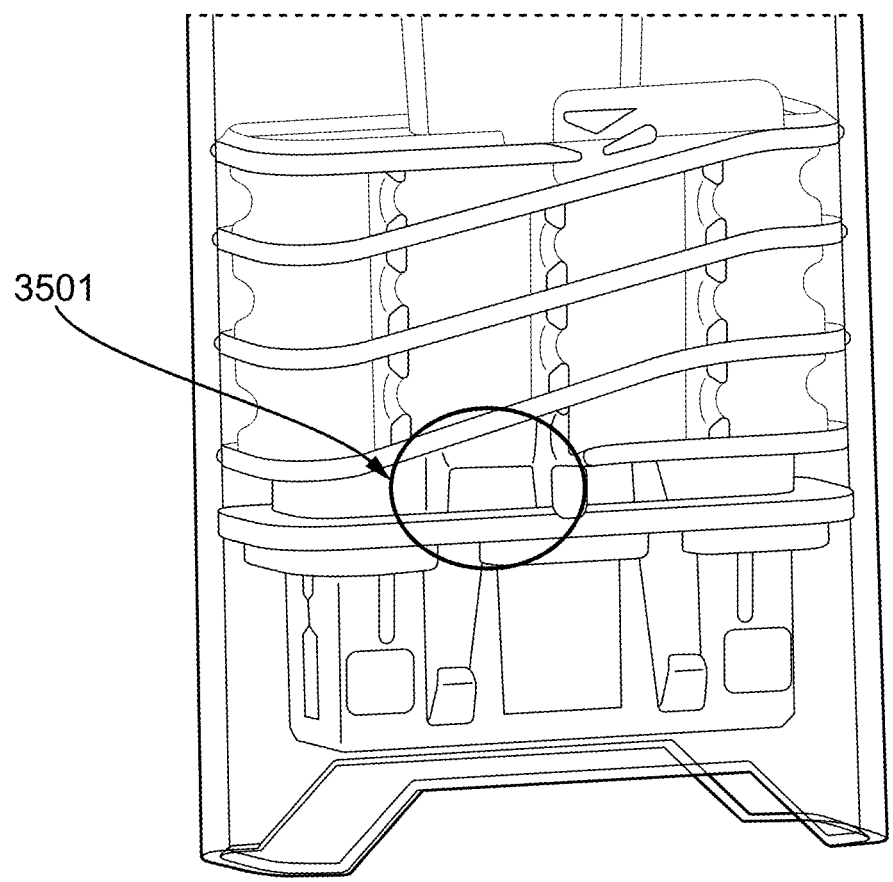

Referring to FIG. 33A, air or vapor may flow into an airflow path in the cartridge. The airflow path may longitudinally extend from an aperture or opening in the mouthpiece, internally along the body of the cartridge such that vaporizable material 1302 inhaled through the mouthpiece passes through a condensate collector 3201. As shown in FIG. 33B, in addition to the condensate collector 3201 condensate recycler channels 3204 (e.g., micro-fluidic channels) may be formed to travel from the opening in the mouthpiece to the wick, for example.

The condensate collector 3201 acts on vaporized vaporizable material 1302 that are cooled and turned into droplets in the mouthpiece to collect and route the condensed droplets to the condensate recycler channels 3204. The condensate recycler channels 3204 collect and return condensate and large vapor droplets to the wick, and prevent the liquid vaporizable material formed in the mouthpiece from being deposited into the user's mouth, during the user puffing or inhaling from the mouthpiece. The condensate recycler channels 3204 may be implemented as micro-fluidic channels to trap any liquid droplet condensates and thereby eliminate the direct inhalation of vaporizable material, in liquid form, and avoid an undesirable sensation or taste in the user's mouth. Additional and/or alternative embodiments of the condensate recycler channels, and/or one or more other features for controlling, collecting, and/or recycling condensate in a vaporizer device are described and shown with respect to FIGS. 117-119C. The condensate recycler channels (and/or the one or more other features described and shown with respect to FIG. 117-119C) may alone, or in combination with one or more features of the vaporizer cartridge, assist in controlling, collecting, and/or recycling condensate in a vaporizer device Referring to FIGS. 35 and 36, perspective views of a portion of an example cartridge are illustrated where the collector structure 1313 includes an air gap 3501 at the bottom rib of the collector structure. The positioning of the air gap 3501 may coincide with the location where the air exchange port is positioned in the collector structure 1313. As provided earlier, the collector structure 1313 may be configured to have a central opening through which an airflow channel leading to the mouthpiece is implemented. The airflow channel may be connected to the air exchange port, such that the volume inside the overflow passageway of the collector 1313 is connected to the ambient air via the air exchange port and also connected to the volume in the storage chamber via a vent.

In accordance with one or more embodiments, the vent may be utilized as a control valve to mainly control liquid flow between the overflow passageway and the storage chamber. The air exchange port may be utilized to mainly control airflow between the overflow passageway and an air path leading to the mouthpiece, for example. The combination of the interactions between the vent, the collector channels of the overflow passageway and the air exchange port provide for proper wick saturation and the proper venting of air bubbles that may be introduced into the cartridge due to various environmental factors as well as the controlled flow of vaporizable material 1302 into and out of the collector channels. The presence of an air gap 3501 at the air exchange ports allows for a more robust venting process as it prevents liquid vaporizable material 1302 stored in the collector from seeping into the wick housing area.

Figure 37C:
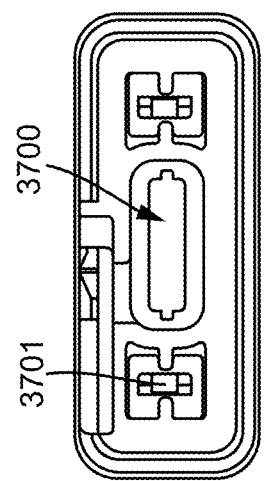
FIGS. 37A through 37C illustrate top views of various example wick feed shapes for a cartridge.
Figure 37B:
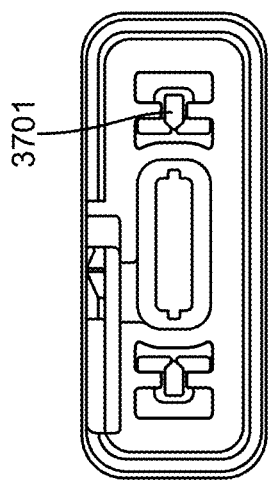
Figure 37A:
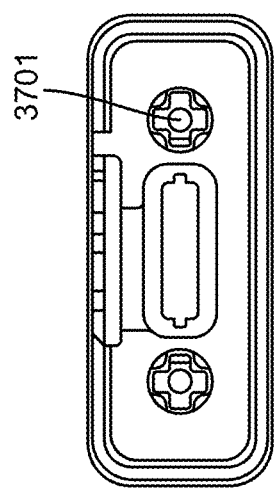

FIGS. 37A through 37C illustrate top views of various example wick feed shapes and configurations for a cartridge in accordance with one or more embodiments. As shown, FIG. 37A illustrates a cross-shaped wick feed cross-section in accordance with an example embodiment. FIG. 37B illustrates a wick feed with an approximately rectangular cross-section. FIG. 37C illustrates a wick feed with an approximately square cross-section. As provided earlier, depending on implementation, one or more wick feeds 3701 may be constructed as ducts, channels, tubes or cavities that travel through the collector structure 1313 as paths that feed the wick with vaporizable material 1302 stored in storage chamber. In certain configurations, the wick feeds 3701 may run approximately parallel to a central channel 3700 in the collector 1313.

Depending on implementation, a wick feed path may be shaped to be tubular with, for example, a substantially rectangular or square cross-sectional shape as shown in FIGS. 37B and 37C. A variable width cross-sectional shaped duct or tube formed through a wick feed path may overcome clogging problems, if such shape provides for a multi-path configuration that allows vaporizable material 1302 to travel through the wick feed even if an air bubble is formed in a certain area of the wick feed. In such implementations, a blockage in the wick feed tube will likely be formed at a portion of the wick feed tube, leaving sub-pathways (e.g., alternate pathways) open to flow.

In accordance with one or more aspects, wick-feeding pathways may be sufficiently wide to allow for free travel of vaporizable material 1302 through the feeding pathways and toward the wick. In some embodiments, the flow through the wick feed may be enhanced or accommodated by way of devising the relative diameter of certain portions of the wick feed to enforce capillary pull or pressure on the vaporizable material 1302 travelling through a wick feed path. In other words, depending on the shape and other structural or material factors, some wick feeding pathways may rely on gravitational or capillary forces to induce movement of vaporizable material 1302 toward the wick-housing portion.

Figure 37D:
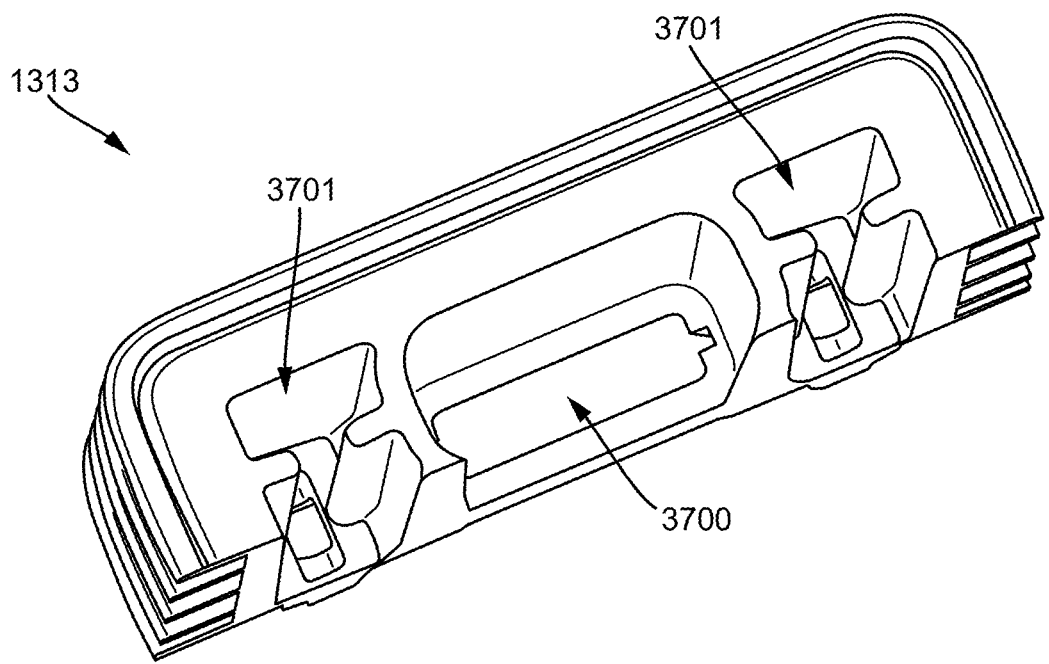
FIGS. 37D and 37E are example embodiments of a collector with a double wick feed implementation.
Figure 37E:
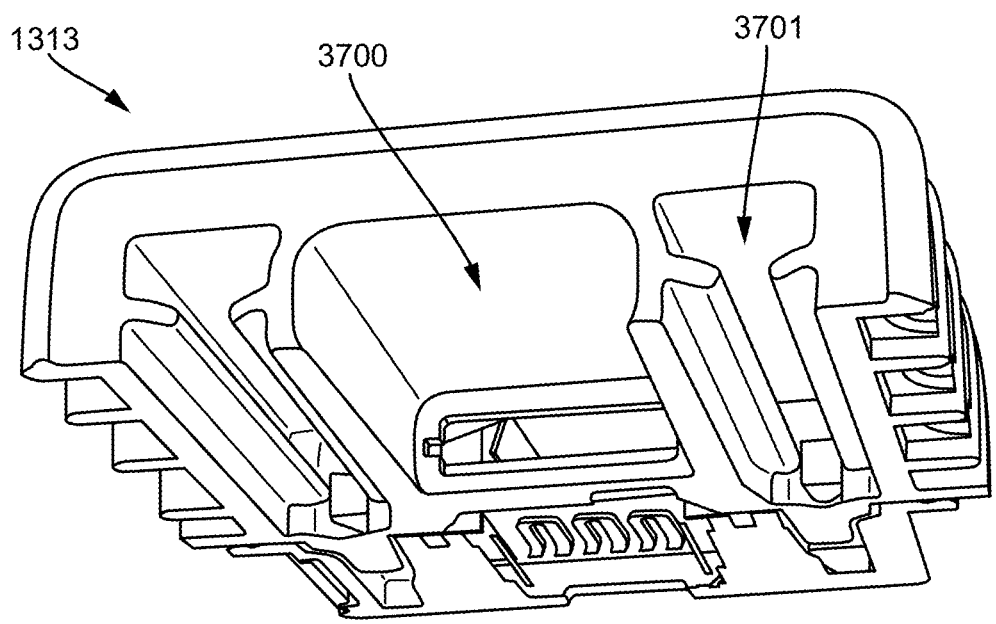

FIGS. 37D and 37E illustrate example embodiments of a collector 1313 with a double wick feed 3701 implementation. At least one of the wick feeds 3701 may be formed to include a partial demising wall. The partial demising wall may be configured to split the volume of the inside of a wick feed 3701 into two separate volumes (i.e., ventricles) as illustrated in the cross-sectional perspective views in FIGS. 37D and 37E. The partial wall implementation would allow for liquid vaporizable material 1302 to easily flow from the reservoir toward the wick housing area to saturate the wick.

In certain implementations, the partial wall in a single wick feed essentially forms two ventricles in the single wick feed. The ventricles in the wick feed may be disjoined by way of the partial wall and be separately utilized to allow vaporizable material 1302 flow toward the wick housing. In such embodiments, if a gas bubble is dislodged in one of the ventricles in the wick feed, the other ventricle may remain open. A ventricle may be volumetrically large to provide a sufficient flow of vaporizable material 1302 toward the wick for adequate saturation.

Accordingly, in embodiments that two wick feeds 3701 are utilized, effectively four ventricles may be available for carrying the vaporizable material 1302 flow toward the wick. Thereby, in the event of formation of gas bubbles in one, two or even three of the ventricles, at least a fourth ventricle would be usable for directing the vaporizable material 1302 flow towards the wick, reducing the chances of wick dehydration.

Figure 38:
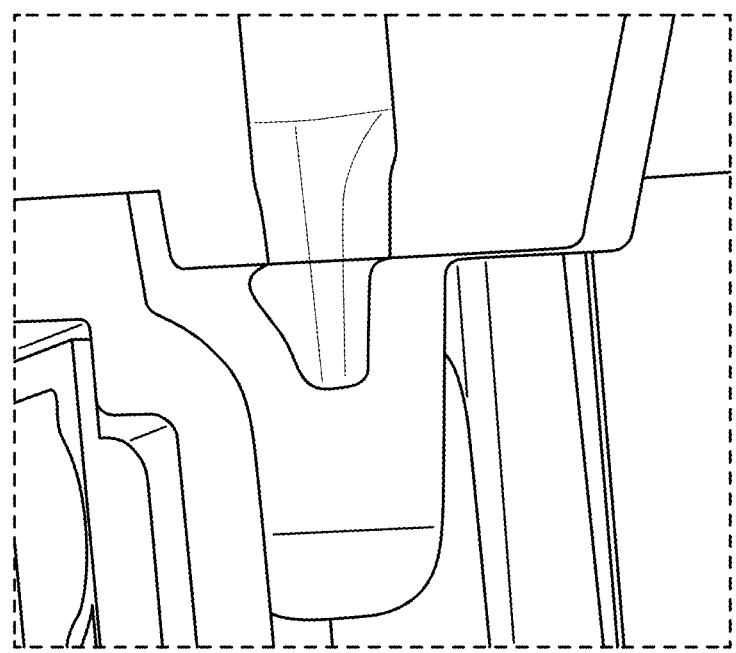
FIG. 38 illustrates a close-up view of an end of the wick feed that is positioned proximate to the wick and configured to at least partially receive the wick.

Referring to FIG. 38, a close-up view of an end of the wick feed that is positioned proximate to the wick (e.g., at the end configured to at least partially receive the wick) where optionally at least a portion of the wick is sandwiched between two or more prongs extending from the end of the wick feed.

Figure 39:
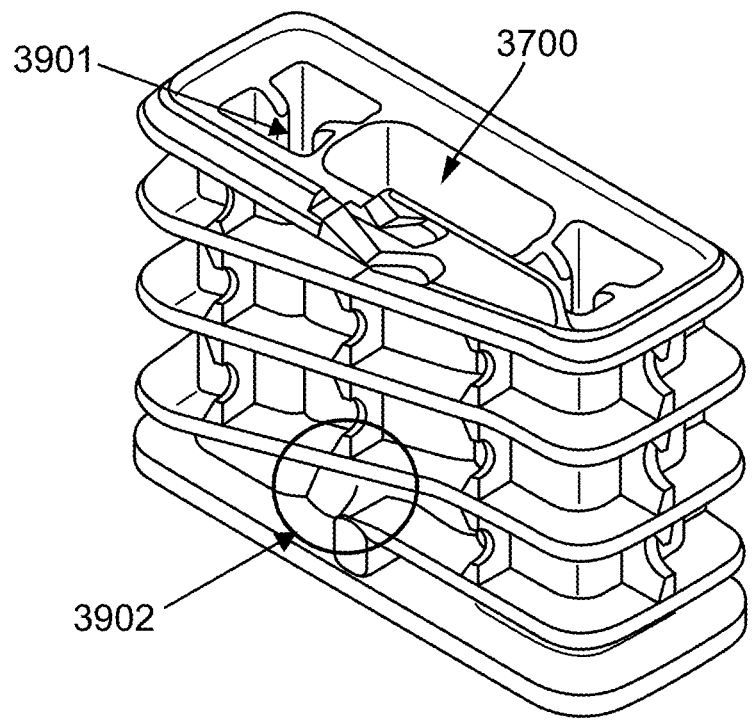
FIG. 39 illustrates a perspective view of an example collector structure having a square-design wick feed in combination with an air gap at one end of the overflow passageway.

FIG. 39 illustrates a perspective view of an example collector structure having a square-design wick feed in combination with an air gap at one end of the overflow passageway.

Figure 40A:
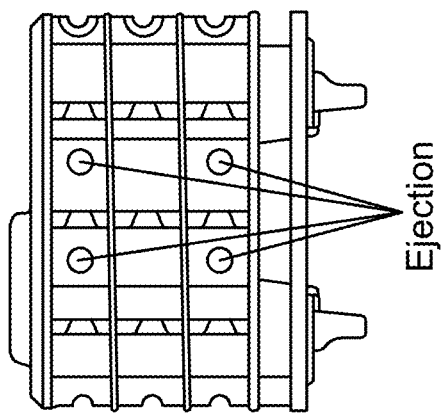
FIG. 40A illustrates a rear view of the collector structure with four distinct ejection sites, for example.
Figure 40B:
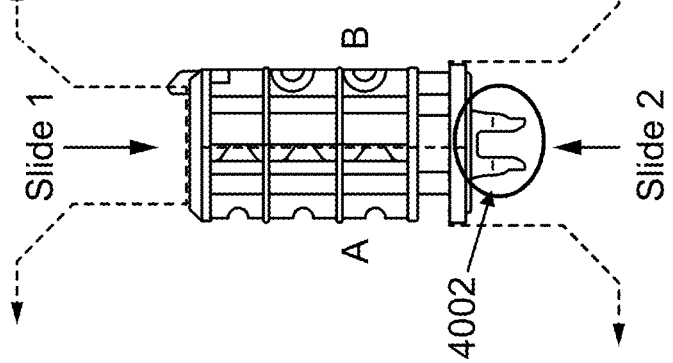
FIG. 40B illustrates a side view of the collector structure particularly showing a clamp-shaped end portion of a wick feed that can firmly hold the wick in the pathway of the wick feed, for example.
Figure 40C:
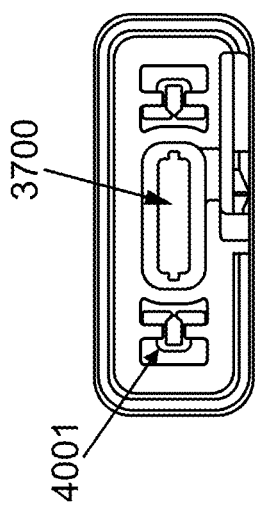
FIG. 40C illustrates a top view of the collector structure with wick feed channels for receiving vaporizable material from the cartridge's storage chamber and leading the vaporizable material towards the wick being held in position at the end of the wick feed channels by the projecting ends of the wick feed channels.

Referring to FIGS. 40A through 40E, rear, side, top, frontal, and bottom views of an example collector structure are respectively illustrated. FIG. 40A illustrates a rear view of the collector structure with four distinct ejection sites, for example. FIG. 40B illustrates a side view of the collector structure particularly showing an clamp-shaped end portion 4002 of a wick feed that can firmly hold the wick in the pathway of the wick feed, for example. As shown in FIG. 40C, the portion of the cartridge body that extends internally to the cartridge body from the mouthpiece can be received through a central channel 3700 in the collector structure forming an airway passageway for the vaporized vaporizable material 1302 to escape from the atomizer towards the mouthpiece.

FIG. 40C illustrates a top view of the collector structure with wick feed channels 4001 for receiving vaporizable material from the cartridge's storage chamber and leading the vaporizable material towards the wick being held in position at the end of the wick feed channels 4001 by the projecting ends of the wick feed channels 4001 forming the clamp-shaped end portion 4002.

Figure 40D:
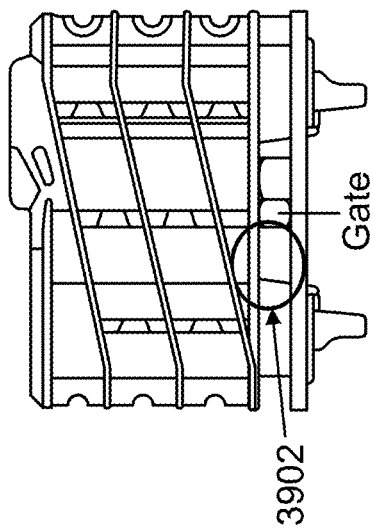
FIG. 40D illustrates a frontal planar view of the collector structures. As shown an air gap cavity may be formed at the lower portion of the collector structure at the end of a lower rib of the collector structure where the overflow passageway of the collector leads to an air control vent in communication with ambient air.

FIG. 40D illustrates a frontal planar view of the collector structures. As shown, an air gap cavity may be formed at the lower portion of the collector structure at the end of a lower rib of the collector structure where the overflow passageway of the collector leads to an air control vent 3902 in communication with ambient air. The portion of the cartridge body that extends from the mouthpiece can be received through the central channel 3700 in the collector structure forming an airway passageway for the vaporized vaporizable material 1302 to escape from the atomizer towards the mouthpiece.

Figure 40E:
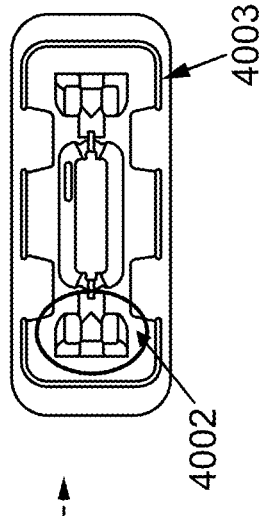
FIG. 40E illustrates a bottom view of the collector structure with wick feed channels ending in clamp-shaped projection that are configured to hold the wick in position on each end.

FIG. 40E illustrates a bottom view of the collector 1313 structure where two wick feed channels end in two clamp-shaped end portions 4002 configured to hold the wick in position at the bottom end of the collector 1313. As shown, optionally, a segmented ridge, flange, or lip 4003 may be formed on the surface of the bottom end of the collector 1313, where the collector 1313 connects to the upper portion of the plug 760 at the time of assembly. The lip 4003 provides for a pressure-tight engagement between the upper portion of the plug 760 and the lower portion of the collector 1313, functioning in a similar manner as a flexible O-ring, so that a proper seal may be established during assembly. In one embodiment, the bottom end of the collector 1313 may be laser welded to the upper portion of the plug 760.

Figure 41A:
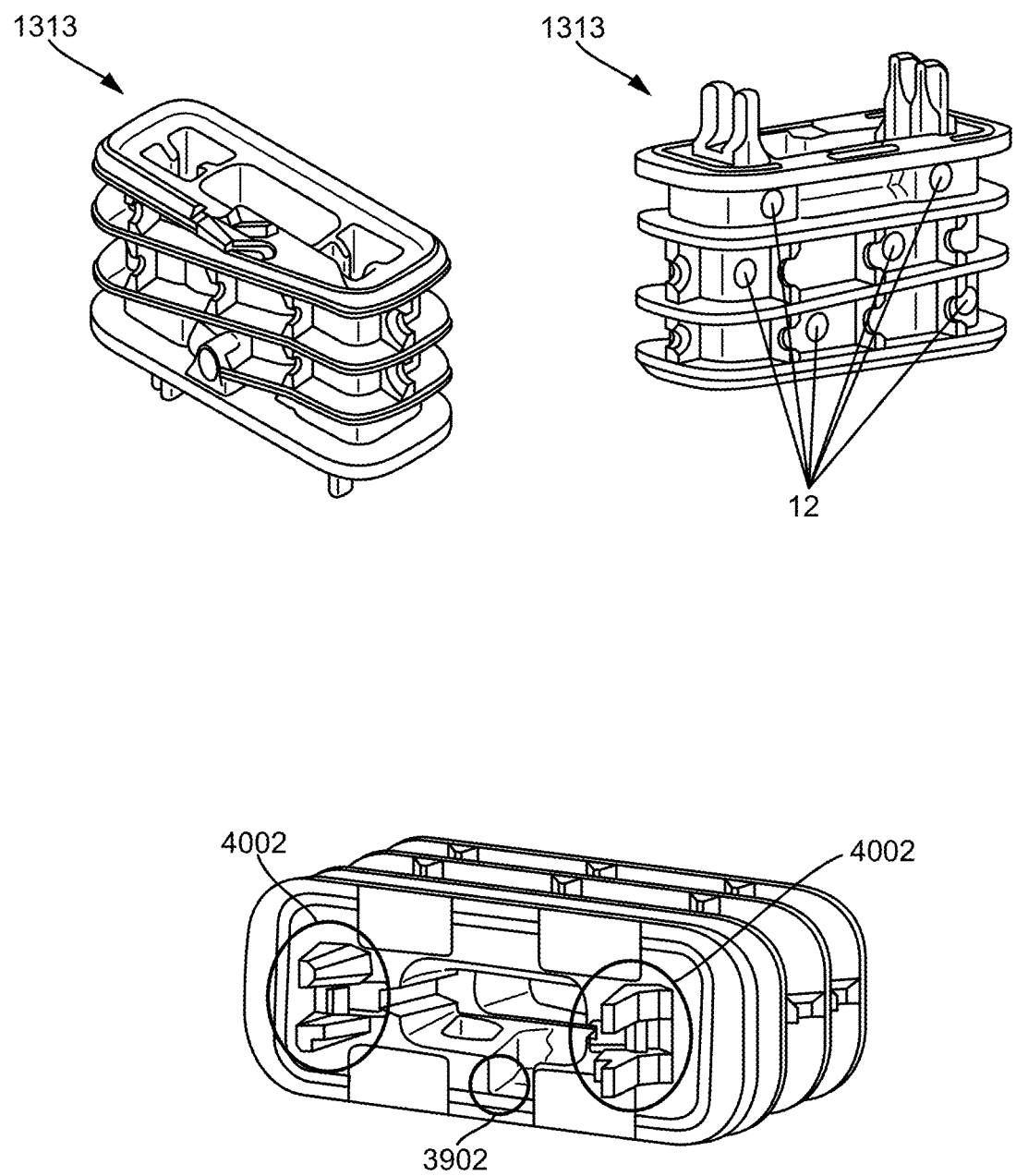
FIGS. 41A and 41B illustrates planar top and side views of the collector structure with two clamp-shaped end portions of two corresponding wick feeds.
Figure 41B:
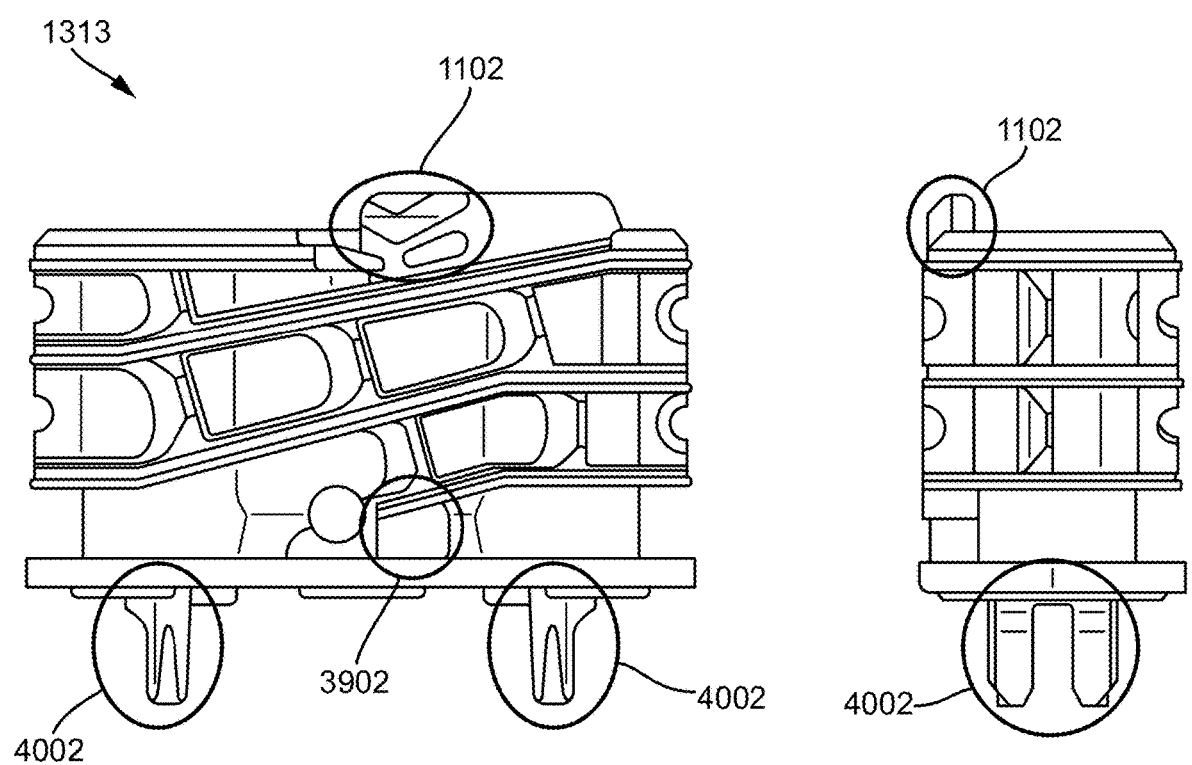

FIGS. 41A and 41B illustrates planar top and side views of an alternative embodiment of the collector structure having two of the clamp-shaped end portion 4002 and two corresponding wick feeds. As shown, this alternative embodiment is shorter in height in comparison with the embodiment illustrated in FIG. 40A. This reduced height provides improved functionality by structurally changing the shape of the collector 1313 and the length of the passageway in the collector 1313 in which vaporizable material 1302 flows. As such, depending on implementation, the length of the vaporizable material 1302 passageway through the collector 1313 may be shorter in certain embodiments to provide for a more effective capillary pressure and better management of the flow of vaporizable material 1302 into the collector 1313 passageway.

Figure 42A:
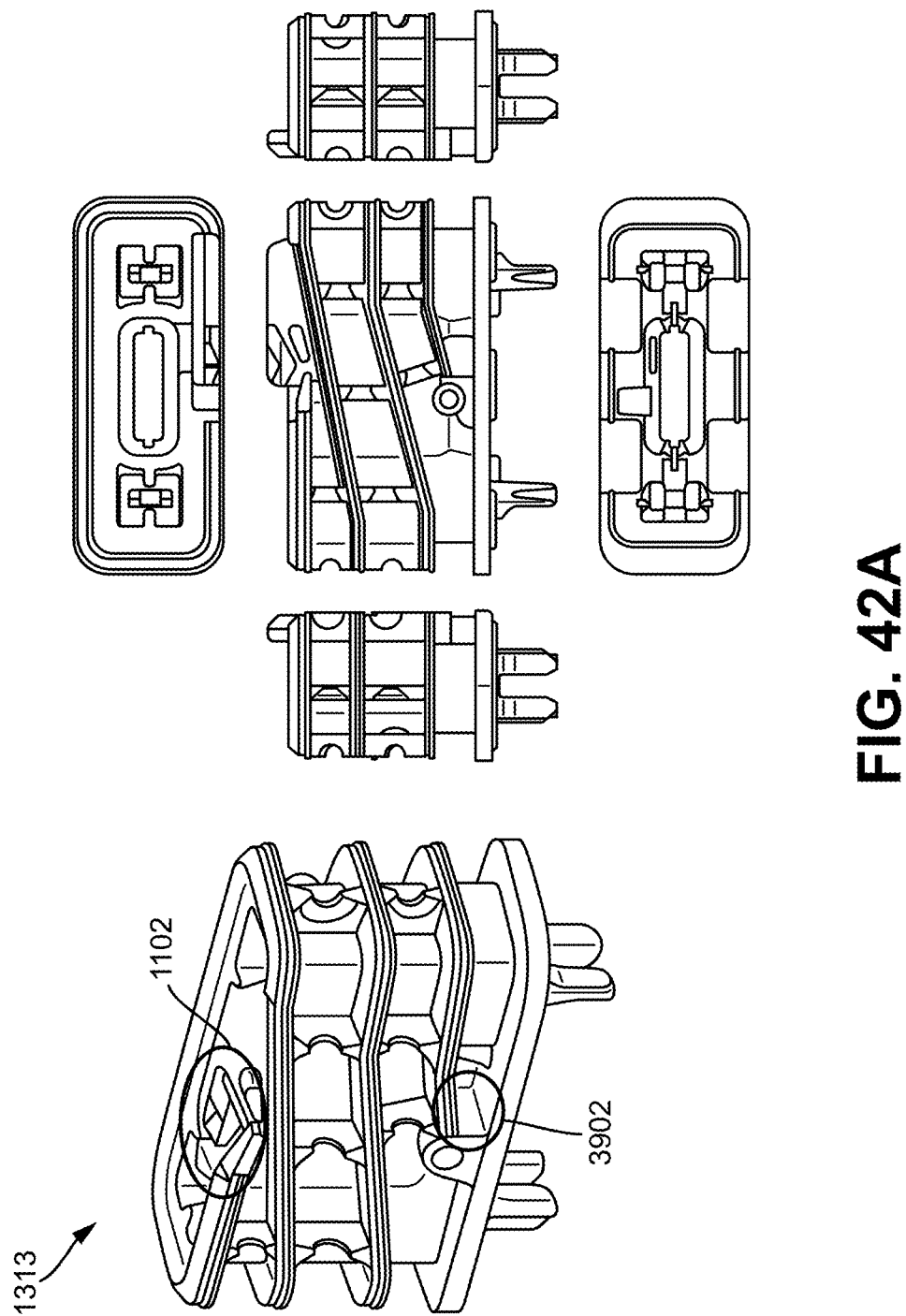

FIGS. 42A and 42B illustrate various perspective, top, bottom and side views of an example collector 1313 with different structural implementations. For example, the embodiment shown in FIG. 42A includes constriction points that include vertically positioned C-shaped walls. In contrast, in the embodiment shown in FIG. 42B, the C-shaped walls are diagonally positioned to promote a more controlled flow of vaporizable material 1302 along the collector 1313 passageway. As shown in the example embodiment of FIG. 42B, the C-shaped walls are positioned diagonally with respect to the bottom blade of the collector, and positioned vertically with respect to the blade portions in the collector that slope downwardly.

As noted earlier, the rate of flow into and out of the collector 1313 is controlled by way of manipulating the hydraulic diameter of the overflow channel 1104 in the collector 1313 through the introduction one or more constriction points, which effectively reduce the overall volume of the overflow channel 1104. As shown, the introduction of multiple constriction points in the overflow channel 1104 divides the overflow channel into multiple segments in which vaporizable material 1302 may flow in either a first or a second direction, for example, toward or away from the air control vent 3902, respectively.

Introduction of the constriction points helps establish or control the capillary pressure state in the overflow channel 1104 such that the hydraulic flow of vaporizable material 1302 towards the air control vent 3902 is minimized in a pressure state when the pressure in the cartridge reservoir is equal or less than the ambient air. In a pressure state in which the pressure in the reservoir is lower than the ambient pressure (e.g., beyond a first threshold), the constriction points are configured to control the capillary pressure or hydraulic flow of vaporizable material 1302 in the overflow channel 1104 such that ambient air may enter the overflow channel 1104 through the air control vent 3904 and travel up toward the controlled fluidic gate 1102 into the reservoir to vent (i.e., establish an equilibrium pressure state in) the cartridge.

In certain embodiments or scenarios, the above noted venting process may not involve or require the entrance of ambient air through the air control vent 3904. In some example scenarios, instead of or in addition to air entering through the air control vent 3904, any air bubbles or gases trapped inside the overflow channel 1104 may travel up toward the controlled fluidic gate 1102 to help establish an equilibrium pressure state in the cartridge by way of venting the reservoir when the air bubbles are introduced into the reservoir from the overflow channel 1104 through the controlled fluidic gate 1102, as provided in further detail herein with reference to FIGS. 11M and 11N, for example. The design of the constriction points and the C-shaped walls formed in the path of the overflow channel 1104, as shown in FIGS. 42A and 42B, promotes a more controlled flow of the vaporizable material 1302 through the overflow channel 1104 by way of better managing the capillary pressure throughout the path of the overflow control channel 1104.

Figure 43A:
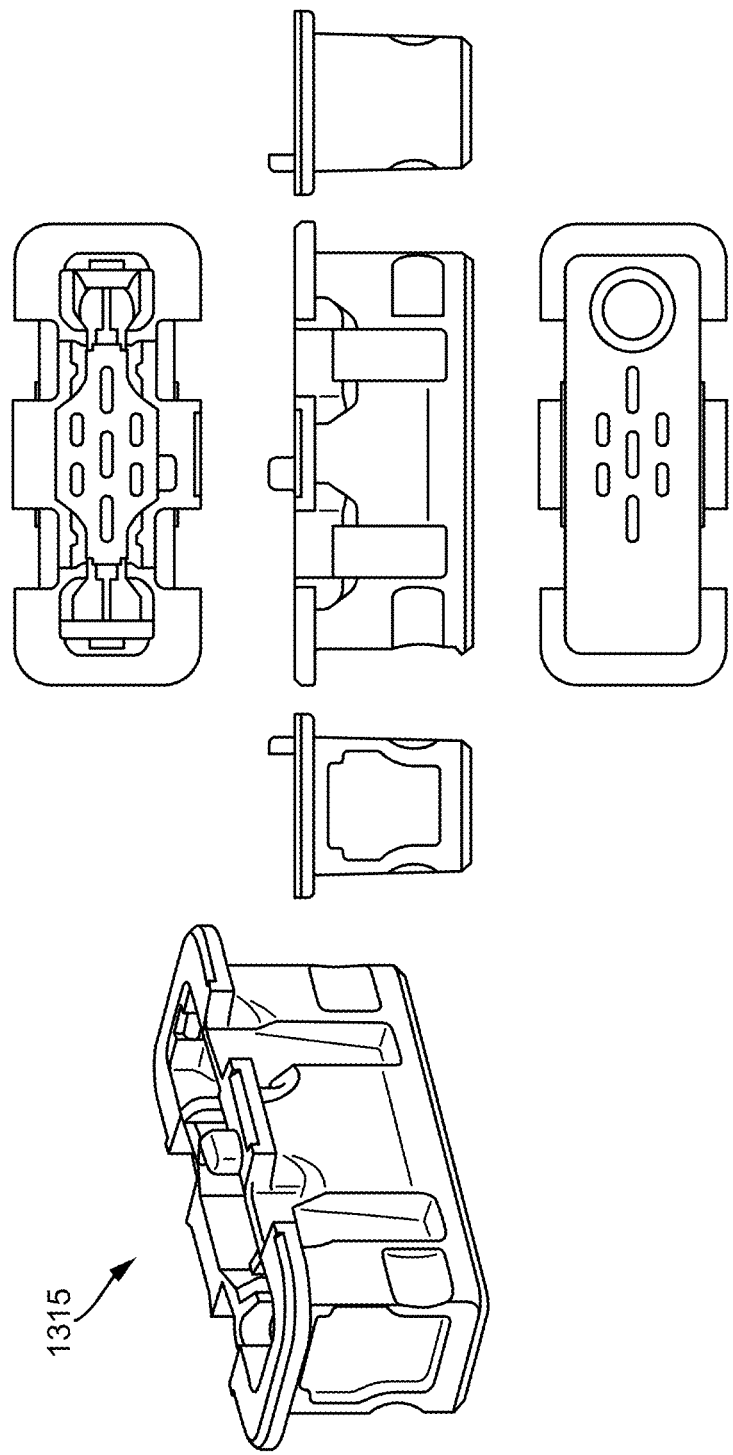
FIG. 43A illustrates various perspective, top and side views of an example wick housing, in accordance with one or more embodiments.

FIG. 43A illustrates various perspective, top, bottom and side views of an example wick housing 1315, in accordance with one or more embodiments. As shown, one or more perforations or holes may be formed in the lower portion of the wick housing 1315 to accommodate airflow through a wick positioned in the wick housing 760 of the wick housing 1315. A sufficient number of holes would promote adequate airflow through the wick housing 760 and will provide for the proper and timely vaporization of vaporizable material 1302 absorbed into the wick in reaction to the heat generated by the heating element positioned near or around the wick.

Figure 43B:
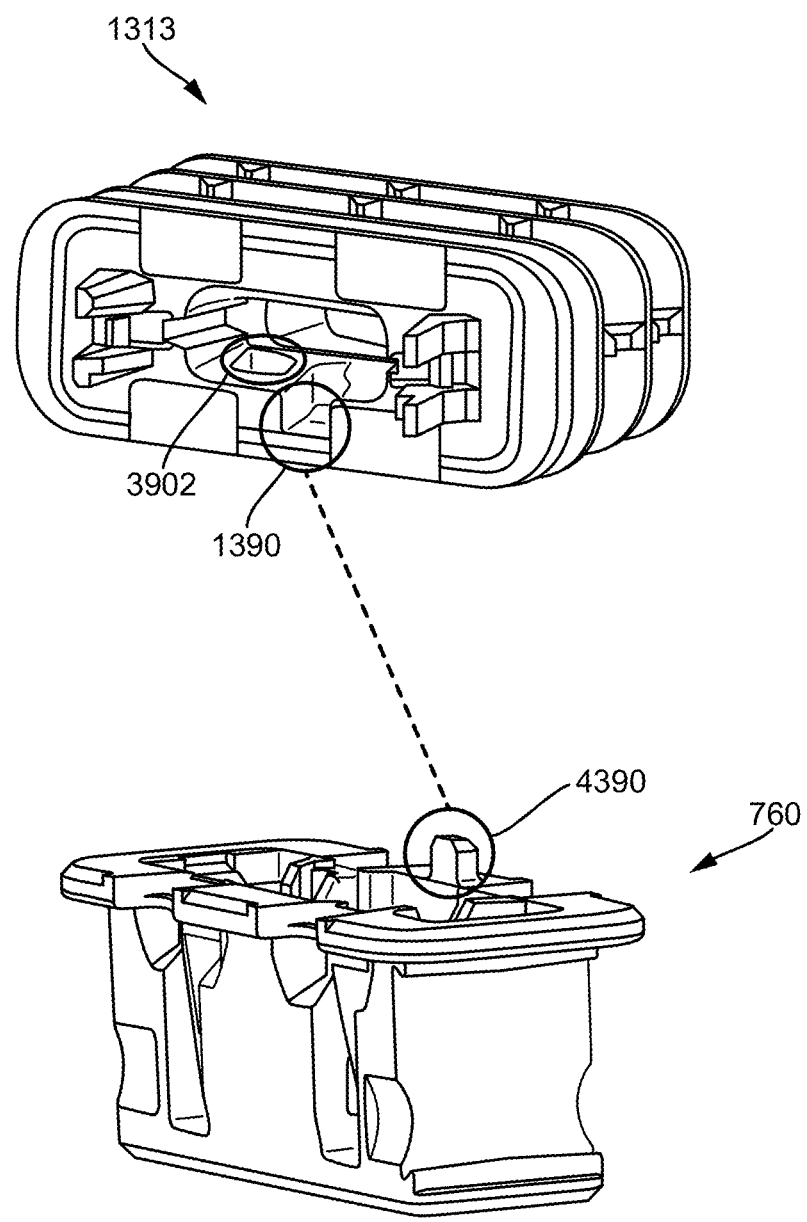
FIG. 43B illustrates the collector and wick housing components of an example cartridge wherein a protruding tab is configured in the structure of the wick housing to be insertably received into a receiving notch or cavity in a corresponding bottom portion of the collector.

FIG. 43B illustrates the collector 1313 and wick housing 760 components of an example cartridge 1320, in accordance with one or more embodiments. As shown, the wick housing 1315 (which includes the wick-housing portion of the cartridge) may be implemented to include a protruding member or tab 4390. The tab 4390 may be configured to extend from the upper end of the wick housing 1315, which during assembly mates with a receiving end of the collector 1313. The tab 4390 may include one or more facets that correspond to or match one or more facets in a receiving notch or receiving cavity 1390 in, for example, the bottom portion of the collector 1313. The receiving cavity 1390 may be configured to removably receive the tab 4390 for a snap-fit engagement, for example. The snap-fit arrangement may assist with holding the collector 1313 and the wick housing 1315 together during or after assembly.

In certain embodiments, the tab 4390 may be utilized to direct the orientation of the wick housing 1315 during assembly. For example, in one embodiment one or more vibrating mechanisms (e.g., vibrating bowls) may be utilized to temporarily store or stage the various components of the cartridge 1320. According to some implementations, the tab 4390 may be helpful in orienting the upper portion of the wick housing 1315 for a mechanical gripper for the purpose of easy engagement and correct automated assembly.

Additional and/or Alternative Heating Element Embodiments

As noted above, the vaporizer cartridge consistent with implementations of the current subject matter may include one or more heating elements. FIGS. 44A-116 illustrate embodiments of a heating element consistent with implementations of the current subject matter. While the features described and shown with respect to FIGS. 44A-116 may be included in the various embodiments of the vaporizer cartridges described above and/or may include one or more features of the various embodiments of the vaporizer cartridges described above, the features of the heating elements described and shown with respect to FIGS. 44A-116 may additionally and/or alternatively be included in one or more other example embodiments of vaporizer cartridges, such as those described below.

A heating element consistent with implementations of the current subject matter may desirably be shaped to receive a wicking element and/or crimped or pressed at least partially around the wicking element. The heating element may be bent such that the heating element is configured to secure the wicking element between at least two or three portions of the heating element. The heating element may be bent to conform to a shape of at least a portion of the wicking element. The heating element may be more easily manufacturable than typical heating elements. The heating element consistent with implementations of the current subject matter may also be made of an electrically conductive metal suitable for resistive heating and in some implementations, the heating element may include selective plating of another material to allow the heating element (and thus, the vaporizable material) to be more efficiently heated.

FIG. 44A illustrates an exploded view of an embodiment of the vaporizer cartridge 120, FIG. 44B illustrates a perspective view of an embodiment of the vaporizer cartridge 120, and FIG. 44C illustrates a bottom perspective view of an embodiment of the vaporizer cartridge 120. As shown in FIGS. 44A-44C, the vaporizer cartridge 120 includes a housing 160 and an atomizer assembly (or the atomizer) 141.

The atomizer assembly 141 (see FIGS. 99-101) may include a wicking element 162, a heating element 500, and a wick housing 178. As explained in more detail below, at least a portion of the heating element 500 is positioned between the housing 160 and the wick housing 178 and is exposed to be coupled with a portion of the vaporizer body 110 (e.g., electrically coupled with the receptacle contacts 125). The wick housing 178 may include four sides. For example, the wick housing 178 may include two opposing short sides and two opposing long sides. The two opposing long sides may each include at least one (two or more) recess 166 (see FIGS. 99, 111A). The recesses 166 may be positioned along the long side of the wick housing 178 and adjacent to respective intersections between the long sides and the short sides of the wick housing 178. The recesses 166 may be shaped to releasably couple with a corresponding feature (e.g., a spring) on the vaporizer body 110 to secure the vaporizer cartridge 120 to the vaporizer body 110 within the cartridge receptacle 118. The recesses 166 provides a mechanically stable securement means to couple the vaporizer cartridge 120 to the vaporizer body 110.

In some implementations, the wick housing 178 also includes an identification chip 174, which may be configured to communicate with a corresponding chip reader located on the vaporizer. The identification chip 174 may be glued and/or otherwise adhered to the wick housing 178, such as on a short side of the wick housing 178. The wick housing 178 may additionally or alternatively include a chip recess 164 (see FIG. 100) that is configured to receive the identification chip 174. The chip recess 164 may be surrounded by two, four, or more walls. The chip recess 164 may be shaped to secure the identification chip 174 to the wick housing 178.

As noted above, the vaporizer cartridge 120 may generally include a reservoir, an air path, and an atomizer assembly 141. In some configurations, the heating element and/or atomizer described in accordance with implementations of the current subject matter can be implemented directly into a vaporizer body and/or may not be removable from the vaporizer body. In some implementations, the vaporizer body may not include a removable cartridge.

Various advantages and benefits of the current subject matter may relate to improvements relative to current vaporizer configurations, methods of manufacture, and the like. For example, a heating element of a vaporizer device consistent with implementations of the current subject matter may desirably be made (e.g., stamped) from a sheet of material and either crimped around at least a portion of a wicking element or bent to provide a preformed element configured to receive the wicking element (e.g., the wicking element is pushed into the heating element and/or the heating element is held in tension and is pulled over the wicking element). The heating element may be bent such that the heating element secures the wicking element between at least two or three portions of the heating element. The heating element may be bent to conform to a shape of at least a portion of the wicking element. Configurations of the heating element allows for more consistent and enhanced quality manufacturing of the heating element. Consistency of manufacturing quality of the heating element may be especially important during scaled and/or automated manufacturing processes. For example, the heating element consistent with implementations of the current subject matter helps to reduce tolerance issues that may arise during manufacturing processes when assembling a heating element having multiple components.

In some implementations, accuracy of measurements taken from the heating element (e.g., a resistance, a current, a temperature, etc.) may be improved due at least in part to the improved consistency in manufacturability of the heating element having reduced tolerance issues. Greater accuracy in measurements can provide an enhanced user experience when using the vaporizer device. For example, as mentioned above, the vaporizer 100 may receive a signal to activate the heating element, either to a full operating temperature for creation of an inhalable dose of vapor/aerosol or to a lower temperature to begin heating the heating element. The temperature of the heating element of the vaporizer may depend on a number of factors, as noted above, and several of these factors can be made more predictable by elimination of potential variations in fabrication and assembly of atomizer components. A heating element made (e.g., stamped) from a sheet of material and either crimped around at least a portion of a wicking element or bent to provide a preformed element desirably helps to minimize heat losses and helps to ensure that the heating element behaves predictably to be heated to the appropriate temperature.

Additionally, as noted above, the heating element may be entirely and/or selectively plated with one or more materials to enhance heating performance of the heating element. Plating all or a portion of the heating element may help to minimize heat losses. Plating may also help in concentrating the heated portion of the heating element in the proper location, providing a more efficiently heated heating element and further reducing heat losses. Selective plating may help to direct the current provided to the heating element to the proper location. Selective plating may also help to reduce the amount of plating material and/or costs associated with manufacturing the heating element.

Once the heating element is formed into the appropriate shape via one or more processes discussed below, the heating element may be crimped around the wicking element and/or bent into the proper position to receive the wicking element. The wicking element may, in some implementations, be a fibrous wick, formed as an at least approximately flat pad or with other cross-sectional shapes such as circles, ovals, etc. A flat pad can allow for the rate that the vaporizable material is drawn into the wicking element to be controlled more precisely and/or accurately. For example, a length, width, and/or thickness can be adjusted for optimal performance. A wicking element forming a flat pad may also provide a greater transfer surface area, which may allow for increased flow of the vaporizable material from the reservoir into the wicking element for vaporization by the heating element (in other words, larger mass transfer of vaporizable material), and from the wicking element to air flowing past it. In such configurations, the heating element may contact the wicking element in multiple directions (e.g., on at least two sides of the wicking element) to increase efficiency of the process of drawing vaporizable material into the wicking element and vaporizing the vaporizable material. The flat pad may also be more easily shaped and/or cut, and thus may be more easily assembled with the heating element. In some implementations, as discussed in more detail below, the heating element may be configured to contact the wicking element on only one side of the wicking element.

The wicking element may include one or more rigid or compressible materials, such as cotton, silica, ceramic, and/or the like. Relative to some other materials, a cotton wicking element may allow for an increased and/or more controllable flow rate of vaporizable material from the reservoir of the vaporizer cartridge into the wicking element to be vaporized. In some implementations, the wicking element forms an at least approximately flat pad that is configured to contact the heating element and/or be secured between at least two portions of the heating element. For example, the at least approximately flat pad may have at least a first pair of opposing sides that are approximately parallel to one another. In some implementations, the at least approximately flat pad may also have at least a second pair of opposing sides that are approximately parallel to one another, and approximately perpendicular to the first pair of opposing sides.

Figure 45:
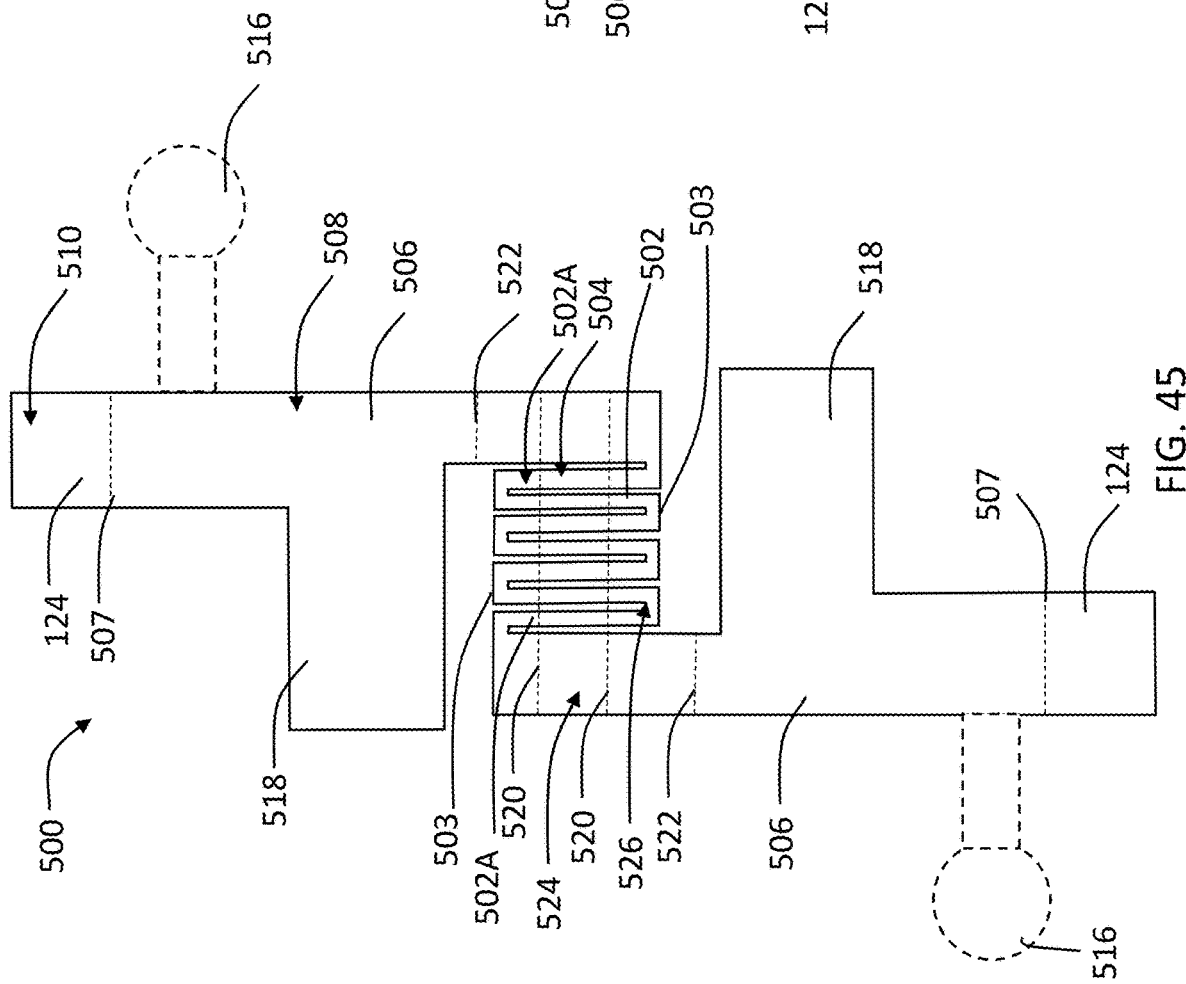
FIG. 45 shows a schematic view of a heating element for use in a vaporizer device consistent with implementations of the current subject matter.

FIGS. 45-48 illustrate schematic views of a heating element 500 consistent with implementations of the current subject matter. For example, FIG. 45 illustrates a schematic view of a heating element 500 in an unfolded position. As shown, in the unfolded position, the heating element 500 forms a planar heating element. The heating element 500 may be initially formed of a substrate material. The substrate material is then cut and/or stamped into the proper shape via various mechanical processes, including but not limited to stamping, laser cutting, photo-etching, chemical etching, and/or the like.

The substrate material may be made of an electrically conductive metal suitable for resistive heating. In some implementations, the heating element 500 includes a nickel-chromium alloy, a nickel alloy, stainless steel, and/or the like. As discussed below, the heating element 500 may be plated with a coating in one or more locations on a surface of the substrate material to enhance, limit, or otherwise alter the resistivity of the heating element in the one or more locations of the substrate material (which can be all or a portion of the heating element 500).

The heating element 500 includes one or more tines 502 (e.g., heating segments) located in a heating portion 504, one or more connecting portions or legs 506 (e.g., one, two, or more) located in a transition region 508, and a cartridge contact 124 located in an electrical contact region 510 and formed at an end portion of each of the one or more legs 506. The tines 502, the legs 506, and the cartridge contacts 124 may be integrally formed. For example, the tines 502, the legs 506, and the cartridge contacts 124 form portions of the heating element 500 that is stamped and/or cut from the substrate material. In some implementations, the heating element 500 also includes a heat shield 518 that extends from one or more of the legs 506 and also may be integrally formed with the tines 502, the legs 506, and the cartridge contacts 124.

In some implementations, at least a portion of the heating portion 504 of the heating element 500 is configured to interface with the vaporizable material drawn into the wicking element from the reservoir 140 of the vaporizer cartridge 120. The heating portion 504 of the heating element 500 may be shaped, sized, and/or otherwise treated to create a desired resistance. For example, the tines 502 located in the heating portion 504 may be designed so that the resistance of the tines 502 matches the appropriate amount of resistance to influence localized heating in the heating portion 504 to more efficiently and effectively heat the vaporizable material from the wicking element. The tines 502 form thin path heating segments or traces in series and/or in parallel to provide the desired amount of resistance.

The tines 502 (e.g., traces) may include various shapes, sizes, and configurations. In some configurations, one or more of the tines 502 may be spaced to allow the vaporizable material to be wicked out of the wicking element and from there, vaporized off side edges of each of the tines 502. The shape, length, width, composition, etc., among other properties of the tines 502 may be optimized to maximize the efficiency of generating an aerosol by vaporizing vaporizable material from within the heating portion of the heating element 500 and to maximize electrical efficiency. The shape, length, width, composition, etc., among other properties of the tines 502 may additionally or alternatively be optimized to uniformly distribute heat across the length of the tines 502 (or a portion of the tines 502, such as at the heating portion 504). For example, the width of the tines 502 may be uniform or variable along a length of the tines 502 to control the temperature profile across at least the heating portion 504 of the heating element 500. In some examples, the length of the tines 502 may be controlled to achieve a desired resistance along at least a portion of the heating element 500, such as at the heating portion 504. As shown in FIGS. 45-48, the tines 502 each have the same size and shape. For example, the tines 502 include an outer edge 503 that is approximately aligned and have a generally rectangular shape, with flat or squared outer edges 503 (see also FIG. 49-53) or rounded outer edges 503 (see FIGS. 54 and 55). In some implementations, one or more of the tines 502 may include outer edges 503 that are not aligned and/or may be differently sized or shaped (see FIGS. 57-62). In some implementations, the tines 502 may be evenly spaced or have variable spacing between adjacent tines 502 (see FIGS. 87-92). The particular geometry of the tines 502 may be desirably selected to produce a particular localized resistance for heating the heating portion 504, and to maximize performance of the heating element 500 to heat the vaporizable material and generate an aerosol.

Figures 47, 48:
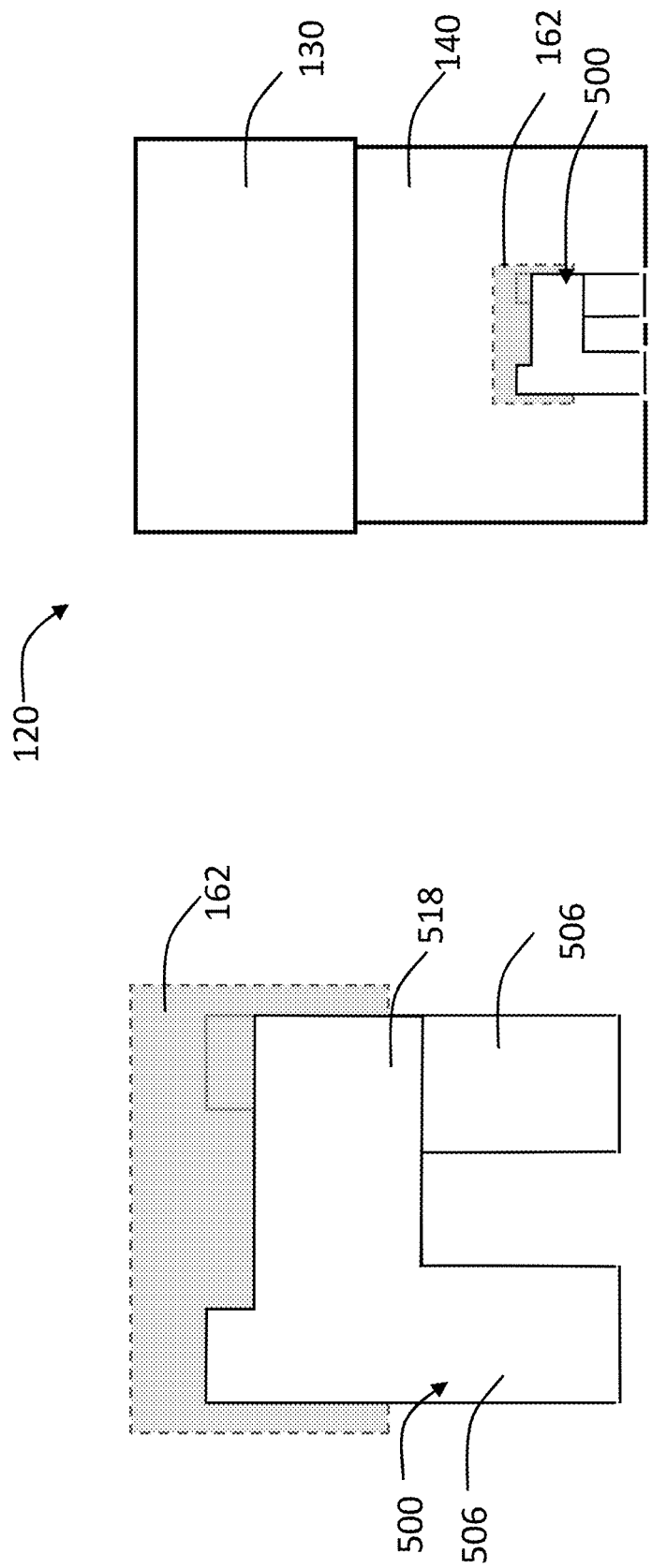
FIG. 47 shows a schematic view of a heating element for use in a vaporizer device consistent with implementations of the current subject matter.
FIG. 48 shows a schematic view of a heating element positioned in a vaporizer cartridge for use in a vaporizer device consistent with implementations of the current subject matter.
Figure 49:
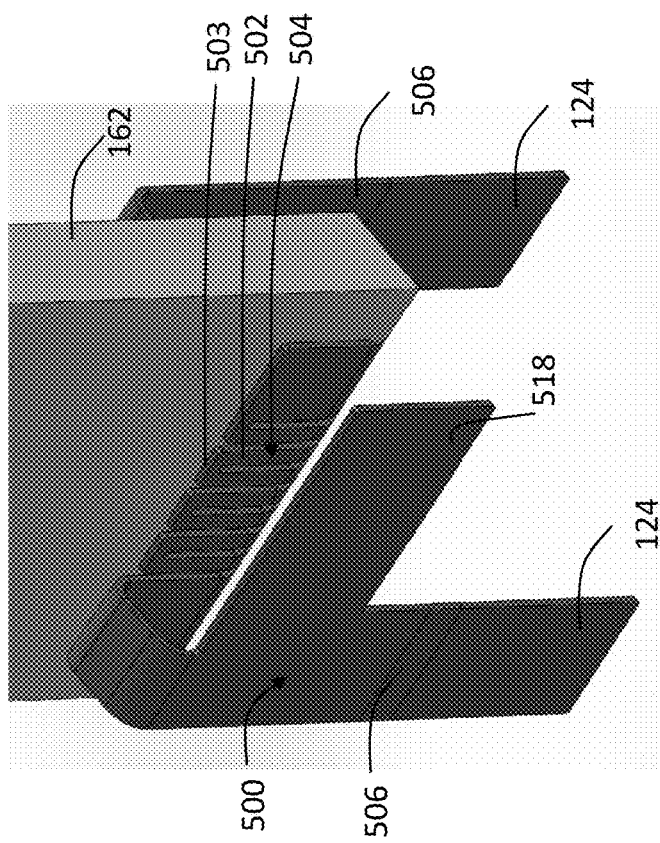
FIG. 49 shows a heating element and a wicking element consistent with implementations of the current subject matter.
Figure 50:
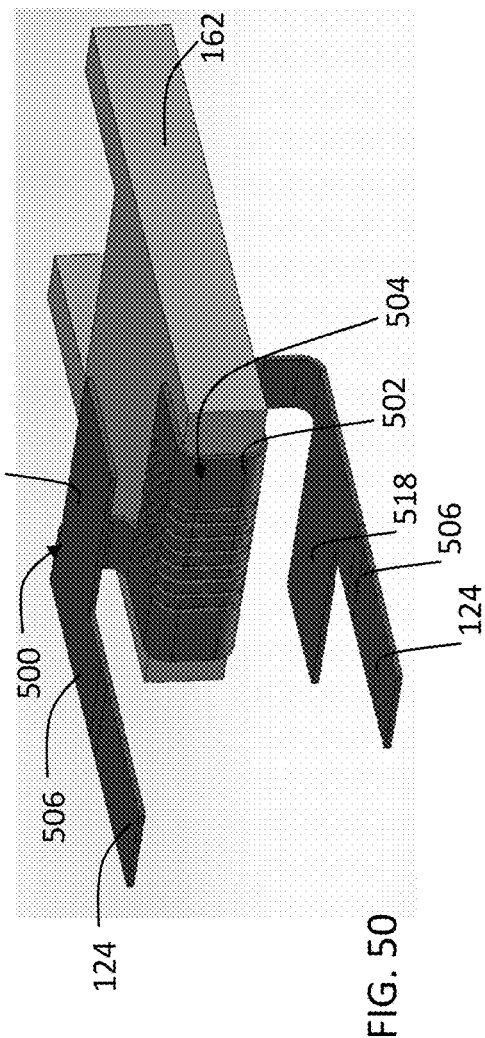
FIG. 50 shows a heating element and a wicking element consistent with implementations of the current subject matter.
Figure 51:
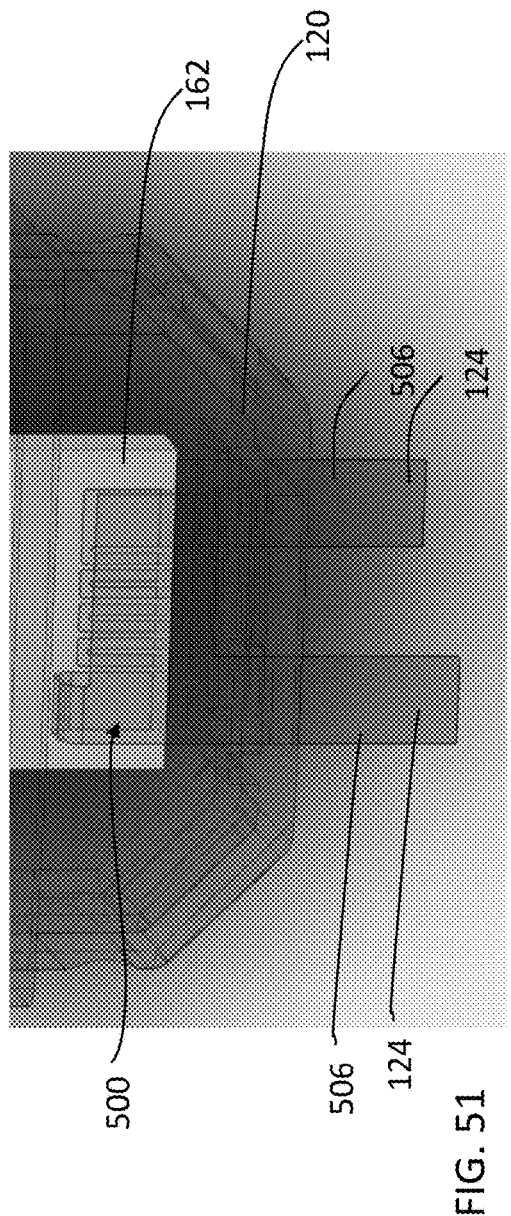
FIG. 51 shows a heating element and a wicking element positioned within a vaporizer cartridge consistent with implementations of the current subject matter.
Figure 52:
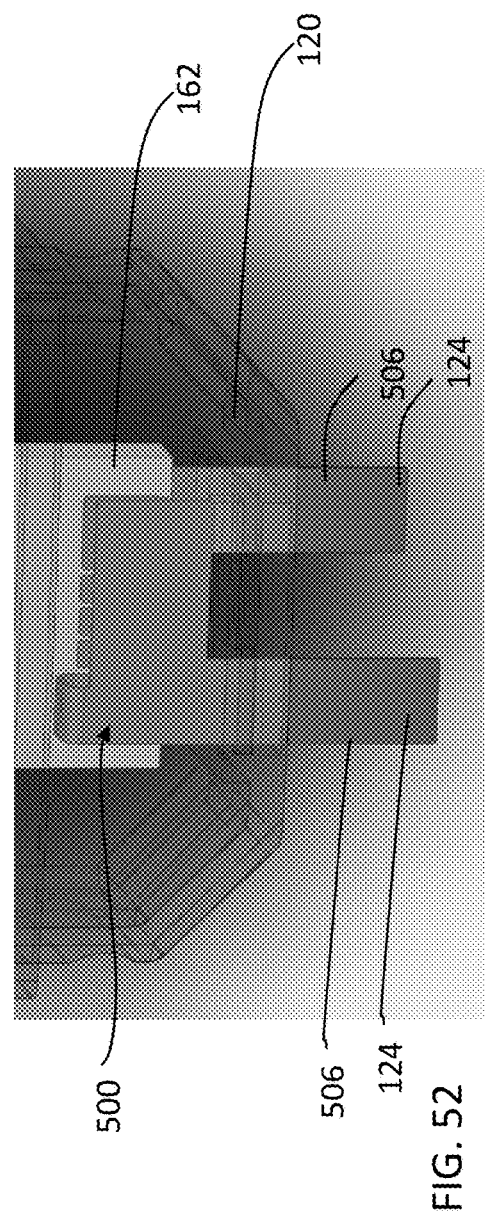
FIG. 52 shows a heating element and a wicking element positioned within a vaporizer cartridge consistent with implementations of the current subject matter.
Figure 53:
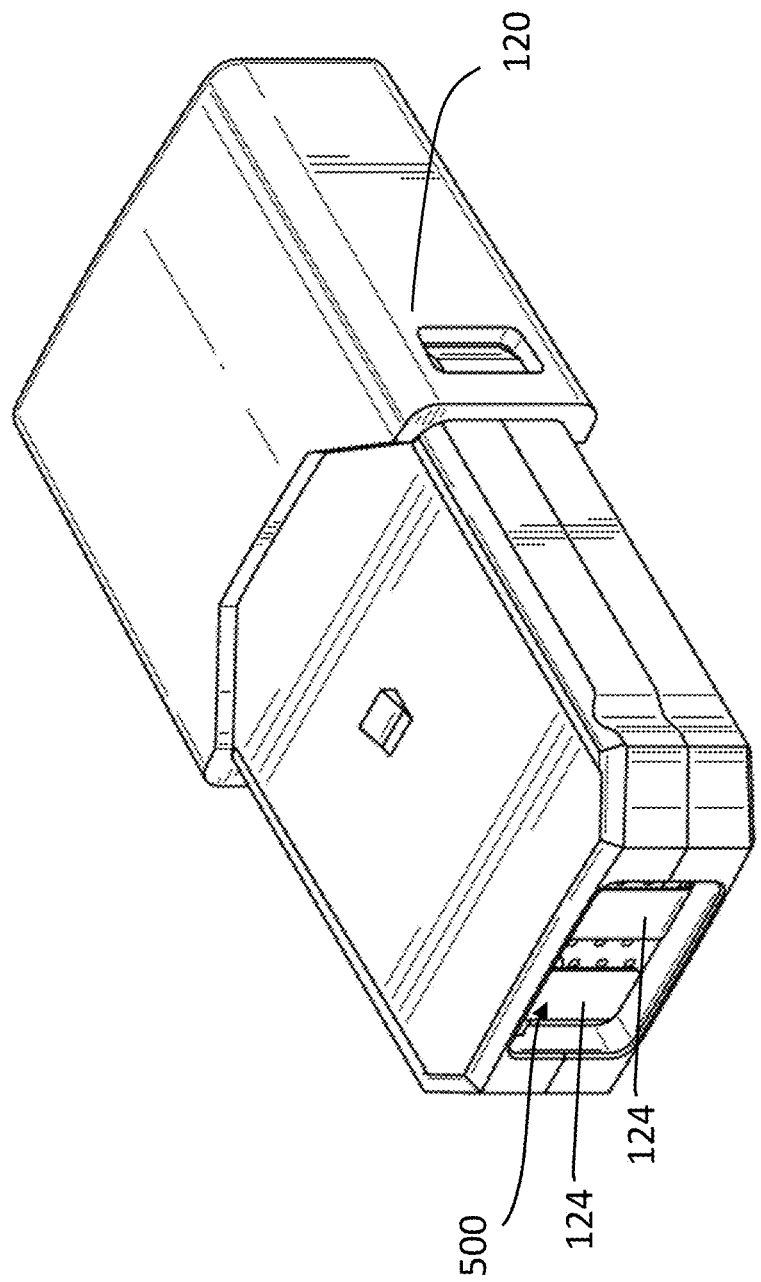
FIG. 53 shows a heating element positioned within a vaporizer cartridge consistent with implementations of the current subject matter.

The heating element 500 may include portions of wider and/or thicker geometry, and/or differing composition relative to the tines 502. These portions may form electrical contact areas and/or more conductive parts, and/or may include features for mounting the heating element 500 within the vaporizer cartridge. The legs 506 of the heating element 500 extend from an end of each outermost tine 502A. The legs 506 form a portion of the heating element 500 that has a width and/or thickness that is typically wider than a width of each of the tines 502. Though, in some implementations, the legs 506 have a width and/or thickness that is the same as or narrower than the width of each of the tines 502. The legs 506 couple the heating element 500 to the wick housing 178 or another portion of the vaporizer cartridge 120, so that the heating element 500 is at least partially or fully enclosed by the housing 160. The legs 506 provide rigidity to encourage the heating element 500 to be mechanically stable during and after manufacturing. The legs 506 also connect the cartridge contacts 124 with the tines 502 located in the heating portion 504. The legs 506 are shaped and sized to allow the heating element 500 to maintain the electrical requirements of the heating portion 504. As shown in FIG. 48, the legs 506 space the heating portion 504 from an end of the vaporizer cartridge 120 when the heating element 500 is assembled with the vaporizer cartridge 120. As discussed in more detail below, with respect to at least FIGS. 82-98 and 103-104, the legs 506 may also include a capillary feature 598, which limits or prevents fluid from flowing out of the heating portion 504 to other portions of the heating element 500.

In some implementations, one or more of the legs 506 includes one or more locating features 516. The locating features 516 may be used for relative locating of the heating element 500 or portions thereof during and/or after assembly by interfacing with other (e.g., adjacent) components of the vaporizer cartridge 120. In some implementations, the locating features 516 may be used during or after manufacturing to properly position the substrate material for cutting and/or stamping the substrate material to form the heating element 500 or post-processing of the heating element 500. The locating features 516 may be sheared off and/or cut off before crimping or otherwise bending the heating element 500.

In some implementations, the heating element 500 includes one or more heat shields 518. The heat shields 518 form a portion of the heating element 500 that extends laterally from the legs 506. When folded and/or crimped, the heat shields 518 are positioned offset in a first direction and/or a second direction opposite the first direction in the same plane from the tines 502. When the heating element 500 is assembled in the vaporizer cartridge 120, the heat shields 518 are configured to be positioned between the tines 502 (and the heating portion 504) and the body (e.g., plastic body) of the vaporizer cartridge 120. The heat shields 518 can help to insulate the heating portion 504 from the body of the vaporizer cartridge 120. The heat shields 518 help to minimize the effects of the heat emanating from the heating portion 504 on the body of the vaporizer cartridge 120 to protect the structural integrity of the body of the vaporizer cartridge 120 and to prevent melting or other deformation of the vaporizer cartridge 120. The heat shields 518 may also help to maintain a consistent temperature at the heating portion 504 by retaining heat within the heating portion 504, thereby preventing or limiting heat losses while vaporization is occurring. In some implementations, the vaporizer cartridge 120 may also or alternatively include a heat shield 518A that is separate from the heating element 500 (see FIG. 102).

As noted above, the heating element 500 includes at least two cartridge contacts 124 that form an end portion of each of the legs 506. For example, as shown in FIGS. 45-48, the cartridge contacts 124 may form the portion of the legs 506 that is folded along a fold line 507. The cartridge contacts 124 may be folded at an angle of approximately 90 degrees relative to the legs 506. In some implementations, the cartridge contacts 124 may be folded at other angles, such as at an angle of approximately 15 degrees, 25 degrees, 35 degrees, 45 degrees, 55 degrees, 65 degrees, 75 degrees or other ranges therebetween, relative to the legs 506. The cartridge contacts 124 may be folded towards or away from the heating portion 504, depending on the implementation.

The cartridge contacts 124 may also be formed on another portion of the heating element 500, such as along a length of at least one of the legs 506. The cartridge contacts 124 are configured to be exposed to the environment when assembled in the vaporizer cartridge 120 (see FIG. 53).

The cartridge contacts 124 may form conductive pins, tabs, posts, receiving holes, or surfaces for pins or posts, or other contact configurations. Some types of cartridge contacts 124 may include springs or other urging features to cause better physical and electrical contact between the cartridge contacts 124 on the vaporizer cartridge and receptacle contacts 125 on the vaporizer body 110. In some implementations, the cartridge contacts 124 include wiping contacts that are configured to clean the connection between the cartridge contacts 124 and other contacts or power source. For example, the wiping contacts would include two parallel, but offset, bosses that frictionally engage and slide against one another in a direction that is parallel or perpendicular to the insertion direction.

The cartridge contacts 124 are configured to interface with the receptacle contacts 125 disposed near a base of the cartridge receptacle of the vaporizer 100 such that the cartridge contacts 124 and the receptacle contacts 125 make electrical connections when the vaporizer cartridge 120 is inserted into and coupled with the cartridge receptacle 118. The cartridge contacts 124 may electrically communicate with the power source 112 of the vaporizer device (such as via the receptacle contacts 125, etc.). The circuit completed by these electrical connections can allow delivery of electrical current to the resistive heating element to heat at least a portion of the heating element 500 and may further be used for additional functions, such as for example for measuring a resistance of the resistive heating element for use in determining and/or controlling a temperature of the resistive heating element based on a thermal coefficient of resistivity of the resistive heating element, for identifying a cartridge based on one or more electrical characteristics of a resistive heating element or the other circuitry of the vaporizer cartridge, etc. The cartridge contacts 124 may be treated, as explained in more detail below, to provide improved electrical properties (e.g., contact resistance) using, for example, conductive plating, surface treatment, and/or deposited materials.

In some implementations, the heating element 500 may be processed through a series of crimping and/or bending operations to shape the heating element 500 into a desired three-dimensional shape. For example, the heating element 500 may be preformed to receive or crimped about a wicking element 162 to secure the wicking element between at least two portions (e.g., approximately parallel portions) of the heating element 500 (such as between opposing portions of the heating portion 504). To crimp the heating element 500, the heating element 500 may be bent along fold lines 520 towards one another. Folding the heating element 500 along fold lines 520 forms a platform tine portion 524 defined by the region between the fold lines 520 and side tine portions 526 defined by the region between the fold lines 520 and the outer edges 503 of the tines 502. The platform tine portion 524 is configured to contact one end of the wicking element 162. The side tine portions 526 are configured to contact opposite sides of the wicking element 162. The platform tine portion 524 and the side tine portions 526 form a pocket that is shaped to receive the wicking element 162 and/or conform to the shape of at least a portion of the wicking element 162. The pocket allows the wicking element 162 to be secured and retained by the heating element 500 within the pocket. The platform tine portion 524 and the side tine portions 526 contact the wicking element 162 to provide a multi-dimensional contact between the heating element 500 and the wicking element 162. Multi-dimensional contact between the heating element 500 and the wicking element 162 provides for a more efficient and/or faster transfer of the vaporizable material from the reservoir 140 of the vaporizer cartridge 120 to the heating portion 504 (via the wicking element 162) to be vaporized.

Figure 46:
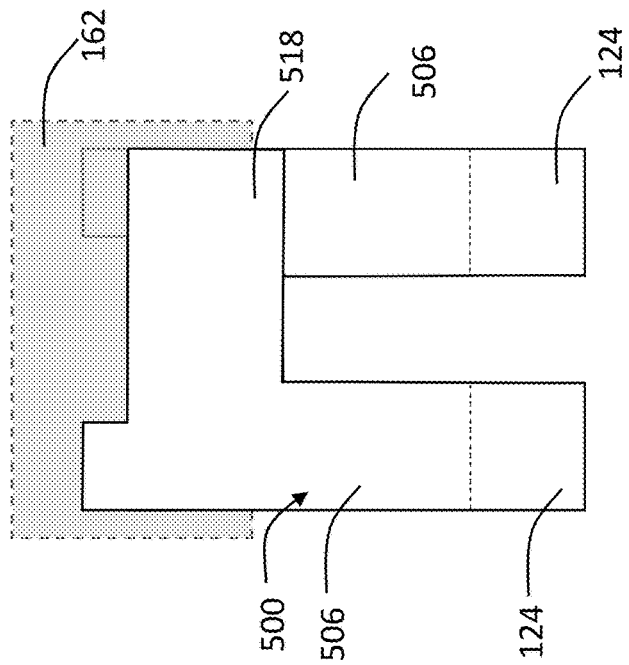
FIG. 46 shows a schematic view of a heating element for use in a vaporizer device consistent with implementations of the current subject matter.

In some implementations, portions of the legs 506 of the heating element 500 may also be bent along fold lines 522 away from one another. Folding the portions of the legs 506 of the heating element 500 along fold lines 522 away from one another locates the legs 506 at a position spaced away from the heating portion 504 (and tines 502) of the heating element 500 in a first and/or second direction opposite the first direction (e.g., in the same plane). Thus, folding the portions of the legs 506 of the heating element 500 along fold lines 522 away from one another spaces the heating portion 504 from the body of the vaporizer cartridge 120. FIG. 46 illustrates a schematic of the heating element 500 that has been folded along the fold lines 520 and fold lines 522 about the wicking element 162. As shown in FIG. 46, the wicking element is positioned within the pocket formed by folding the heating element 500 along fold lines 520 and 522.

In some implementations, the heating element 500 may also be bent along fold lines 523. For example, the cartridge contacts 124 may be bent towards one another (into and out of the page shown in FIG. 47) along the fold lines 523. The cartridge contacts 124 may be exposed to the environment to contact the receptacle contacts, while the remaining portions of the heating element 500 are positioned within the vaporizer cartridge 120 (see FIGS. 48 and 53).

In use, when a user puffs on the mouthpiece 130 of the vaporizer cartridge 120 when the heating element 500 is assembled into the vaporizer cartridge 120, air flows into the vaporizer cartridge and along an air path. In association with the user puff, the heating element 500 may be activated, e.g., by automatic detection of the puff via a pressure sensor, by detection of a pushing of a button by the user, by signals generated from a motion sensor, a flow sensor, a capacitive lip sensor, and/or another approach capable of detecting that a user is taking or about to be taking a puff or otherwise inhaling to cause air to enter the vaporizer 100 and travel at least along the air path. Power can be supplied from the vaporizer device to the heating element 500 at the cartridge contacts 124, when the heating element 500 is activated.

When the heating element 500 is activated, a temperature increase results due to current flowing through the heating element 500 to generate heat. The heat is transferred to some amount of the vaporizable material through conductive, convective, and/or radiative heat transfer such that at least a portion of the vaporizable material vaporizes. The heat transfer can occur to vaporizable material in the reservoir and/or to vaporizable material drawn into the wicking element 162 retained by the heating element 500. In some implementations, the vaporizable material can vaporize along one or more edges of the tines 502, as mentioned above. The air passing into the vaporizer device flows along the air path across the heating element 500, stripping away the vaporized vaporizable material from the heating element 500. The vaporized vaporizable material can be condensed due to cooling, pressure changes, etc., such that it exits the mouthpiece 130 as an aerosol for inhalation by a user.

As noted above, the heating element 500 may be made of various materials, such as nichrome, stainless steel, or other resistive heater materials. Combinations of two or more materials may be included in the heating element 500, and such combinations can include both homogeneous distributions of the two or more materials throughout the heating element or other configurations in which relative amounts of the two or more materials are spatially heterogeneous. For example, the tines 502 may have portions that are more resistive and thereby be designed to grow hotter than other sections of the tines or heating element 500. In some implementations, at least the tines 502 (such as within the heating portion 504) may include a material that has high conductivity and heat resistance.

The heating element 500 may be entirely or selectively plated with one or more materials. Since the heating element 500 is made of a thermally and/or electrically conductive material, such as stainless steel, nichrome, or other thermally and/or electrically conductive alloy, the heating element 500 may experience electrical or heating losses in the path between the cartridge contacts 124 and the tines 502 in the heating portion 504 of the heating element 500. To help to reduce heating and/or electrical losses, at least a portion of the heating element 500 may be plated with one or more materials to reduce resistance in the electrical path leading to the heating portion 504. In some implementations consistent with the current subject matter, it is beneficial for the heating portion 504 (e.g., the tines 502) to remain unplated, with at least a portion of the legs 506 and/or cartridge contacts 124 being plated with a plating material that reduces resistance (e.g., either or both of bulk and contact resistance) in those portions.

For example, the heating element 500 may include various portions that are plated with different materials. In another example, the heating element 500 may be plated with layered materials. Plating at least a portion of the heating element 500 helps to concentrate current flowing to the heating portion 504 to reduce electrical and/or heat losses in other portions of the heating element 500. In some implementations, it is desirable to maintain a low resistance in the electrical path between the cartridge contacts 124 and the tines 502 of the heating element 500 to reduce electrical and/or heat losses in the electrical path and to compensate for the voltage drop that is concentrated across the heating portion 504.

In some implementations, the cartridge contacts 124 may be selectively plated. Selectively plating the cartridge contacts 124 with certain materials may minimize or eliminate contact resistance at the point where the measurements are taken and the electrical contact is made between the cartridge contacts 124 and the receptacle contacts. Providing a low resistance at the cartridge contacts 124 can provide more accurate voltage, current, and/or resistance measurements and readings, which can be beneficial for accurately determining the current actual temperature of the heating portion 504 of the heating element 500.

In some implementations, at least a portion of the cartridge contacts 124 and/or at least a portion of the legs 506 may be plated with one or more outer plating materials 550. For example, at least a portion of the cartridge contacts 124 and/or at least a portion of the legs 506 may be plated with at least gold, or another material that provides low contact resistance, such as platinum, palladium, silver, copper, or the like.

Figure 79:
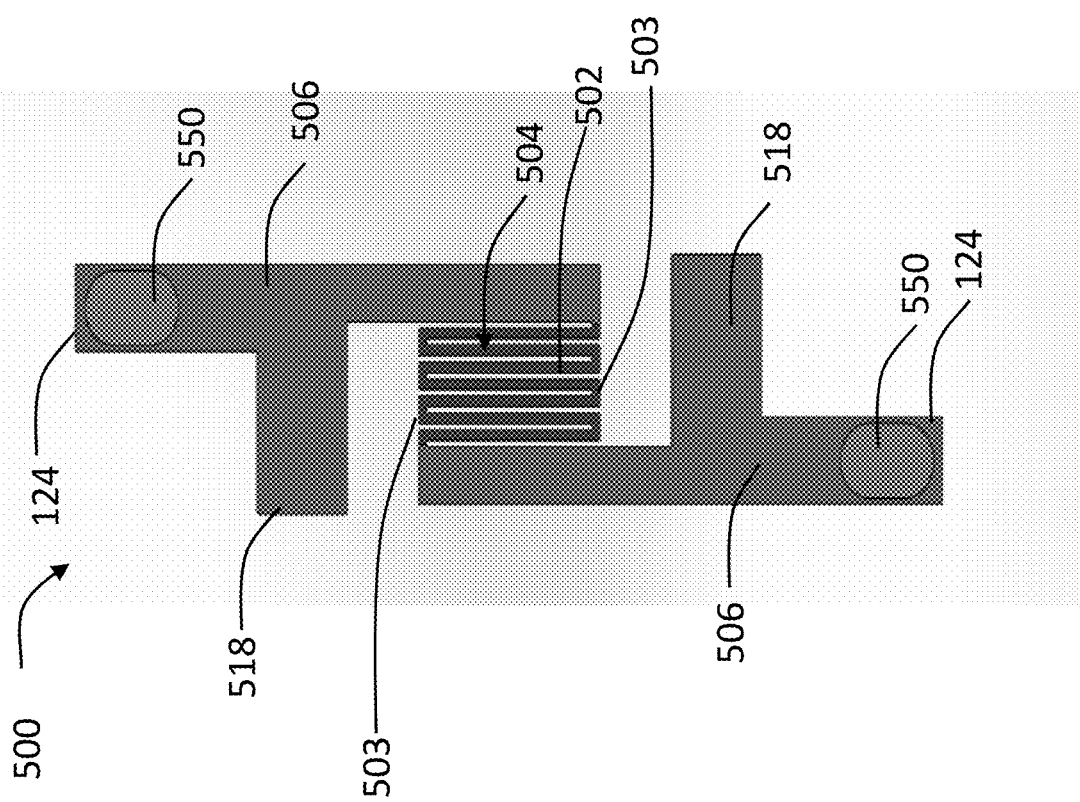
FIG. 79 shows a heating element having a plated portion, in an unbent position consistent with implementations of the current subject matter.
Figure 80:
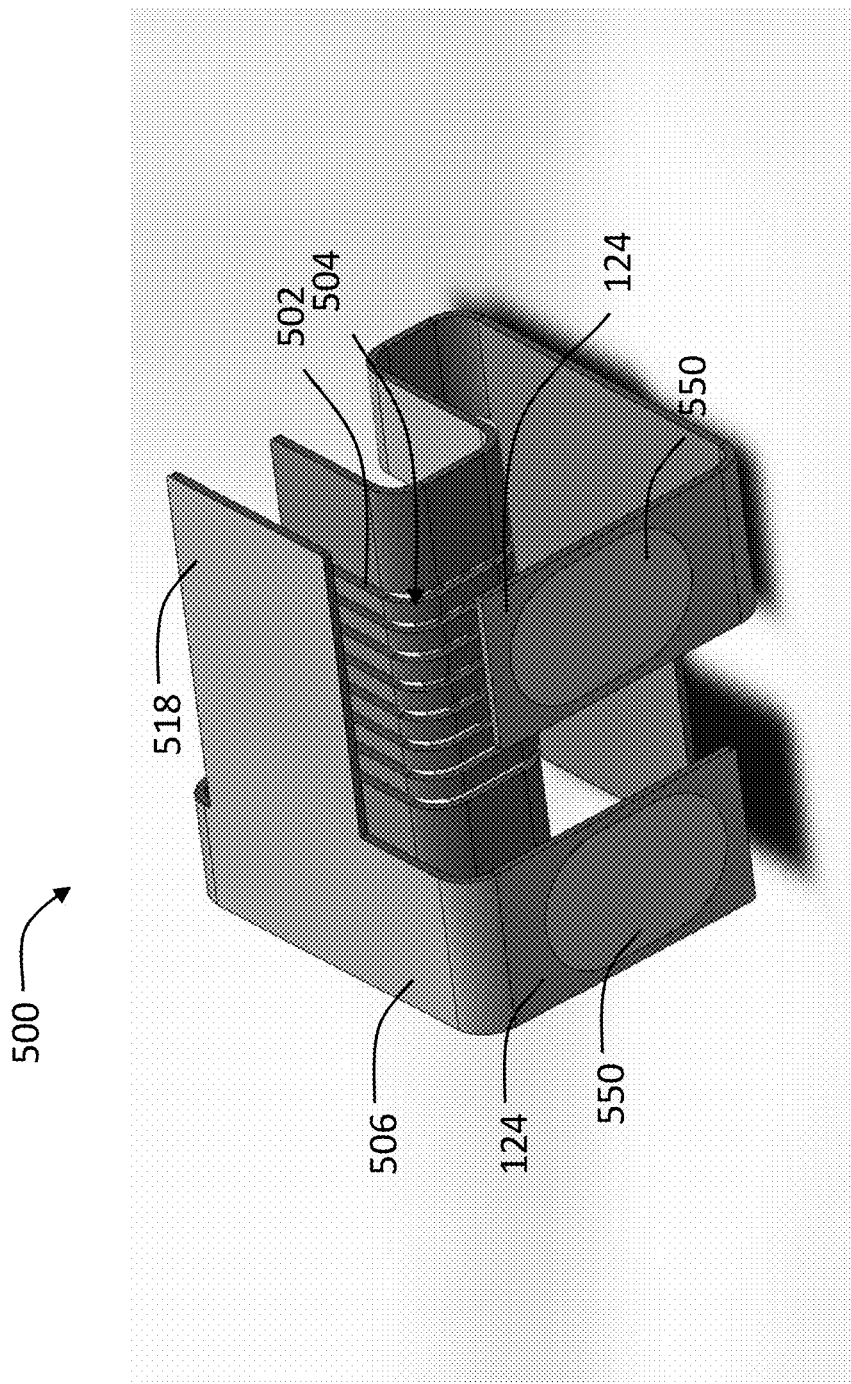
FIG. 80 shows a heating element having a plated portion, in a bent position consistent with implementations of the current subject matter.
Figure 81:
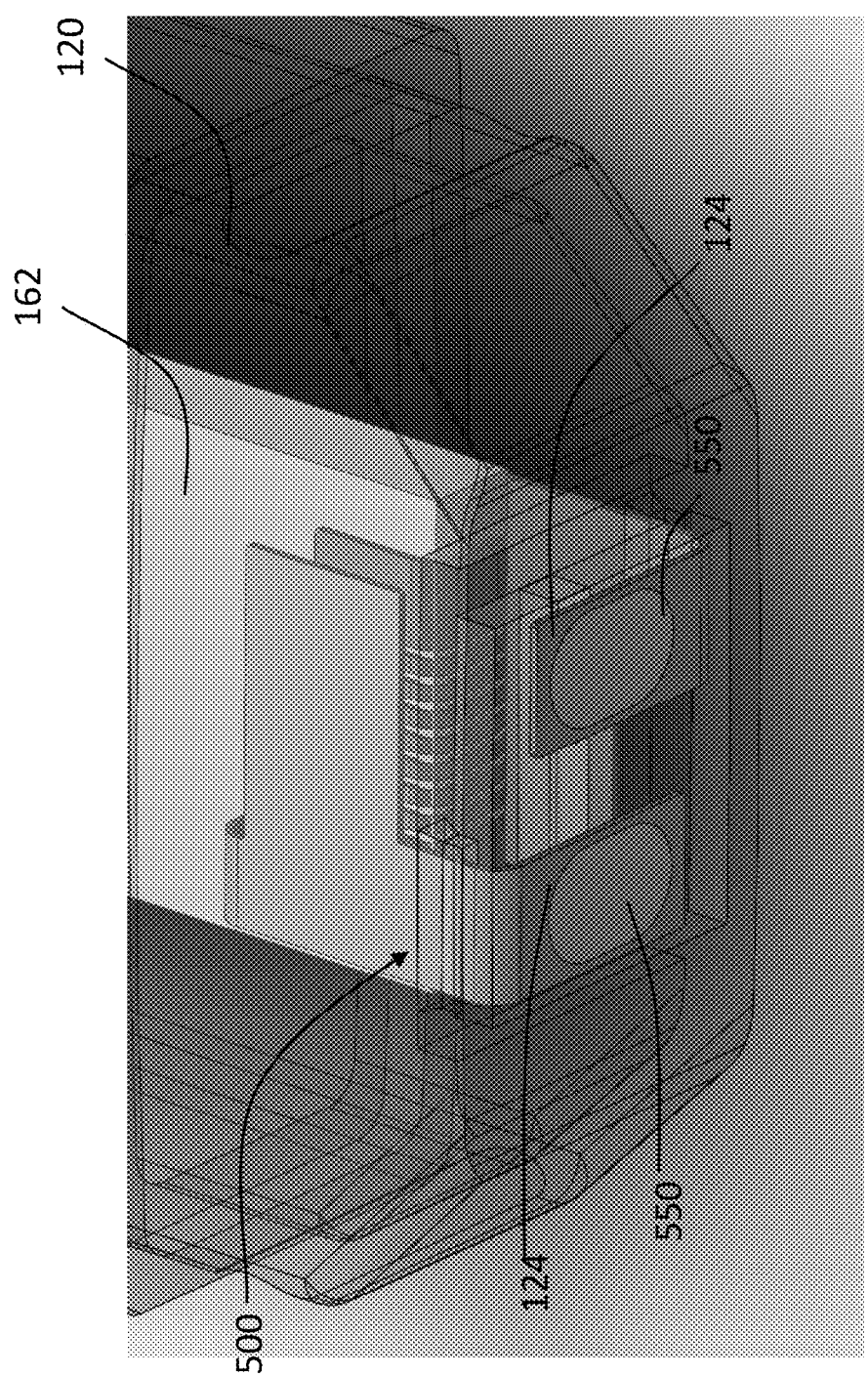
FIG. 81 shows a heating element having a plated portion positioned within a vaporizer cartridge consistent with implementations of the current subject matter.
Figure 87:
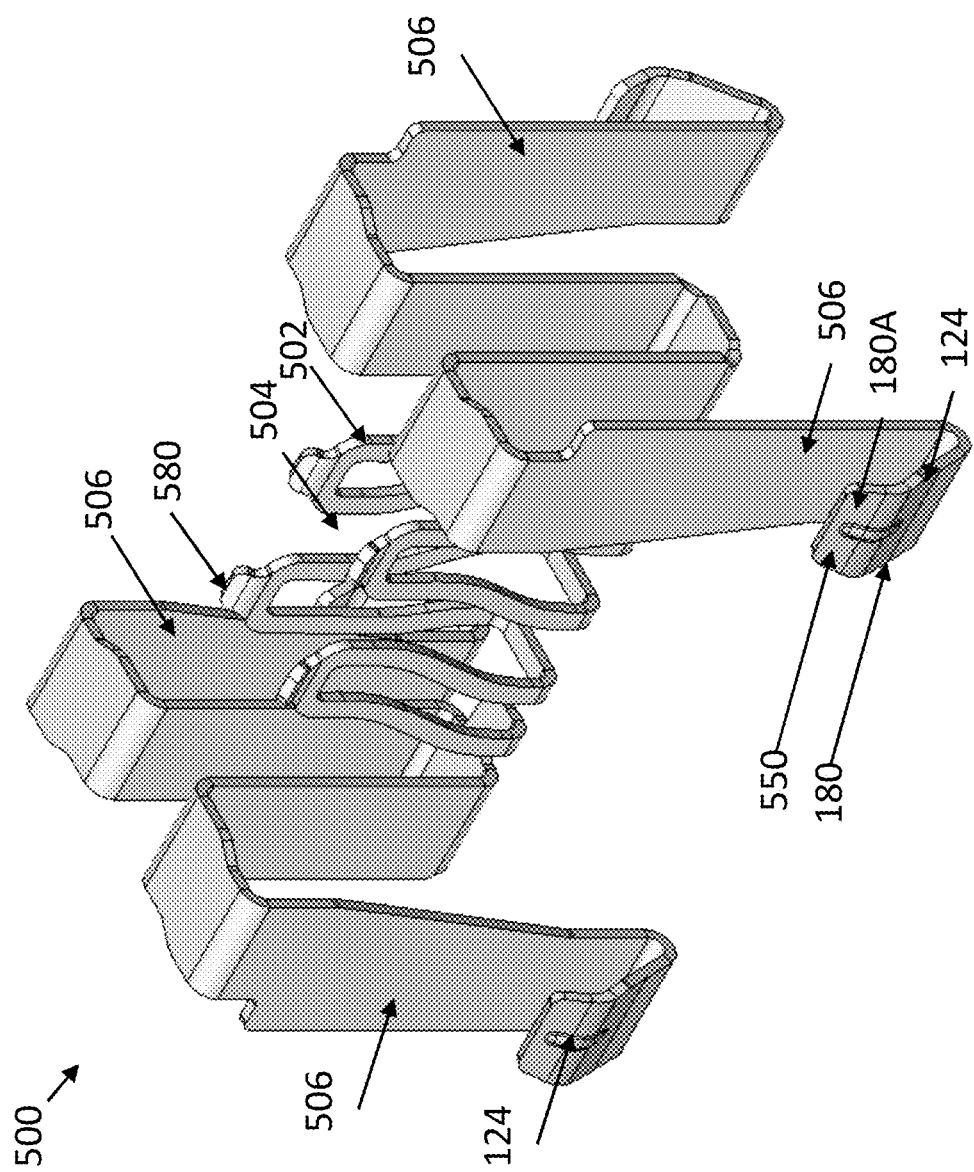
FIG. 87 shows a perspective view of a heating element in a bent position consistent with implementations of the current subject matter.
Figure 92:
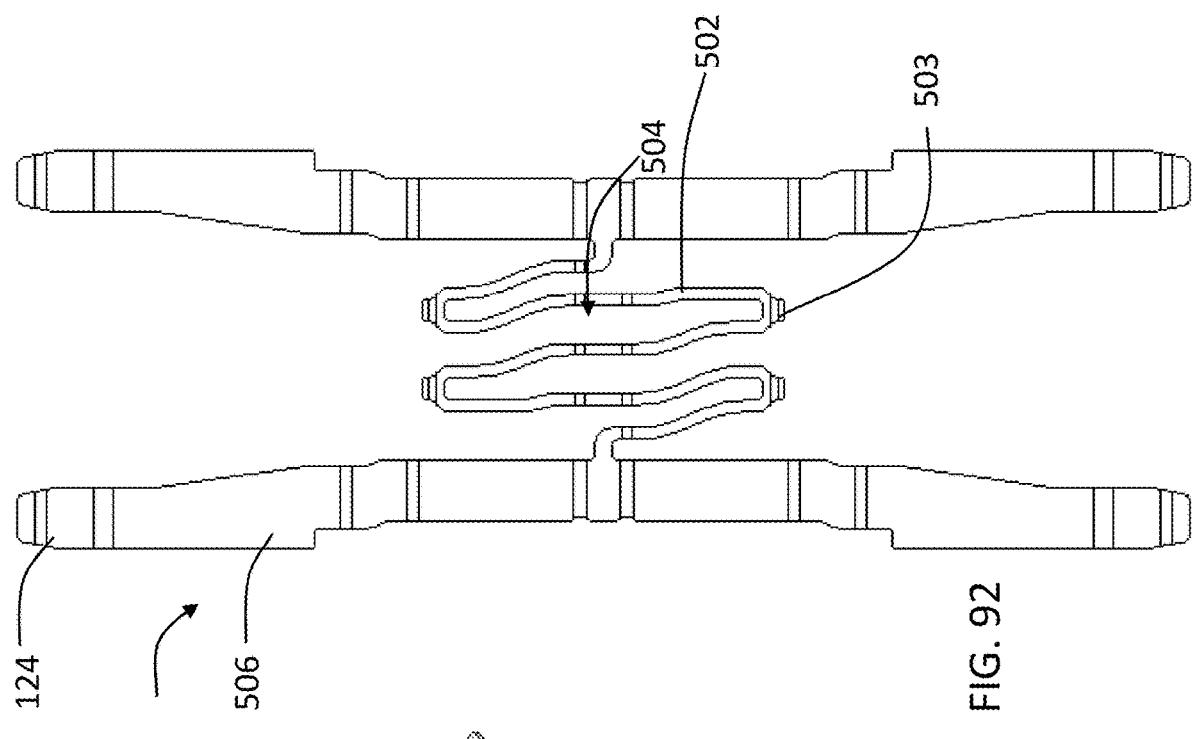
FIG. 92 shows a top view of a heating element in an unbent position consistent with implementations of the current subject matter.
Figure 91:
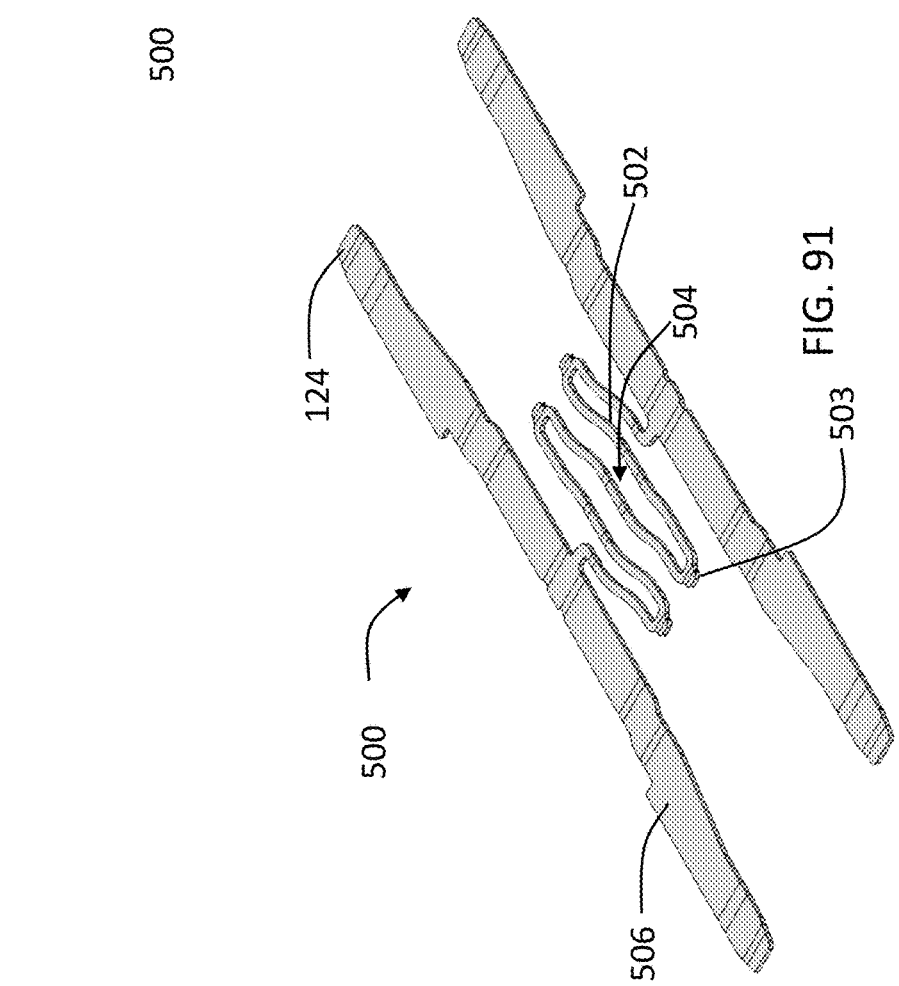
FIG. 91 shows a perspective view of a heating element in an unbent position consistent with implementations of the current subject matter.
Figure 93A:
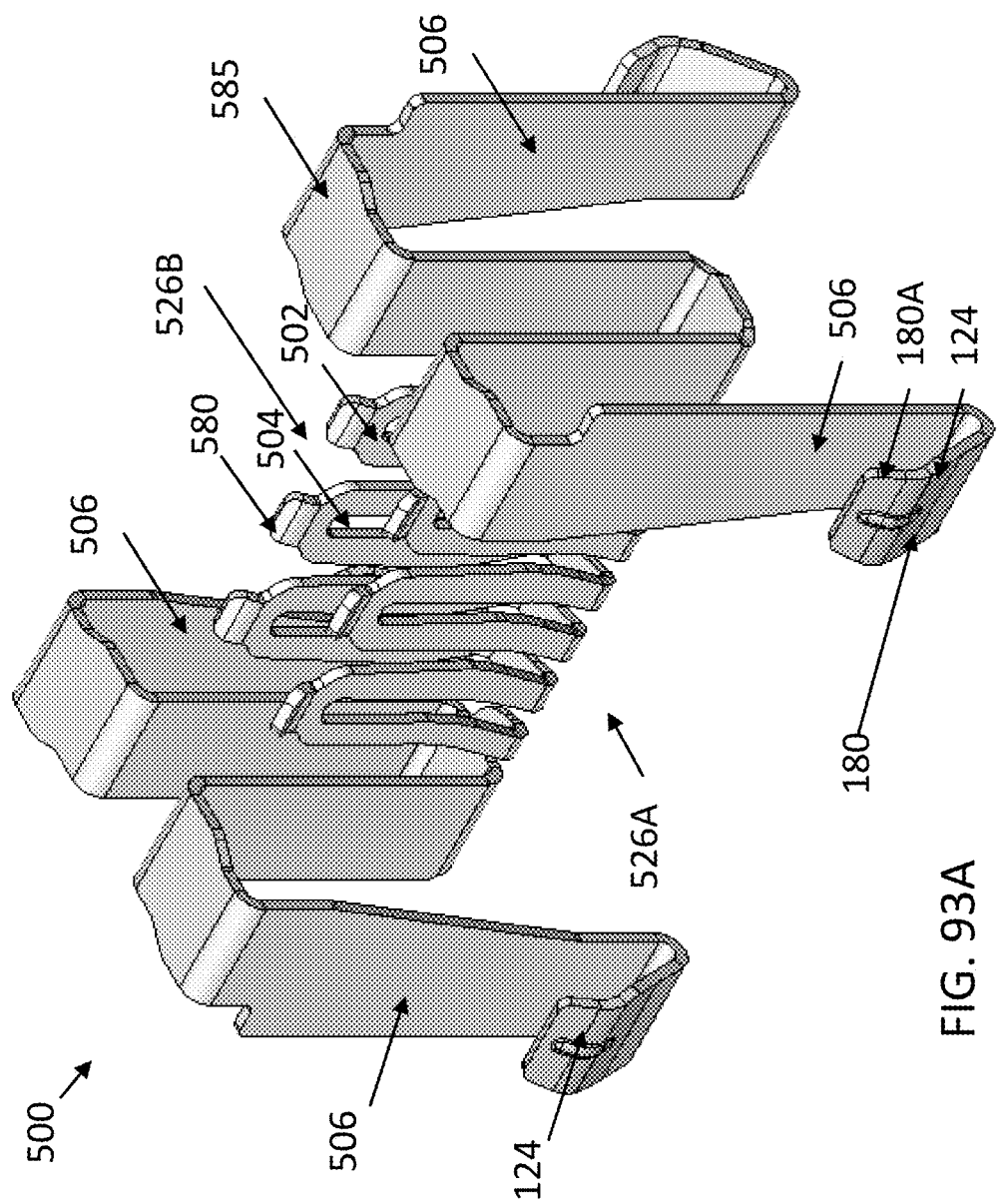
FIG. 93A shows a perspective view of a heating element in a bent position consistent with implementations of the current subject matter.
Figure 93B:
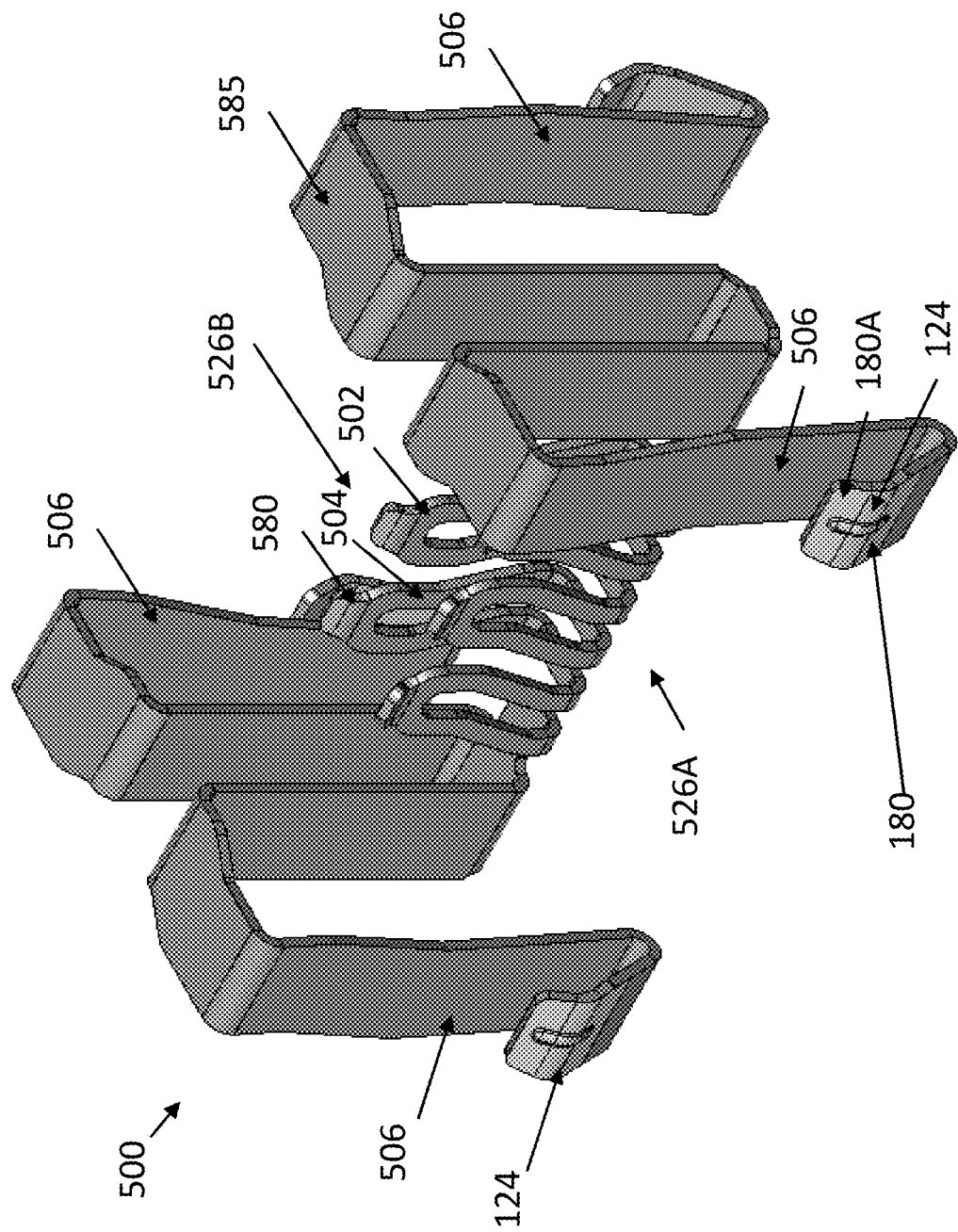
FIG. 93B shows a perspective view of a heating element in a bent position consistent with implementations of the current subject matter.
Figure 98B:
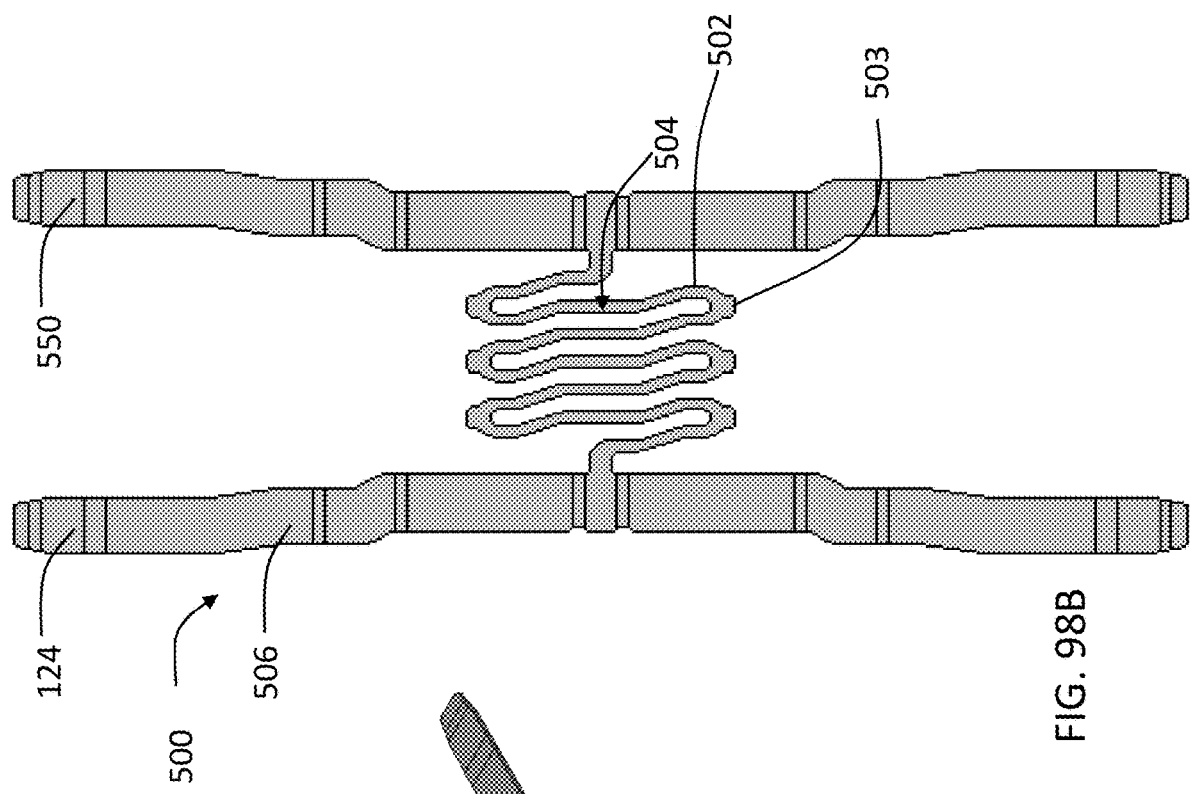
Figure 97B:
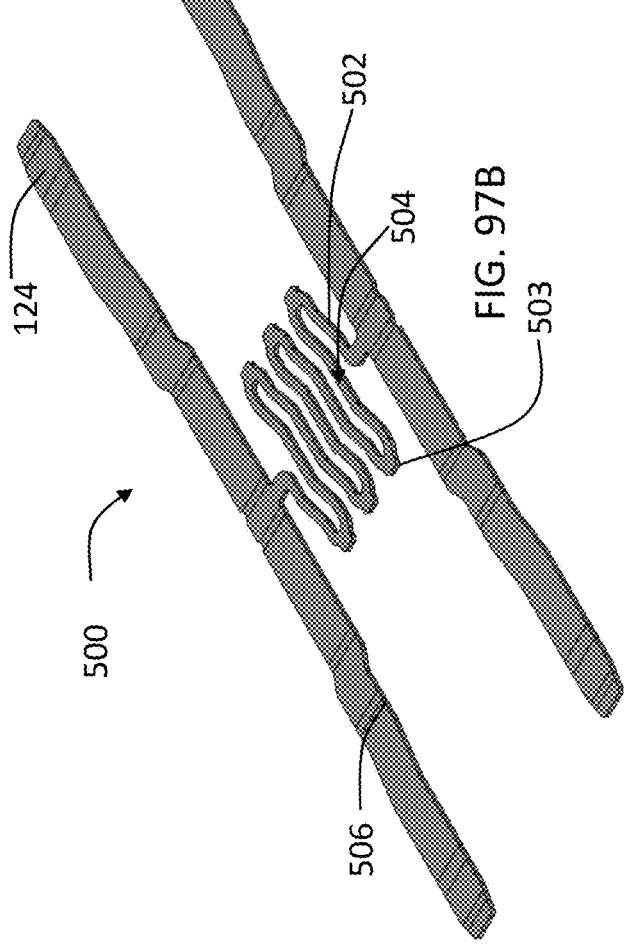

In some implementations, in order for the low resistance outer plating material to be secured to the heating element 500, a surface of the heating element 500 may be plated with an adhering plating material. In such configurations, the adhering plating material may be deposited onto the surface of the heating element 500 and the outer plating material may be deposited onto the adhering plating material, defining first and second plating layers, respectively. The adhering plating material includes a material with adhesive properties when the outer plating material is deposited onto the adhering plating material. For example, the adhering plating material may include nickel, zinc, aluminum, iron, alloys thereof, or the like. FIGS. 79-81 illustrate examples of the heating element 500 in which the cartridge contacts 124 have been selectively plated with the adhering plating material and/or the outer plating material.

In some implementations, the surface of the heating element 500 may be primed for the outer plating material to be deposited onto the heating element 500 using non-plating priming, rather than by plating the surface of the heating element 500 with the adhering plating material. For example, the surface of the heating element 500 may be primed using etching rather than by depositing the adhering plating material.

In some implementations, all or a portion of the legs 506 and the cartridge contacts 124 may be plated with the adhering plating material and/or the outer plating material. In some examples, the cartridge contacts 124 may include at least a portion that has an outer plating material having a greater thickness relative to the remaining portions of the cartridge contacts 124 and/or the legs 506 of the heating element 500. In some implementations, the cartridge contacts 124 and/or the legs 506 may have a greater thickness relative to the tines 502 and/or the heating portion 504.

In some implementations, rather than forming the heating element 500 of a single substrate material and plating the substrate material, the heating element 500 may be formed of various materials that are coupled together (e.g., via laser welding, diffusion processes, etc.). The materials of each portion of the heating element 500 that is coupled together may be selected to provide a low or no resistance at the cartridge contacts 124 and a high resistance at the tines 502 or heating portion 504 relative to the other portions of the heating element 500.

In some implementations, the heating element 500 may be electroplated with silver ink and/or spray coated with one or more plating materials, such as the adhering plating material and the outer plating material.

As mentioned above, the heating element 500 may include various shapes, sizes, and geometries to more efficiently heat the heating portion 504 of the heating element 500 and more efficiently vaporize the vaporizable material.

FIGS. 49-53 illustrate an example of a heating element 500 consistent with implementations of the current subject matter. As shown, the heating element 500 includes the one or more tines 502 located in the heating portion 504, the one or more legs 506 extending from the tines 502, the cartridge contacts 124 formed at the end portion of each of the one or more legs 506, and the heat shields 518 extending from the one or more legs 506. In this example, each of the tines 502 have the same or similar shape and size. The tines 502 have been crimped about a wicking element 162 (e.g., a flat pad) to secure the wicking element 162 within the pocket of the tines 502.

FIGS. 54-55 illustrate another example of a heating element 500 consistent with implementations of the current subject matter in an unbent position (FIG. 54) and a bent position (FIG. 55). As shown, the heating element 500 includes the one or more tines 502 located in the heating portion 504, the one or more legs 506 extending from the tines 502, the cartridge contacts 124 formed at the end portion of each of the one or more legs 506, and the heat shields 518 extending from the one or more legs 506. In this example, each of the tines 502 have the same or similar shape and size and the tines 502 have a rounded and/or semi-circular outer edge 503.

Figure 56:
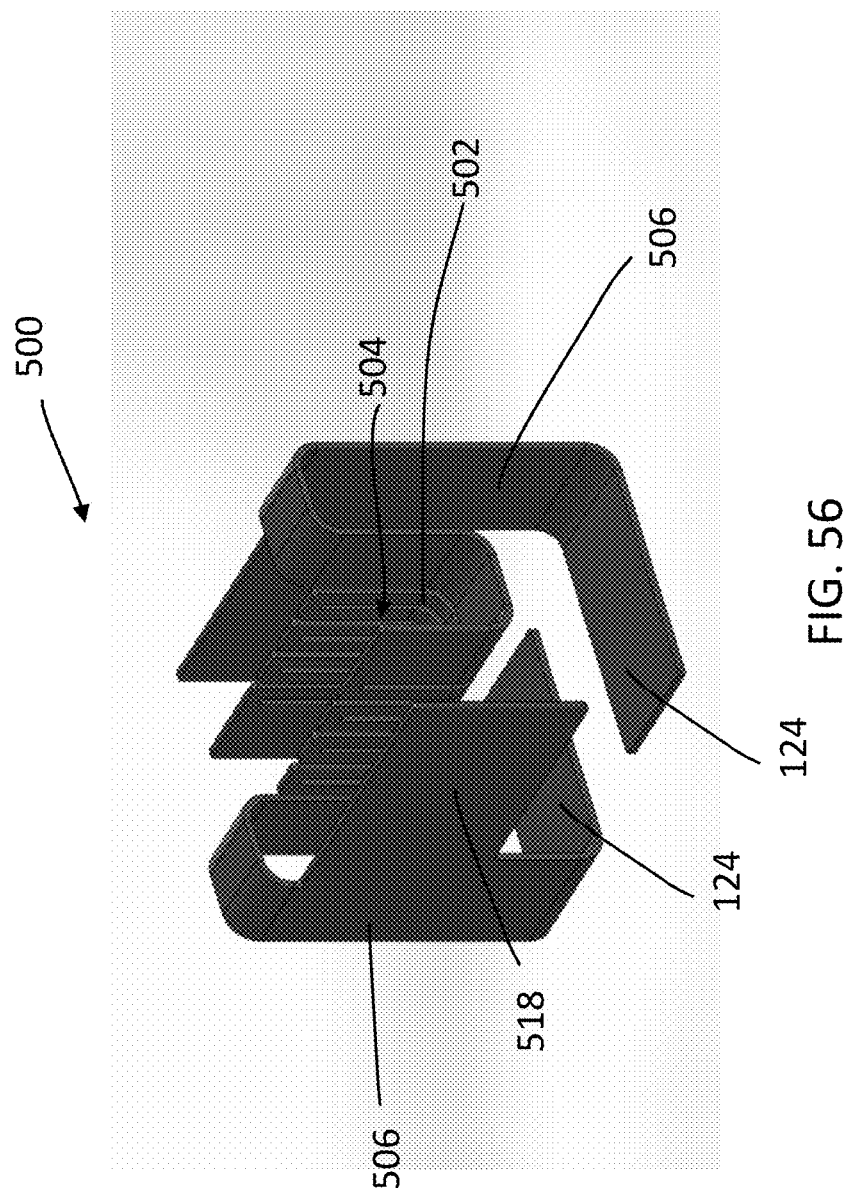
FIG. 56 shows a heating element in a bent position consistent with implementations of the current subject matter.

FIG. 56 illustrates another example of a heating element 500 in a bent position consistent with implementations of the current subject matter that is similar to the example heating element 500 shown in FIGS. 54-55, but in this example, each of the tines 502 have the same or similar shape and size and the tines 502 have a squared and/or flat outer edge 503.

FIGS. 57-62 illustrate other examples of the heating element 500 in which at least one of the tines 502 has a size, shape, or position that is different from the remaining tines 502. For example, as shown in FIGS. 57-58, the heating element 500 includes the one or more tines 502 located in the heating portion 504, the one or more legs 506 extending from the tines 502, and the cartridge contacts 124 formed at the end portion of each of the one or more legs 506. In this example, the tines 502 include a first set of tines 505A and a second set of tines 505B. The first and second sets of tines 505A, 505B are offset from one another. For example, the outer edges 503 of the first and second sets of tines 505A, 505B are not aligned with one another. As shown in FIG. 58, when the heating portion 504 is in the bent position, the first set of tines 505A appear to be shorter than the second set of tines 505B in the first portion of the heating element 500, and the first set of tines 505A appear to be longer than the second set of tines 505B in the second portion of the heating element 500.

Figure 60:
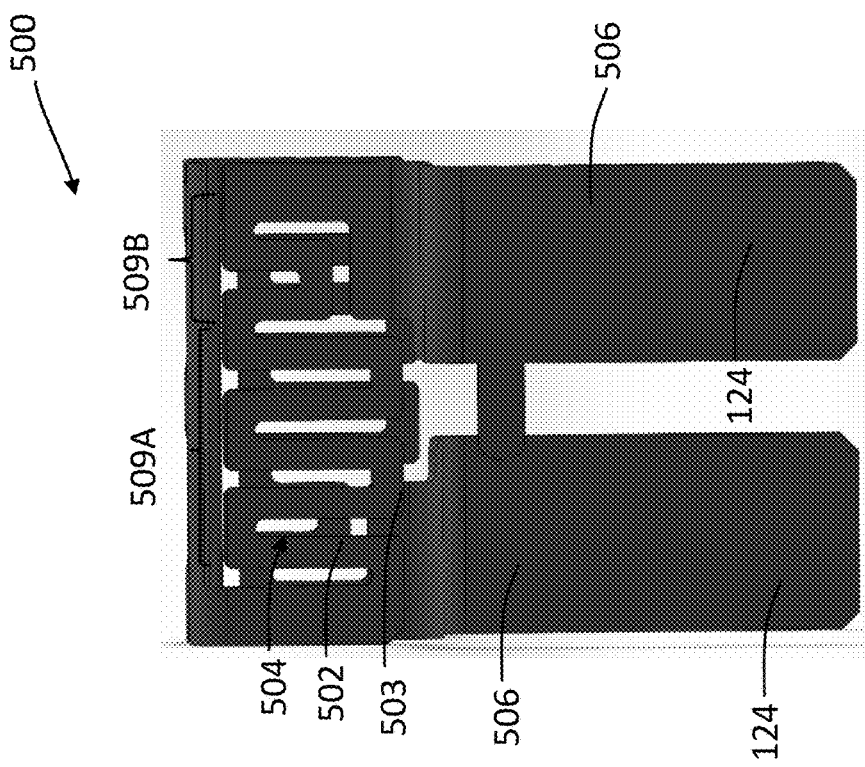
FIG. 60 shows a heating element in a partially bent position consistent with implementations of the current subject matter.
Figure 59:
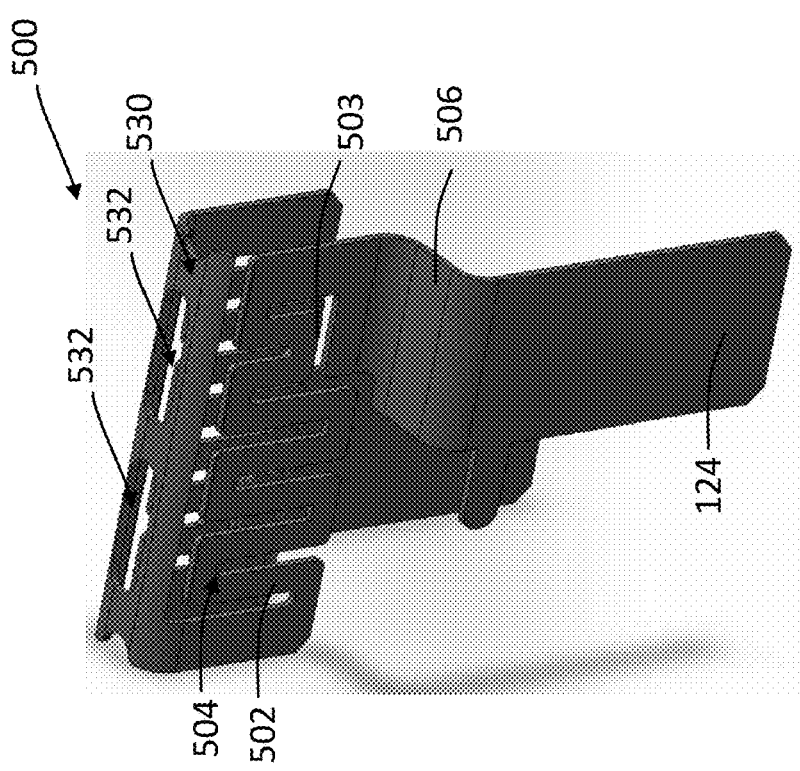
FIG. 59 shows a heating element in a partially bent position consistent with implementations of the current subject matter.

As shown in FIGS. 59-60, the heating element 500 includes the one or more tines 502 located in the heating portion 504, the one or more legs 506 extending from the tines 502, and the cartridge contacts 124 formed at the end portion of each of the one or more legs 506. In this example, the tines 502 include a first set of tines 509A and a second set of tines 509B. The first and second sets of tines 509A, 509B are offset from one another. For example, the outer edges 503 of the first and second sets of tines 509A, 509B are not aligned with one another. Here, the second set of tines 509B includes a single outermost tine 502A. As shown in FIGS. 59-60, when the heating portion 504 is in the bent position, the first set of tines 509A appear to be longer than the second set of tines 509B. In addition, in FIGS. 59-60, the tines 502 are not bent. Rather, the tines 502 are located on a first portion and a second portion of the heating element 500 that is positioned approximately parallel to and opposite the first portion. The first set of tines positioned on the first portion of the heating element 500 are separated from the second set of tines positioned on the second portion of the heating element 500 by a platform portion 530 that is positioned between and spaced from both of the first and second set of tines. The platform portion 530 is configured to contact an end of the wicking element 162. The platform portion 530 includes a cutout portion 532. The cutout portion 532 may provide additional edges along which the vaporizable material can vaporize from when the heating element 500 is activated.

Figure 62:
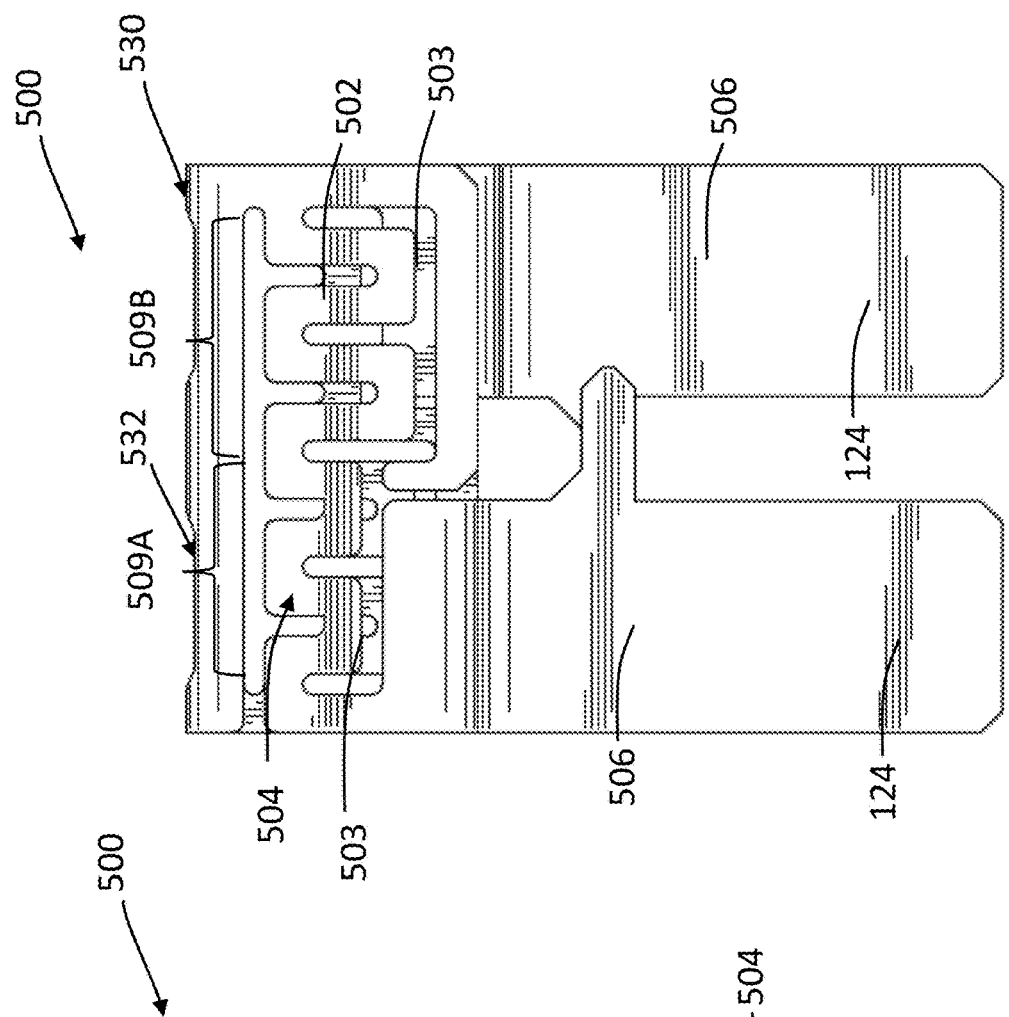
FIG. 62 shows a heating element in a partially bent position consistent with implementations of the current subject matter.
Figure 61:
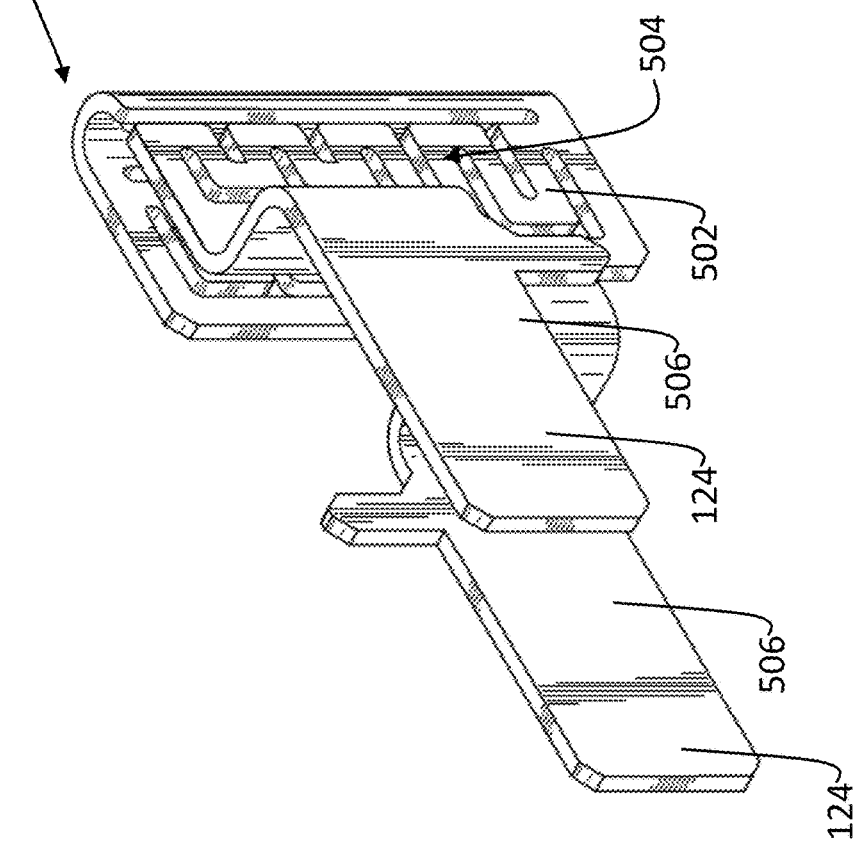
FIG. 61 shows a heating element in a partially bent position consistent with implementations of the current subject matter.
Figure 66:
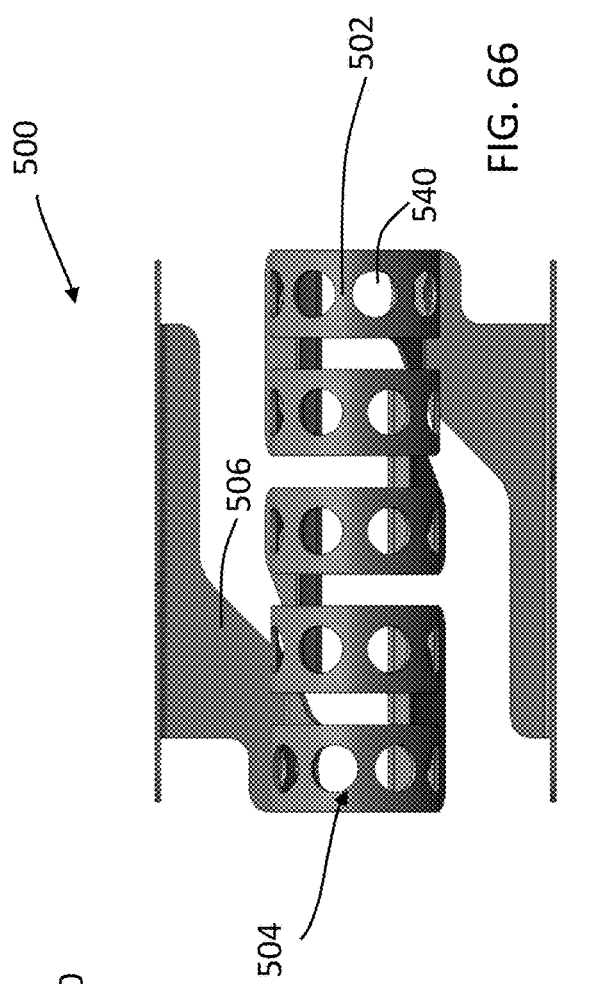
FIG. 66 shows a heating element in a partially bent position consistent with implementations of the current subject matter.
Figure 68:
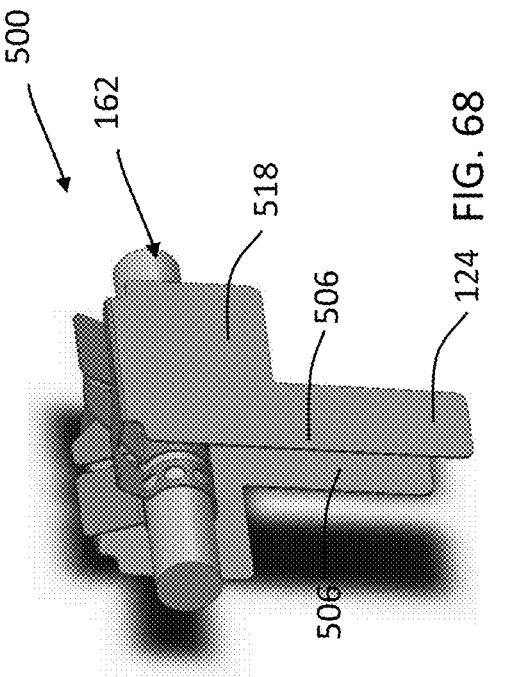
FIG. 68 shows a heating element in a partially bent position and a wicking element consistent with implementations of the current subject matter.
Figure 65:
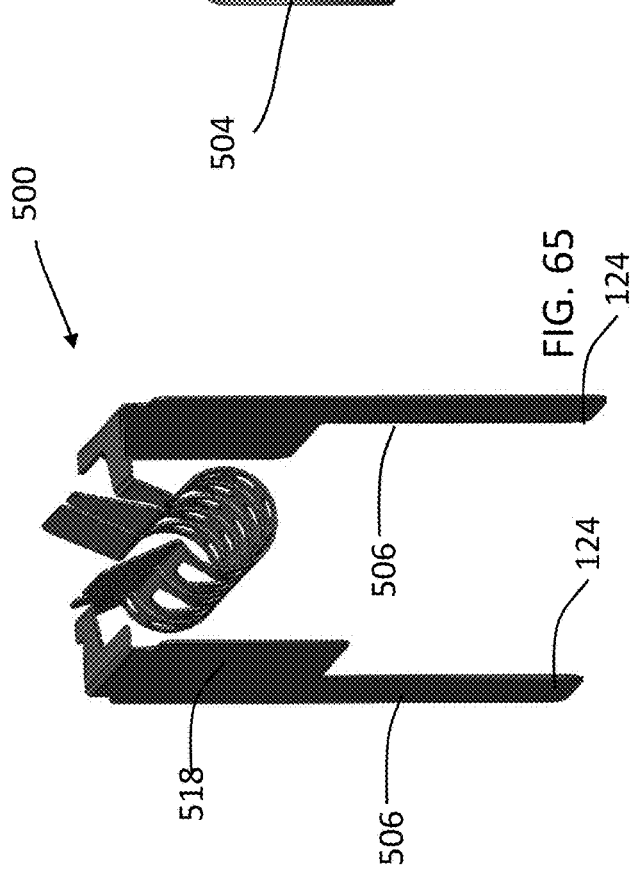
FIG. 65 shows a heating element in a partially bent position consistent with implementations of the current subject matter.
Figure 67:
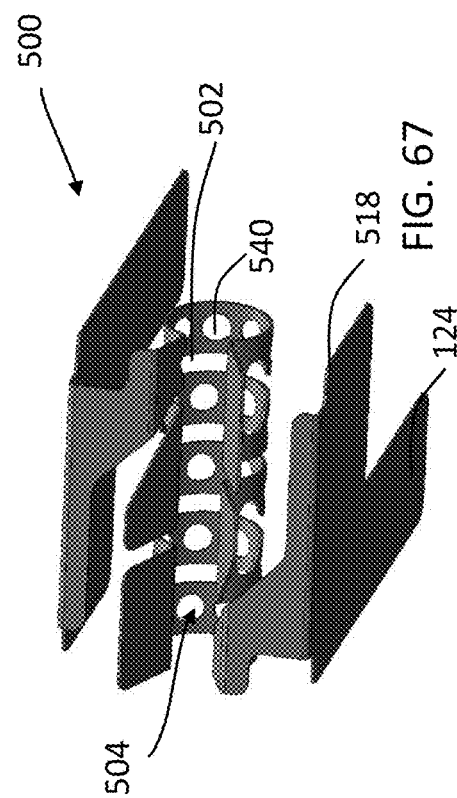
FIG. 67 shows a heating element in a partially bent position consistent with implementations of the current subject matter.
Figure 70:
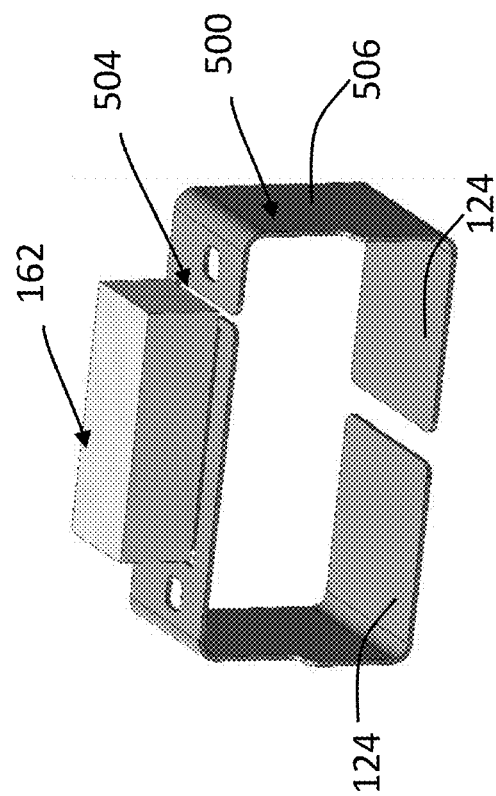
FIG. 70 shows a heating element in a bent position and a wicking element consistent with implementations of the current subject matter.
Figure 69:
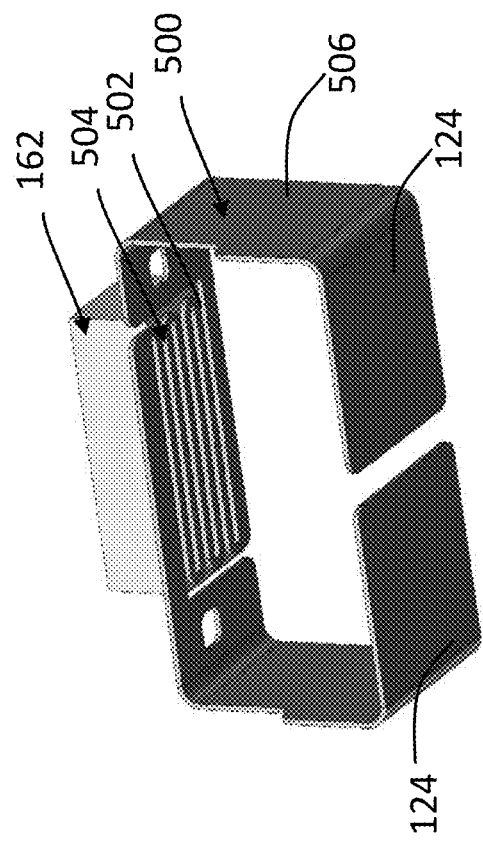
FIG. 69 shows a heating element in a bent position and a wicking element consistent with implementations of the current subject matter.

As shown in FIGS. 61-62, the heating element 500 includes the one or more tines 502 located in the heating portion 504, the one or more legs 506 extending from the tines 502, and the cartridge contacts 124 formed at the end portion of each of the one or more legs 506. In this example, the tines 502 include a first set of tines 509A and a second set of tines 509B. The first and second sets of tines 509A, 509B are offset from one another. For example, the outer edges 503 of the first and second sets of tines 509A, 509B are not aligned with one another. Here, each of the first and the second set of tines 509A, 509B includes two tines 502. As shown in FIGS. 61-62, when the heating portion 504 is in the bent position, the first set of tines 509A appear to be shorter than the second set of tines 509B. In addition, in FIGS. 61-62, the tines 502 are not bent. Rather, the tines 502 are located on a first portion and a second portion (that is parallel and opposite the first portion) of the heating element 500. The first set of tines positioned on the first portion are separated from the second set of tines positioned on the second portion by a platform portion that is positioned between and spaced from both of the first and second set of tines. The platform portion is configured to contact an end of the wicking element 162. The platform portion includes a cutout portion. The cutout portion may provide additional edges along which the vaporizable material can vaporize from when the heating element 500 is activated.

FIGS. 63-68 illustrate another example of a heating element 500 consistent with implementations of the current subject matter in an unbent position (FIG. 63) and a bent position (FIGS. 64-68). As shown, the heating element 500 includes the one or more tines 502 located in the heating portion 504, the one or more legs 506 extending from the tines 502, the cartridge contacts 124 formed at the end portion of each of the one or more legs 506, and the heat shields 518 extending from the one or more legs 506. In this example, the heating element 500 is configured to be crimped around and/or bent to receive a cylindrical-shaped wicking element 162 or a wicking element 162 having a circular cross-section. Each of the tines 502 include apertures 540. The apertures 540 may provide additional edges along which the vaporizable material can vaporize from when the heating element 500 is activated. The apertures 540 also reduce the amount of material used to form the heating element 500, reducing the weight of the heating element 500 and the amount of material used for the heating element 500, thereby reducing material costs.

FIGS. 69-78 illustrate a heating element 500 consistent with implementations of the current subject matter in which the heating element 500 is pressed against one side of the wicking element 162. As shown, the heating element 500 includes the one or more tines 502 located in the heating portion 504, the one or more legs 506 extending from the tines 502, and the cartridge contacts 124 formed at the end portion of each of the one or more legs 506. In these examples, the legs 506 and the cartridge contacts 124 are configured to bend in a third direction, rather than in a first-second direction that is perpendicular to the third direction. In such a configuration, the tines 502 of the heating portion 504 form a planar platform that faces outwardly from the heating element 500 and is configured to be pressed against the wicking element 162 (e.g., on one side of the wicking element 162).

FIGS. 71-74 illustrate several examples of the heating element 500 consistent with implementations of the current subject matter including tines 502 configured in various geometries. As mentioned above, the tines 502 form a planar platform that is pressed against one side of the wicking element 162 in use. The legs 506, rather than the tines 502, bend in the bent position.

Figure 76:
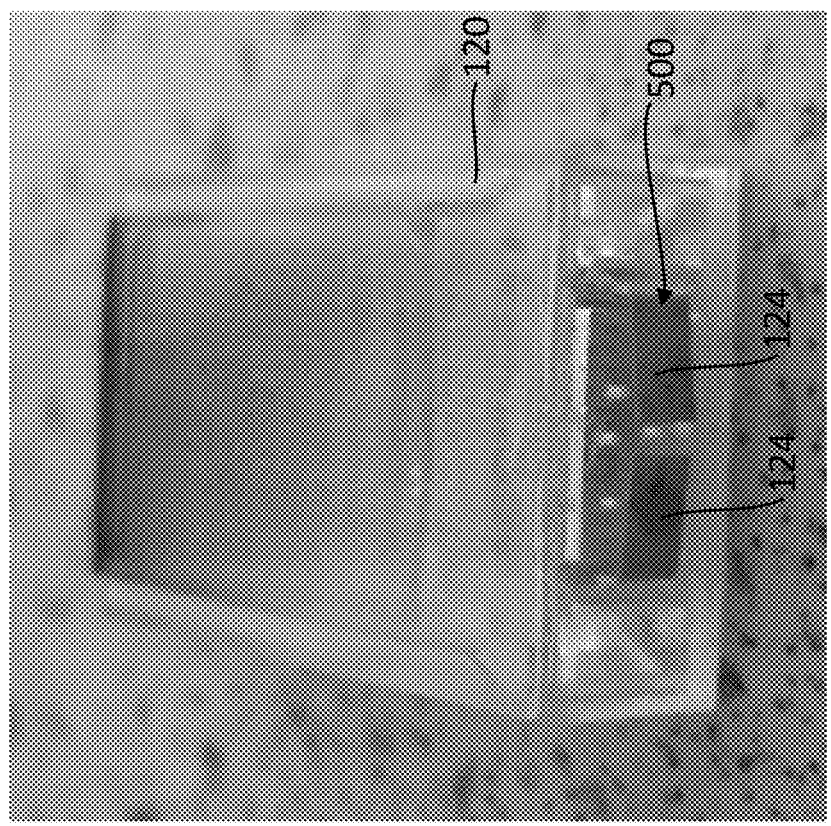
FIG. 76 shows a heating element and a wicking element positioned within a vaporizer cartridge consistent with implementations of the current subject matter.
Figure 75:
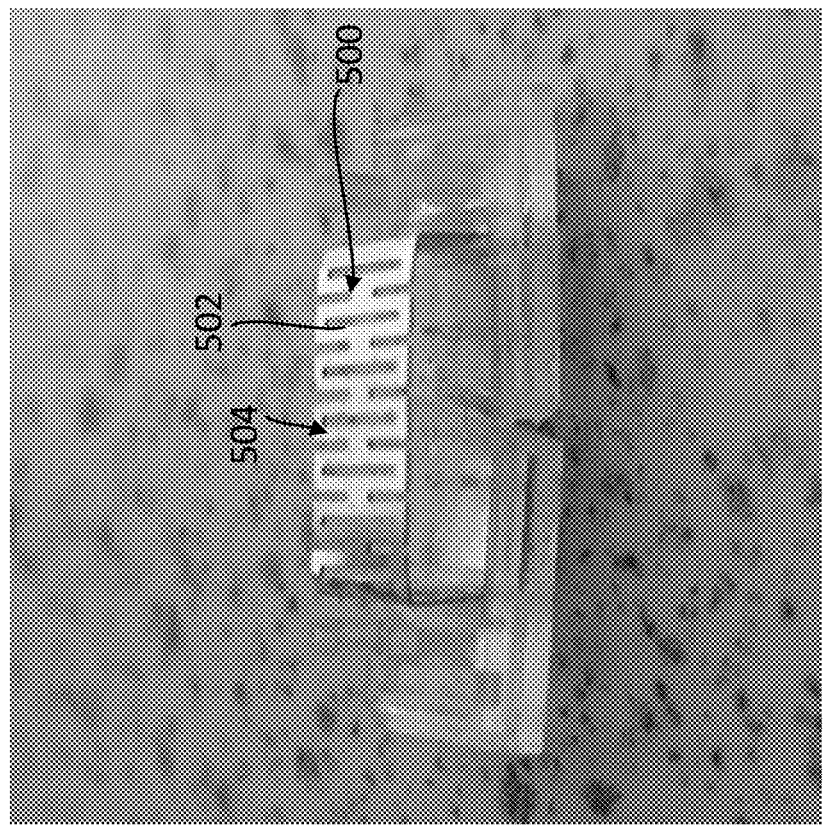
FIG. 75 shows a heating element coupled with a portion of a vaporizer cartridge consistent with implementations of the current subject matter.

FIG. 75 illustrates an example of the heating element 500 shown in FIG. 71 assembled with a component of the vaporizer cartridge 120, such as a wick housing (e.g., the wick housing 178) that houses the wicking element 162 and the heating element 500 and FIG. 76 illustrates the heating element 500 assembled with an example vaporizer cartridge 120 consistent with implementations of the current subject matter. As shown the cartridge contacts 124 are bent towards one another in a lateral direction.

Figure 77:
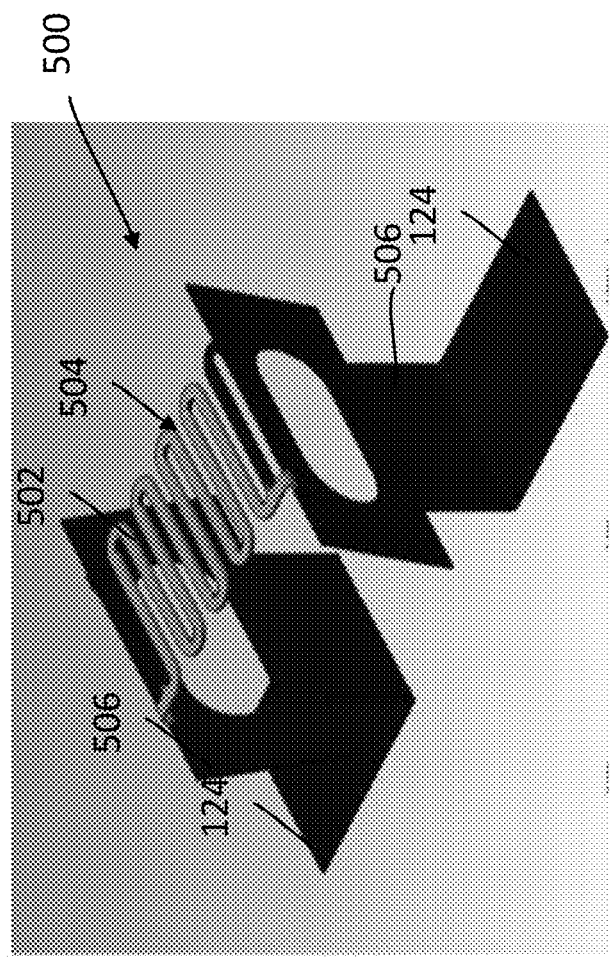
FIG. 77 shows a heating element in a partially bent position consistent with implementations of the current subject matter.
Figure 78:
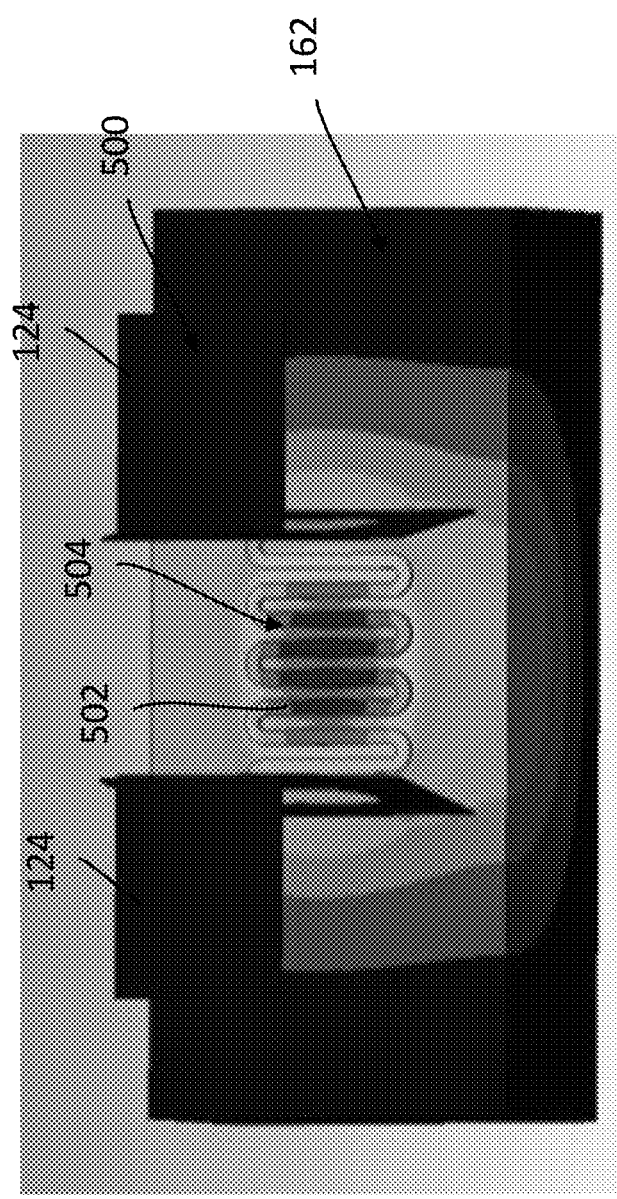
FIG. 78 shows a heating element in a partially bent position and a wicking element consistent with implementations of the current subject matter.

FIGS. 77 and 78 illustrate another example of the heating element 500 in which the tines 502 form a platform that is configured to be pressed against the wicking element 162. Here, the legs 506 may form spring-like structures that force the tines 502 to be pressed against the wicking element 162 when a lateral inward force is applied to each of the legs 506. For example, FIG. 78 illustrates an example of the tines 502 being pressed against the wicking element 162 when power (e.g., a current) is supplied to the heating element 500, such as via the cartridge contacts 124.

FIGS. 82-86 illustrate another example of a heating element 500 consistent with implementations of the current subject matter. As shown, the heating element 500 includes the one or more tines 502 located in the heating portion 504, the one or more legs 506 extending from the tines 502, and the cartridge contacts 124 formed at the end portion and/or as part of each of the one or more legs 506. In this example, each of the tines 502 have the same or similar shape and size, and are spaced apart from one another at equal distances. The tines 502 have a rounded outer edge 503.

As shown in FIG. 85, the tines 502 have been crimped about a wicking element 162 (e.g., a flat pad) to secure the wicking element 162 within the pocket formed by the tines 502. For example, the tines 502 may be folded and/or crimped to define the pocket in which the wicking element 162 resides. The tines 502 include a platform tine portion 524 and side tine portions 526. The platform tine portion 524 is configured to contact one side of the wicking element 162 and the side tine portions 526 are configured to contact other opposite sides of the wicking element 162. The platform tine portion 524 and the side tine portions 526 form the pocket that is shaped to receive the wicking element 162 and/or conform to the shape of at least a portion of the wicking element 162. The pocket allows the wicking element 162 to be secured and retained by the heating element 500 within the pocket.

In some implementations, the side tine portions 526 and the platform tine portion 524 retain the wicking element 162 via compression (e.g., at least a portion of the wicking element 162 is compressed between the opposing side tine portions 526 and/or the platform tine portion 524). The platform tine portion 524 and the side tine portions 526 contact the wicking element 162 to provide a multi-dimensional contact between the heating element 500 and the wicking element 162. Multi-dimensional contact between the heating element 500 and the wicking element 162 provides for a more efficient and/or faster transfer of the vaporizable material from the reservoir 140 of the vaporizer cartridge 120 to the heating portion 504 (via the wicking element 162) to be vaporized.

The one or more legs 506 of the example heating element 500 shown in FIGS. 82-86 includes four legs 506. Each of the legs 506 may include and/or define a cartridge contact 124 that is configured to contact a corresponding receptacle contact 125 of the vaporizer 100. In some implementations, each pair of legs 506 (and the cartridge contacts 124) may contact a single receptacle contact 125. The legs 506 may be spring-loaded to allow the legs 506 to maintain contact with the receptacle contacts 125. The legs 506 may include a portion that extends along a length of the legs 506 that is curved to help to maintain contact with the receptacle contacts 125. Spring-loading the legs 506 and/or the curvature of the legs 506 may help to increase and/or maintain consistent pressure between the legs 506 and the receptacle contacts 125. In some implementations, the legs 506 are coupled with a support 176 that helps to increase and/or maintain consistent pressure between the legs 506 and the receptacle contacts 125. The support 176 may include plastic, rubber, or other materials to help maintain contact between the legs 506 and the receptacle contacts 125. In some implementations, the support 176 is formed as a part of the legs 506.

The legs 506 may contact one or more wiping contacts that are configured to clean the connection between the cartridge contacts 124 and other contacts or power source. For example, the wiping contacts would include at least two parallel, but offset, bosses that frictionally engage and slide against one another in a direction that is parallel or perpendicular to the insertion direction.

As shown in FIGS. 82-98, the one or more legs 506 of the heating element 500 includes four legs 506. FIGS. 91-92, 97A-98B, and 109-110 show examples of the heating element 500 in the unbent position. As shown, the heating element 500 has an H-shape, defined by the four legs 506 and the tines 502. This configuration allows for resistance across the heater to be measured more accurately, and reduces variability in the resistance measurements, thereby allowing for more efficiency aerosol generation and higher quality aerosol generation. The heating element 500 includes two pairs of opposing legs 506. The tines 502 are coupled (e.g., intersect) with each of the pairs of opposing legs 506 at or near a center of each of the pairs of opposing legs 506. The heating portion 504 is positioned between the pairs of opposing legs 506.

FIG. 109 illustrates an example of the heating element 500 before the heating element 500 has been stamped and/or otherwise formed from a substrate material 577. Excess substrate material 577A may be coupled with the heating element 500 at one, two, or more coupling locations 577B. For example, as shown, the excess substrate material 577A may be coupled with the heating element 500 at two coupling locations 577B, near opposing lateral ends 173 of the platform portion of the heating element and/or heating portion 504 of the heating element 500. In some implementations, the heating element 500 may be first be stamped from the substrate material 577, and then removed from the excess substrate material 577A at the coupling locations 577B (e.g., by twisting, pulling, stamping, cutting, etc., the heating element 500).

As noted above, to crimp the heating element 500, the heating element 500 may be bent or otherwise folded along fold lines 523, 522A, 522B, 520 towards or away from one another (see, for example, FIG. 98A). Though the fold lines are illustrated in FIG. 98A, the example heating elements 500 described and shown in FIGS. 44A-115C may also be crimped, folded, or otherwise bent along the fold lines. Folding the heating element 500 along fold lines 520 forms a platform tine portion 524 defined by the region between the fold lines 520 and/or between side tine portions 526 defined by the region between the fold lines 520 and the outer edges 503 of the tines 502. The platform tine portion 524 may contact one end and/or support one end of the wicking element 162. The side tine portions 526 may contact opposite sides of the wicking element 162. The platform tine portion 524 and the side tine portions 526 define an interior volume of the heating element that forms a pocket shaped to receive the wicking element 162 and/or conform to the shape of at least a portion of the wicking element 162. The interior volume allows the wicking element 162 to be secured and retained by the heating element 500 within the pocket. The platform tine portion 524 and the side tine portions 526 contact the wicking element 162 to provide a multi-dimensional contact between the heating element 500 and the wicking element 162. Multi-dimensional contact between the heating element 500 and the wicking element 162 provides for a more efficient and/or faster transfer of the vaporizable material from the reservoir 140 of the vaporizer cartridge 120 to the heating portion 504 (via the wicking element 162) to be vaporized.

In some implementations, portions of the legs 506 of the heating element 500 may also be bent along fold lines 522A, 522B. Folding the portions of the legs 506 of the heating element 500 along fold lines 522 away from one another locates the legs 506 at a position spaced away from the heating portion 504 (and tines 502) of the heating element 500 in a first and/or second direction opposite the first direction (e.g., in the same plane). Thus, folding the portions of the legs 506 of the heating element 500 along fold lines 522 away from one another spaces the heating portion 504 from the body of the vaporizer cartridge 120. Folding the portions of the legs 506 along the fold lines 522A, 522B forms a bridge 585. In some implementations, the bridge 585 helps to reduce or eliminate overflow of vaporizable material from the heating portion 504, such as due to capillary action. The bridge 585 also helps to isolate the heating portion 504 from the legs 506, so that the heat generated at the heating portion 504 does not reach the legs 506. This also helps to localize heating of the heating element 500 to within the heating portion 504.

In some implementations, the heating element 500 may also be bent along fold lines 523 to define the cartridge contacts 124. The cartridge contacts 124 may be exposed to the environment or may otherwise be accessible (and may be positioned within an interior of a portion of the cartridge, such as the outer shell) to contact the receptacle contacts, while other portions, such as the heating portion 504 of the heating element 500, are positioned within an inaccessible part of the vaporizer cartridge 120, such as the wick housing.

In some implementations, the legs 506 include retainer portions 180 that are configured to be bent around at least a portion of a wick housing 178 that surrounds at least a portion of the wicking element 162 and heating element 500 (such as the heating portion 504). The retainer portions 180 form an end of the legs 506. The retainer portions 180 help to secure the heating element 500 and wicking element 162 to the wick housing 178 (and the vaporizer cartridge 120). The retainer portions 180 may alternatively be bent away from at least a portion of the wick housing 178.

FIGS. 87-92 illustrate another example of a heating element 500 consistent with implementations of the current subject matter. As shown, the heating element 500 includes the one or more tines 502 located in the heating portion 504, the one or more legs 506 extending from the tines 502, and the cartridge contacts 124 formed at the end portion and/or as part of each of the one or more legs 506.

The tines 502 may be folded and/or crimped to define the pocket in which a wicking element 162 (e.g., a flat pad) resides. The tines 502 include a platform tine portion 524 and side tine portions 526. The platform tine portion 524 is configured to contact one side of the wicking element 162 and the side tine portions 526 are configured to contact other opposite sides of the wicking element 162. The platform tine portion 524 and the side tine portions 526 form the pocket that is shaped to receive the wicking element 162 and/or conform to the shape of at least a portion of the wicking element 162. The pocket allows the wicking element 162 to be secured and retained by the heating element 500 within the pocket.

In this example, the tines 502 have various shapes and size, and are spaced apart from one another at the same or varying distances. For example, as shown, each of the side tine portions 526 includes at least four tines 502. In a first pair 570 of adjacent tines 502, each of the adjacent tines 502 is spaced apart at an equal distance from an inner region 576 positioned near the platform tine portion 524 to an outer region 578 positioned near the outer edge 503. In a second pair 572 of adjacent tines 502, the adjacent tines 502 are spaced apart by a varying distance from the inner region 576 to the outer region 578. For example, the adjacent tines 502 of the second pair 572 are spaced apart by a width that is greater at the inner region 576 than at the outer region 578. These configurations may help to maintain a constant and uniform temperature along the length of the tines 502 of the heating portion 504. Maintaining a constant temperature along the length of the tines 502 may provide higher quality aerosol, as the maximum temperature is more uniformly maintainable across the entire heating portion 504.

As noted above, each of the legs 506 may include and/or define a cartridge contact 124 that is configured to contact a corresponding receptacle contact 125 of the vaporizer 100. In some implementations, each pair of legs 506 (and the cartridge contacts 124) may contact a single receptacle contact 125. In some implementations, the legs 506 include retainer portions 180 that are configured to be bent and generally extend away from the heating portion 504. The retainer portions 180 are configured to be positioned within a corresponding recess in the wick housing 178. The retainer portions 180 form an end of the legs 506. The retainer portions 180 help to secure the heating element 500 and wicking element 162 to the wick housing 178 (and the vaporizer cartridge 120). The retainer portions 180 may have a tip portion 180A that extends from an end of the retainer portion 180 towards the heating portion 504 of the heating element 500. This configuration reduces the likelihood that the retainer portion will contact another portion of the vaporizer cartridge 120, or a cleaning device for cleaning the vaporizer cartridge 120.

The outer edge 503 of the tines 502 in the heating portion 504 may include a tab 580. The tab 580 may include one, two, three, four, or more tabs 580. The tab 580 may extend outwardly from the outer edge 503 and extend away from a center of the heating element 500. For example, the tab 580 may be positioned along an edge of the heating element 500 surrounding an internal volume defined by at least the side tine portions 526 for receiving the wicking element 162. The tab 580 may extend outwardly away from the internal volume of the wicking element 162. The tab 580 may also extend away in a direction opposite the platform tine portion 524. In some implementations, tabs 580 positioned on opposing sides of the internal volume of the wicking element 162 may extend away from one another. This configuration helps to widen the opening leading to the internal volume of the wicking element 162, thereby helping to reduce the likelihood that the wicking element 162 will catch, tear, and/or become damaged when assembled with the heating element 500. Due to the material of the wicking element 162, the wicking element 162 may easily catch, tear, and/or otherwise become damaged when assembled (e.g., positioned within or inserted into) with the heating element 500. Contact between the wicking element 162 and the outer edge 503 of the tines 502 may also cause damage to the heating element. The shape and/or positioning of the tab 580 may allow the wicking element 162 to more easily be positioned within or into the pocket (e.g., the internal volume of the heating element 500) formed by the tines 502, thereby preventing or reducing the likelihood that the wicking element 162 and/or the heating element will be damaged. Thus, the tabs 580 help to reduce or prevent damage caused to the heating element 500 and/or the wicking element 162 upon entry of the wicking element 162 into thermal contact with the heating element 500. The shape of the tab 580 also helps to minimize impact on the resistance of the heating portion 504.

In some implementations, at least a portion of the cartridge contacts 124 and/or at least a portion of the legs 506 may be plated with one or more outer plating materials 550 to reduce contact resistance at the point where the heating element 500 contacts the receptacle contacts 125.

FIGS. 93A-98B illustrate another example of a heating element 500 consistent with implementations of the current subject matter. As shown, the heating element 500 includes the one or more tines 502 located in the heating portion 504, the one or more legs 506 extending from the tines 502, and the cartridge contacts 124 formed at the end portion and/or as part of each of the one or more legs 506.

The tines 502 may be folded and/or crimped to define the pocket in which a wicking element 162 (e.g., flat pad) resides. The tines 502 include a platform tine portion 524 and side tine portions 526. The platform tine portion 524 is configured to contact one side of the wicking element 162 and the side tine portions 526 are configured to contact other opposite sides of the wicking element 162. The platform tine portion 524 and the side tine portions 526 form the pocket that is shaped to receive the wicking element 162 and/or conform to the shape of at least a portion of the wicking element 162. The pocket allows the wicking element 162 to be secured and retained by the heating element 500 within the pocket.

In this example, the tines 502 have the same shape and size and are spaced apart from one another at equal distances. Here, the tines 502 include a first side tine portion 526A and a second side tine portion 526B that are spaced apart by the platform tine portion 524. Each of the first and second side tine portions 526A, 526B include an inner region 576 positioned near the platform tine portion 524 to an outer region 578 positioned near the outer edge 503. At the outer region 578, the first side tine portion 526A is positioned approximately parallel to the second tine portion 526A. At the inner region 576, the first side tine portion 526A is positioned offset from the second tine portion 526B and the first and second side tine portions 526A, 526B are not parallel. This configuration may help to maintain a constant and uniform temperature along the length of the tines 502 of the heating portion 504. Maintaining a constant temperature along the length of the tines 502 may provide higher quality aerosol, as the maximum temperature is more uniformly maintainable across the entire heating portion 504.

As noted above, each of the legs 506 may include and/or define a cartridge contact 124 that is configured to contact a corresponding receptacle contact 125 of the vaporizer 100. In some implementations, each pair of legs 506 (and the cartridge contacts 124) may contact a single receptacle contact 125. In some implementations, the legs 506 include retainer portions 180 that are configured to be bent and generally extend away from the heating portion 504. The retainer portions 180 are configured to be positioned within a corresponding recess in the wick housing 178. The retainer portions 180 form an end of the legs 506. The retainer portions 180 help to secure the heating element 500 and wicking element 162 to the wick housing 178 (and the vaporizer cartridge 120). The retainer portions 180 may have a tip portion 180A that extends from an end of the retainer portion 180 towards the heating portion 504 of the heating element 500. This configuration reduces the likelihood that the retainer portion will contact another portion of the vaporizer cartridge 120, or a cleaning device for cleaning the vaporizer cartridge 120.

The outer edge 503 of the tines 502 in the heating portion 504 may include a tab 580. The tab 580 may extend outwardly from the outer edge 503 and extend away from a center of the heating element 500. The tab 580 may be shaped to allow the wicking element 162 to more easily be positioned within the pocket formed by the tines 502, thereby preventing or reducing the likelihood that the wicking element 162 will get caught on the outer edge 503. The shape of the tab 580 helps to minimize impact on the resistance of the heating portion 504.

In some implementations, at least a portion of the cartridge contacts 124 and/or at least a portion of the legs 506 may be plated with one or more outer plating materials 550 to reduce contact resistance at the point where the heating element 500 contacts the receptacle contacts 125.

Figure 99:
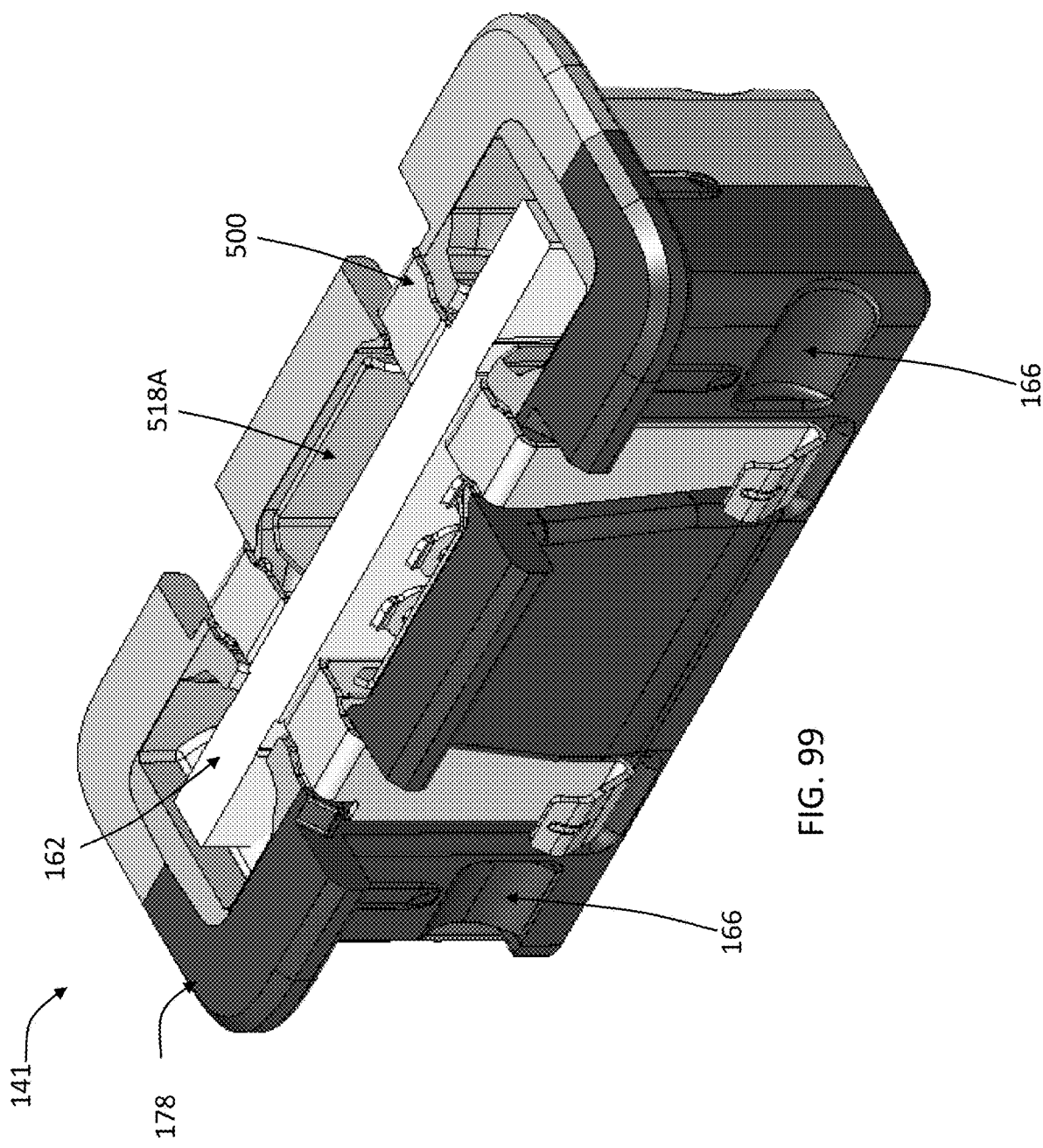
Figure 100:
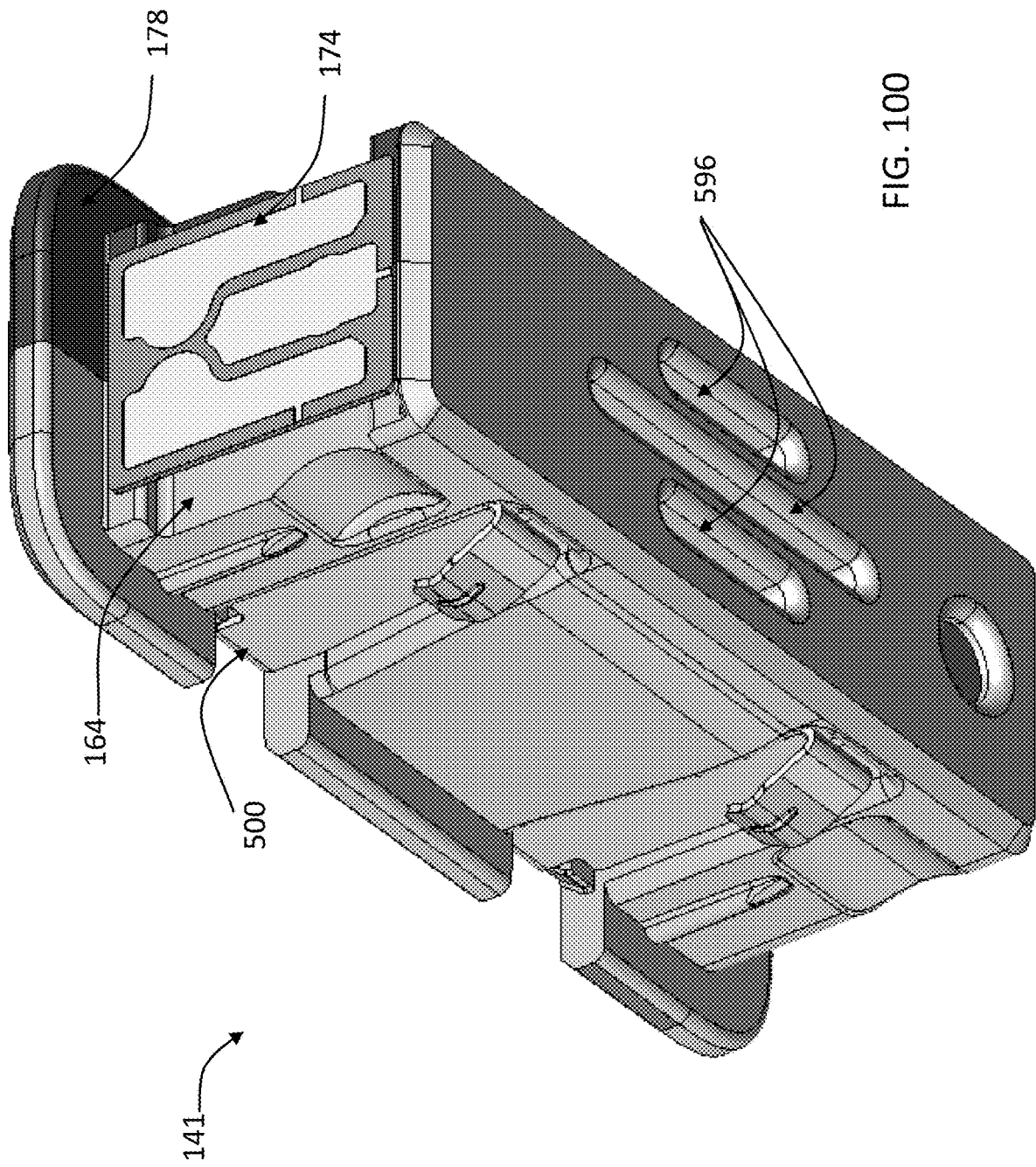
Figure 101:
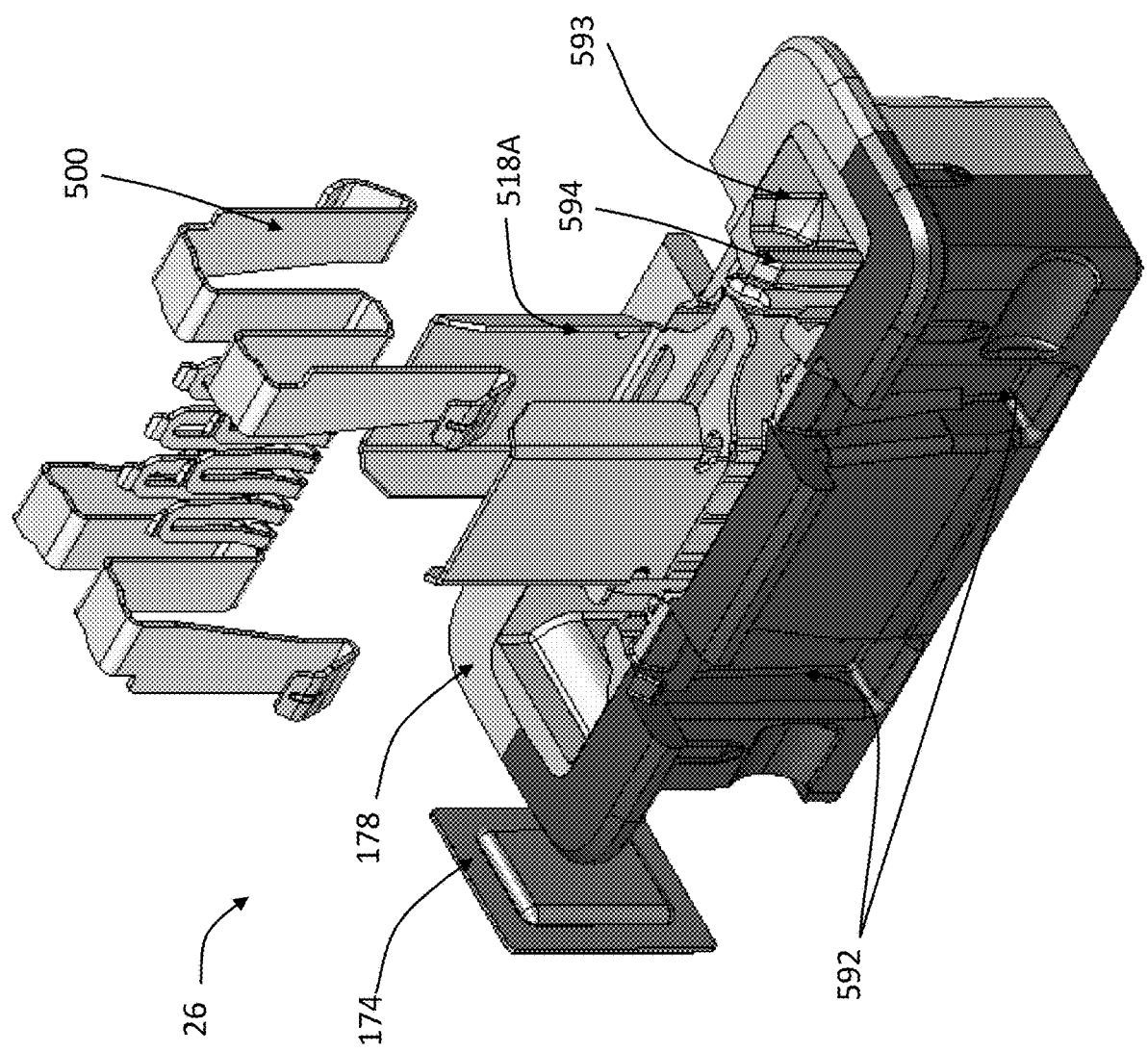

FIGS. 99-100 illustrate an example of the atomizer assembly 141, with the heating element 500 assembled with the wick housing 178, and FIG. 101 illustrates an exploded view of the atomizer assembly 141, consistent with implementations of the current subject matter. The wick housing 178 may be made of plastic, polypropylene, and the like. The wick housing 178 includes four recesses 592 in which at least a portion of each of the legs 506 of the heating element 500 may be positioned and secured. As shown, the wick housing 178 also includes an opening 593 providing access to an internal volume 594, in which at least the heating portion 504 of the heating element 500 and the wicking element 162 are positioned.

Figure 102:
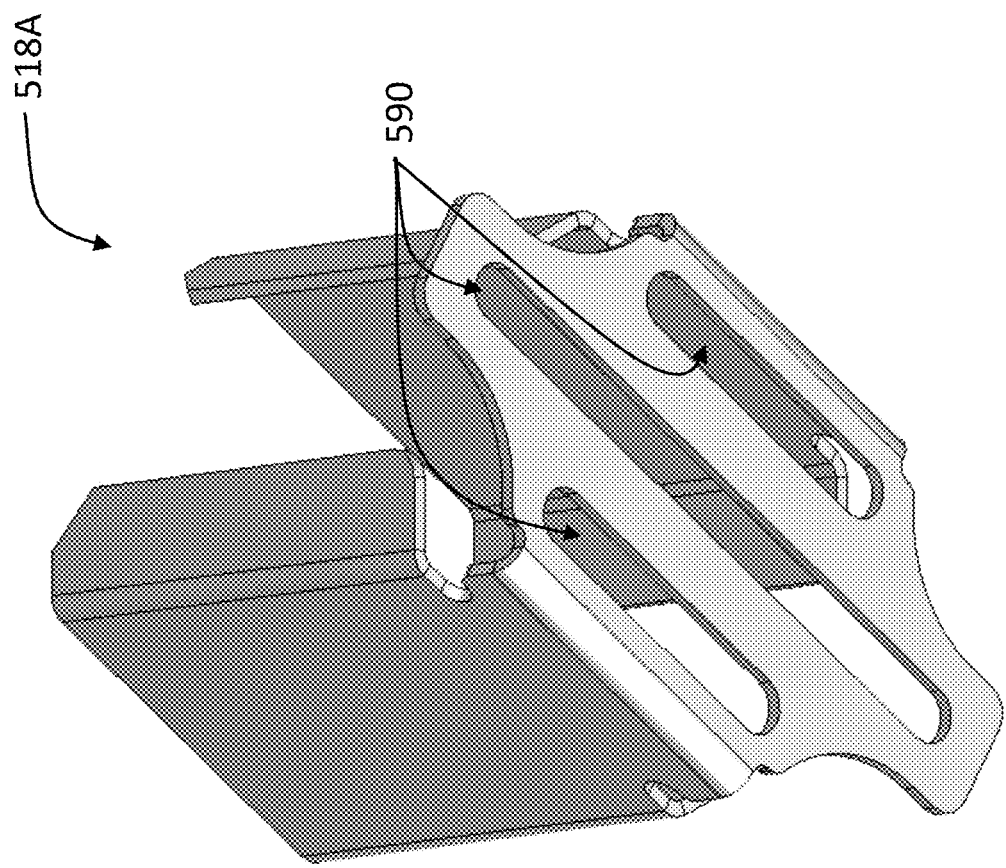

The wick housing 178 may also include a separate heat shield 518A, which is shown in FIG. 102. The heat shield 518A is positioned within the internal volume 594 within the wick housing 178 between the walls of the wick housing 178 and the heating element 500. The heat shield 518A is shaped to at least partially surround the heating portion 504 of the heating element 500 and to space the heating element 500 from the side walls of the wick housing 178. The heat shield 518A can help to insulate the heating portion 504 from the body of the vaporizer cartridge 120 and/or the wick housing 178. The heat shield 518A helps to minimize the effects of the heat emanating from the heating portion 504 on the body of the vaporizer cartridge 120 and/or the wick housing 178 to protect the structural integrity of the body of the vaporizer cartridge 120 and/or the wick housing 178 and to prevent melting or other deformation of the vaporizer cartridge 120 and/or the wick housing 178. The heat shield 518A may also help to maintain a consistent temperature at the heating portion 504 by retaining heat within the heating portion 504, thereby preventing or limiting heat losses.

The heat shield 518A includes one or more slots 590 (e.g., three slots) at one end that align with one or more slots (e.g., one, two, three, four, five, six, or seven or more slots) 596 formed in a portion of the wick housing 178 opposite the opening 593, such as a base of the wick housing 178 (see FIGS. 100 and 112). The one or more slots 590, 596 allow for the escape of pressure caused by the flow of liquid vaporizable material within the heating portion 504 and vaporization of vaporizable material, without affecting liquid flow of the vaporizable material.

In some implementations, flooding may occur between the heating element 500 (e.g., the legs 506) and an outer wall of the wick housing 178 (or between portions of the heating element 500). For example, liquid vaporizable material may build up due to capillary pressure between the legs 506 of the heating element 500 and the outer wall of the wick housing 178, as indicated by liquid path 599. In such cases, there may be sufficient capillary pressure to draw the liquid vaporizable material out of the reservoir and/or the heating portion 504. To help limit and/or prevent liquid vaporizable material from escaping the internal volume of the wick housing 178 (or the heating portion 504), the wick housing 178 and/or the heating element 500 may include a capillary feature that causes an abrupt change in capillary pressure, thereby forming a liquid barrier that prevents the liquid vaporizable material from passing the feature without the use of an additional seal (e.g., a hermetic seal). The capillary feature may define a capillary break, formed by a sharp point, bend, curved surface, or other surface in the wick housing 178 and/or the heating element 500. The capillary feature allows a conductive element (e.g., the heating element 500) to be positioned within both a wet and dry region.

The capillary feature may be positioned on and/or form a part of the heating element 500 and/or the wick housing 178 and causes an abrupt change in capillary pressure. For example, the capillary feature may include a bend, sharp point, curved surface, angled surface, or other surface feature that causes an abrupt change in capillary pressure between the heating element and the wick housing, along a length of the heating element, or another component of the vaporizer cartridge. The capillary feature may also include a protrusion or other portion of the heating element and/or wick housing that widens a capillary channel, such as a capillary channel formed between portions of the heating element, between the heating element and the wick housing, and the like, that is sufficient to reduce the capillary pressure within the capillary channel (e.g., the capillary feature spaces the heating element from the wick housing) such that the capillary channel does not draw liquid into the capillary channel. Thus, the capillary feature prevents or limits liquid from flowing along a liquid path beyond the capillary feature, due at least in part to the abrupt change and/or reduction in capillary pressure. The size and/or shape of the capillary feature (e.g., the bend, sharp point, curved surface, angled surface, protrusion, and the like) may be a function of a wetting angle formed between materials, such as the heating element and wick housing, or other walls of a capillary channel formed between components, may be a function of a material of the heating element and/or the wick housing or other component, and/or may be a function of a size of a gap formed between two components, such as the heating element and/or wick housing defining the capillary channel, among other properties.

Figure 103B:
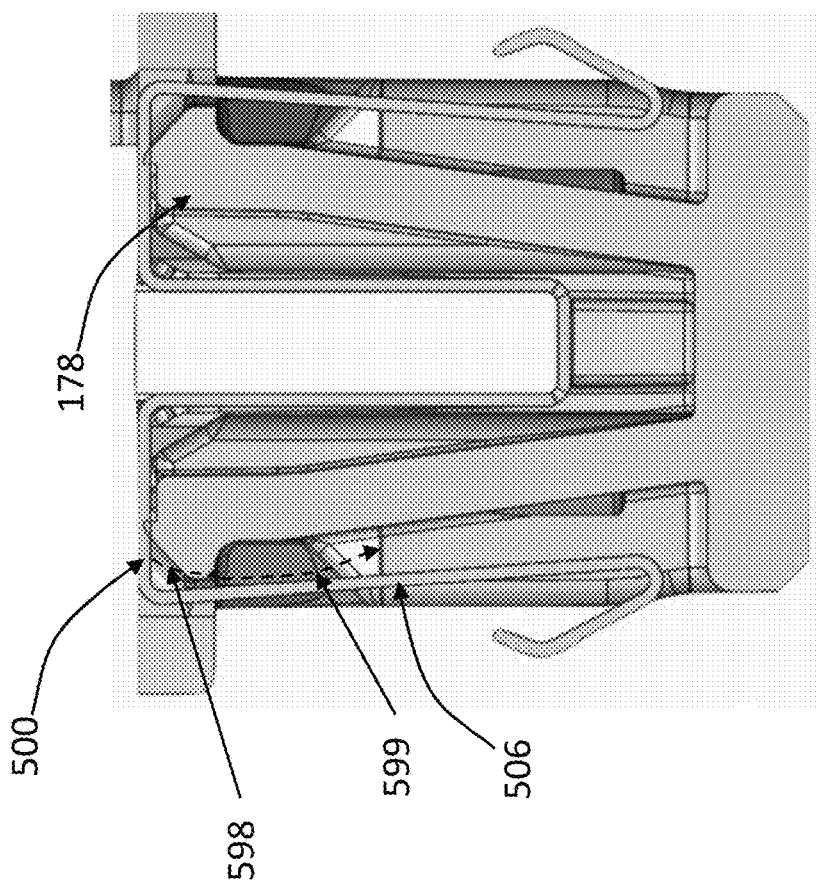
Figure 103A:
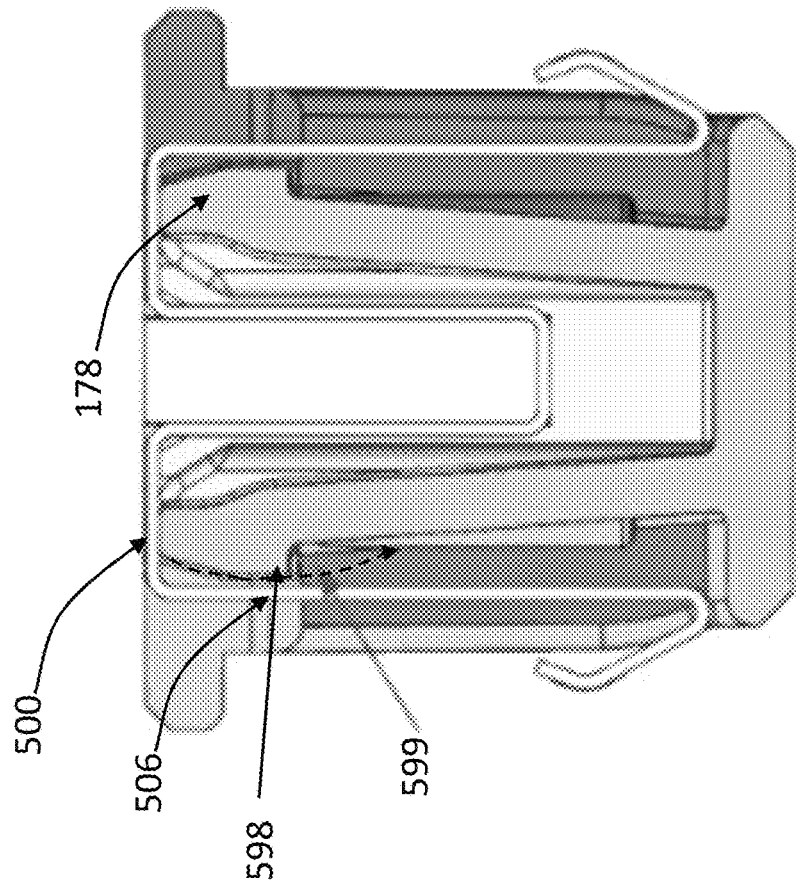

As an example, FIGS. 103A and 103B illustrate the wick housing 178 having a capillary feature 598 that causes an abrupt change in capillary pressure. The capillary feature 598 prevents or limits liquid from flowing along the liquid path 599 beyond the capillary feature 598, and helps to prevent liquid from pooling between the legs 506 and the wick housing 178. The capillary feature 598 on the wick housing 178 spaces the heating element 500 (e.g., a component made of metal, etc.) away from the wick housing 178 (e.g., a component made of plastic, etc.), thereby reducing the capillary strength between the two components. The capillary feature 598 shown in FIGS. 103A and 103B also includes a sharp edge at an end of an angled surface of the wick housing that limits or prevents liquid from flowing beyond the capillary feature 598.

As shown in FIG. 103B, the legs 506 of the heating element 500 may also be angled inwardly towards the interior volume of the heating element 500 and/or wick housing 178. The angled legs 506 may form a capillary feature that helps to limit or prevent liquid from flowing over an outer surface of the heating element and along the legs 506 of the heating element 500.

As another example, the heating element 500 may include a capillary feature (e.g., a bridge 585) that is formed with the one or more legs 506 and spaces the legs 506 away from the heating portion 504 (See FIGS. 82-98). The bridge 585 may be formed by folding the heating element 500 along the fold lines 520, 522. In some implementations, the bridge 585 helps to reduce or eliminate overflow of vaporizable material from the heating portion 504, such as due to capillary action. In some examples, such as the example heating elements 500 shown in FIGS. 93A-98B, the bridge 585 is angled and/or includes a bend to help limit fluid flow out of the heating portion 504.

As another example, the heating element 500 may include a capillary feature 598 that defines a sharp point to causes an abrupt change in capillary pressure, thereby preventing liquid vaporizable material from flowing beyond the capillary feature 598. FIG. 104 shows an example of the heating element 500 having the capillary feature 598, consistent with implementations of the current subject matter. As shown in FIG. 104, the capillary feature 598 may form an end of the bridge 585 that extends outwardly away from the heating portion by a distance that is greater than a distance between the legs 506 and the heating portion 504. The end of the bridge 585 may be a sharp edge to further help prevent liquid vaporizable material from passing to the legs 506 and/or out of the heating portion 504, thereby reducing leaking and increasing the amount of vaporizable material that remains within the heating portion 504.

FIGS. 105-106 illustrate a variation of the heating element 500 shown in FIGS. 87-92. In this variation of the heating element 500, the legs 506 of the heating element 500 include a bend at an inflection region 511. The bend in the legs 506 may form a capillary feature 598, which helps to prevent liquid vaporizable material from flowing beyond the capillary feature 598. For example, the bend may create an abrupt change in capillary pressure, which may also help to limit or prevent liquid vaporizable material from flowing beyond the bend and/or from pooling between the legs 506 and the wick housing 178, and may help to limit or prevent liquid vaporizable material from flowing out of the heating portion 504.

FIGS. 107-108 illustrate a variation of the heating elements 500 shown in FIGS. 93A-98B. In this variation of the heating element 500, the legs 506 of the heating element 500 include a bend at an inflection region 511. The bend in the legs 506 may form a capillary feature 598, which helps to prevent liquid vaporizable material from flowing beyond the capillary feature 598. For example, the bend may create an abrupt change in capillary pressure, which also helps to limit or prevent liquid vaporizable material from flowing beyond the bend and/or from pooling between the legs 506 and the wick housing 178, and may help to limit or prevent liquid vaporizable material from flowing out of the heating portion 504.

FIGS. 111A-112 illustrate another example of the atomizer assembly 141, with the heating element 500 assembled with the wick housing 178 and the heat shield 518A, and FIG. 113 illustrates an exploded view of the atomizer assembly 141, consistent with implementations of the current subject matter. The wick housing 178 may be made of plastic, polypropylene, and the like. The wick housing 178 includes four recesses 592 in which at least a portion of each of the legs 506 of the heating element 500 may be positioned and secured. Within the recesses 592, the wick housing 178 may include one or more wick housing retention features 172 (see FIG. 115A) that help to secure the heating element 500 to the wick housing 178, such as, for example, via a snap-fit arrangement between at least a portion of the legs 506 of the heating element 500 and the wick housing retention features 172. The wick housing retention features 172 may also help to space the heating element 500 from a surface of the wick housing 178, to help prevent heat from acting on the wick housing and melting a portion of the wick housing 178.

As shown, the wick housing 178 also includes an opening 593 providing access to an internal volume 594, in which at least the heating portion 504 of the heating element 500 and the wicking element 162 are positioned.

The wick housing 178 may also include one or more other cutouts that help to space the heating element 500 from a surface of the wick housing 178 to reduce the amount of heat that contacts the surface of the wick housing 178. For example, the wick housing 178 may include cutouts 170. The cutouts 170 may be formed along an outer surface of the wick housing 178 proximate to the opening 593. The cutouts 170 may also include a capillary feature, such as the capillary feature 598. The capillary feature of the cutouts 170 may define a surface (e.g., curved surface) that breaks tangency points between adjacent (or intersecting) walls (such as the walls of the wick housing). The curved surface may have a radius that is sufficient to reduce or eliminate the capillarity formed between the adjacent outer walls of the wick housing.

Referring to FIGS. 111A-112, the wick housing 178 may include a tab 168. The tab 168 may help to properly position and/or orient the wick housing during assembly of the vaporizer cartridge, with respect to one or more other components of the vaporizer cartridge. For example, added material forming the tab 168 shifts the center of mass of the wick housing 178. Due to the shifted center of mass, the wick housing 178 may rotate or slide in a certain orientation to align with a corresponding feature of another component of the vaporizer cartridge during assembly.

FIGS. 114A-114C illustrate an example method of forming the atomizer assembly 141 of the vaporizer cartridge 120, including the wick housing 178, the wicking element 162, and the heating element 500, consistent with implementations of the current subject matter. As shown in FIG. 114A, the wicking element 162 may be inserted into the pocket formed in the heating element 500 (e.g., formed by the side tine portions 526 and the platform tine portion 524. In some implementations, the wicking element 162 expands after being secured to the heating element 500, when vaporizable material is introduced to the wicking element 162.

FIG. 114B shows the wicking element 162 and the heating element 500 being coupled to the wick housing 178 and FIG. 114C shows an example of the wicking element 162 and the heating element 500 assembled with the wick housing 178. At least a portion of the heating element 500, such as the heating portion 504 may be positioned within the internal volume of the wick housing 178. The legs 506 (e.g., the retainer portions 180) of the heating element 500 may couple with the outer walls of the wick housing 178 via, for example, a snap-fit arrangement. In particular, the retainer portions 180 of the legs 506 may couple with and be positioned at least partially within the recesses in the wick housing 178.

FIGS. 115A-115C illustrate another example method of forming the atomizer assembly 141 of the vaporizer cartridge 120, including the wick housing 178, the wicking element 162, and the heating element 500, consistent with implementations of the current subject matter. As shown in FIG. 115A, the heating element 500 may be coupled to the wick housing 178, for example, by inserting or otherwise positioning the at least a portion of the heating element 500, such as the heating portion 504 within the internal volume of the wick housing 178. The legs 506 (e.g., the retainer portions 180) of the heating element 500 may couple with the outer walls of the wick housing 178 via, for example, a snap-fit arrangement. In particular, the retainer portions 180 or another portion of the legs 506 may couple with and be positioned at least partially within the recesses in the wick housing 178, for example, by coupling with the wick housing retention features 172.

As shown in FIG. 115B, the wicking element 162 may be inserted into the pocket formed in the heating element 500 (e.g., formed by the side tine portions 526 and the platform tine portion 524. In some implementations, the wicking element 162 is compressed as the wicking element 162 is coupled with the heating element 500. In some implementations, the wicking element 162 fits within the heating element 500 and expands after being secured to the heating element 500, when vaporizable material is introduced to the wicking element 162.

FIG. 115C shows an example of the wicking element 162 and the heating element 500 assembled with the wick housing 178 to form the atomizer assembly 141.

FIG. 116 illustrates an example process 3600 for assembling the heating element 500 consistent with implementations of the current subject matter. The process flow chart 3600 illustrates features of a method, which may optionally include some or all of the following. At block 3610, a planar substrate having resistive heating properties is provided. At block 3612, the planar substrate may be cut and/or stamped into the desired geometry. At block 3614, at least a portion of the heating element 500 may be plated. For example, as mentioned above, one or more layers of a plating material (e.g., an adhering plating material and/or an outer plating material) may be deposited onto at least a portion of an outer surface of the heating element 500. At block 3616, the heating portion 504 (e.g., the tines 502) may be bent and/or otherwise crimped about a wicking element to match the shape of the wicking element and to secure the wicking element to the heating element. At block 3618, the cartridge contacts 124, which in some implementations form an end portion of the legs 506 of the heating element 500, may be bent in a first or second direction along a plane or a third direction that is perpendicular to the first or second direction. At block 3620, the heating element 500 may be assembled into a vaporizer cartridge 120 and fluid communication between the wicking element 162 and a reservoir of vaporizable material may be caused. At 3622, the vaporizable material may be drawn into the wicking element 162, which may be positioned in contact with at least two surfaces of the heating portion 504 of the heating element 500. At block 3624, a heating means may be provided to the cartridge contacts 124 of the heating element to heat the heating element 500 at least the heating portion 504. The heating causes vaporization of the vaporizable material. At block 3626, the vaporized vaporizable material is entrained in a flow of air to a mouthpiece of the vaporization cartridge in which the heating element is positioned.

Condensate Control, Collection and Recycling Embodiments

FIGS. 117-119C illustrate embodiments of a vaporizer cartridge including one or more features for controlling, collecting, and/or recycling condensate in a vaporizer device. While the features described and shown with respect to FIGS. 117-119C may be included in the various embodiments of the vaporizer cartridges described above and/or may include one or more features of the various embodiments of the vaporizer cartridges described above, the features of the vaporizer cartridges described and shown with respect to FIGS. 117-119C may additionally and/or alternatively be included in one or more other example embodiments of vaporizer cartridges, such as those described below.

A typical approach by which a vaporizer device generates an inhalable aerosol from a vaporizable material involves heating the vaporizable material in a vaporization chamber (or a heater chamber) to cause the vaporizable material to be converted to the gas (or vapor) phase. A vaporization chamber generally refers to an area or volume in the vaporizer device within which a heat source (e.g., conductive, convective, and/or radiative) causes heating of a vaporizable material to produce a mixture of air and vaporized vaporizable to form a vapor for inhalation by a user of the vaporization device.

Since the introduction of vaporizer devices onto the market, vaporizer cartridges containing free liquid (i.e., the liquid held in a reservoir and not retained by porous material) have gained popularity. Products on the market may either have cotton pads or no feature at all to collect a condensate produced by the generation of vapor in a vaporizer device.

Liquid from condensation may form a film on the walls of an airpath and can travel up to the mouthpiece with the potential to leak into a user's mouth, which may cause an unpleasant experience. Even if the wall film does not leak out of the mouthpiece it can be entrained by the airflow creating large droplets which may be drawn into the user's mouth and throat resulting in an unpleasant user experience. Issues with using a cotton pad to absorb such condensate include ineffectiveness as well as additional manufacturing and assembly cost of integrating the cotton pad into a part of a vaporizer device. Furthermore, buildup and loss of condensate and/or unvaporized vaporizable material can ultimately result in an inability to draw all of the vaporizable material into the vaporization chamber, thereby wasting vaporizable material. As such, improved vaporization devices and/or vaporization cartridges are desired.

Vaporizing vaporizable material into an aerosol, as described in greater detail below, can result in condensate collecting along one or more internal channels and outlets (e.g., along a mouthpiece) of some vaporizers. For example, such condensate may include vaporizable material that was drawn from a reservoir, formed into an aerosol, and condensed into the condensate prior to exiting the vaporizer. Additionally, vaporizable material that has circumvented the vaporization process may also accumulate along the one or more internal channels and/or air outlets. This can result in the condensate and/or unvaporized vaporizable material exiting the mouthpiece outlet and depositing into the mouth of a user thereby creating both an unpleasant user experience as well as decreasing the amount of inhalable aerosol otherwise available. Furthermore, the buildup and loss of condensate can ultimately result in the inability to draw all of the vaporizable material from the reservoir into the vaporization chamber, thereby wasting vaporizable material. For example, as vaporizable material particulates accumulate in the internal channels of an air tube downstream of a vaporization chamber, the effective cross-sectional area of the airflow passageway narrows, thus increasing the flow rate of the air and thereby applying drag forces onto the accumulated fluid consequently amplifying the potential to entrain fluid from the internal channels and through the mouthpiece outlet. Various features and devices are described below that improve upon or overcome these issues.

As mentioned above, drawing vaporizable material from the reservoir and vaporizing the vaporizable material into an aerosol may result in vaporizable material condensate collecting adjacent and/or within one or more outlets formed in the mouthpiece. This can result in the condensate exiting the outlets and depositing into the mouth of the user, thus creating both an unpleasant user experience as well as decreasing the amount of consumable vapor otherwise available. Various vaporizer device features are described below that improve upon or overcome these issues. For example, various features are described herein for controlling condensate in a vaporizer device, which may provide advantages and improvements relative to existing approaches, while also introducing additional benefits as described herein. For example, vaporizer device features are described that are configured to collect and contain condensate that forms or collects adjacent an outlet of the mouthpiece thereby preventing the condensate from exiting the outlet.

Alternatively or in addition, drawing the vaporizable material 102 from the reservoir 140 and vaporizing the vaporizable material into an aerosol may result in condensate collecting within one or more tubes or internal channels (such as an air tube) of a vaporizer device. As will be described in greater detail below, vaporizer device features are described that are configured to trap the condensate and prevent vaporizable material particulates from exiting the air outlet of the vaporizer cartridge.

FIG. 117 illustrates an embodiment of a vaporizer cartridge 120 including a finned condensate collector 352 configured to collect and contain condensate that forms or collects adjacent an outlet of the mouthpiece or other region of the vaporizer cartridge 120 thereby preventing the condensate from exiting the outlet. As shown in FIG. 117, the finned condensate collector 352 may be disposed in a chamber proximate to the outlet 136 in a mouthpiece 130 such that aerosol passes through the finned condensate collector 352 prior to exiting through the outlet 136.

FIG. 118 illustrates an embodiment of a mouthpiece 330 including an embodiment of a finned condensate collector 352 having a plurality of microfluidic fins 354. The mouthpiece 330 may be configured for a vaporizer cartridge (such as vaporizer cartridge 120) and/or a vaporizer device (such as vaporizer 100) with the microfluidic fins 354 housed in the finned condensate collector 352 for improving condensate collection and containment in the vaporizer cartridge. As shown in FIG. 118, the microfluidic fins 354 include a set of walls 355 or other protrusions and narrow grooves 353 that have microfluidic properties. In an example embodiment, each wall in the set of walls 355 may be positioned parallel, or substantially parallel, to each other such that the space between each wall creates the grooves 353, which define capillary channels. The walls 355 define or otherwise form one or more capillary channels or grooves that are configured to collect fluid or other condensate.

The mouthpiece 330 illustrated in FIG. 118 may improve or otherwise modify the collection and containment of condensate within the reservoir such that condensate flowing out an air tube outlet 332 (such as an air tube or cannula 128 as shown in FIG. 117) may get trapped or otherwise collect between the microfluidic fins 354 as a user inhales on the vaporizer device. As mentioned, the microfluidic fins define one or more capillary channels through which fluid is collected via a capillary force formed when fluid is positioned within the capillary channel(s). To keep the fluid trapped by the finned condensate collector 352 without being extracted by the drag force of the airflow, the capillary force of the microfluidic fins may be greater than the airflow drag force by providing narrow grooves or channels in which the fluid becomes positioned. For example, an effective groove width may be 0.3 mm, and/or range from approximately 0.1 mm to approximately 0.8 mm.

One benefit to this configuration is eliminating the need for the manufacture of additional parts, thus reducing part count without loss of function. In one embodiment, the finned condensate collector and mouthpiece may be manufactured as a monolithic body using one mold, (e.g., plastic mold). Additionally, the finned condensate collector and mouthpiece may be separate structures that are welded together that collectively form the finned condensate collector. Other manufacturing methods and materials are within the scope of this disclosure.

In other embodiments, the microfluidic fins may be formed as a separate part and fit into the mouthpiece. For example, the microfluidic fins may be formed into any part of the vaporizer device or vaporizer cartridge for collecting and containing condensate. The microfluidic fins may be formed with the mouthpiece or may be formed as a second plastic part and fitted into the mouthpiece.

In addition to collecting in the mouthpiece, vaporizable material condensate may build up within one or more airflow passageways or internal channels of a vaporizer device. Various features and devices are described below that improve upon or overcome these issues. For example, various features are described herein for recycling condensate in a vaporizer device, such as embodiments of a condensate recycler system, as will be described in greater detail below.

FIGS. 119A-119C illustrate an embodiment of a condensate recycler system 360 of a vaporizer cartridge (such as vaporizer cartridge 120) and/or vaporizer device (such as vaporizer 100). The condensate recycler system 360 may be configured for collecting vaporizable material condensate and directing the condensate back to the wick for reuse.

The condensate recycler system 360 may include an internally grooved air tube 334 creating an airflow passageway 338 which extends from the mouthpiece toward the vaporization chamber 342 and may be configured to collect any vaporizable material condensate and direct it (via capillary action) back to the wick for reuse.

One function of the grooves may include that vaporizable material condensate becomes trapped or is otherwise positioned within the grooves. The condensate, once positioned within the grooves, drains down to the wick due to the capillary action created by the wicking element. The draining of the condensate within the grooves may at least partially be achieved via capillary action. If any condensation exists inside the air tube the vaporizable material particulates fill into the grooves rather than forming or building a wall of condensate inside the air tube if the grooves were not present. When the grooves are filled enough to establish fluid communication with the wick, the condensate drains through and from the grooves and can be reused as vaporizable material. In some embodiments, the grooves may be tapered such that the grooves are narrower towards the wick and wider towards the mouthpiece. Such tapering may encourage fluid to move toward the vaporization chamber as more condensate collects in the grooves via higher capillary action at the narrower point.

FIG. 119A shows a cross-sectional view of air tube 334. The air tube 334 includes an airflow passageway 338 and one or more internal grooves having a decreasing hydraulic diameter toward the vaporization chamber 342. The grooves are sized and shaped such that fluid (such as condensate) disposed within the grooves can be transported from a first location to a second location via capillary action. The internal grooves include air tube grooves 364 and chamber grooves 365. The air tube grooves 364 may be disposed inside of air tube 334 and may taper such that the cross-section of the air tube grooves 364 at an air tube first end 362 may be greater than the cross-section of the air tube grooves 364 at an air tube second end 363. The chamber grooves 365 may be disposed proximate to the air tube second end 363 and coupled with air tube grooves 364. The internal grooves may be in fluid communication with the wick and configured to allow the wick to continually drain vaporizable material condensate from the internal grooves, thus preventing the buildup of a film of condensate in the airflow passageway 338. The condensate may preferentially enter the internal grooves due to the capillary drive of the internal grooves. The gradient of capillary drive in the internal grooves directs fluid migration toward wick housing 346, where the vaporizable material condensate is recycled by resaturating the wick.

FIGS. 119B and 119C show an internal view of the condensate recycler system 360 as seen from the air tube first end 362, and the air tube second end 363, respectively. The air tube first end 362 may be disposed proximate to the mouthpiece and/or air outlet. The air tube second end 363 may be disposed proximate to the vaporization chamber 342 and/or wick housing 346, and may be in fluid communication with the chamber grooves 365 and/or the wick. The air tube grooves 364 may have a first diameter 366 and a second diameter 368. The second diameter 368 may be narrower than the first diameter 366.

As discussed above, as the effective cross-section of the air flow passageway narrows, either by accumulation of condensate in the airflow passageway or by design as discussed herein, the flow rate of the air moving through the air tube increases, applying drag forces on the accumulated fluid (e.g., condensate). Fluid exits the air outlet when the drag forces pulling the fluid out toward the user (e.g., responsive to inhalation on the vaporizer) are higher than the capillary forces pulling the fluid toward the wick.

To overcome this issue and encourage the condensate away from the mouthpiece outlet and back toward the vaporization chamber 342 and/or the wick, a tapered airflow passageway is provided such that a cross-section of the air tube grooves 364 proximate to the vaporization chamber 342 is narrower than a cross-section of the air tube grooves 364 proximate to the mouthpiece. Further, each of the internal grooves narrows such that the width of the internal grooves proximate to the air tube first end 362 may be wider than the width of the internal grooves proximate to the air tube second end 363. As such, the narrowing passageway increases the capillary drive of the air tube grooves 364 and encourages fluid movement of the condensate toward the chamber grooves 365. Further yet, the chamber grooves 365 proximate to the air tube second end 363 may be wider than the width of the chamber grooves 365 proximate to the wick. That is, each groove channel progressively narrows approaching the wick in addition to the airflow passageway itself narrowing toward the wick end.

To maximize the effectiveness of the capillary action provided by the condensate recycler system design, the air tube cross-sectional size relative to the groove size may be considered. While capillary drive may increase as groove width narrows, smaller groove sizes may result in the condensate overflowing the grooves and clogging the air tube. As such, groove width may range from approximately 0.1 mm to approximately 0.8 mm.

In some embodiments, the geometry or number of grooves may vary. For example, the grooves may not necessarily have a decreasing hydraulic diameter toward the wick. In some embodiments, a decreasing hydraulic diameter toward the wick may improve performance of the capillary drive, but other embodiments may be considered. For example, the internal grooves and channels may have a substantially straight structure, a tapered structure, a helical structure, and/or other arrangements.

In some embodiments, the features required to create the capillary drive may be integral with the housing structure of the aerosol generation unit (e.g., vaporization chamber), the mouthpiece, and/or part of a separate plastic part (such as the finned condensation collector discussed herein).

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together."

A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" may encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments are described above, any of a number of changes may be made to various embodiments without departing from the teachings herein. For example, the order in which various described method steps are performed may often be changed in alternative embodiments, and in other alternative embodiments, one or more method steps may be skipped altogether. Optional features of various device and system embodiments may be included in some embodiments and not in others. Therefore, the foregoing description is provided primarily for exemplary purposes and should not be interpreted to limit the scope of the claims.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to programs, software, software applications, applications, components, or code, include machine instructions for a programmable processor, and may be implemented in a high-level procedural language, an object-oriented programming language, a functional programming language, a logical programming language, and/or in assembly/machine language.

As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed.

Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent document or the patent disclosure, as it appears in the Patent and Trademark Office patent file or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A vaporizer comprising:
    a reservoir configured to contain a liquid vaporizable material, the reservoir at least partially defined by at least one wall, the reservoir comprising a storage chamber and an overflow volume;
    an atomizer configured to convert the liquid vaporizable material to a gas-phase state;
    a primary passageway comprising a first channel for conveying the liquid vaporizable material from the storage chamber to the atomizer; and
    a collector disposed in the overflow volume, the collector comprising a capillary structure having a secondary passageway configured to retain a volume of the liquid vaporizable material in fluid contact with the storage chamber, the secondary passageway comprising a microfluidic feature configured to prevent air and liquid from bypassing each other during filling and emptying of the collector, the microfluidic feature allowing the liquid vaporizable material to move along a length of the secondary passageway only with a meniscus fully covering a cross-sectional area of the secondary passageway such that ambient air can enter the storage chamber through the secondary passageway and such that the liquid vaporizable material that enters the secondary passageway from the storage chamber is at least temporarily retained within the overflow volume thereby preventing the liquid vaporizable material from leaking from the vaporizer cartridge;
    wherein the primary passageway and the secondary passageway are each separately and fluidly connected to the storage chamber and to the atomizer.

2. The vaporizer of claim 1, wherein the primary passageway is formed through a structure of the collector.

3. The vaporizer of claim 1, wherein the first channel has a cross-sectional shape with at least one irregularity configured to allow liquid vaporizable material in the first channel to bypass an air bubble blocking a remainder of the first channel.

4. The vaporizer of claim 3, wherein the cross-sectional shape resembles a cross.

5. The vaporizer of claim 1, wherein the cross-sectional area is sufficiently small that, for a material from which walls of the secondary passageway are formed and a composition of the liquid vaporizable material, the liquid vaporizable material wets the secondary passageway around an entire perimeter of the secondary passageway.

6. The vaporizer of claim 1, wherein the storage chamber and the collector are configured to maintain a continuous column of the liquid vaporizable material in the collector in contact with the liquid vaporizable material in the storage chamber such that a reduction in pressure in the storage chamber relative to ambient pressure causes the continuous column of the liquid vaporizable material in the collector to be at least partially drawn back into the storage chamber.

7. The vaporizer of claim 1, wherein the secondary passageway comprises a plurality of spaced-apart constriction points having a smaller cross-sectional area than parts of the secondary passageway between the constriction points.

8. The vaporizer of claim 7, wherein the constriction points have a flatter surface directed along the secondary passageway toward the storage chamber and a rounder surface directed along the secondary passageway away from the storage chamber.

9. The vaporizer of claim 1, further comprising a microfluidic gate between the collector and the storage chamber, the microfluidic gate comprising a rim of an aperture between the storage chamber and the collector that is flatter on a first side facing the storage chamber than a second, more rounded, side facing the collector.

10. The vaporizer of claim 9, wherein the microfluidic gate comprises a plurality of openings connecting the storage chamber and the collector and a pinch-off point between the plurality of openings, the plurality of openings comprising a first channel and a second channel, wherein the first channel of the plurality of openings has a higher capillary drive than the second channel.

11. The vaporizer of claim 10, wherein the meniscus, when reaching the pinch-off point, is routed to the second channel due to the higher capillary drive in the first channel of the plurality of openings such that an air bubble is formed to escape into the liquid vaporizable material in the storage chamber.

12. The vaporizer of claim 1, wherein the liquid vaporizable material comprises one or more of propylene glycol and vegetable glycerin.

13. The vaporizer of claim 1, wherein the capillary structure is configured to contain at least some excess liquid vaporizable material that is pushed out of the storage chamber without allowing the liquid vaporizable material in the capillary structure to reach an outlet of the collector.

14. The vaporizer of claim 1, wherein the primary and secondary passageways are directly connected to the storage chamber.

15. A vaporizer comprising:
- a reservoir configured to contain a liquid vaporizable material, the reservoir at least partially defined by at least one wall, the reservoir comprising a storage chamber and an overflow volume;
- an atomizer configured to convert the liquid vaporizable material to a gas-phase state;
- a primary passageway comprising a first channel for conveying the liquid vaporizable material from the storage chamber to the atomizer; and
- a collector disposed in the overflow volume, the collector comprising a capillary structure having a secondary passageway configured to retain a volume of the liquid vaporizable material in fluid contact with the storage chamber, the secondary passageway comprising a microfluidic feature configured to prevent air and liquid from bypassing each other during filling and emptying of the collector, wherein the primary and secondary passageways are each separately and directly connected to the storage chamber and the atomizer;
- wherein the atomizer is positioned below the collector.

16. The vaporizer of claim 15, wherein the microfluidic feature is configured to allow the liquid vaporizable material to move along a length of the secondary passageway such that ambient air can enter the storage chamber through the secondary passageway.

17. The vaporizer of claim 15, wherein the microfluidic feature is configured to allow the liquid vaporizable material to move along a length of the secondary passageway such that the liquid vaporizable material that enters the secondary passageway from the storage chamber is at least temporarily retained within the overflow volume thereby preventing the liquid vaporizable material from leaking from the vaporizer cartridge.

* * * * *